(12) United States Patent
Schlangen

(10) Patent No.: US 9,623,912 B2
(45) Date of Patent: Apr. 18, 2017

(54) UTILITY VEHICLE

(71) Applicant: Polaris Industries Inc., Medina, MN (US)

(72) Inventor: Adam J. Schlangen, Rush City, MN (US)

(73) Assignee: Polaris Industries Inc., Medina, MN (US)

( * ) Notice: Subject to any disclaimer, the term of this patent is extended or adjusted under 35 U.S.C. 154(b) by 83 days.

(21) Appl. No.: 14/430,074

(22) PCT Filed: Sep. 20, 2013

(86) PCT No.: PCT/US2013/061002
§ 371 (c)(1),
(2) Date: Mar. 20, 2015

(87) PCT Pub. No.: WO2014/047488
PCT Pub. Date: Mar. 27, 2014

(65) Prior Publication Data
US 2015/0343900 A1  Dec. 3, 2015

Related U.S. Application Data

(60) Provisional application No. 61/703,383, filed on Sep. 20, 2012, provisional application No. 61/822,113, filed on May 10, 2013.

(51) Int. Cl.
*B62D 23/00* (2006.01)
*B60K 17/34* (2006.01)
(Continued)

(52) U.S. Cl.
CPC ............. *B62D 23/005* (2013.01); *B60G 3/20* (2013.01); *B60G 7/001* (2013.01); *B60K 15/063* (2013.01);
(Continued)

(58) Field of Classification Search
CPC .................................................. B62D 23/005
(Continued)

(56) References Cited

U.S. PATENT DOCUMENTS 4,045,075 A * 8/1977 Pulver .................... B62D 21/08
280/798
5,078,229 A  1/1992 Kikuchi
(Continued)

OTHER PUBLICATIONS

International Search Report and Written Opinion of the International Searching Authority, issued by the European Patent Office, dated Jan. 3, 2014, for International Application No. PCT/US2013/061002; 14 pages.
(Continued)

*Primary Examiner* — Jason S Morrow
(74) *Attorney, Agent, or Firm* — Faegre Baker Daniels LLP

(57) ABSTRACT

In one embodiment, a utility vehicle includes a plurality of ground-engaging members configured to contact a ground surface, and a powertrain assembly operably coupled to the ground-engaging members. The utility vehicle also includes a frame supported by the ground-engaging members and extending along a longitudinal axis of the utility vehicle. The utility vehicle further includes a tunnel member coupled to the frame and extending along the longitudinal axis. The tunnel member is positioned at a first height from the ground surface. Additionally, the utility vehicle includes a cargo portion supported by the frame and positioned generally rearward of the tunnel member. The cargo portion has a cargo surface substantially aligned with the tunnel member and positioned at a second height from the ground surface. The first height is approximately equal to the second height.

15 Claims, 85 Drawing Sheets

(51) Int. Cl.
| | |
|---|---|
| *B60K 15/063* | (2006.01) |
| *B60R 11/00* | (2006.01) |
| *B60G 7/00* | (2006.01) |
| *B62D 25/20* | (2006.01) |
| *B62D 33/027* | (2006.01) |
| *B62D 33/06* | (2006.01) |
| *B60G 3/20* | (2006.01) |
| *B60N 2/01* | (2006.01) |
| *B60N 2/38* | (2006.01) |
| *B60R 21/13* | (2006.01) |
| *B62D 33/02* | (2006.01) |
| *B60R 21/00* | (2006.01) |

(52) U.S. Cl.
 CPC .............. *B60K 17/34* (2013.01); *B60N 2/012* (2013.01); *B60N 2/38* (2013.01); *B60R 11/00* (2013.01); *B60R 21/13* (2013.01); *B62D 25/20* (2013.01); *B62D 33/02* (2013.01); *B62D 33/0273* (2013.01); *B62D 33/06* (2013.01); *B62D 33/0625* (2013.01); *B60G 2200/144* (2013.01); *B60G 2300/13* (2013.01); *B60K 2015/0635* (2013.01); *B60R 2021/0074* (2013.01); *B60R 2021/134* (2013.01)

(58) Field of Classification Search
 USPC .......................................... 296/205; 280/756
 See application file for complete search history.

(56) References Cited

U.S. PATENT DOCUMENTS

| | | | | |
|---|---|---|---|---|
| 8,240,748 | B2* | 8/2012 | Chapman | A61G 3/00 296/187.07 |
| 8,944,465 | B2* | 2/2015 | Shinbori | B60N 2/01 280/756 |
| 8,967,666 | B2* | 3/2015 | Iardella | F41A 23/34 280/756 |
| 8,979,124 | B2* | 3/2015 | Shinbori | B62D 63/04 280/756 |
| 9,150,182 | B1* | 10/2015 | Schlangen | B60G 3/20 |
| 2002/0107101 | A1 | 8/2002 | Bowen | |
| 2003/0211913 | A1 | 11/2003 | Spitale | |
| 2004/0026948 | A1 | 2/2004 | Novajovsky | |
| 2009/0301830 | A1* | 12/2009 | Kinsman | B60G 15/063 188/289 |
| 2010/0012412 | A1 | 1/2010 | Deckard et al. | |
| 2011/0240395 | A1* | 10/2011 | Hurd | B60K 5/1241 180/291 |
| 2012/0223500 | A1 | 9/2012 | Kinsman et al. | |
| 2015/0210319 | A1* | 7/2015 | Tiramani | B62D 21/183 280/756 |

OTHER PUBLICATIONS

Patent Examination Report No. 1 issued by the Australian Government IP Australia, dated Mar. 18, 2016, 5 pages.

* cited by examiner

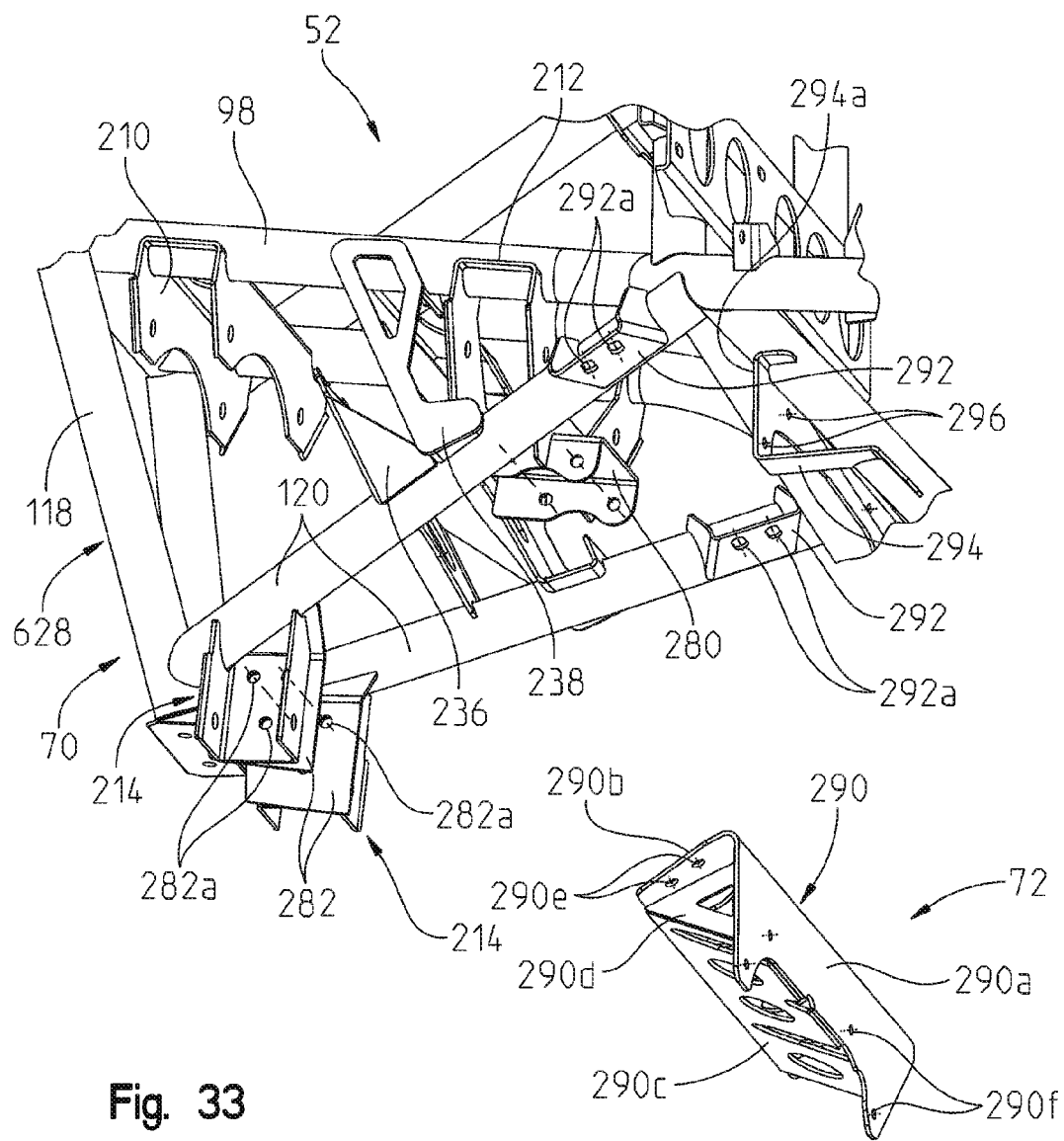
Fig. 33
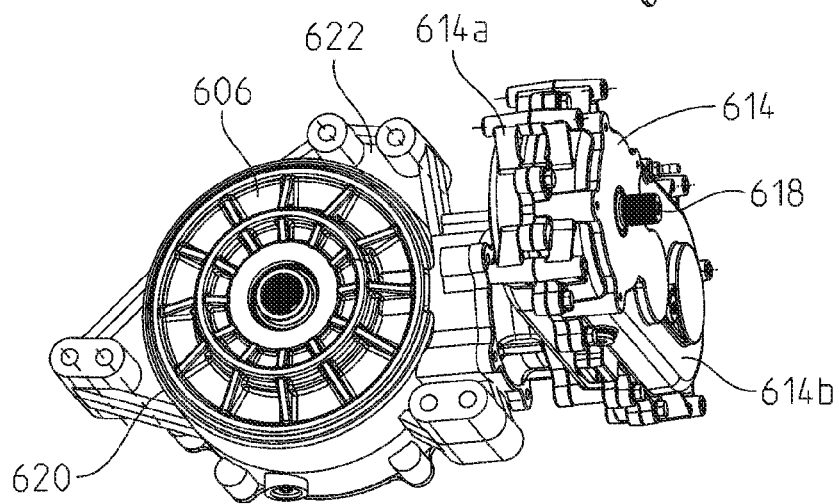

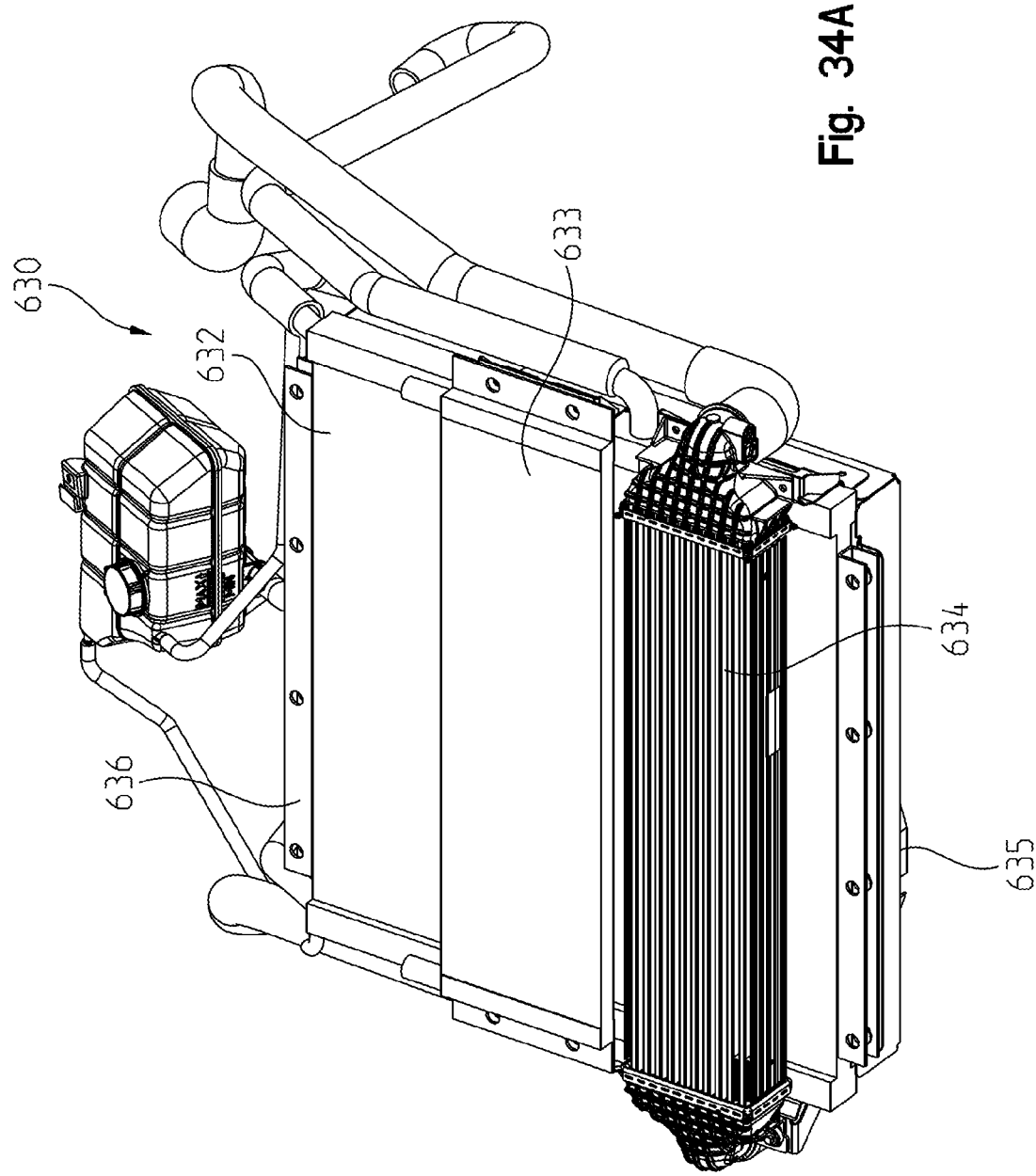

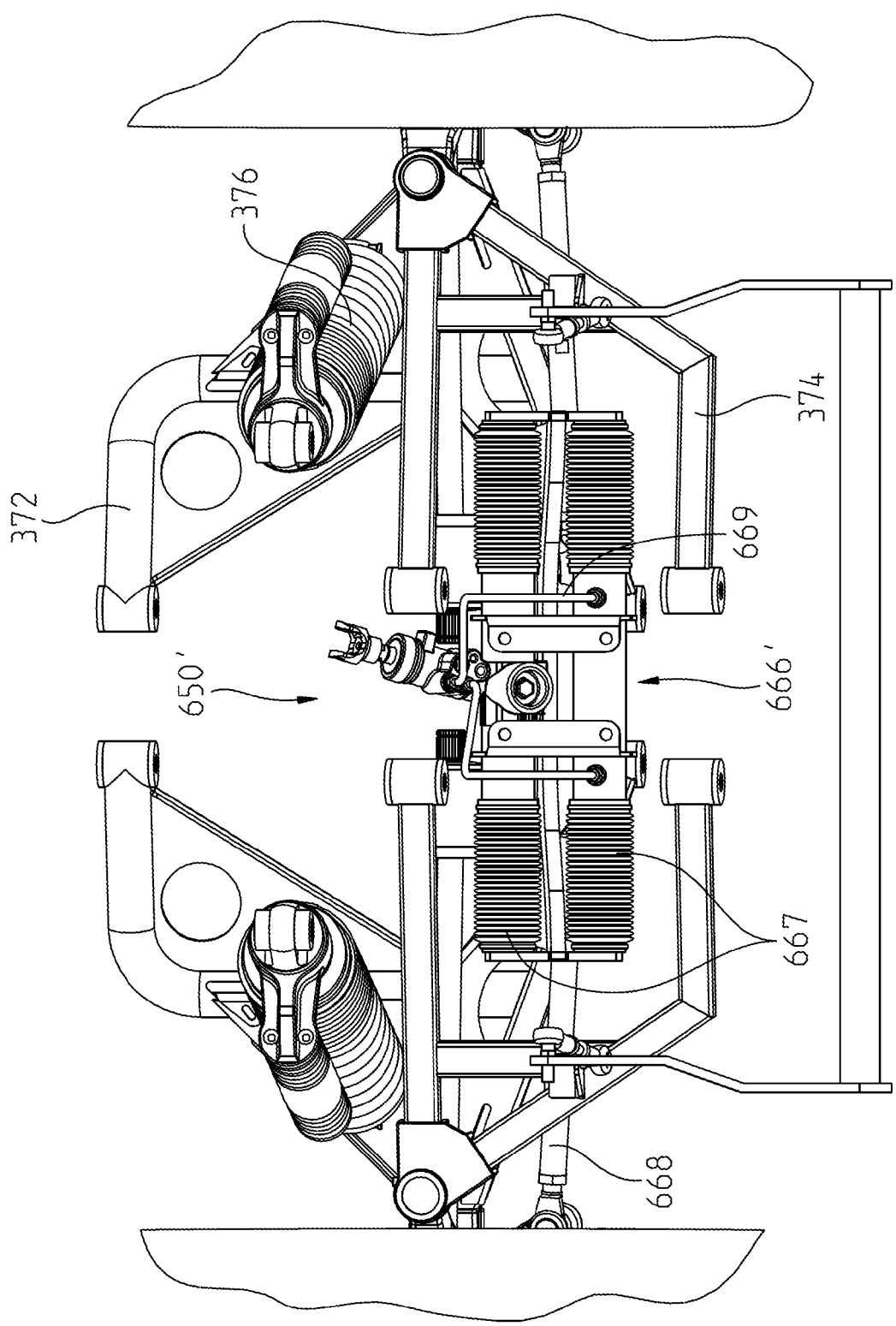

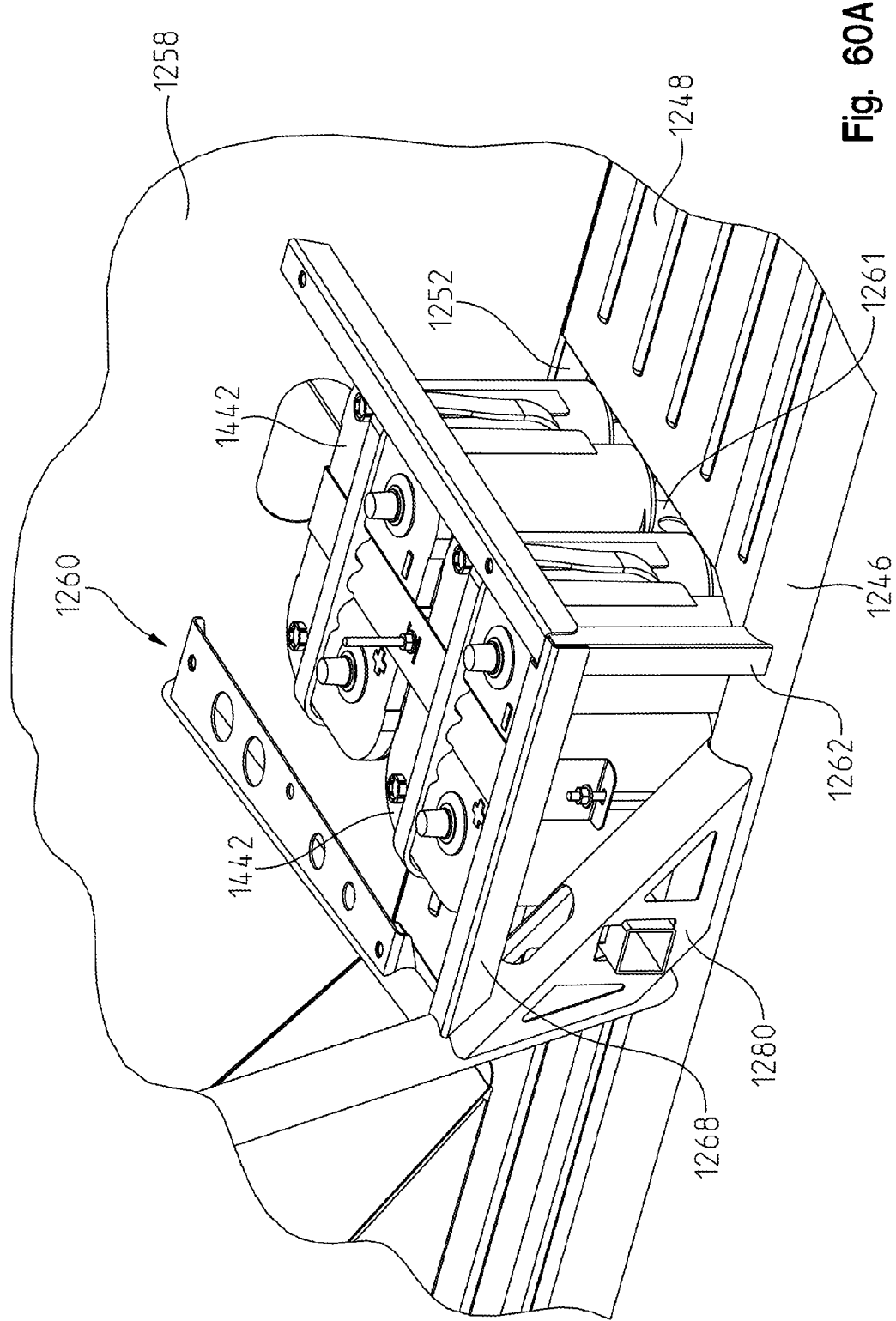

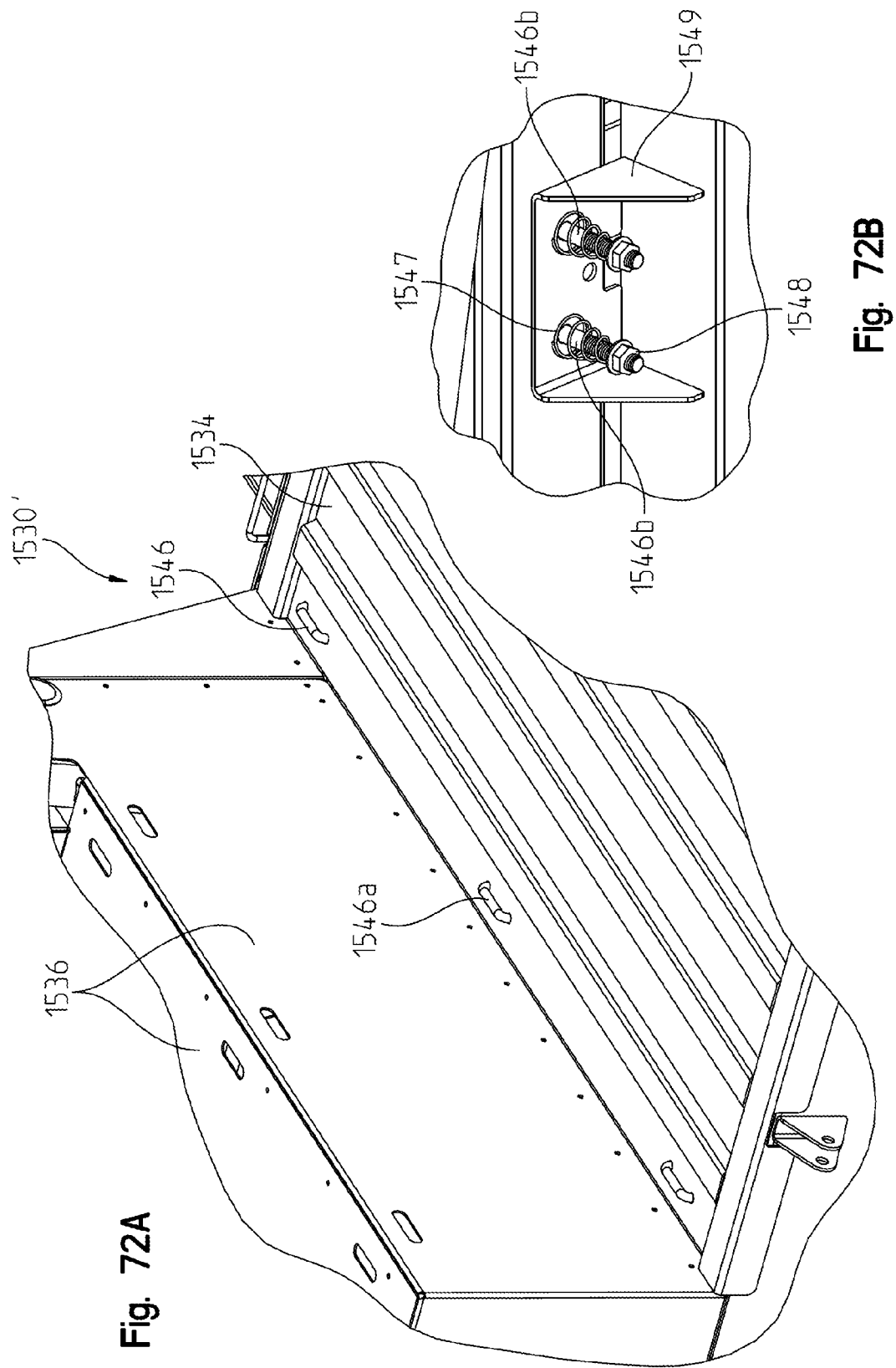

UTILITY VEHICLE

The present application is a national stage application under 35 U.S.C. §371 of International Patent Application No. PCT/US13/61002, filed on Sep. 20, 2013, and entitled "VEHICLE," which claims priority to U.S. Patent Application Ser. No. 61/703,383, filed Sep. 20, 2012, entitled "VEHICLE" and U.S. Patent Application Ser. No. 61/822,113, filed May 10, 2013, entitled "VEHICLE," the complete disclosures of which are expressly incorporated by reference herein.

The present invention relates generally to a vehicle configured to support one or more passengers and a cargo load and, more particularly, to a utility vehicle with features and systems configured for military operations and applications.

Vehicles such as utility vehicles, all-terrain vehicles, tractors, and other similar vehicles are known. Such vehicles may include forward and rear storage compartments, such as trunks. The vehicles also may be configured to couple with sub-assemblies having axles, such as trailers.

Utility vehicles are also configured to support at least an operator. Some utility vehicles may support one or more passengers. The passengers may share a bench seat, or the vehicle may be individual seats in a side-by-side configuration.

In one embodiment, a utility vehicle includes a plurality of ground-engaging members configured to contact a ground surface, and a drivetrain assembly operably coupled to the ground-engaging members. The utility vehicle also includes a frame supported by the ground-engaging members and extending along a longitudinal axis of the utility vehicle. The utility vehicle further includes a tunnel member coupled to the frame and extending along the longitudinal axis. The tunnel member is positioned at a first height from the ground surface. Additionally, the utility vehicle includes a cargo portion supported by the frame and positioned generally rearward of the tunnel member. The cargo portion has a cargo surface substantially aligned with the tunnel member and positioned at a second height from the ground surface. The first height is approximately equal to the second height.

In another embodiment, a utility vehicle includes a plurality of ground-engaging members, and a frame assembly supported by the ground-engaging members and extending along a longitudinal axis of the utility vehicle. The utility vehicle also includes a seating section supported by the frame assembly and including a plurality of seats in a side-by-side configuration. The utility vehicle further includes a drivetrain assembly supported by the frame assembly, and a fuel tank operably coupled to the drivetrain assembly and positioned intermediate the seats.

Another embodiment includes a utility vehicle having a plurality of ground-engaging members configured to contact a ground surface, and a drivetrain assembly operably coupled to the ground-engaging members. The utility vehicle further includes a frame assembly comprised of a plurality of frame members defining a front portion and a rear portion. At least one of the frame members of the front portion is substantially comprised of a high-strength material. Additionally, the utility vehicle includes at least one accessory mount integrally coupled to the front portion of the frame assembly and configured to increase the vertical strength of the frame assembly.

A further embodiment includes a utility vehicle having a plurality of ground-engaging members, and a drivetrain assembly operably coupled to the ground-engaging members. The utility vehicle also includes a frame assembly extending along a longitudinal axis of the utility vehicle and including a front end and a rear end. The frame assembly includes a plurality of longitudinally-extending frame members extending generally parallel to the longitudinal axis and between the front and rear ends of the frame assembly. The longitudinally-extending frame members are configured with at least one accessory bracket, which is configured to support an accessory positioned laterally outward of the utility vehicle and generally perpendicular to the longitudinal axis.

Another embodiment includes a utility vehicle having a plurality of ground-engaging members, and a drivetrain assembly operably coupled to the ground-engaging members. The utility vehicle further includes a frame assembly supported by the ground-engaging members and including at least one central frame member. The utility vehicle also includes a seating section within an operator area and supported by the frame assembly. The seating section includes at least a first seat and a second seat in a side-by-side configuration. The first and second seat are laterally outward of the at least one central frame member of the frame assembly. Additionally, the utility vehicle includes a roll cage assembly coupled to the frame assembly and generally surrounding the seating section. The roll cage assembly includes a plurality of roll cage members, and at least one of the roll cage members extends downwardly and inwardly to couple with the at least one central frame member of the frame assembly. The at least one roll cage member is configured to increase space in the operator area.

In one embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A front suspension is also provided. The front suspension comprises a lower control arm coupled to the frame at first and second coupling points; an upper control arm coupled to the frame at third and fourth coupling points; and a shock absorber coupled to the frame at an upper end thereof and to the lower control arm, the shock being positioned between the second and fourth coupling points.

In another embodiment, a utility vehicle has a main frame; a plurality of ground engaging members adapted to support the main frame above the ground. The ground engaging members comprise front and rear ground engaging members. A first seating area is supported by the main frame. An engine is supported by the main frame, forward of the first seating area. A rear suspension is also provided. The rear suspension comprises rear trailing arms coupled to the frame at a front end thereof and to the axle at a rear end thereof; rear alignment arms are coupled to the frame at a front end thereof and to the axle at a rear end thereof; and a shock absorber is coupled to the frame at an upper end thereof and to the rear trailing arm at a lower end thereof.

Another embodiment includes a utility vehicle comprising a frame having a front section, a midsection, and a rear section. The frame defines a cab rearward of the front section. The utility vehicle further comprises a plurality of ground engaging members operably coupled to the frame and configured for use on a ground surface; and a plurality of body panels. The body panels include a hood, a first side panel, and a second side panel coupled to the front section of the frame. The utility vehicle further comprises an engine supported by the frame and operably coupled to the ground engaging members; and a cooling assembly fluidly coupled to the engine and supported by the front section of the frame.

The cooling assembly is angled relative to the longitudinal direction and is spaced apart from a line of sight extending from the cab.

A further embodiment includes a utility vehicle comprising a frame extending along a centerline of the utility vehicle and having a front section, a midsection, and a rear section. The frame defines a cab rearward of the front section. The utility vehicle further comprises a plurality of ground engaging members operably coupled to the frame. Additionally, the utility vehicle comprises an engine supported by the frame along the centerline of the utility vehicle; a drive shaft spaced apart from the engine; a transfer case operably coupled to the drive shaft and supported by the front section of the frame; and a front final drive operably coupled to the transfer case and supported by the frame. The final drive is positioned along the centerline of the utility vehicle.

Another embodiment includes a utility vehicle comprising a frame extending along a centerline of the utility vehicle; a plurality of ground engaging members operably coupled to the frame; and a drivetrain assembly supported by the frame. The drivetrain assembly includes an engine supported by the frame; and a drive shaft off-center from the centerline of the utility vehicle. The drive shaft has an input end operably coupled to the engine and an output end. The drivetrain assembly further includes a final drive positioned along the centerline of the utility vehicle. The final drive has an input end operably coupled to the drive shaft and an output end operably coupled to the ground engaging members. Additionally, the drivetrain assembly includes a transfer case positioned intermediate the drive shaft and the final drive. The transfer case is perpendicular to the output end of the drive shaft and is perpendicular to the input end of the final drive.

A further embodiment includes a utility vehicle comprising a frame extending along a centerline of the utility vehicle; a plurality of ground engaging members operably coupled to the frame; a drivetrain assembly supported by the frame; and a suspension assembly operably coupled to the ground engaging members. The suspension assembly includes upper control arms, lower control arms, and shock absorbers. The utility vehicle further comprises a steering assembly configured to move the ground engaging members. A portion of the steering assembly is positioned between the upper control arms and is elevated relative to the lower control arms.

A utility vehicle, comprising a frame extending along a centerline of the utility vehicle; a plurality of ground engaging members operably coupled to the frame; a drivetrain assembly supported by the frame; a rear cargo bed supported by the frame; a rear tailgate pivotally mounted to the cargo bed, the cargo bed having at least one first and second bracket; and a locking lever, pivotally supported by frame, the locking lever is movable from a first locked position in engagement with the first bracket, to a second locked position with the second bracket.

The above mentioned and other features of this invention, and the manner of attaining them, will become more apparent and the invention itself will be better understood by reference to the following description of embodiments of the invention taken in conjunction with the accompanying drawings, where:

FIG. 1 is a front left perspective view of a vehicle according to the present disclosure;
FIG. 2 is a rear right perspective view of the vehicle of FIG. 1;
FIG. 3 is a left side view of the vehicle of FIG. 1;
FIG. 4 is a right side view of the vehicle of FIG. 1;
FIG. 5 is a top view of the vehicle of FIG. 1;
FIG. 6 is a bottom view of the vehicle FIG. 1;
FIG. 7 is a front view of the vehicle of FIG. 1;
FIG. 8 is a rear view of the vehicle of FIG. 1;
FIG. 9 is a front left perspective view of the frame for the vehicle of FIG. 1;
FIG. 10 is a front underside perspective view of the frame of FIG. 9;
FIG. 11 is a top perspective view of the frame of FIG. 9;
FIG. 12 is a left side view of the frame of FIG. 9;
FIG. 13 is a top view of the frame of FIG. 9;
FIG. 14 is a bottom view of the frame of FIG. 9;
FIG. 15 is a front view of the frame of FIG. 9;
FIG. 16 is a rear view of the frame of FIG. 9;
FIG. 17 is an enlarged perspective view, partially broken away, of the frame shown in FIG. 9;
FIG. 18 is an underside perspective view, partially broken away, of the frame showing a front transfer case mount;
FIG. 19 is a perspective view, partially broken away, of the frame showing an engine mount;
FIG. 20 is a front perspective view, partially broken away, of the frame showing a steering rack and pinion mount;
FIG. 21 is an enlarged front perspective view, partially broken away, of the frame showing seat mounts;
FIG. 22 is an underside perspective view of a removable portion of the frame;
FIG. 23 is an underside perspective view of the frame of FIG. 22, with the removable frame exploded away from the remainder of the frame;
FIG. 24 is an exploded view of a front suspension system;
FIG. 25 is an exploded view of the front suspension systems of FIG. 24;
FIG. 26 is a rear perspective view of a rear suspension;
FIG. 27 is a view of the rear suspension system exploded away from the frame;
FIG. 28 is an exploded view of the rear suspension system;
FIG. 29 is a side view of the frame, a drivetrain assembly, a cooling assembly, and a steering assembly of the vehicle of FIG. 1;
FIG. 30 is a front perspective view of the drivetrain assembly of FIG. 29;
FIG. 31 is a side view of a front final drive of the drivetrain assembly of FIG. 30 coupled to the frame;
FIG. 32 is a bottom elevational view of the front final drive of the drivetrain assembly coupled to the frame;
FIG. 33 is an exploded view of the frame and the front final drive of FIG. 30;
FIG. 33A is a front perspective view of an alternative embodiment of the drivetrain assembly of FIG. 30;
FIG. 34 is an exploded view of a front section of the frame and the cooling assembly of FIG. 29;
FIG. 34A is a front perspective view of an alternative embodiment of the cooling assembly of FIG. 34;
FIG. 34B is a rear perspective view of the alternative embodiment cooling assembly of FIG. 34A;
FIG. 35 is a front perspective view of the steering assembly of FIG. 29;
FIG. 36 is a top view of a front end of the vehicle, with a vehicle body removed and showing a portion of the drivetrain assembly, the steering assembly, and the front suspension;
FIG. 37 is a top elevational view of the front end of the frame and the steering assembly of FIG. 36;
FIG. 38 is a rear perspective view of the steering assembly of FIG. 36 coupled to the front end of the frame;

FIG. 60A is a right front perspective view of a support member for batteries;

FIG. 72A is a rear perspective view of a portion of an alternative embodiment of the cargo bed assembly of FIG. 70;

FIG. 72B is a bottom perspective view of a tie down member of the alternative embodiment cargo bed assembly of FIG. 72A;

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, snowmobiles, and golf carts.

Figure 1:
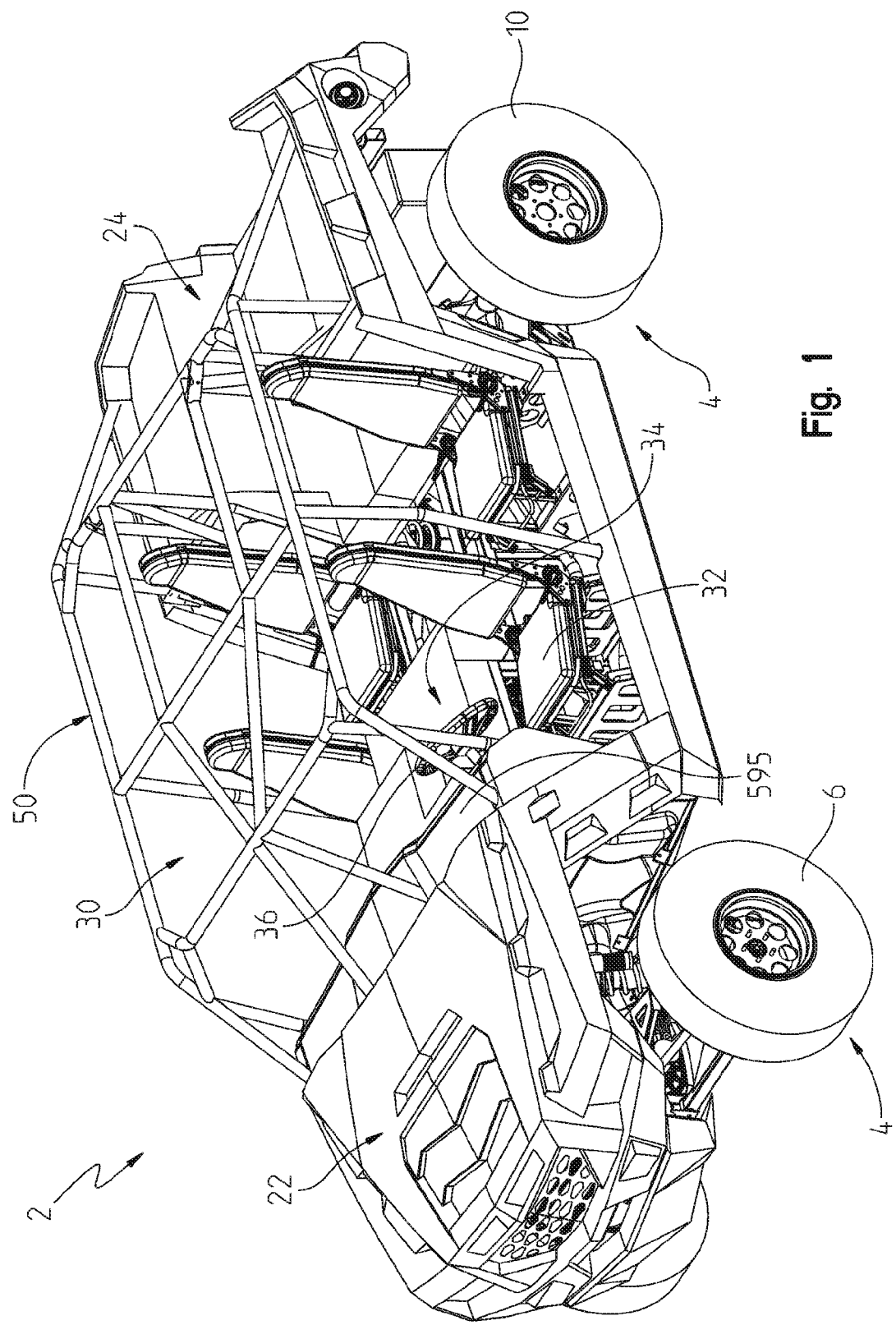
Figure 6:
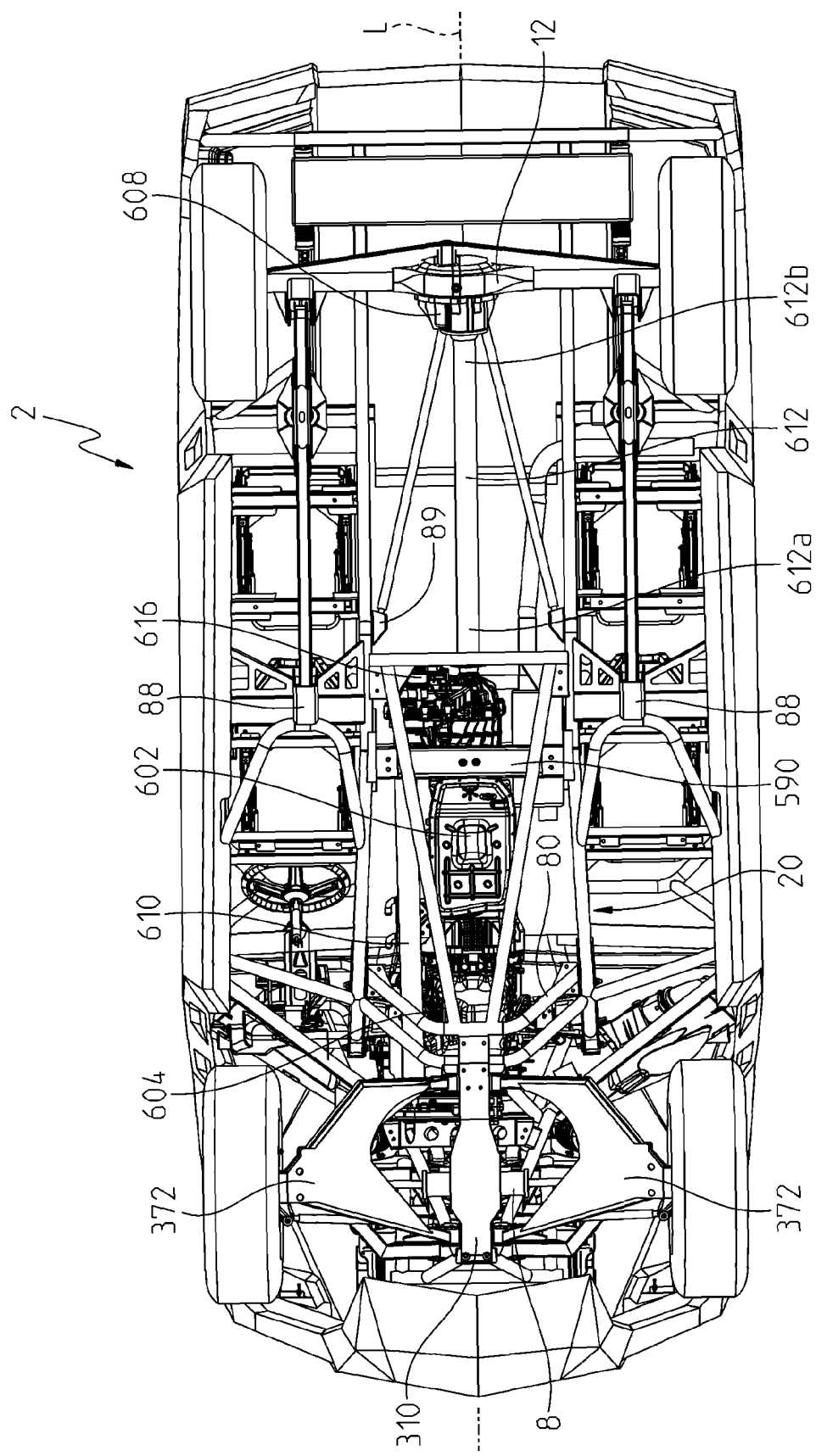
Figure 7:
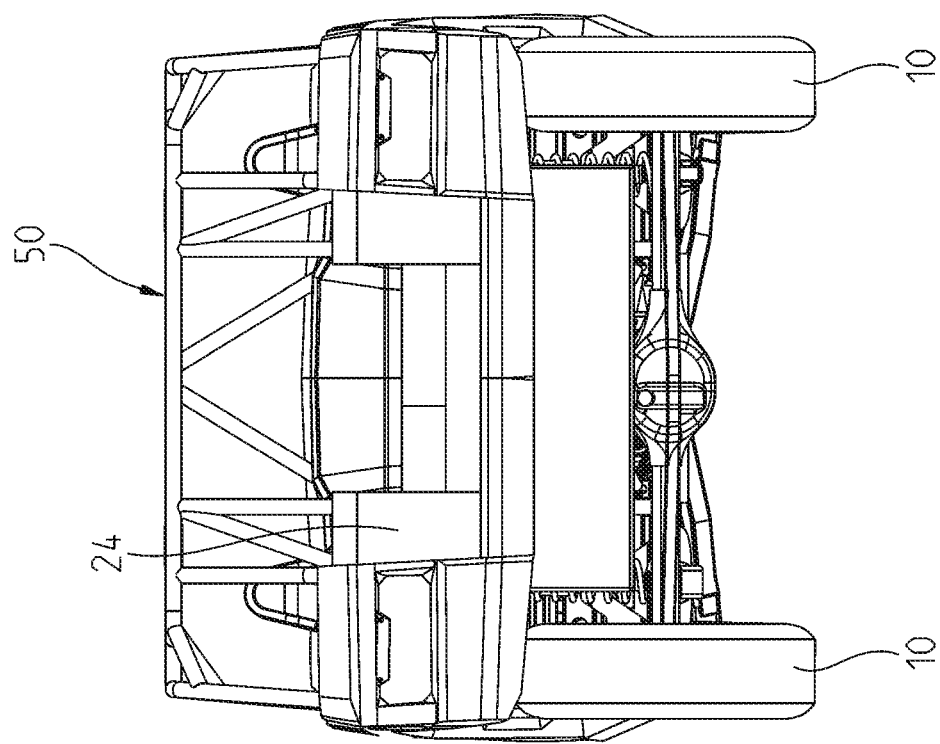
Figure 8:
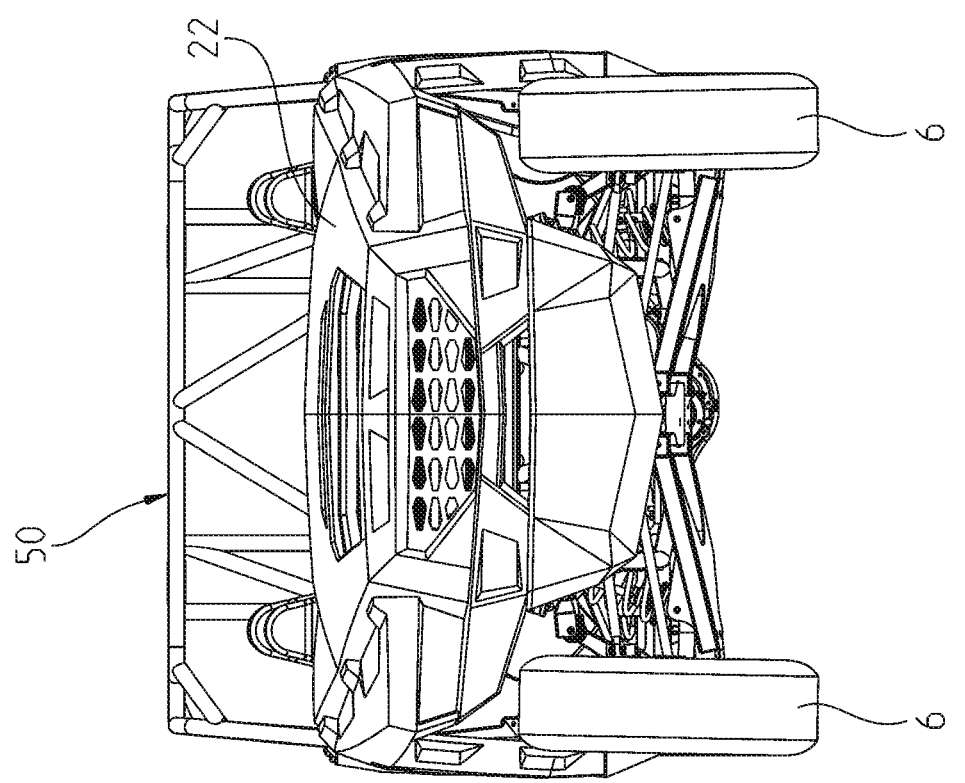

Referring to FIG. 1, an illustrative embodiment of a vehicle 2 is shown. Vehicle 2 as illustrated includes a plurality of ground engaging members 4, illustratively wheels. A first set of wheels 6, one on each side of vehicle 2, generally correspond to a front axle 8 (FIG. 6). A second set of wheels 10, one on each side of vehicle 2, generally correspond to a rear axle 12 (FIG. 6). It should be understood that the vehicle described herein could include any of the components of previous military vehicles as described and depicted in U.S. Pat. No. 7,795,602; U.S. Pat. No. 8,029,021; U.S. Pat. No. 7,717,495; and U.S. Pat. No. 8,205,910; the subject matter of which is incorporated herein by reference.

In one embodiment, one or more of the wheels may be replaced with tracks, such as the Prospector II Tracks available from Polaris Industries, Inc. located at 2100 Highway 55 in Medina, Minn. 55340. As shown, wheels include pneumatic tires mounted on standard steel rims. Alternatively, tires could be non-pneumatic tires as shown in U.S.

Pat. No. 8,176,957; U.S. Pat. No. 8,104,524 or in U.S. Patent application 61/611,300, the subject matter of which is incorporated herein by reference.

Vehicle 2 further includes a frame 20 (FIG. 6) supported by the plurality of ground engaging members 4. Frame 20 supports a vehicle body 22 and a rear cargo support area 24. Vehicle 2 defines an operator area 30 which includes seating 32 for one or more passengers. Operator area 30 further includes a plurality of operator controls 34 by which an operator may provide input into the control of vehicle 2. Operator area 30 and controls 34 may further include a portion of an HVAC system for the comfort of the operator and the passengers.

Controls 34 include a steering wheel 36 which is rotated by the operator to change the orientation of one or more of ground engaging members 6, to steer vehicle 2. Controls 34 also include a first foot pedal 38 actuable by the operator to control the acceleration and speed of vehicle 2 through the control of an engine described in more detail herein. Controls 34 also include a second foot pedal 40 to control the braking and deceleration of vehicle 2.

Figure 3:
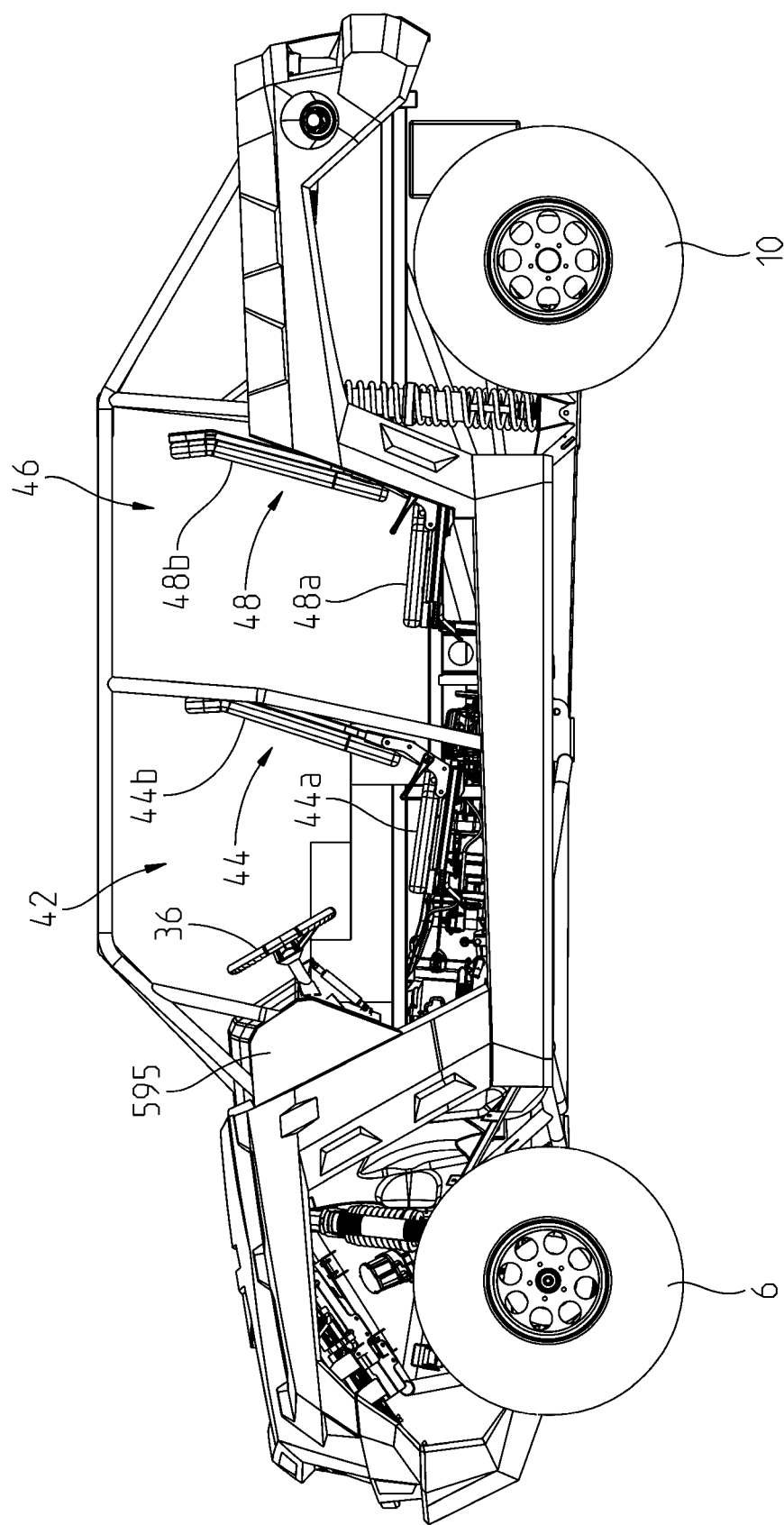
Figure 4:
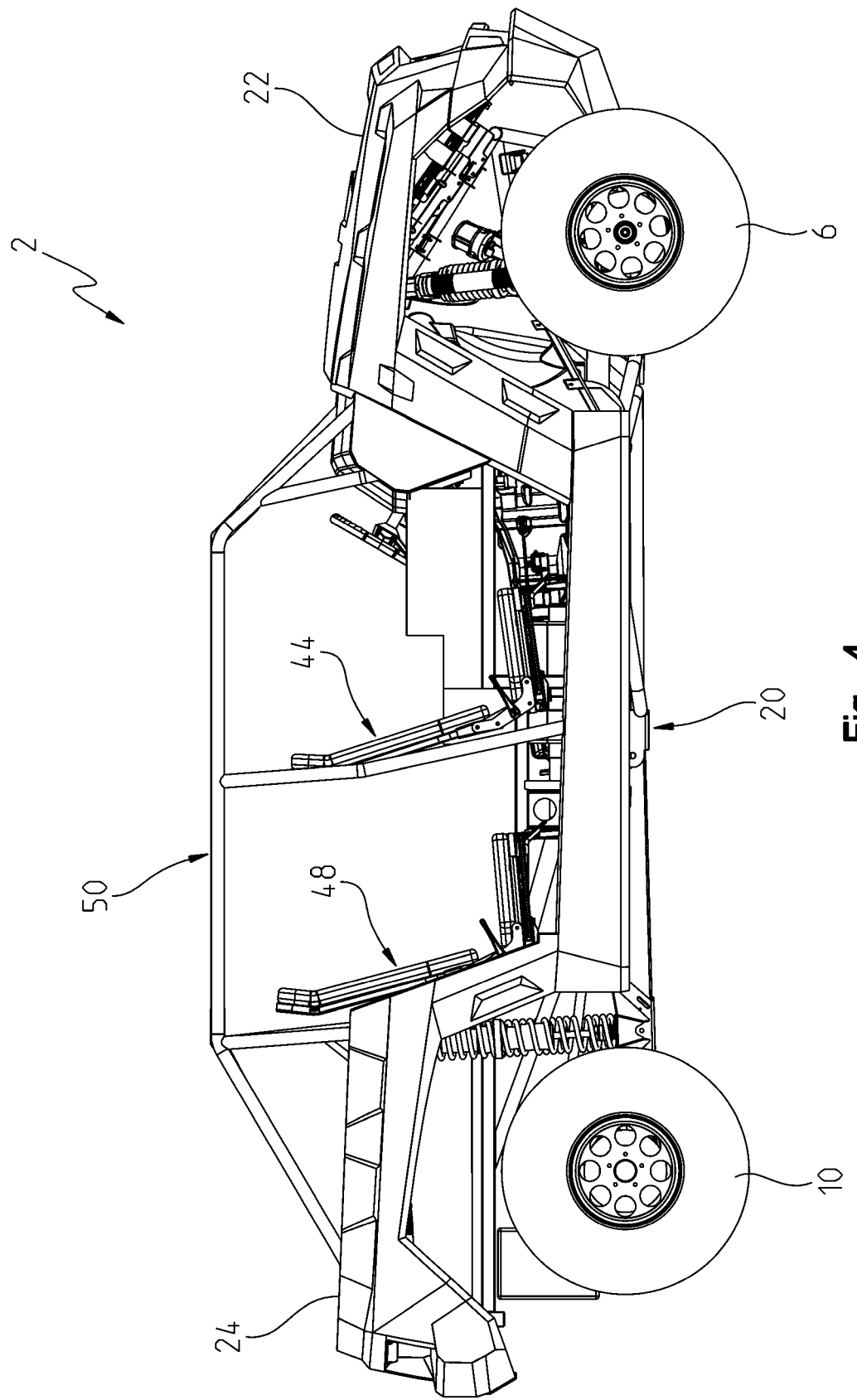
Figure 5:
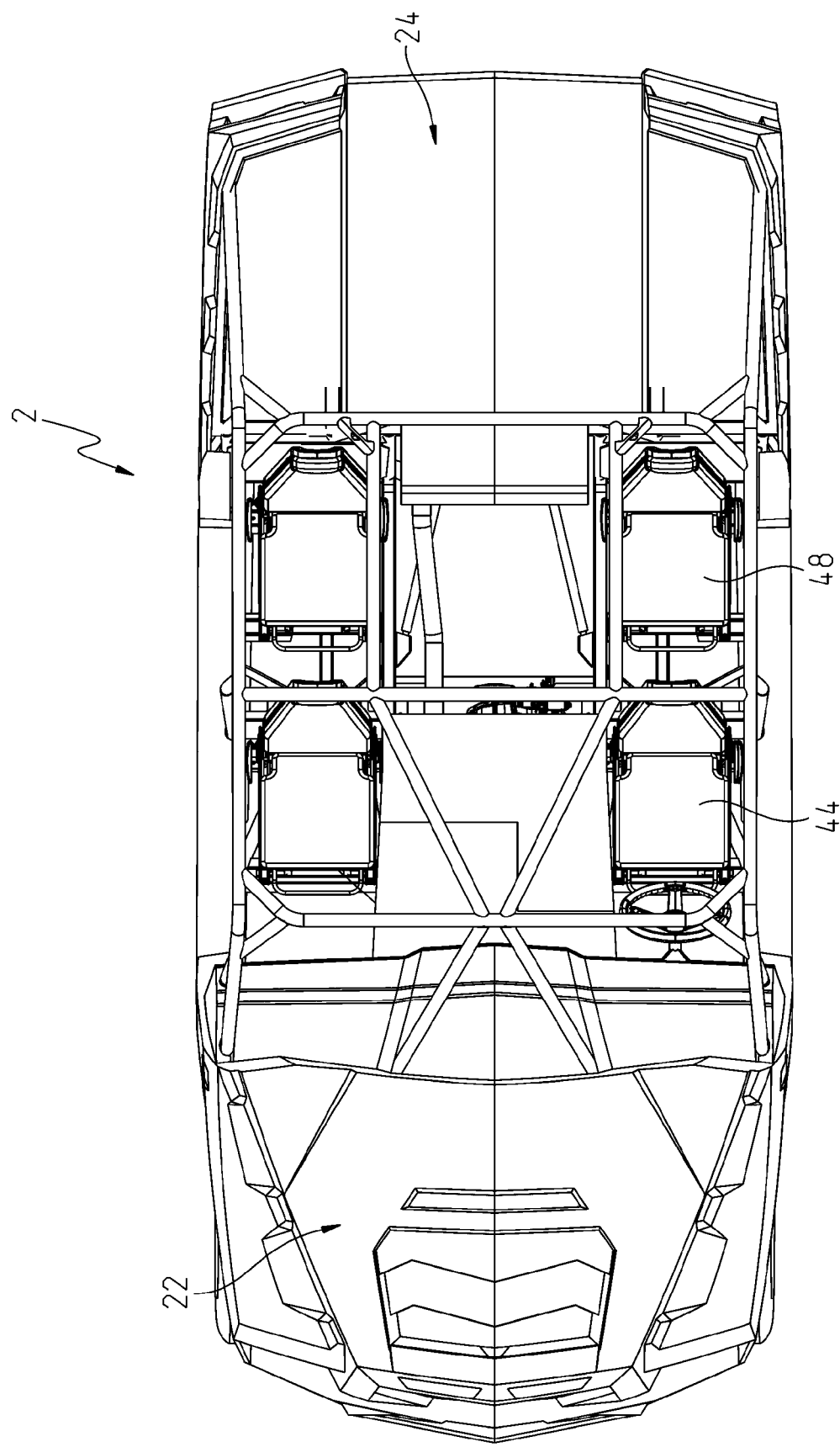

As shown in FIG. 3, operator area 30 further includes a front seating area 42 having front seats 44, with seat bottoms 44a and seat backs 44b; and rear seating area 46 having seats 48, with seat bottoms 48a and seat backs 48b. While not shown operator area 30 could further includes passenger seat belts and harnesses for securing the passenger in their respective seats 44, 48, as more fully described in U.S. patent application Ser. No. 12/484,888, incorporated herein by reference. Furthermore, operator area could include side nets, again to add further security to the passengers, as more fully described in U.S. patent application Ser. No. 12/796, 495 incorporated herein by reference.

Frame 20 includes a portion 50 extending above operator area 30. Portion 50 is provided to protect the occupants of operator area 30 if vehicle 2 tips or rolls over. In the illustrated embodiment, portion 50 is a roll cage. In one embodiment, portion 50 may be moveable from a first position protecting operator area 30 to a second position which provides vehicle 2 with a smaller envelope than when portion 50 is in the first position. Additional details about exemplary moveable portions are provided in U.S. Pat. No. 7,871,106. In a second embodiment, portion 50 may be collapsible from a first position to a second position as shown in U.S. Patent application Ser. No. 61/617,844, the subject matter of which is incorporated herein by reference.

Figure 9:
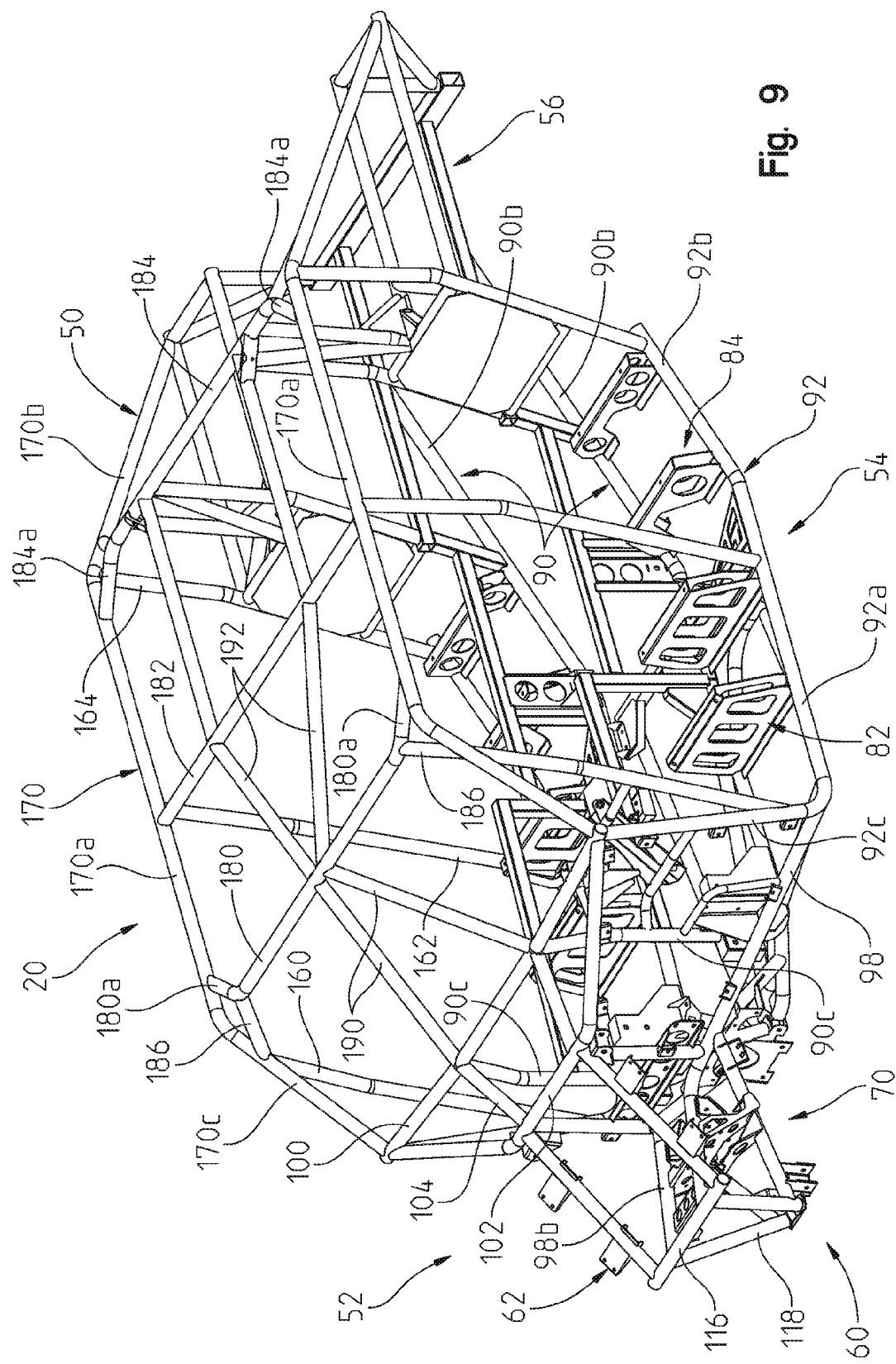
Figure 10:
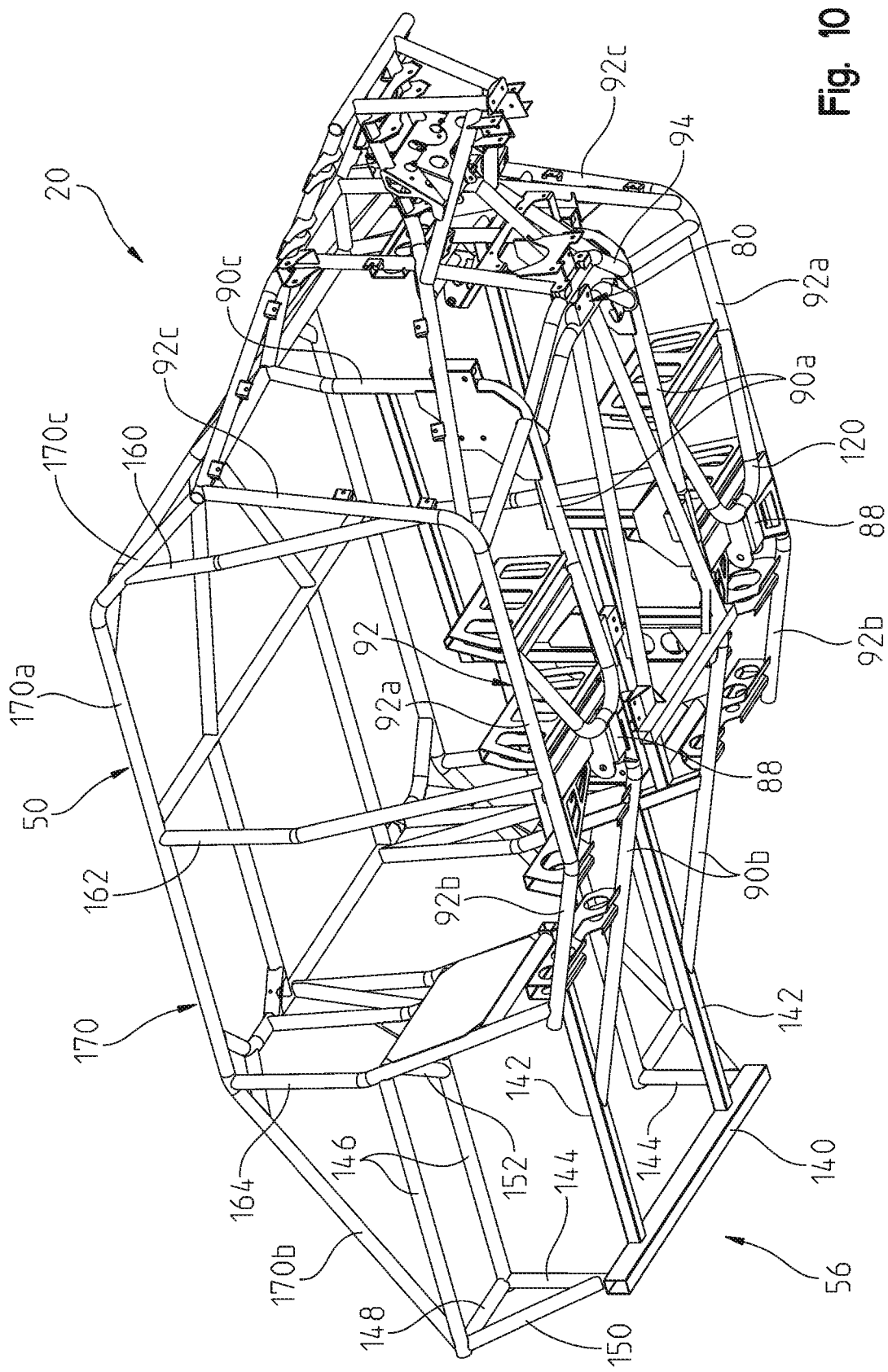
Figure 16:
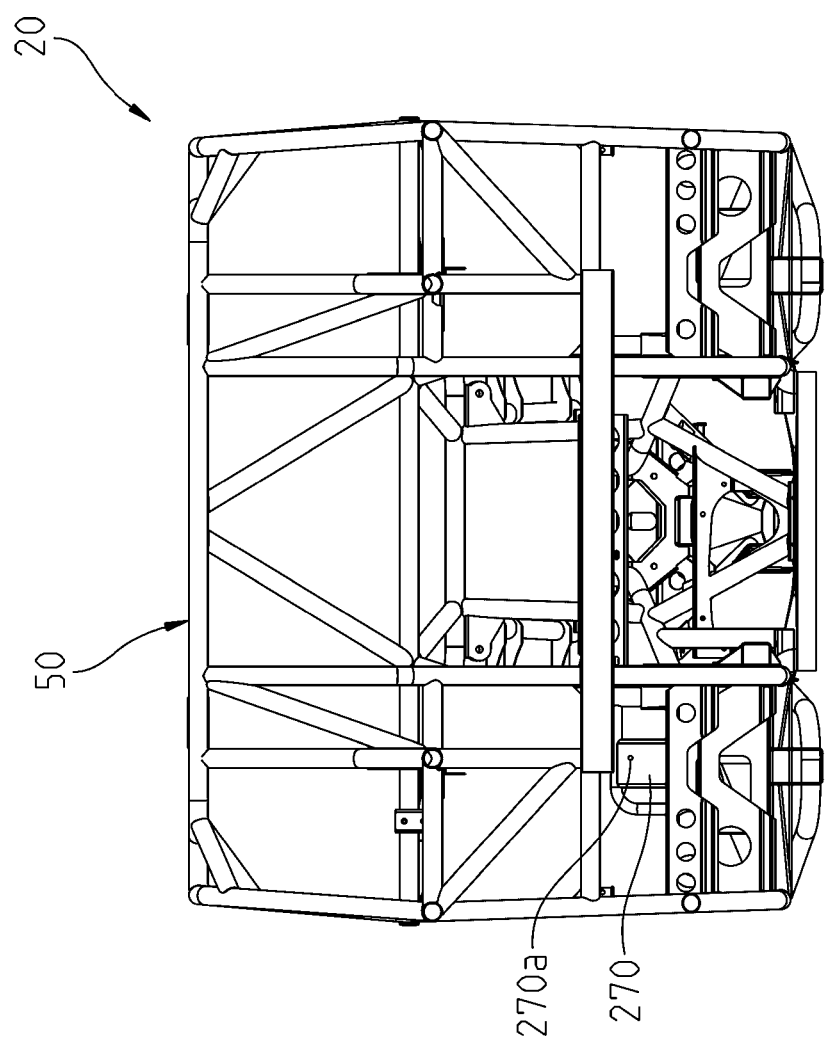
Figure 17:
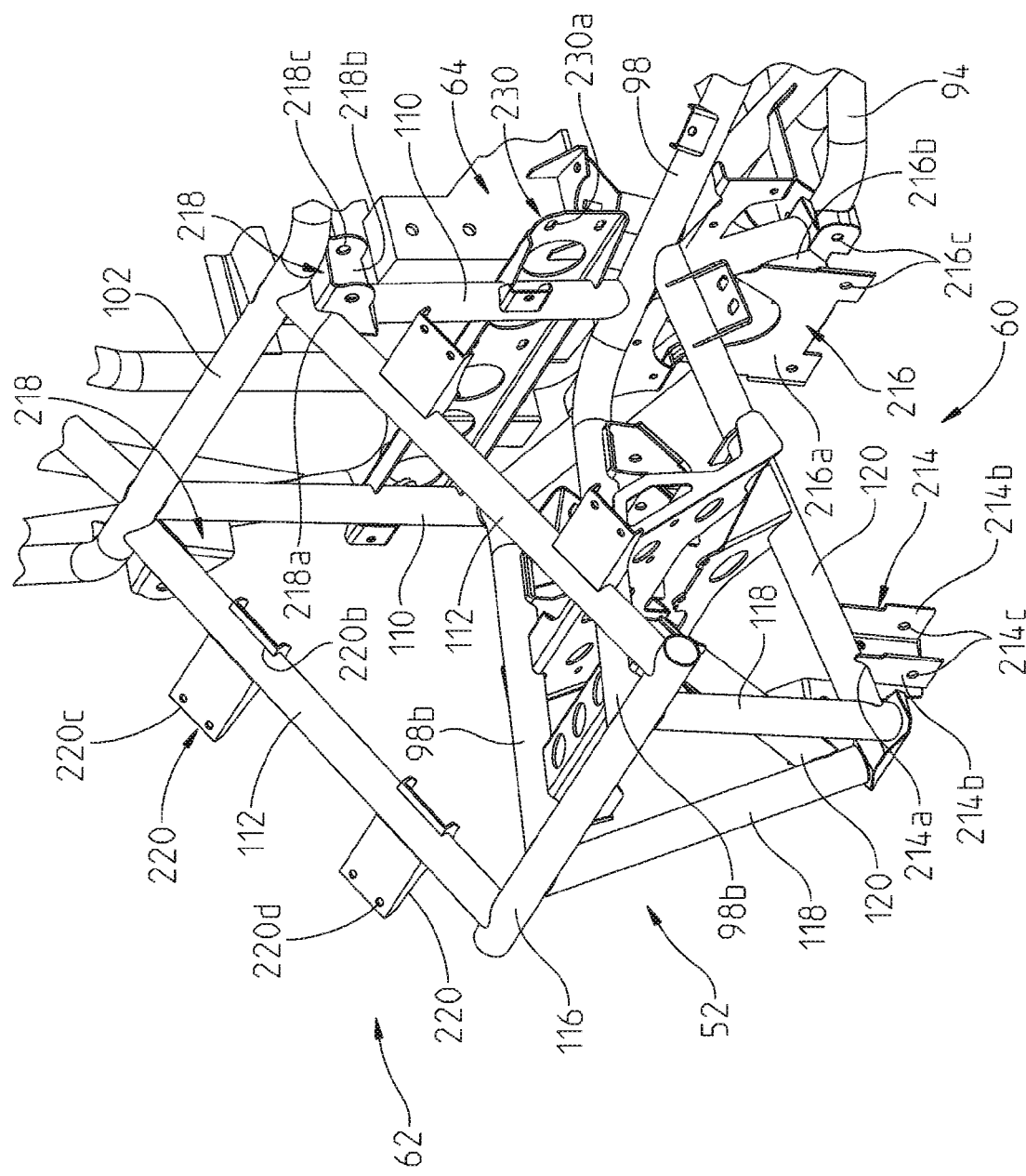
Figure 18:
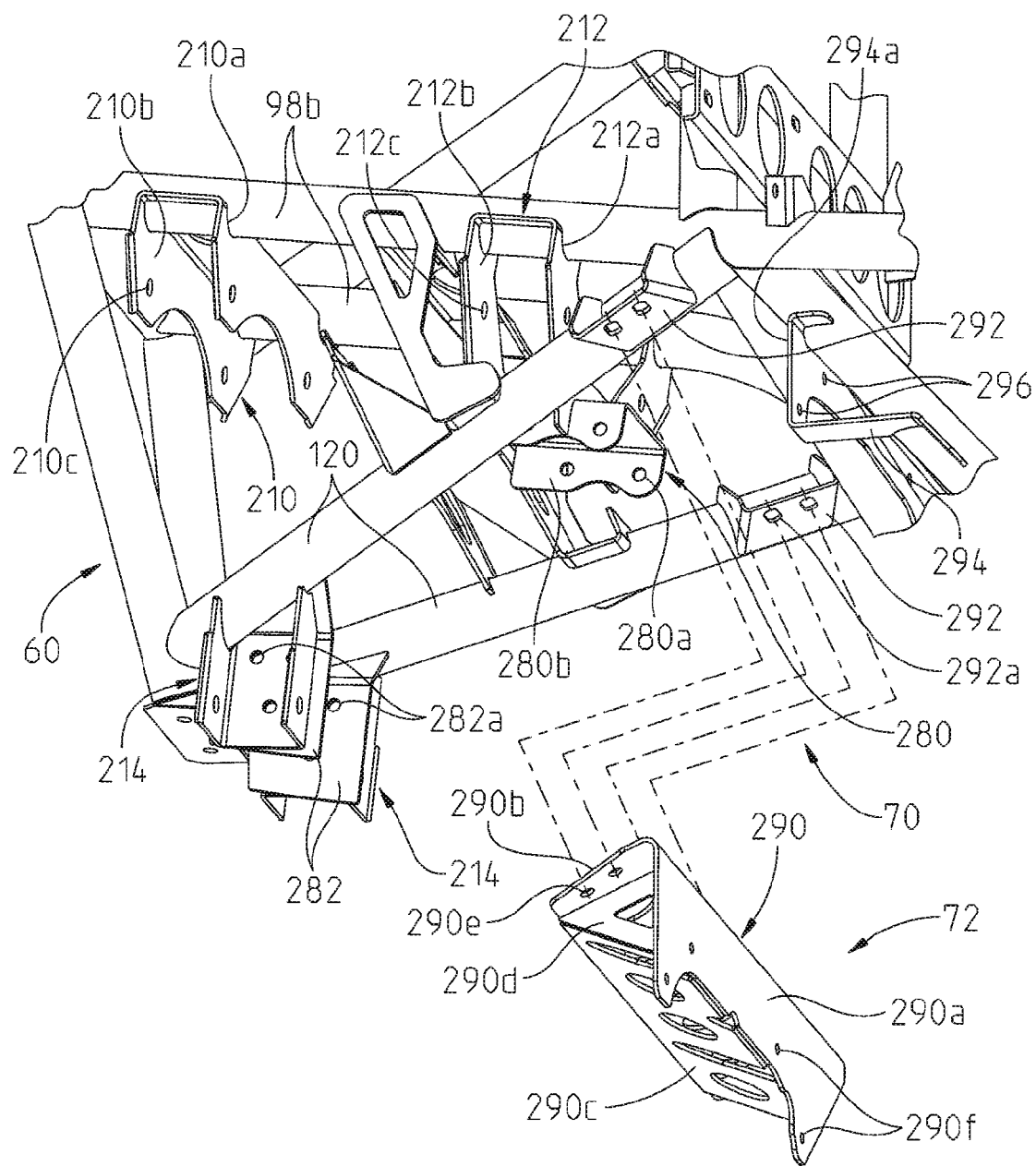

With reference now to FIGS. 9-18, frame 20 will be described in greater detail. As shown best in FIG. 9, frame 20 includes front section 52, midsection 54, and rear section 56. In addition to providing the structural rigidity for the vehicle, each frame section provides mounting accessories for mounting various vehicle components. Front section 52 includes a front suspension mount 60, radiator mount 62, steering mount 64 (FIG. 11), engine mount 66 (FIG. 11), controls mount 68 (FIG. 11), front final drive mount 70 (FIG. 9), and front transfer case mount 72 (FIG. 18). As shown in FIG. 10, frame 20 further includes a removable section 80 providing lower access to the frame for the addition and removal of a powertrain as described herein in greater detail.

Figure 22:
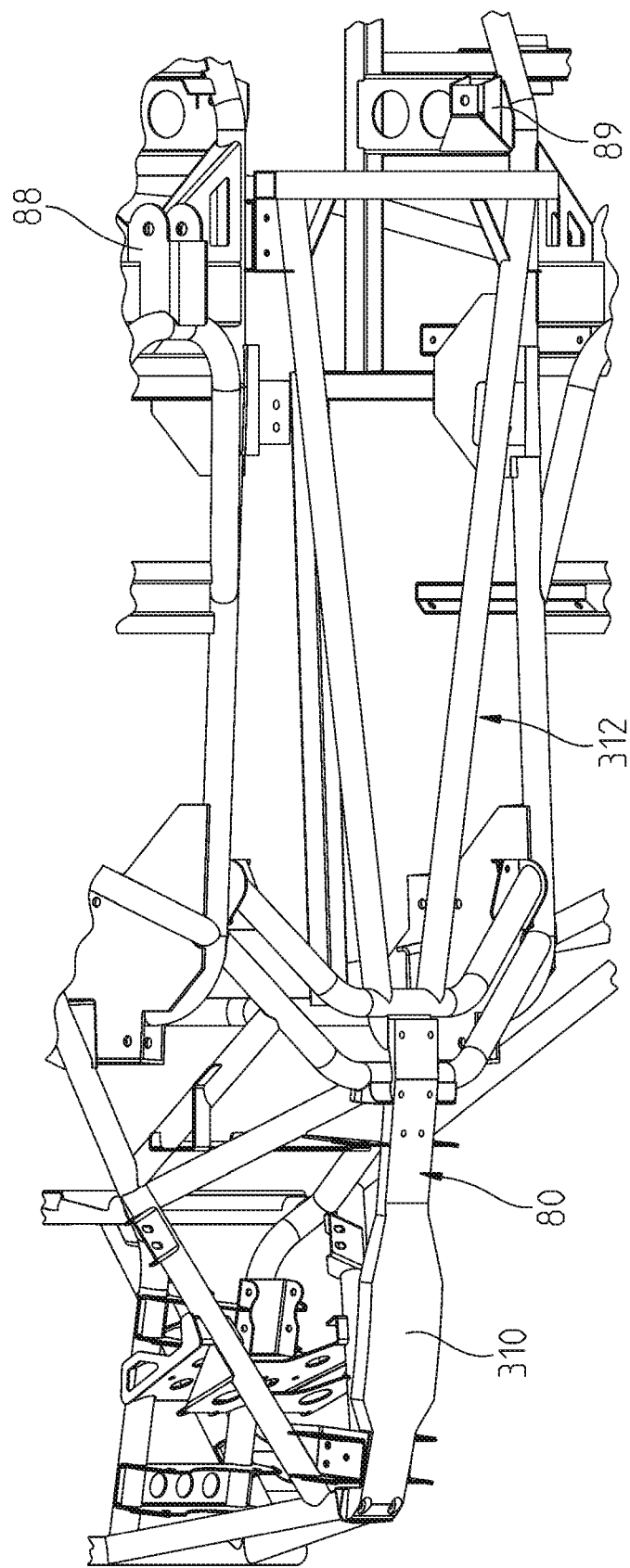

Midsection 54 includes front seating supports 82 and rear seating supports 84. Finally, rear section 56 includes rear shock mounts 86 (FIG. 11), and rear suspension mounts 88 (FIG. 10) and 89 (FIG. 22). With reference now to FIGS. 9-18, the structural components of the frame will be described in greater detail.

Figure 14:
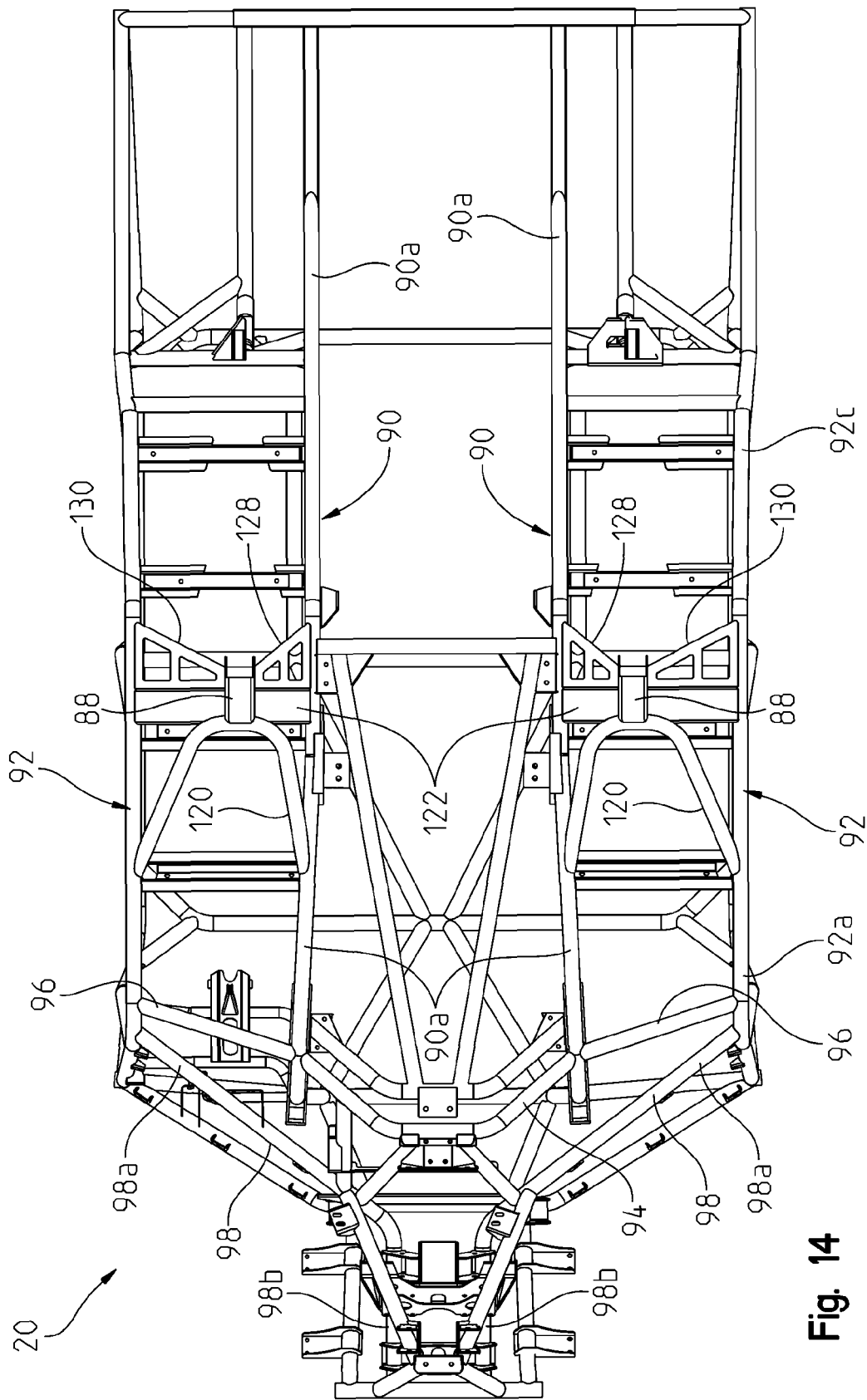

As shown best in FIGS. 9 and 14, frame 20 includes longitudinally extending frame tubes 90, which include generally horizontally extending portions 90a (FIG. 10) and rearwardly and upwardly extending portions 90b. Meanwhile a vertically extending portion 90c extends vertically upwardly from the generally horizontally extending portions 90a. Frame tubes 92 extend generally parallel to frame tube 90 having generally horizontally extending sections 92a, rearwardly and upwardly extending sections 92b and front and vertically extending sections 92c. As shown in FIG. 10, frame tubes 92 flank frame tubes 90 and sections 90a, 92a; 90b, 92b; and 90c and 92c are generally parallel with each other.

As shown best in FIG. 14, a U-shaped tube 94, couples frame tubes 90 together from an inside position and frame tubes 96 couple together frame tubes 90 and 92. As shown in FIGS. 9 and 14, frame tubes 98 couple to frame tubes 92 at a portion 98a, and couple to frame tube portion 92a at a portion 98b. Tube portions 98a extend in a generally longitudinally extending direction and in a closely spaced apart position as shown in FIG. 14. As shown best FIG. 9, cross tube 100 extends across frame 20 and is coupled to top ends of frame tubes 90c and 92c. A second cross tube 102 extends in a somewhat C-shape and is coupled at it ends to cross tube 100 and is further coupled by frame tubes 104.

With reference now to FIG. 17, upstanding frame tubes 110 extend between frame tubes 98 and cross tube 102, and frame tubes 112 extend forwardly from cross tube 102 and couple to cross tube 116. Front frame tubes 118 extend downwardly from cross tube 116 and couple with frame tubes 120, which in turn couple with frame tubes 98. As best shown in FIG. 14, frame 20 further includes U-shaped frame tubes 120, which extend between frame tubes 90 and 92, and couple with channels 122 to which rear suspension mounts 88 are mounted, as described in greater detail herein. Frame 20 is further fortified by triangular truss plates 128, 130.

With reference now to FIG. 10, rear frame portion 56 will be described. Rear frame portion 56 includes rear cross tube 140 coupled to frame tubes 142, which in turn couple to frame tubes 90b. Rear frame portion 56 further includes upstanding frame tubes 144, longitudinally extending frame tubes 146, and connecting tubes 148, 150 and 152.

Figure 11:
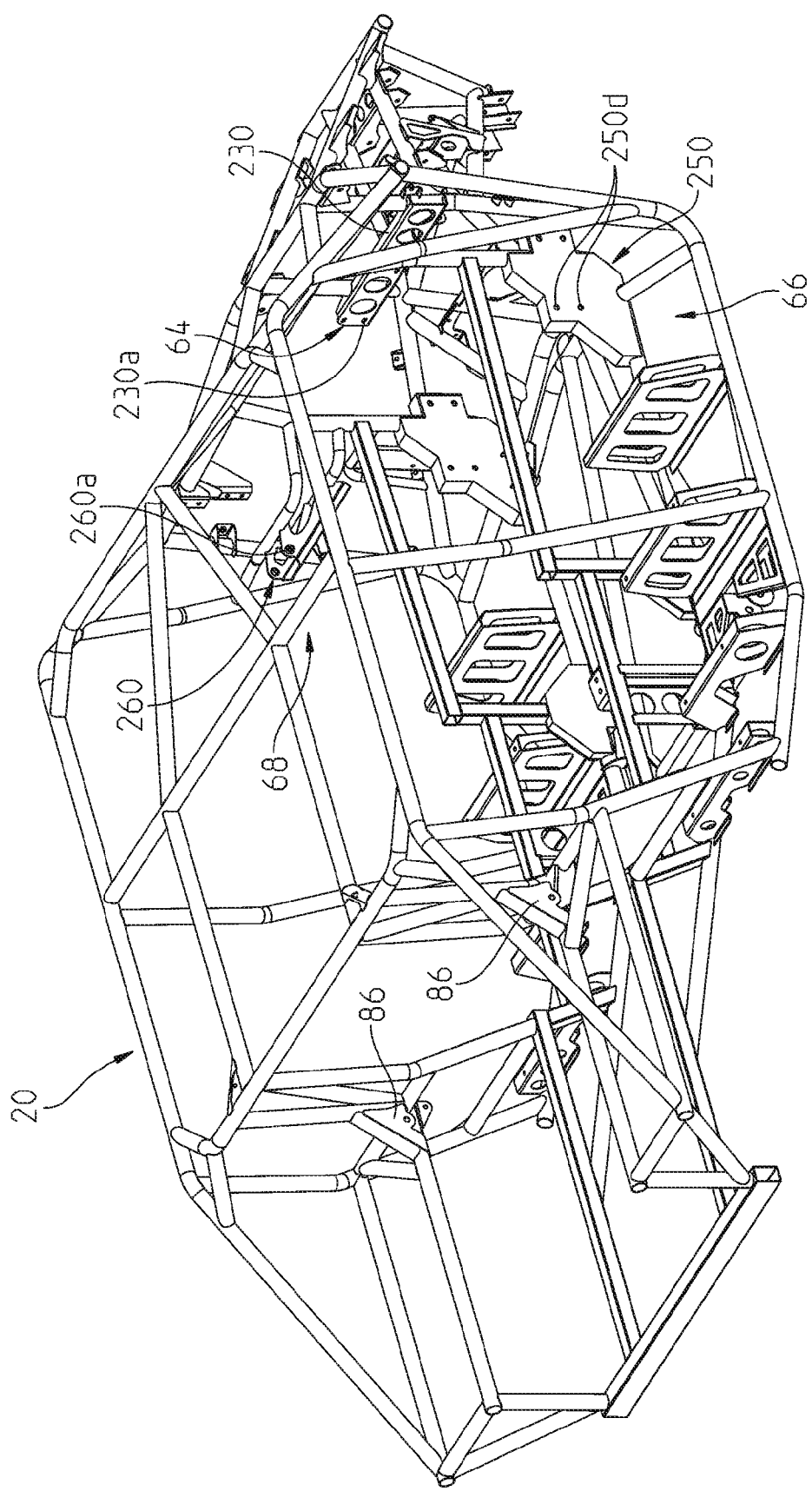
Figure 12:
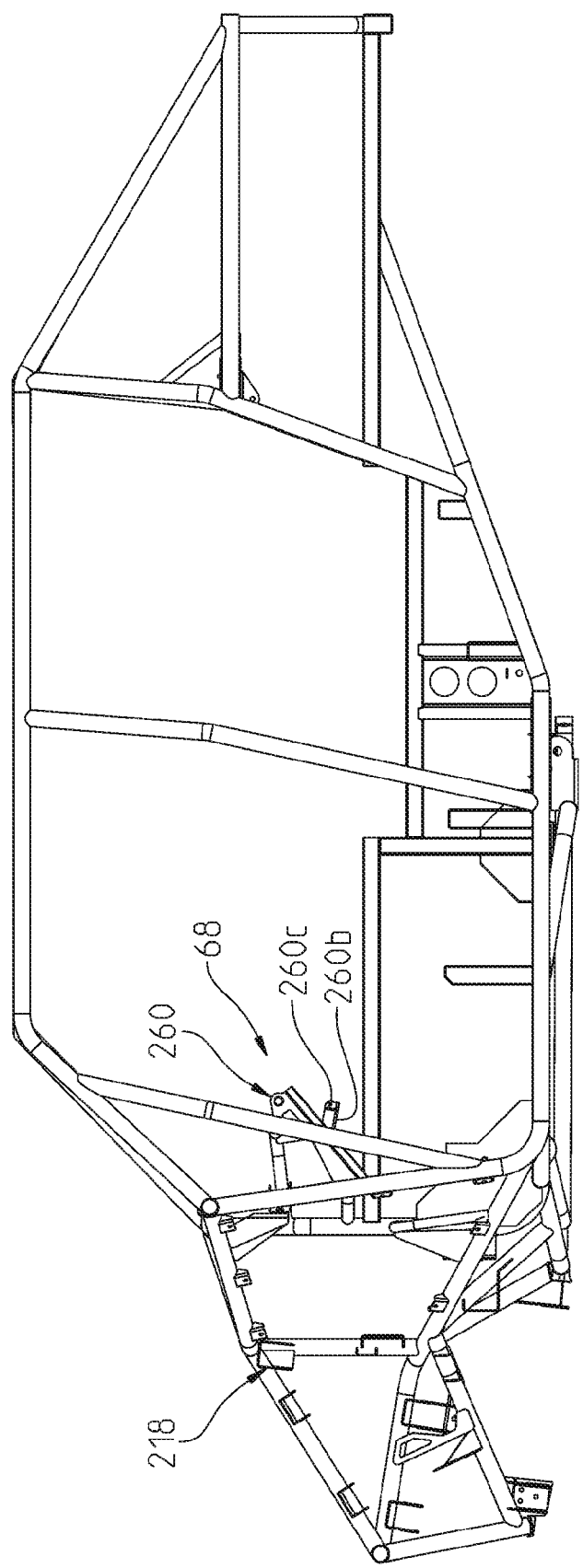
Figure 13:
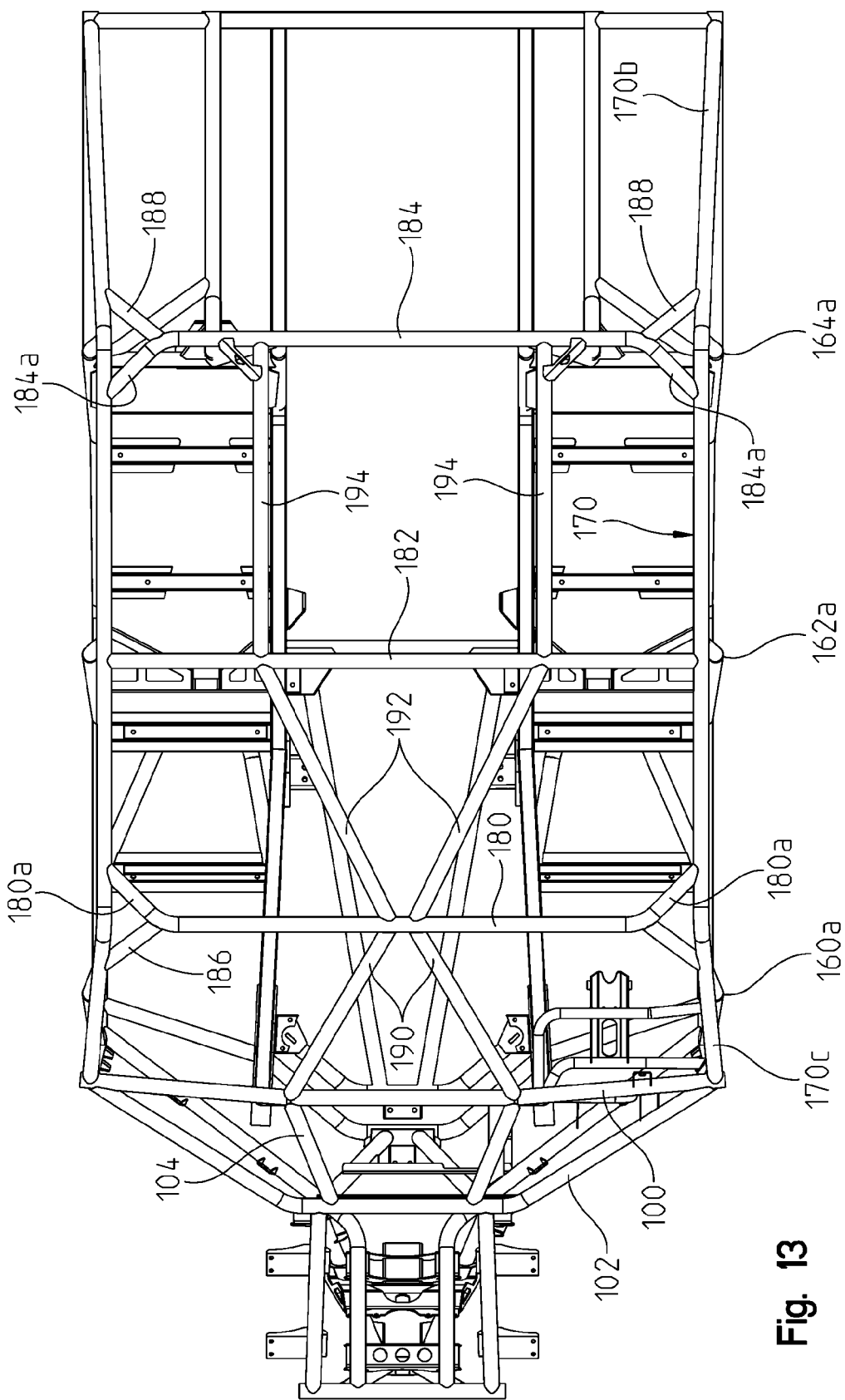

With reference now to FIGS. 9-13, upper structure 50 will be described in greater detail. As shown first in FIG. 10, upper structure 50 includes outer vertically extending members 160, 162, and 164. An outer and upper tube 170 is coupled to a top portion of each of the vertically extending members 160, 162, 164 and includes a generally horizontal section 170a, a rearwardly and downwardly extending section 170b, and a front and generally downwardly extending section 170c. As shown, vertically extending members 162 and 164 are coupled to tube portion 170a, and vertically extending member 160 is coupled to front section 170c. Rearward portion 170b extends between vertically extending member 164 and frame tubes 146. As shown in FIG. 13, each of the vertically extending members 160, 162, and 164, include an outward most point 160a, 162a, 164a, respectively, which is wider than the frame in order to protect the occupants of the vehicle in case of a rollover.

As shown best in FIG. 9, three cross tubes 180, 182, and 184, together with upper tubes 170a forming a substantial part of the overhead canopy. Cross tubes 180 are coupled to frame tubes 170 at end portions 180a and by two portions 186 forming a triangular connection point. Cross tube 180 is coupled to cross tube 100 by way of frame tubes 190, and cross tube 180 is coupled to cross tube 182 by way of frame tubes 192. Rear cross tube 184 is coupled to frame tubes 170 by way of sections 184a and by way of coupling tubes 188 (FIG. 13). Cross tube 182 is coupled to cross tube 184 by way of frame tubes 194.

With the structural frame as described above, the mounting sections will now be described with reference to FIGS. 9-18.

With reference now to FIGS. 17 and 18, front suspension mount 60 will be described in greater detail. With reference first to FIG. 18, front suspension mount 60 includes first and second brackets 210, 212 which are coupled between front frame tube portions 98b. Each of the brackets 210 and 212 include U-shaped cut-out portions 210a, 212a, respectively, to receive therein the tube portions 98B. Each of the brackets further includes sidewalls 210b and 212b, respectively, having apertures 210c and 212c, respectively, for mounting of the front suspension as further described herein. In a like manner, front suspension mount 60 includes a lower bracket 214; (FIG. 17), having a cylindrical cutout 214a for coupling to tube 120. Bracket 214 also includes sidewalls 214b providing an aperture at 214c for mounting a suspension arm as further provided herein. As also shown in FIG. 17, front suspension mount 60 includes a bracket 216 having sidewalls 216a, 216b defining apertures 216c for mounting a lower control arm of front suspension as further described herein. Bracket 216 also includes apertures 216d (FIG. 23) at an underside thereof, as described in further detail herein. Front suspension mount 60 further includes a top bracket 218 having U-shaped cutouts at 218a for attachment to frame tubes 112, sidewalls 218b, and apertures 218c. Brackets 218 provide a mounting structure for a front shock absorber as described herein.

With reference now to FIG. 17, radiator mount section is shown at 62 being defined by brackets 220 and having U-shaped cutouts at 220b to be received over frame tubes 112. This positions a top face 220c of bracket 220 in a planar relationship with other brackets 220 for mounting of a radiator as further described herein.

Figure 20:
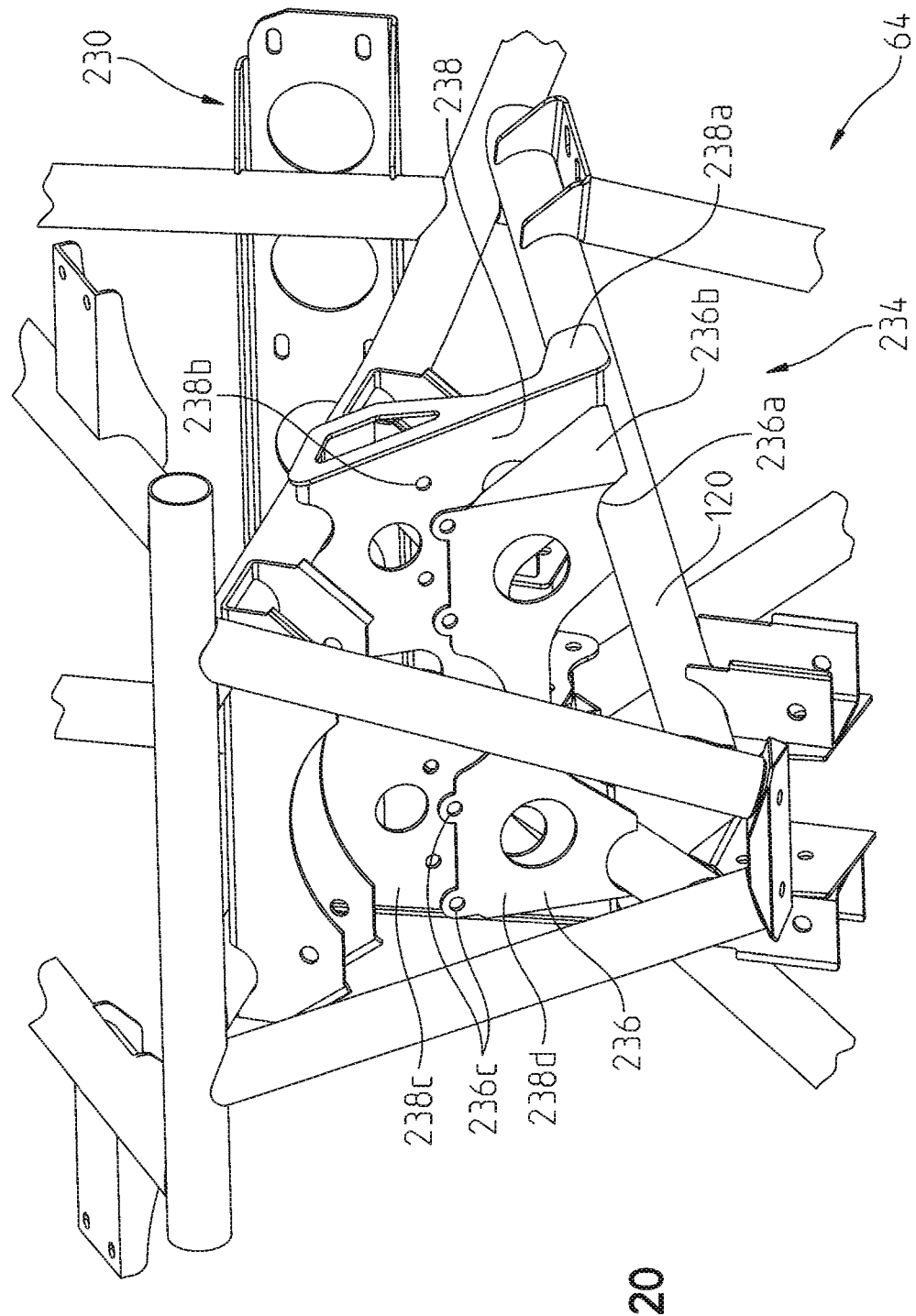

With reference now FIGS. 11 and 17, steering mount section 64 will be described in greater detail. As shown, a first bracket 230 is provided, which extends across and is coupled to vertical frame tubes 110. A plurality of apertures 230a are provided for coupling a first steering mechanism as further described herein. With reference now to FIG. 20 steering mount section 64 includes a second bracket assembly 234. Bracket assembly 234 includes a first bracket 236 having a cutout portion at 236a and a flange 236b for mounting of the bracket 236 to frame tubes 120. Mounting apertures 236c are provided on bracket plate portion 238d for mounting of the steering assembly as further described herein. Bracket assembly 234 includes a second bracket 238 having a flange 238a for mounting bracket 238 to the frame tubes 120. Mounting apertures 238b are provided on bracket plate portion 238c for mounting of the steering assembly as further described herein. As shown, apertures 236c are longitudinally aligned with apertures 238b, for receiving a fastener therethrough as described herein.

Figure 19:
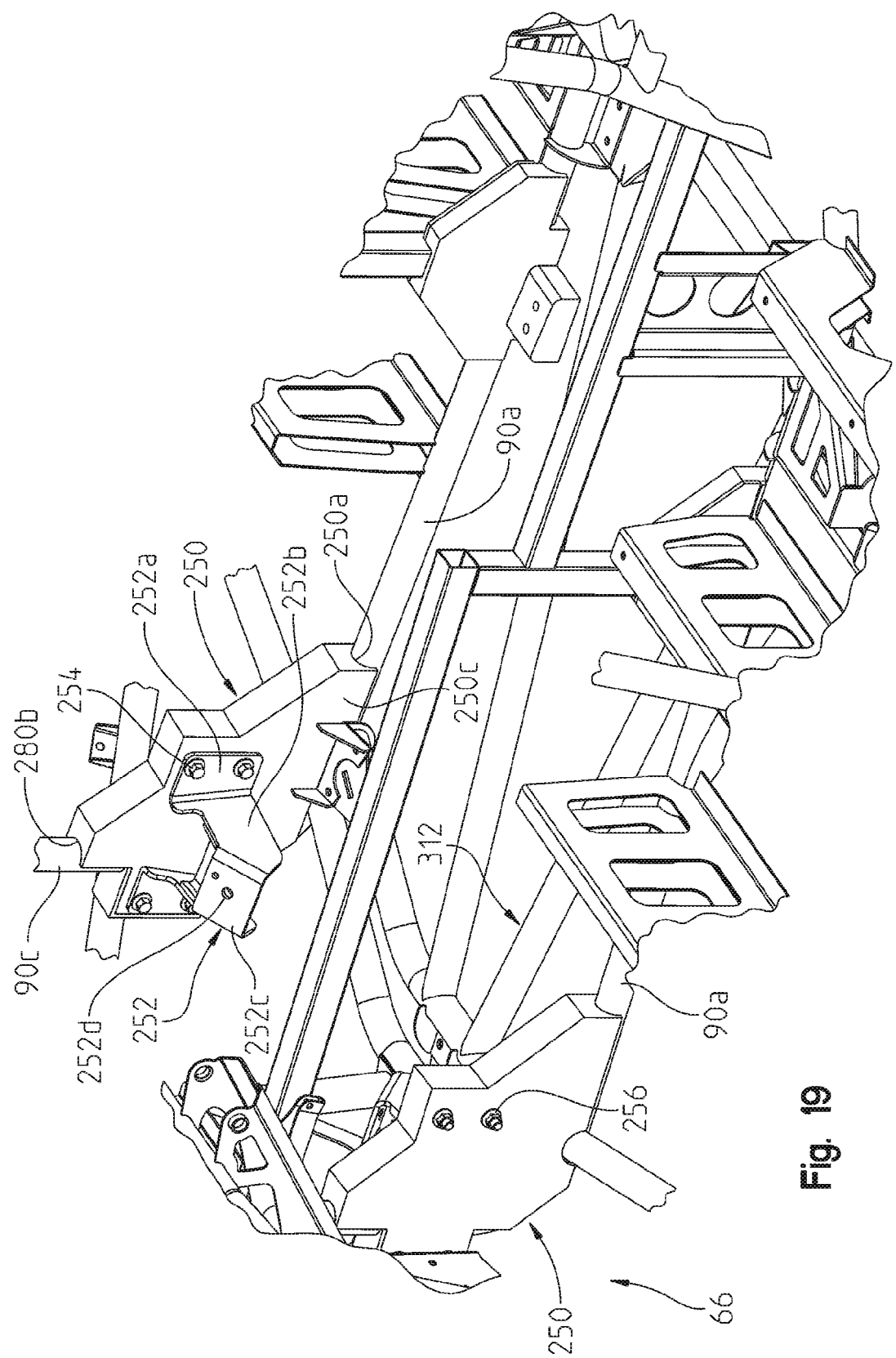

With reference now to FIGS. 11 and 19, engine mount section 66 will be described in greater detail. As shown best in FIG. 19, engine mount section 66 includes a bracket 250 having U-shaped cutouts 250a for overlying frame tube 90a and U-shaped cutouts 250b for overlying frame tube portion 90c. Bracket 250 includes an internal surface 250c having a bracket 252 mounted thereto. Bracket 250 receives fasteners 254 therethrough, and fasteners 254 and 256 attach bracket 252 thereto. Bracket 252 includes flanges 252a for mounting against surface 250c and for receipt therethrough of fasteners 254. Bracket arms 252b and support plate 252c are also provided for support of an engine as described further herein. An aperture 252d allows mounting of the engine to bracket 252 as described in further detail herein.

Figure 15:
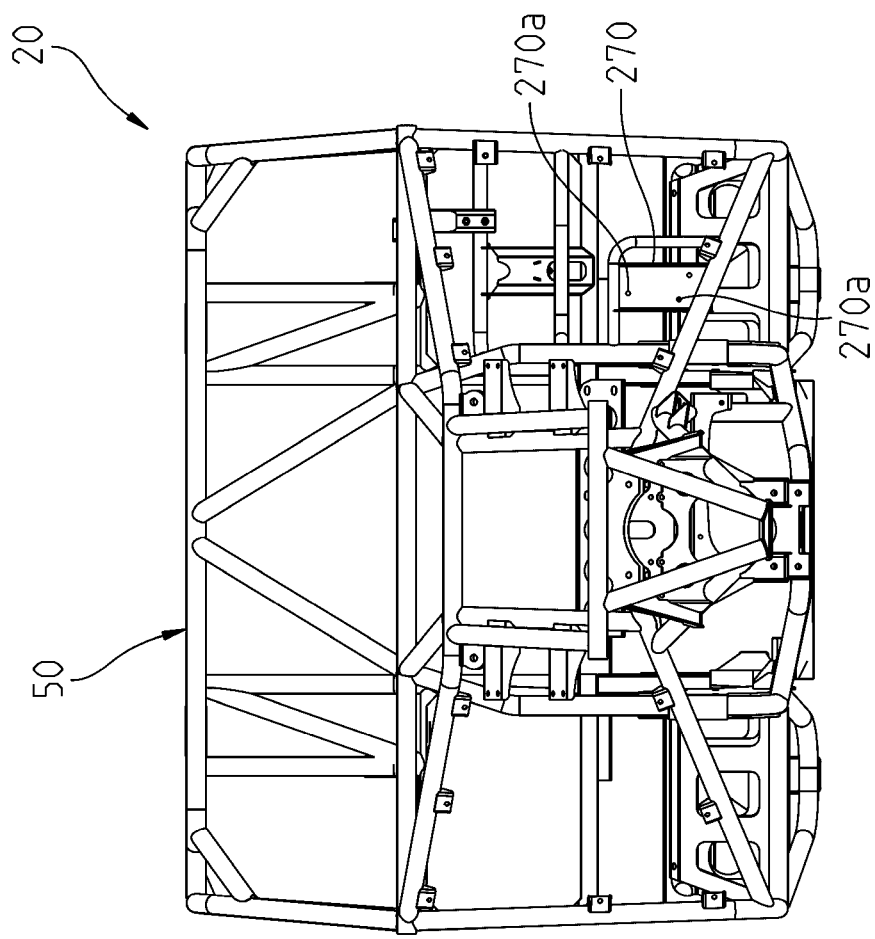

With reference now to FIGS. 11, 12, 15, and 16, the controls mount 68 will be described in greater detail. As shown in FIGS. 11 and 12, the controls mounts 68 includes a steering control bracket 260 coupled to the frame 20 defined as a U-shaped channel (FIG. 11) having a mounting aperture at 260a, and a mounting leg at 260b (FIG. 12) providing a mounting aperture at 260c. As shown in FIGS. 15 and 16, a bracket 270 is shown for at least one foot control having apertures at 270a.

With reference again to FIG. 18, front final drive mount 70 will be described. As shown, a bracket 280 is coupled to a lower edge of bracket 212 having mounting apertures 280a positioned through sidewalls 280b of bracket 280. Furthermore, bracket 214 includes two plate portions 282 attached thereto defining apertures 282a for attachment to front final drive, as described further herein.

With reference still to FIG. 18, front transfer case mount 72 will be described. As shown, mount 72 includes bracket 290 configured in a substantially folded and triangular configuration comprising a rear wall 290a, a front wall 290b, lower wall 290c, and sidewalls 290d. Front wall 290b includes apertures 290e. Rear wall 290a includes mounting apertures 290f. As also shown in FIG. 18, brackets 292 are attached to frame tubes 120 and include apertures at 292a. It should be appreciated that apertures 290e of brackets 72 and apertures 292e of brackets 292 align with each other and that bracket 290 is fixed by way of fasteners through apertures 290e and 292a.

Figure 21:
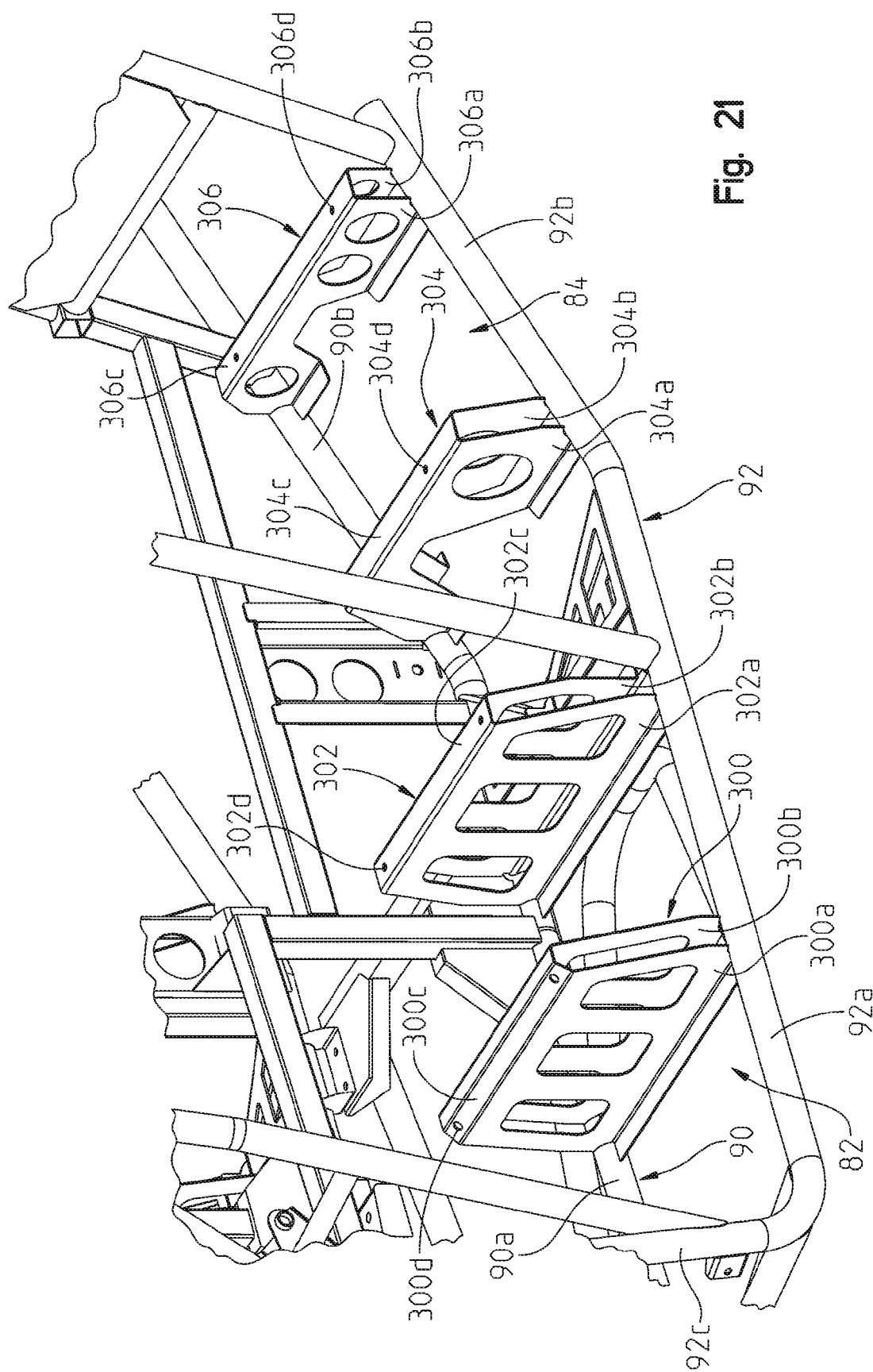

With reference now to FIG. 21, front seating support 82 will be described in greater detail. As shown, support 82 includes first bracket 300 having parallel plate portions 300a, 300b fixedly retained between longitudinal frame tubes 90, 92 and attached at tube portions 90a, 92a. Bracket 300 includes a front edge portion 300c having apertures 300d for attachment of seating as described herein.

With reference still to FIG. 21, front seating support 82 includes second bracket 302 having parallel plate portions 302a, 302b fixedly retained between longitudinal frame tubes 90, 92 and attached at tube portions 90a, 92a. Bracket 302 includes a top edge portion 302c having apertures 302d for attachment of seating as described herein.

With reference still to FIG. 21, rear seating support 82 includes first bracket 304 having parallel plate portions 304a, 304b fixedly retained between longitudinal frame tubes 90, 92 and attached at tube portions 90a, 92b. Bracket 304 includes a top edge portion 304c having apertures 304d for attachment of seating as described herein.

With reference still to FIG. 21, rear seating support 82 includes second bracket 306 having parallel plate portions 306a, 306b fixedly retained between longitudinal frame tubes 90, 92 and attached at tube portions 90b, 92b. Bracket 306 includes a top edge portion 306c having apertures 306d for attachment of seating as described herein.

Figure 23:
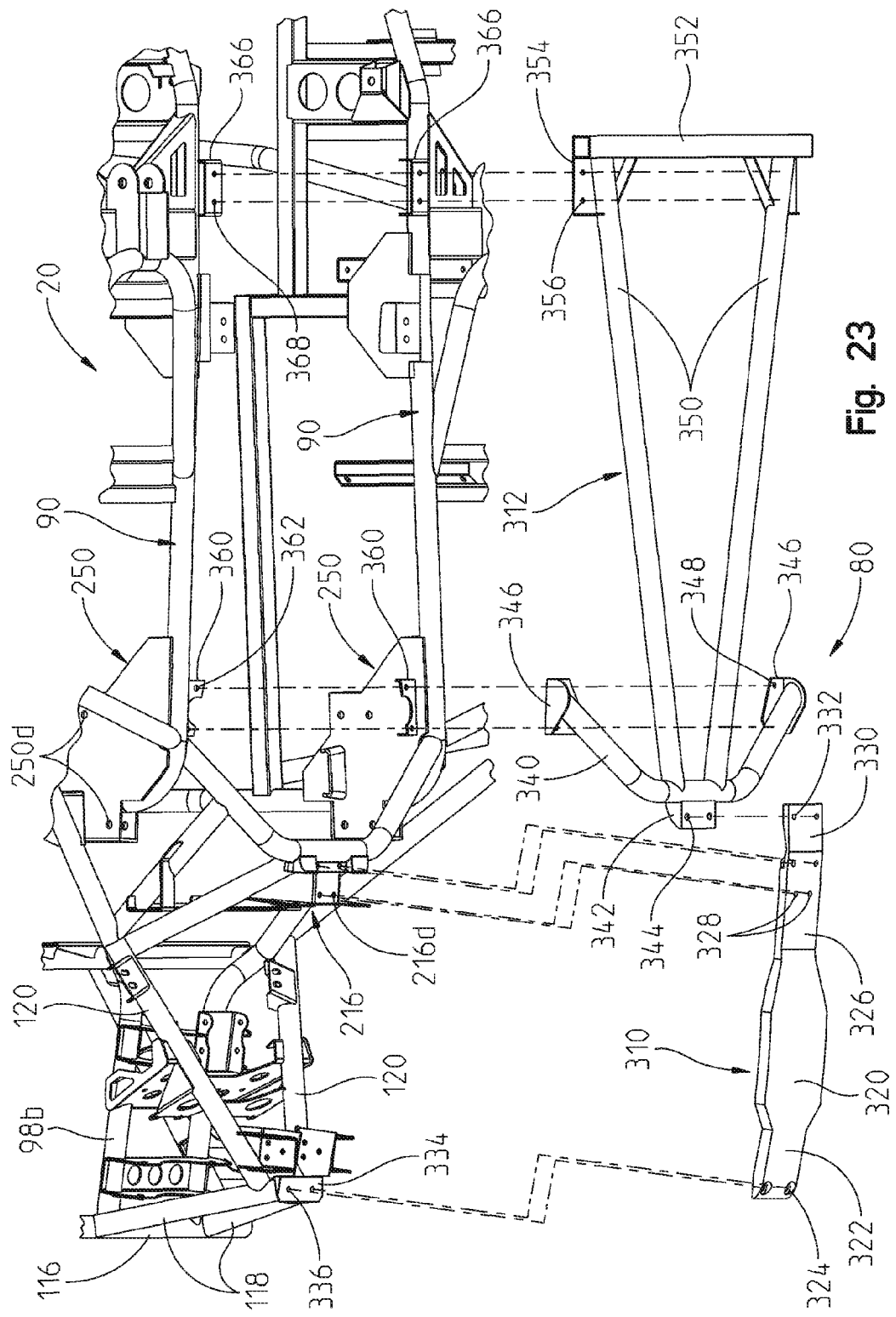

With reference now to FIGS. 22 and 23, the frame removable portion 80 will be described in greater detail. As shown, the removable portion 80 includes a front most portion 310 and a rearward portion 312. As shown best in FIG. 23, the front portion 310 includes a skid plate portion 320 having a front connector portion 322 having apertures 324. Portion 310 includes a mid connector portion 326 having apertures 328. A rearward most connector part 330 has apertures 332. As shown best in FIG. 23, the front of frame 20 includes a bracket 334 attached to a lower portion of frame tubes 118 having threaded apertures 336.

Removable frame portion 312 includes a U-shaped tube 340 having a front bracket 342 having apertures 344. Brackets 346 are positioned at opposite ends of tube 340 and include mounting apertures at 348. Rearwardly extending tubes 350 extend from tube 340 and include a rear cross tube 352 and mounting brackets 354 having mounting apertures at 356. Mounting brackets 360 are coupled to inside surfaces of bracket 250 and includes apertures 362. Finally, brackets 366 are mounted to frame tubes 90 and include mounting apertures at 368.

Thus as shown best in FIG. 23, removable frame portion 312 may be positioned with brackets 346 aligned with brackets 360; and with brackets 354 aligned with brackets 366. The removable portion 312 may be fixed to frame tubes 90 by way of fasteners (not shown) through apertures 348, 362; and 356, 368. Removable portion 310 may then be positioned with apertures 324 aligned with apertures 336 in bracket 334; with apertures 328 aligned with apertures 216d; and with apertures 332 aligned with apertures 344 in removable portion 312. Again, fasteners may be used to hold removable portion 310 in position.

Figure 24:
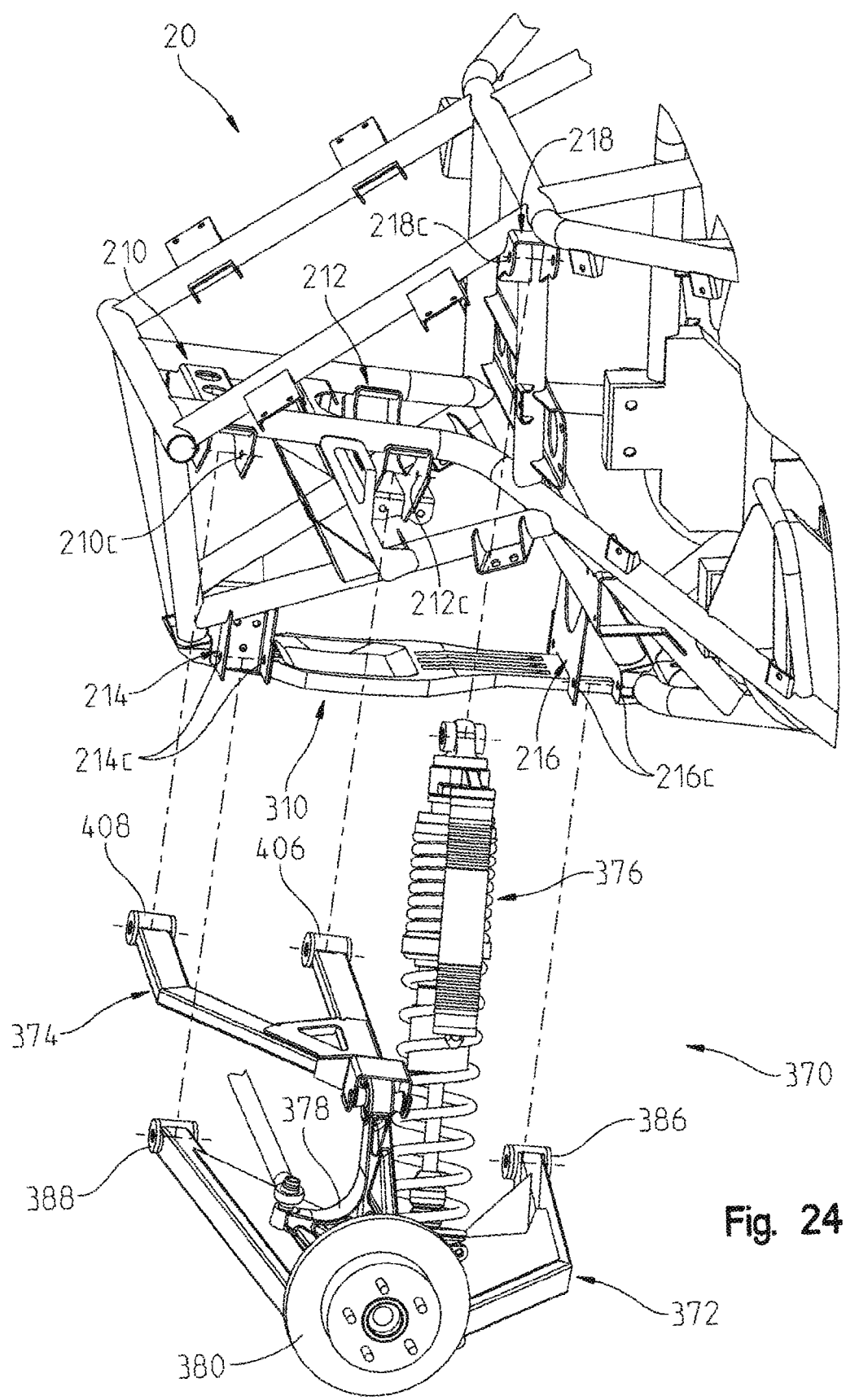
Figure 25:
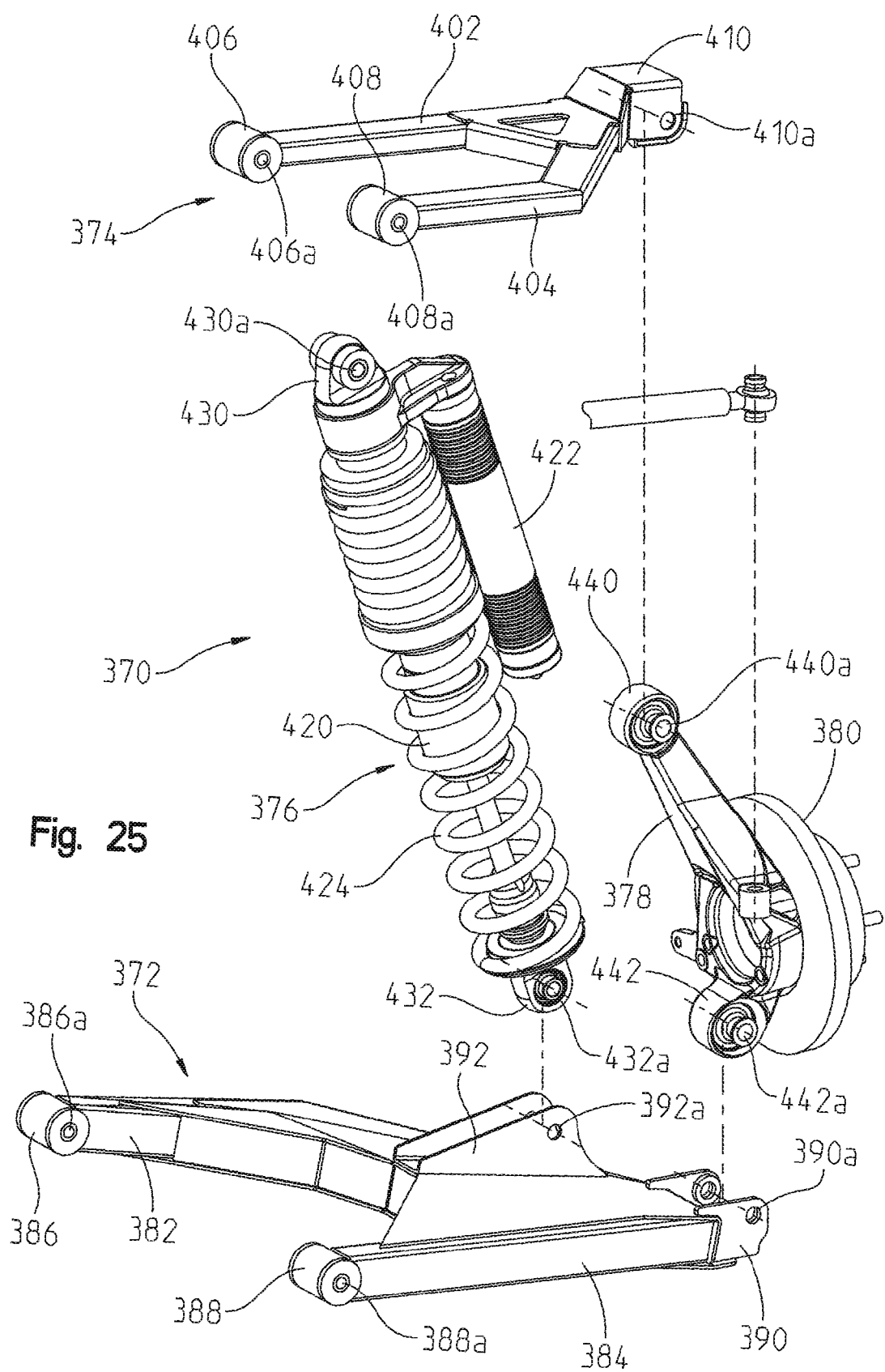

With reference now to FIGS. 24 and 25, front suspension 370 will be described in greater detail. As shown, front suspension 370 is generally comprised of a lower control arm 372, upper control arm 374, and shock absorber 376; where upper and lower control arms 374, 372 are coupled to a wheel spindle 378, which in turn is coupled to wheel hub 380. As shown best in FIG. 25, lower control arm 372 is comprised of arm portions 382 and 384 having couplers 386 and 388 at respective ends thereof. Couplers 386 and 388 include mounting apertures at 386a and 388a. Lower control arm 372 further includes a bracket at 390 having a mounting aperture 390a; and an upper bracket at 392 having a mounting aperture 392a.

Upper control arm 374 is similar in nature to lower control arm 372 including arm portions 402 and 404; couplers 406, 408 and mounting apertures at 406a and 408a. A bracket 410 is positioned at an outer most part of control arm 374 and includes apertures at 410a.

Shock absorber 376 includes a gas shock portion 420 having a gas canister at 422 together with an over spring at 424. Shock 376 includes an upper coupler 430 having an aperture at 430a and a lower coupler 432 having an aperture at 432a.

Wheel spindle 378 includes an upper coupler at 440 having an aperture at 440a and a lower coupler 442 having an aperture at 442a.

It should be appreciated that couplers 386, 388 couple with brackets 216, 214, respectively, as best shown in FIG. 24. Fasteners are received through apertures 386a, 216c; and 388a, 214c. It should also be appreciated that upper control arm 374 is coupled to frame 20 by positioning couplers 408, 406 in brackets 210, 212 and by positioning fasteners through respective apertures 210c, 408a; and 212c, 406a. Wheel spindle 378 is thereafter coupled to upper and lower control arms 374, 372 by way of fasteners through apertures 410a, 440a; and 390a, 442a. Finally, shock absorber is coupled to frame by positioning a fastener through apertures 218c (FIG. 24), 430a, and through 392a, 432a.

As shown best in FIG. 24, upper control arm 374 is substantially narrower than lower control arm 372. In fact, the linear distance between a center of couplers 406-408, is approximately one-half the same distance between couplers 386-388. Thus, the narrowed width of upper control arm 374 allows shock absorber 376 to be attached to lower control arm 372 rather than upper control arm 374. Also the shock mount brackets 218 are positioned high in the frame 20. This allows shock absorber 376 to be substantially longer than shock absorbers on prior vehicles and has an increased shock stroke length. In the embodiment shown, the shock 376 is a 3-inch internal bypass shock available from Fox Shox.

Figure 26:
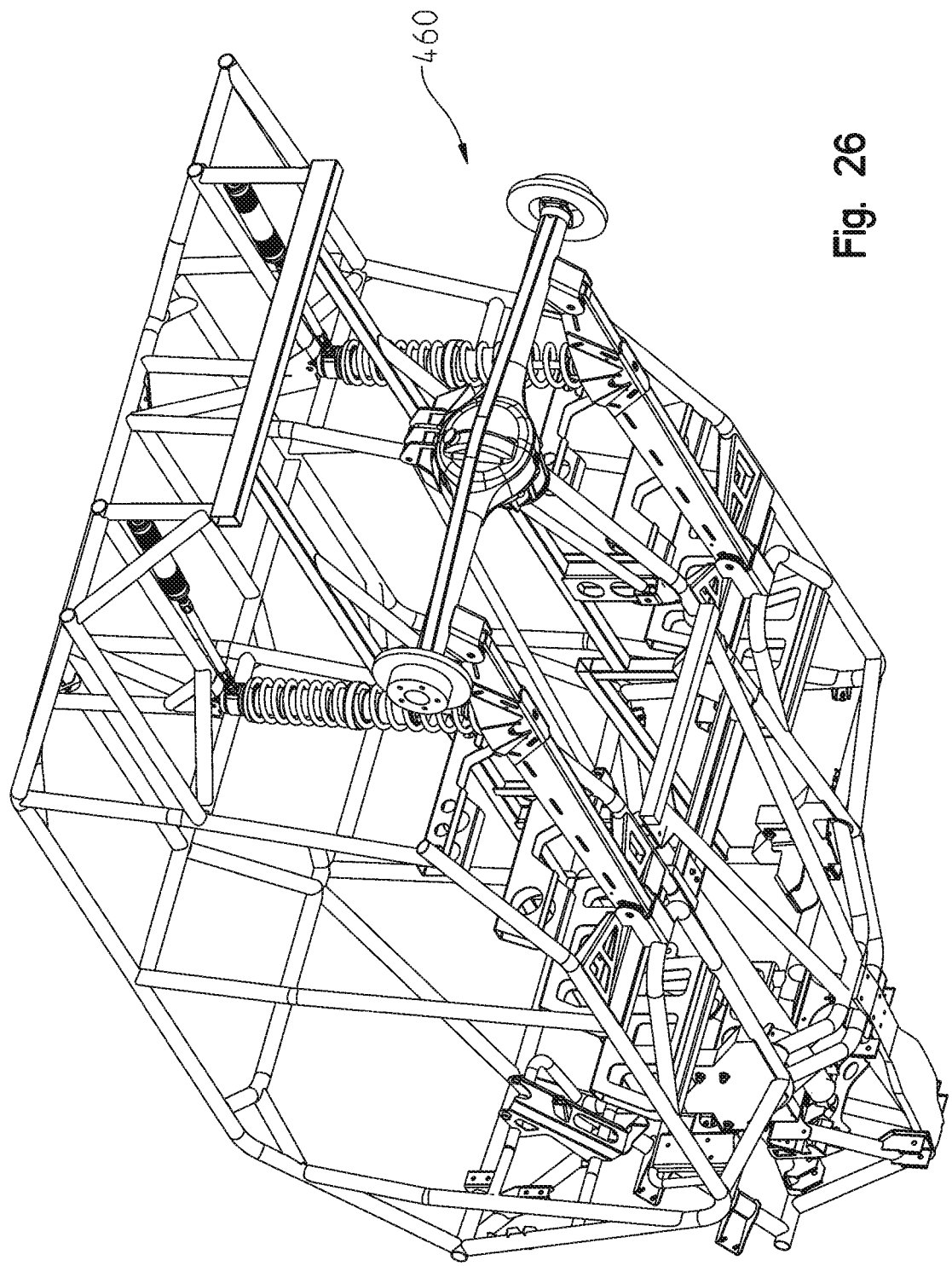
Figure 27:
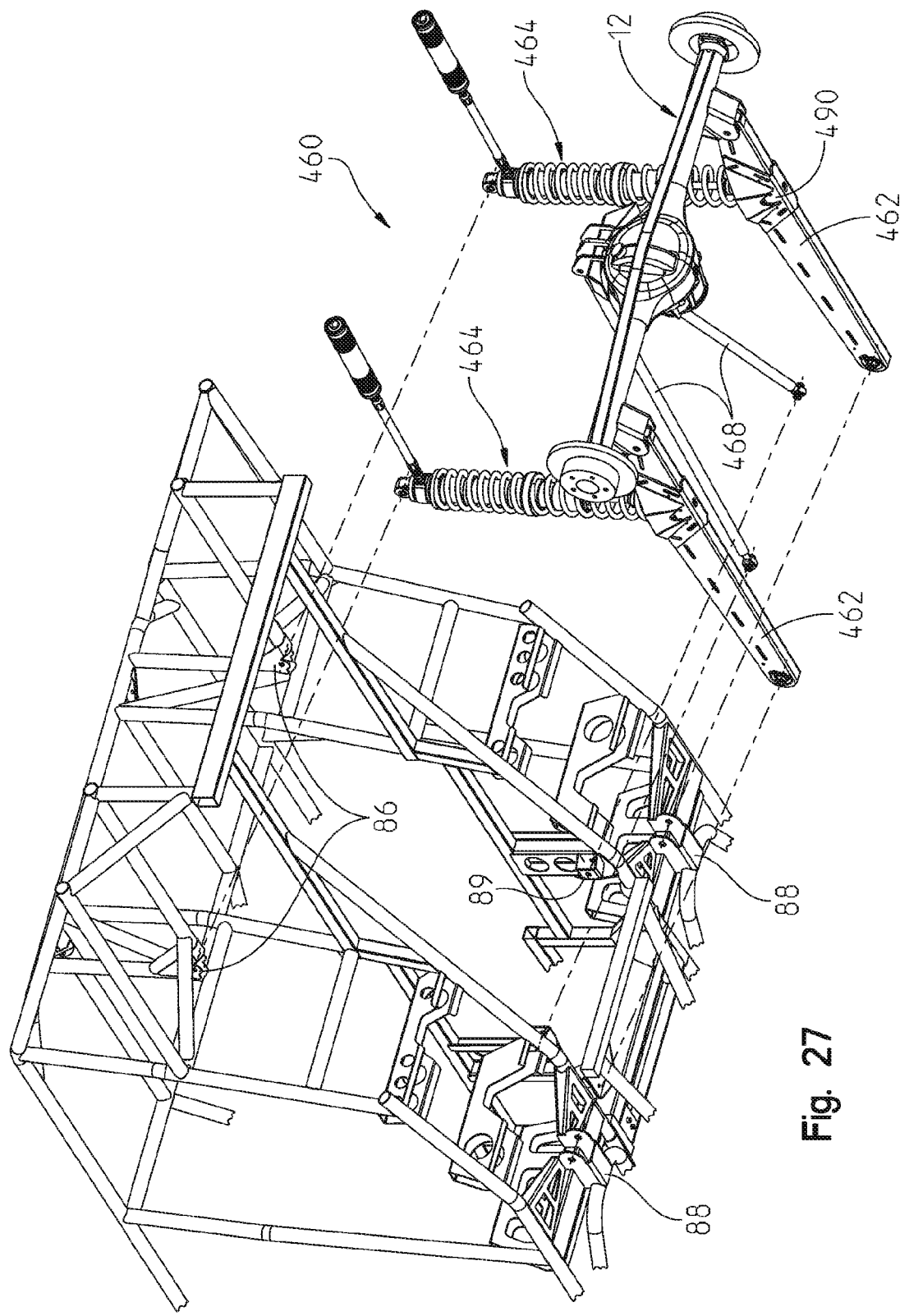
Figure 28:
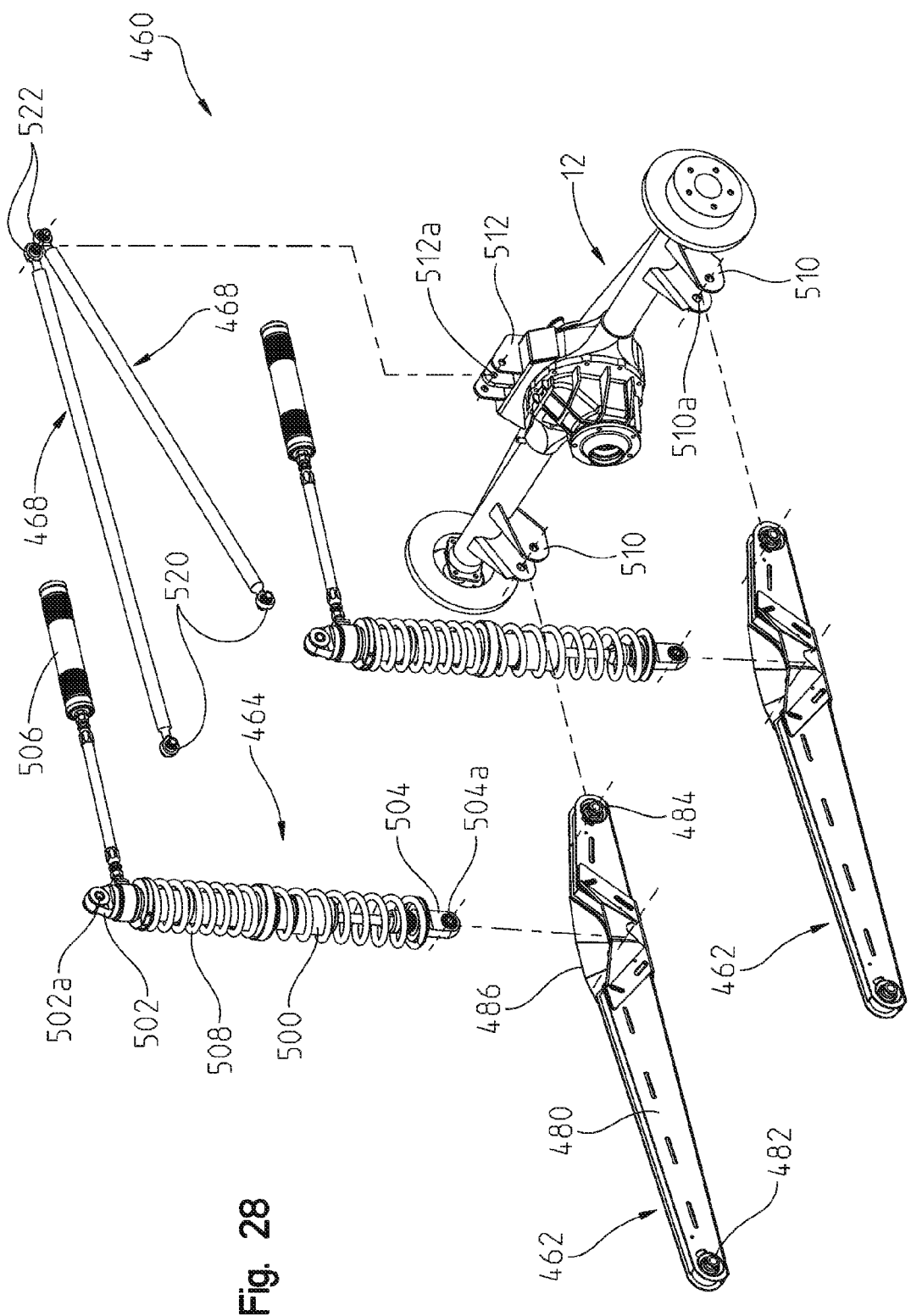

With reference now to FIGS. 26-28, rear suspension 460 will be described in greater detail. As shown best in FIGS. 27 and 28, rear suspension 460 generally includes rear trailing arms 462, shock absorbers 464, and rear alignment arms 468 coupled to rear axle 12. As shown in FIG. 28, trailing arms 462 include elongate arm portions 480 having a front coupler 482 and rear coupler 484. Trailing arm 462 further includes a funnel-shaped receiving area 486 having an internal connecting point 490 (FIG. 27).

Shock absorbers 464 are similar to front shock absorbers and include a gas shock portion 500 having an upper coupler 502 with mounting aperture 502a, and a lower coupler 504 having a mounting aperture 504a. Shock 464 further includes a gas canister 506 and an overspring at 508.

Rear axle 12 includes a first set of brackets 510 having mounting apertures 510a and a second set of brackets 512 having mounting apertures at 512a. Rear control arms 468 include front couplers 520 and rear couplers 522.

Figure 28A:
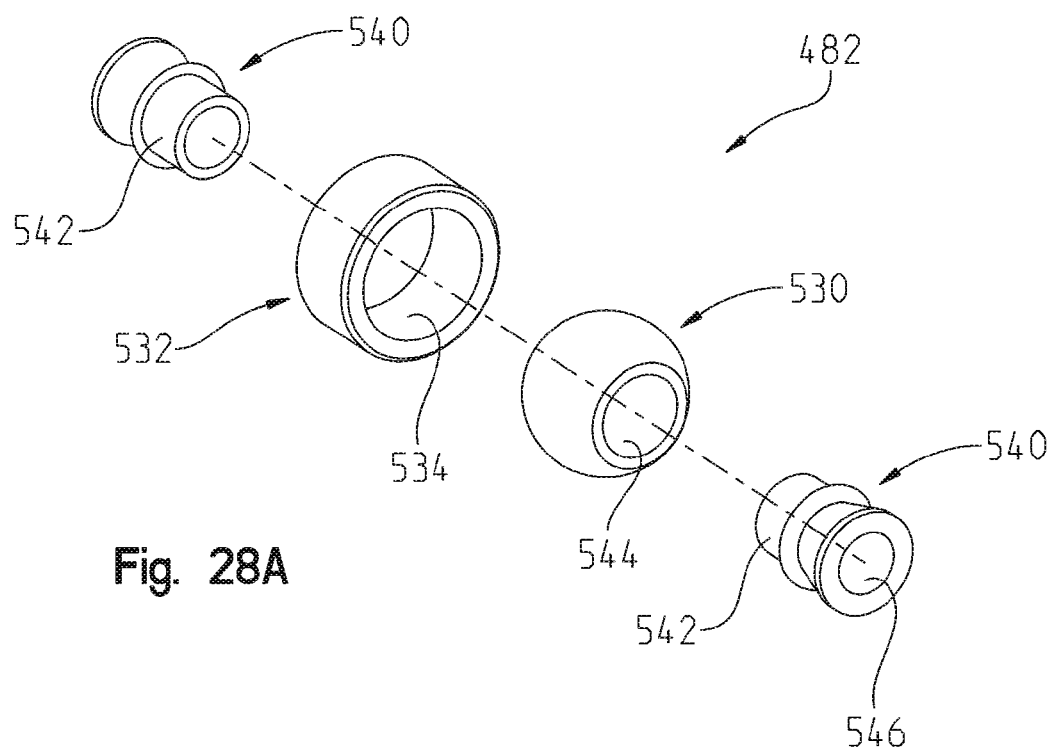

With reference now to FIG. 28A, the front coupler and rear couplers 482, 484 will be described in greater detail. Front coupler 482 is comprised of a ball joint portion 530 which is profiled for receipt within a ball race 532, where the race 532 includes an interior spherical surface 534 matching a spherical profile of ball 530. Front coupler 482 further includes a mounting insert 540 having a cylindrical surface 542 receivable within aperture 544 of ball 530. Inserts 540 include apertures 546. Rear coupler 484 is substantially similar to front couplers 482.

Figure 28B:
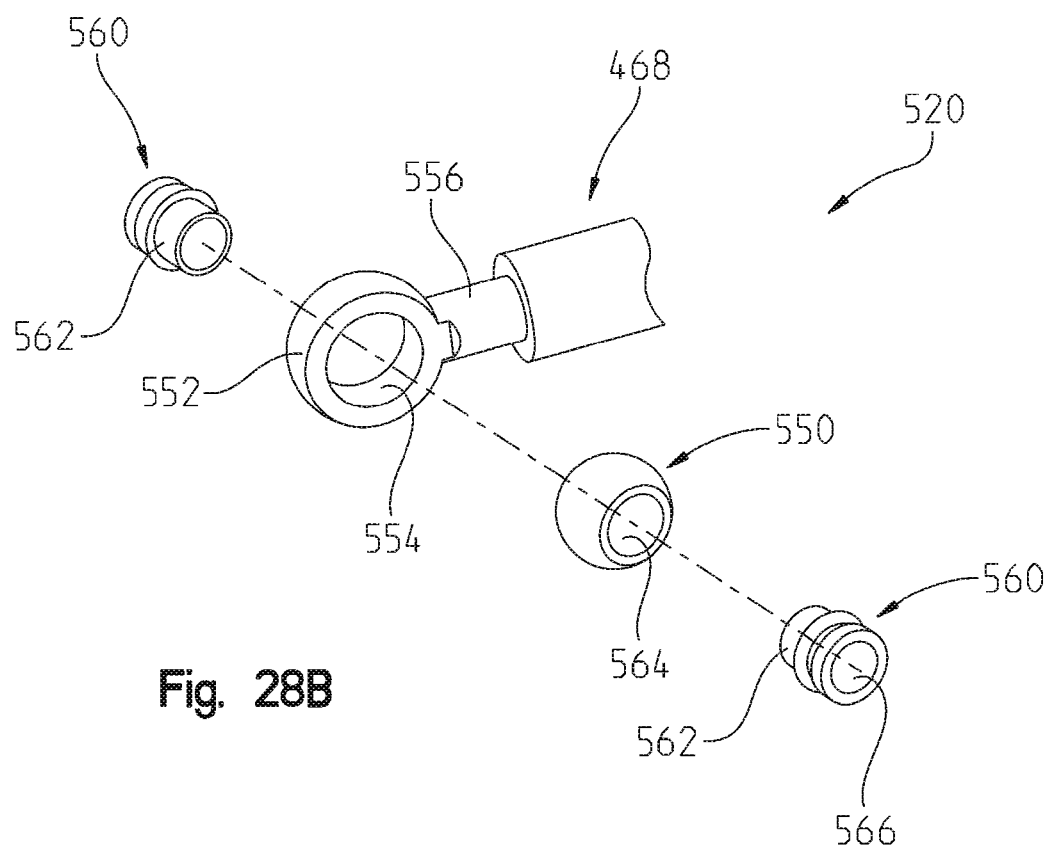

With reference now to FIG. 28B, the front coupler and rear couplers 520, 522 will be described in greater detail. Coupler 520 is comprised of a ball joint portion 550 which is profiled for receipt within a ball race 552, where the race 552 includes an interior spherical surface 554 matching a spherical profile of ball 550. In this case, race 552 is profiled like a tie rod having a threaded end 556, so as to allow the overall length of the rear alignment arm to be adjustable. Coupler 520 further includes a mounting insert 560 having a cylindrical surface 562 receivable within aperture 564 of ball 550. Inserts 560 include apertures 566.

Thus, it should be appreciated that trailing arms 462 may be attached to frame 20 by way of connection of ball joints 482 with couplers 88 and by way of couplers 484 with brackets 510. Alternatively, trailing arms 462 may be attached to frame 20 with polymeric bushings. Rear alignment arms 468 are also attached to frame 20 by way of couplers 520 attached to brackets 89 (FIG. 27) and with couplers 522 coupled to brackets 512 on axle 12. Top coupler 502 of shock absorber 500 is then attached to bracket 86 on frame 20 (FIG. 27) and lower couplers 504 of shock absorber 464 is connected to connection point 490 (FIG. 27) of trailing arms 462. In the embodiment shown, the shock 376 is a 3-inch internal bypass shock available from Fox Shox.

Figure 29:
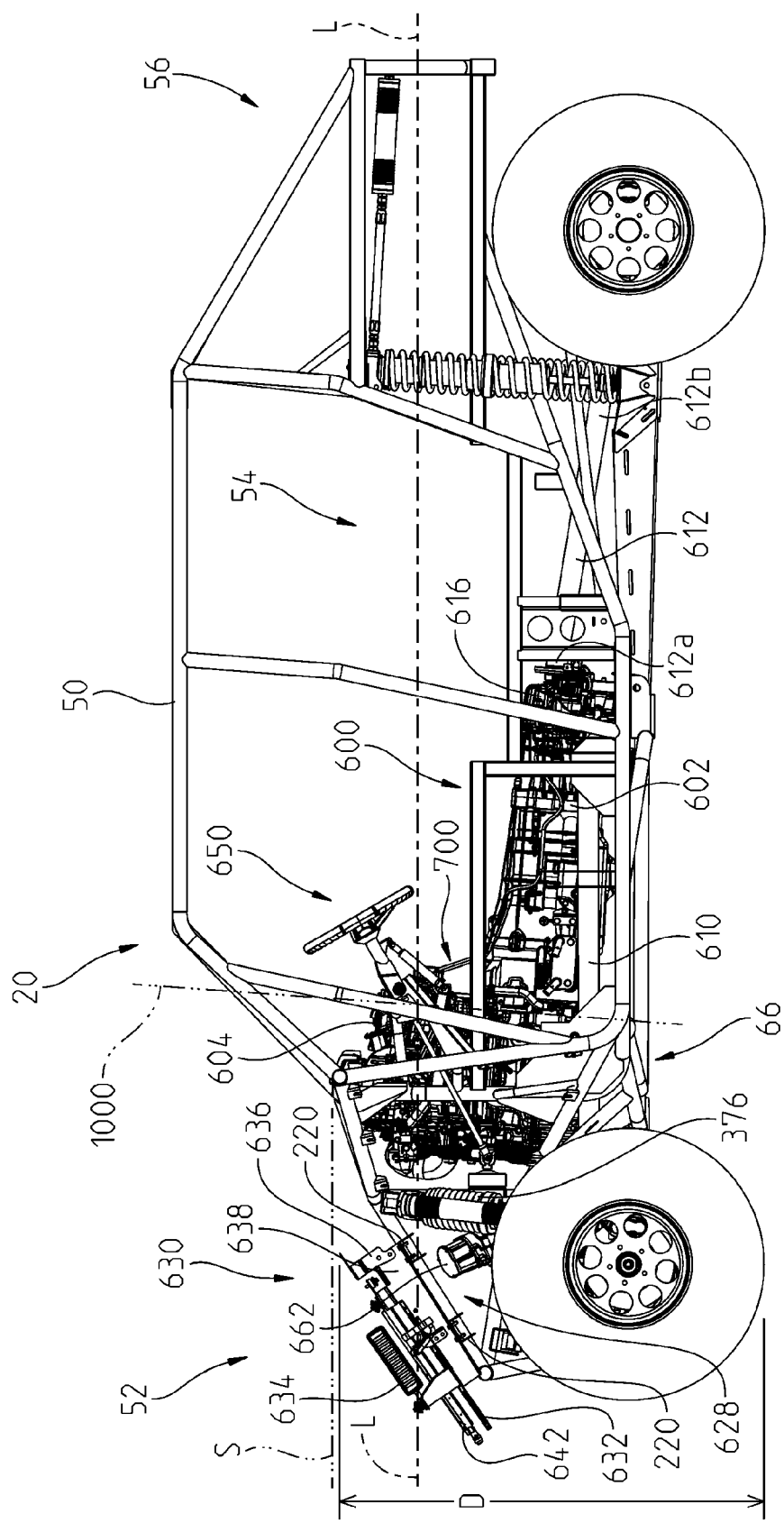
Figure 30:
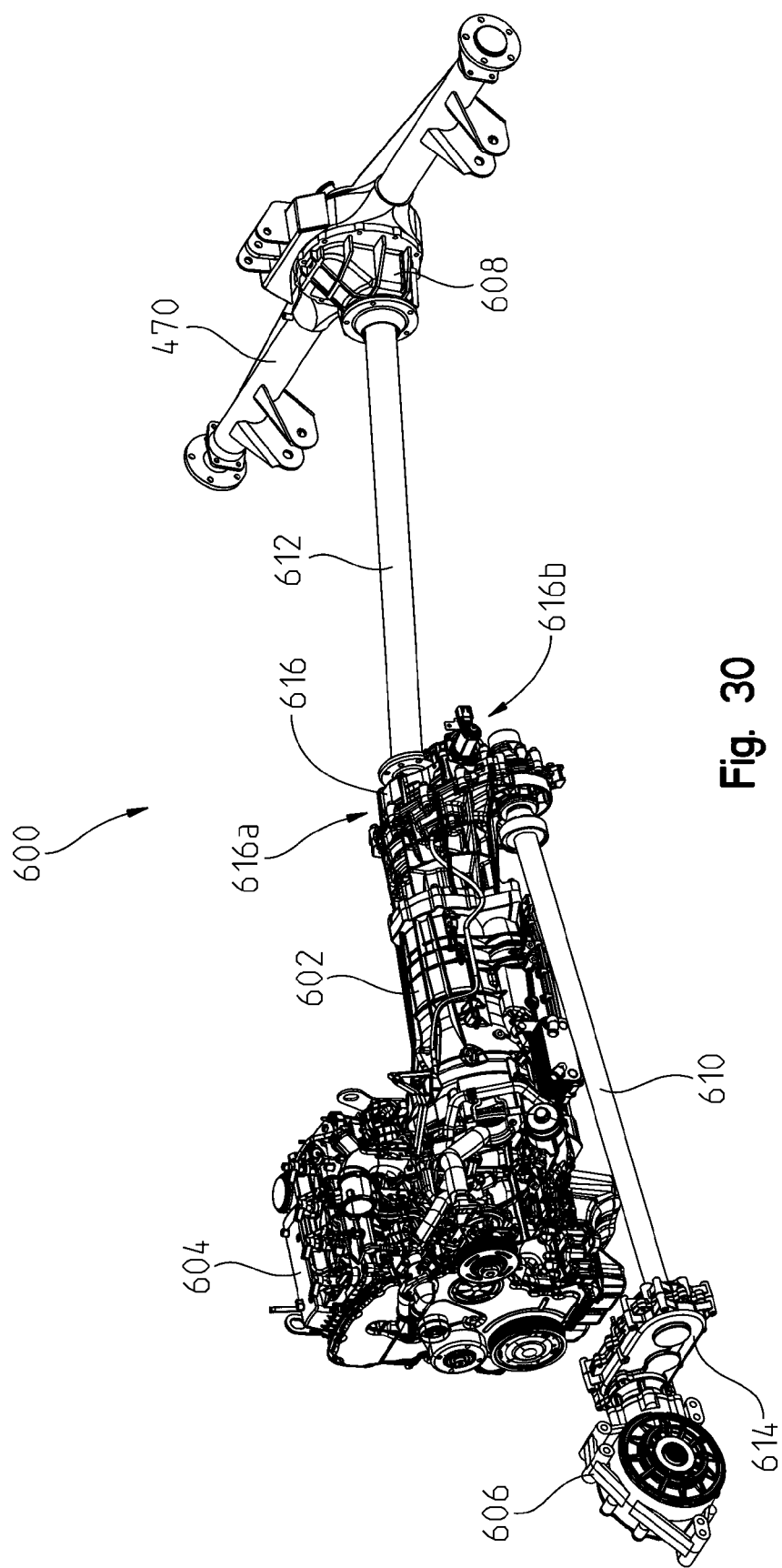

Referring to FIGS. 29 and 30, frame 20 further supports a drivetrain assembly 600, a cooling assembly 630, a steering assembly 650, and a brake assembly 700. Drivetrain assembly 600 is generally positioned at the centerline of vehicle 2 along a longitudinal axis L and extends from front section 52 to rear section 56. Drivetrain assembly 600 illustratively includes a transmission 602, an engine 604, a front final drive 606, a rear final drive 608, a front drive shaft 610, a rear drive shaft 612, a front transfer case 614, and a rear transfer case 616. Final drives 606, 608 may be in the form of differentials. Drivetrain assembly 600 also may include a turbocharger operably coupled to engine 604. In operation, engine 604 is operably coupled to transmission 602 at interface 1000 in order to drive front wheels 6 via front drive shaft 610 and rear wheels 10 via rear drive shaft 612.

Illustrative transmission 602 is rearward of engine 602 at interface 1000. Transmission 602 is positioned at midsection 54 of frame 20 between front seats 44 of operator area 30 and may be coupled to a cross-member 590 (FIG. 6). Cross-member 590 may be coupled to frame 20 and transmission 602 with conventional fasteners (not shown), such as bolts, welds, and/or rivets. Illustratively, cross-member 590 is removable in order to facilitate assembly of transmission 602 with frame 20. Transmission 602 may be an automatic transmission or, alternatively, may be another type of transmission, for example a sequential transmission having a manual shift lever, an electric shift lever, or paddle levers.

Engine 604 is operably coupled to transmission 602 forward of interface 1000 and is a front-mid engine, i.e., engine 604 is supported between front section 52 and midsection 54 of frame 20. As shown in FIG. 29, engine 602 is positioned within operator area 30 and extends upwardly from the footwell area for the operator and passenger. Additionally, engine 602 is forward of steering wheel 36 and rearward of front suspension 370 and front axle 8, thereby allowing sufficient space for front suspension 370, a portion of steering assembly 650, and other components of vehicle 2, as is detailed further herein.

Brackets 252 support engine 604 on frame 20 at engine mount section 66. As shown in FIG. 19, engine 604 is supported on support plate 252c of bracket 252 through conventional coupling means, such as bolts, welds, or rivets. For example, a bolt (not shown) may be received through aperture 252d of support plate 252c in order to couple engine 604 to frame 20. Rubber bushings (not shown) also may be used to mount engine 604 to engine mount section 66.

Engine 604 is positioned between frame tubes 104 and removable section 80 (FIG. 6). Removable section 80 supports engine 604 at engine mount section 66, however, section 80 may be removed in order to install engine 604 through the bottom of frame 20, rather than from above frame 20. The position of engine 604 may be adjusted to accommodate various cargo loads and uniformly distribute the weight of vehicle 2. Engine 604 contributes to the weight load near the front of vehicle 2 such that the weight distribution of vehicle 2 may be biased towards the front. However, by positioning engine 604 in a front-mid position, the cargo space at the rear of vehicle 2 is increased, which contributes to a uniform weight distribution for vehicle 2.

Engine 604 also is assembled with an air intake assembly, including an airbox 624, in order to operate engine 604. Airbox 624 is illustratively supported by front section 52 of frame 20 along a passenger side of vehicle 2.

As shown in FIG. 30, engine 604 is operably coupled to rear final drive 608 through transmission 602 and rear drive shaft 612. Rear final drive 608 is supported on rear axle 470 and drive rear wheels 10 according to an output from transmission 602. Rear drive shaft 612 generally extends in the direction of longitudinal axis L of vehicle 2 (see FIG. 6). Also, as best shown in FIG. 29, rear drive shaft 612 extends at a generally downward angle toward rear final drive 608, such that a front portion 612a of rear drive shaft 612 is elevated relative a rear portion 612b of rear drive shaft 612.

Referring to FIG. 30, rear transfer case 616 is operably coupled to front portion 612a of rear drive shaft 612 and transmission 602. In particular, rear transfer case 616 is positioned intermediate transmission 602 and rear drive shaft 612 and operably couples rear drive shaft 612 to front drive shaft 610. Rear transfer case 616 allows front drive shaft 610 to be off-center, i.e., laterally spaced apart from longitudinal axis L of vehicle 2 and rear drive shaft 612. Rear drive shaft 612 is perpendicular to an inner end 616a of rear transfer case 616, and front drive shaft 610 is perpendicular to an outer end 616b of rear transfer case 616. Illustrative vehicle 2 may be configured for four-wheel drive operation and, as such, rear transfer case 616 allows output from transmission 602 to drive both front and rear drive shafts 610, 612, as is detailed further herein.

Front drive shaft 610 extends between rear transfer case 616 and front transfer case 614. Front transfer case 614 includes an input shaft 618 for engaging front drive shaft 610. Input shaft 618 may be splined to engage with front drive shaft 610. Illustratively, as shown in FIGS. 6 and 30, front drive shaft 610 is positioned below the operator seat, rather than along longitudinal axis L. In other words, front drive shaft 610 is off-center.

Figure 31:
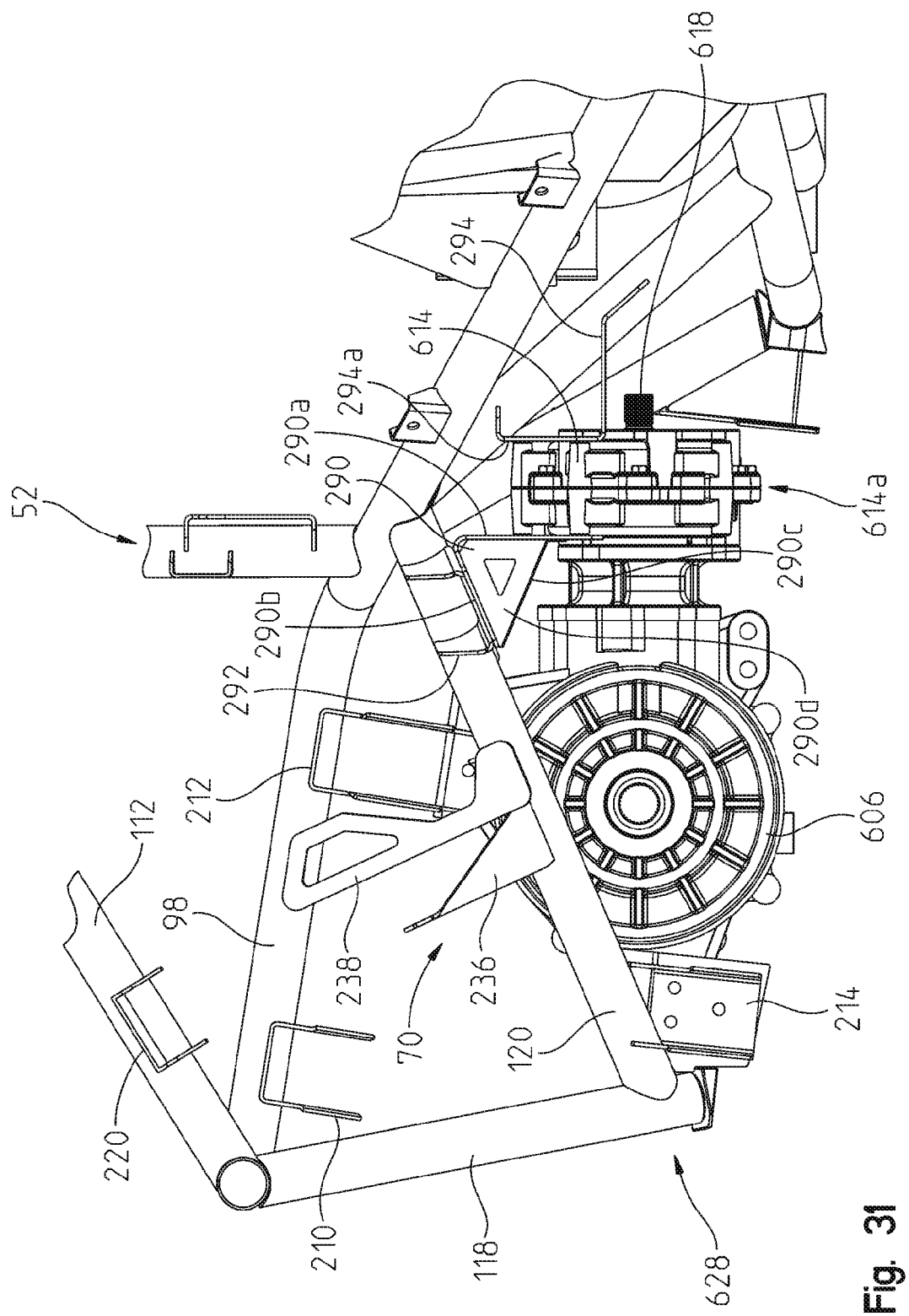
Figure 32:
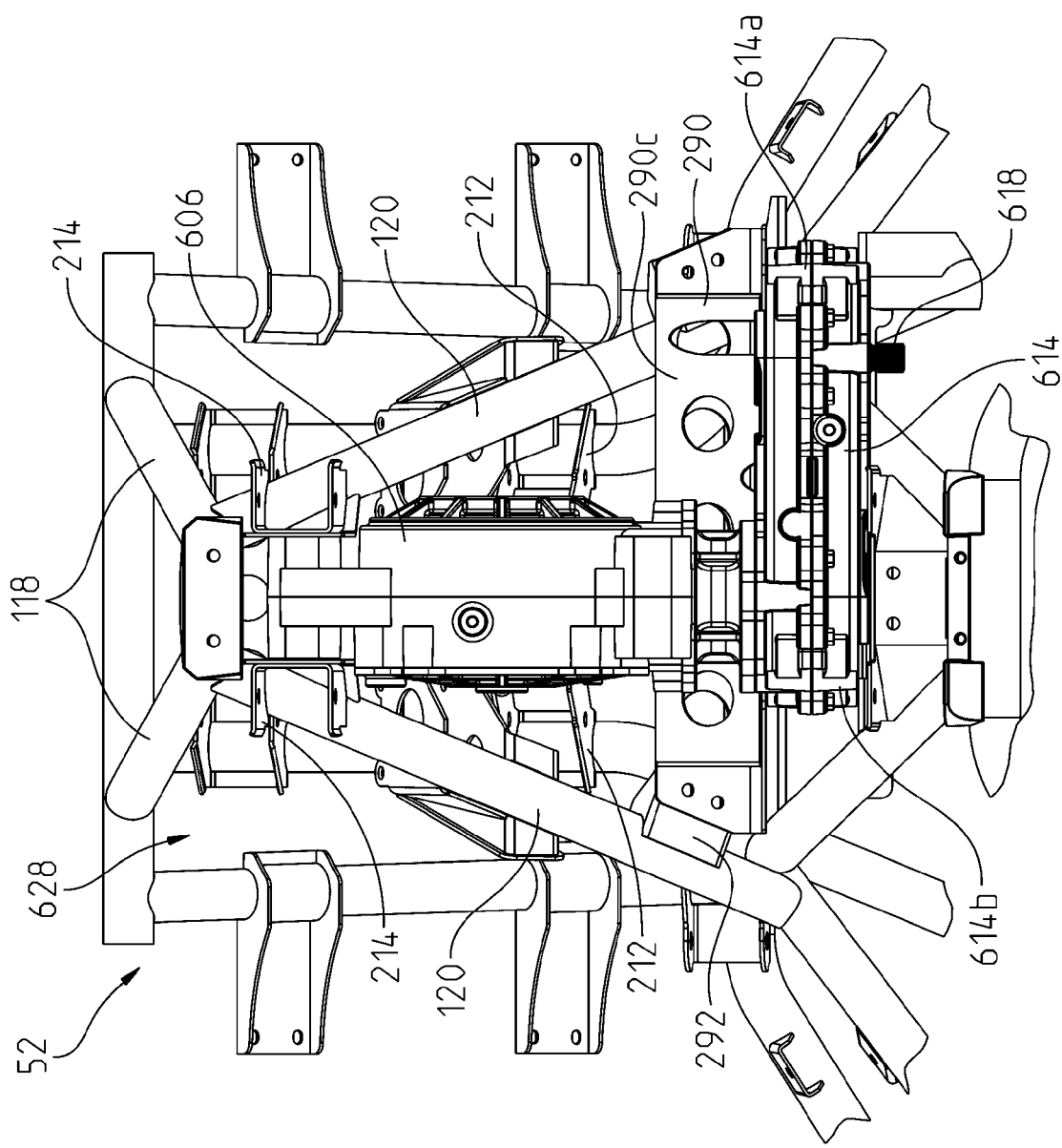

Referring to FIGS. 31-33, front transfer case 614 is supported on front section 52 of frame 20 by front transfer case mount 72 and is positioned intermediate engine 604 and front final drive 606. Front transfer case 614 is generally perpendicular to front drive shaft 610, front final drive 606, and longitudinal axis L of vehicle 2. Front transfer case 614 includes an outer end 614a and an inner end 614b. Outer end 614a extends laterally outward in a generally perpendicular direction from longitudinal axis L of vehicle 2 and, more particularly, extends toward an operator side of vehicle 2 in order to engage input shaft 618 with front drive shaft 610. Inner end 614b is positioned along longitudinal axis L in order to engage with front final drive 606, which also is positioned along longitudinal axis L. As such, front transfer case 614 transfers power from front drive shaft 610 to front final drive 606 in order to drive front wheels 6.

Front transfer case 614 is coupled to rear wall 290a of bracket 290 with conventional fasteners (not shown), which are received through apertures 290f. Additionally, front transfer case 614 is coupled to a bracket 294, and in particular to a front wall 294a of bracket 294, with conventional fasteners (not shown), which are received through apertures 296. Front transfer case 614 extends downwardly from front section 52 of frame 20 and is generally suspended from brackets 290, 294.

Front final drive 606 is positioned forward of front transfer case 614 and is coupled to front section 52 of frame 20 by front final drive mount 70. Portion 310 also may support front final drive 606 and may be removed from frame 20 when drivetrain assembly 600 is assembled with frame 20. As shown in FIG. 33, an upper mounting portion 622 of front final drive 606 is coupled to brackets 212, 280 with conventional fasteners (not shown). A lower mounting portion 620 of front final drive 606 is coupled to an inner surface of plate portion 282 of lower brackets 214 with conventional fasteners (not shown), which are received through apertures 282a. Additionally, an outer portion of plate portion 282 is coupled with lower control arms 372 of front suspension 370, thereby maximizing the coupling surfaces of lower brackets 214.

Front final drive 606 generally extends along longitudinal axis L of vehicle 2. As such, front final drive 606 is aligned with inner end 614b of front transfer case 614, rather than outer end 614a of front transfer case 614. As shown best in FIG. 30, front final drive 606 is not aligned with front drive shaft 610. Front final drive 606 is operably coupled to front drive shaft 610 via front transfer case 614. In addition to driving front wheels 6, front final drive 606 may assist with suspension travel of front suspension 370 and increase stability and control of the movement of wheel 6.

As detailed above, lower brackets 214 are coupled to both front final drive 606 and lower control arms 372 of front suspension 370. Front final drive extends below lower brackets 214 and, as such, extends below a generally horizontal plane defined by lower control arms 372. In general, front suspension 370 is positioned around front final drive 606 such that front suspension 370 defines an envelope 628 for supporting various components of vehicle 2 on frame 20. Front final drive 606 is positioned within an opening defined by lower control arms 372 (see FIG. 6). Portion 310 may be positioned below front final drive 606 in order to cover and protect front final drive 606.

Front and rear final drives 606, 608 may be selectively locking final drives configured for at least approximately 7,000 lb-ft of torque. Illustratively, front final drive 606 is a locking final drive available from The Hilliard Corporation of Elmira, N.Y. Additionally, rear final drive 608 also may be a locking final drive available from The Hilliard Corporation of Elmira, N.Y. The configuration of frame 20 and final drive mount 70 allows other types of front final drives to be used for vehicle 2, such as positive traction final drives, limited-slip final drives, open final drives, automatic torque biasing final drives, high-friction final drives, and other embodiments thereof. Because vehicle 2 is able to support various types of final drives, drivetrain assembly 600 may be selectively customized to operator needs and preferences. Other components of drivetrain assembly 600 also may be interchanged to allow for additional customization of vehicle 2.

During operation of drivetrain assembly 600 in two-wheel drive mode, engine 604 and transmission 602 operate according to user inputs, such as a user input on first foot pedal 38. The output from transmission 602 is transmitted to rear drive shaft 612 in order to operate rear final drive 608 and drive rear wheels 10. Rear drive shaft 612 also drives front drive shaft 610. Alternatively, when four-wheel drive mode is selected by the user from operator controls 34, the output of transmission 602 is transmitted to both front and rear drive shafts 610, 612 via rear transfer case 616. As such, both front and rear drive shafts 610, 612 drive the operation of the respective front and rear final drives 606, 608 and front and rear wheels 6, 10. Front transfer case 614 is engaged in order to operably align the output from front drive shaft 610 with the input of front final drive 606. Vehicle 2 may be configured with selective drive modes, such as all-wheel drive, two-wheel drive, four-wheel drive, and others. Alternatively, vehicle 2 may automatically change the drive mode or may continuously operate in one particular mode.

Figure 33A:
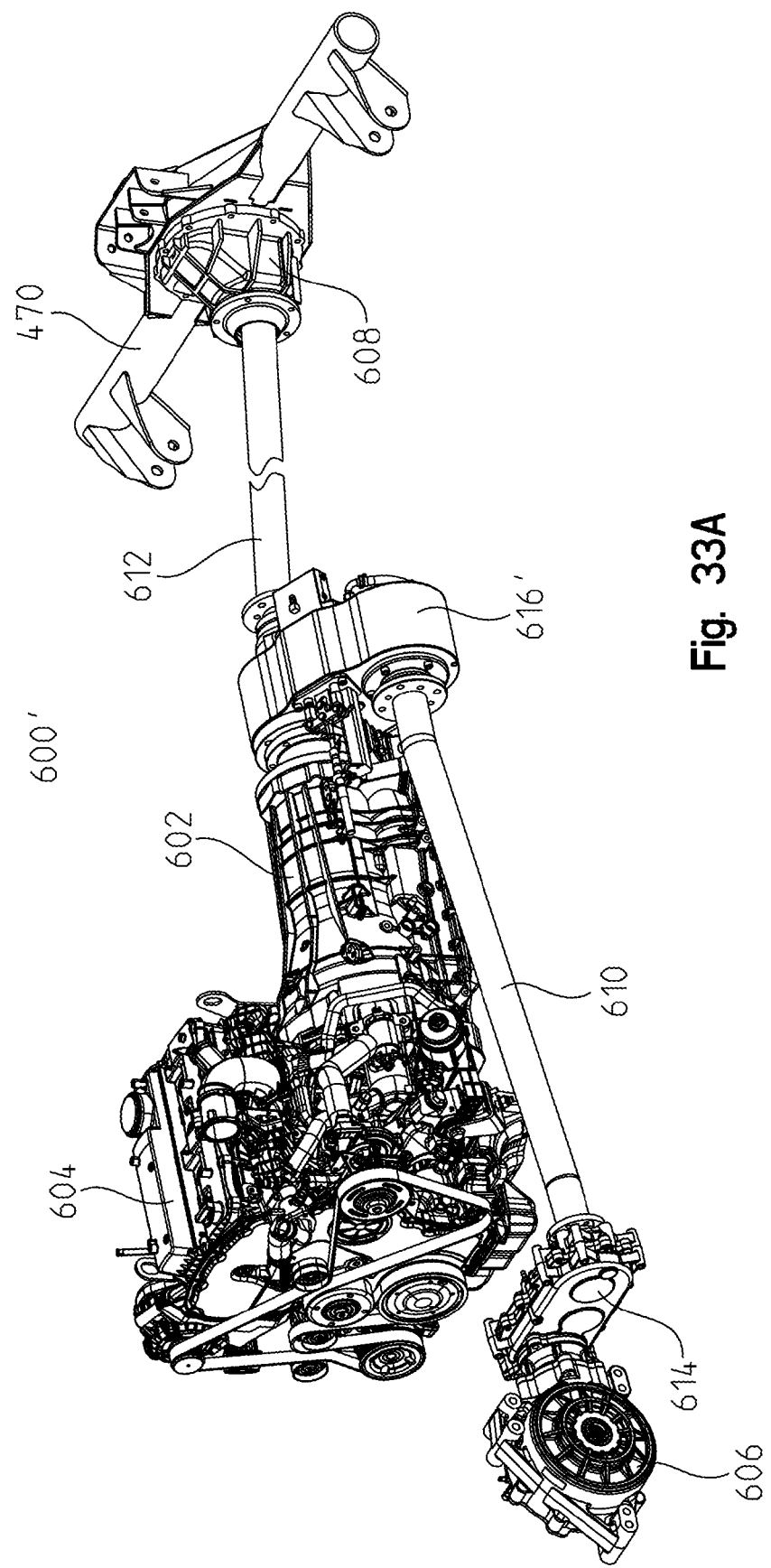

An alternative embodiment of drivetrain assembly 600 is shown as drivetrain assembly 600' in FIG. 33A. Drivetrain assembly 600' includes transmission 602, engine 604, front final drive 606, rear final drive 608, rear drive shaft 612, front drive shaft 610, front transfer case 614, and rear transfer case 616'. Rear transfer case 616' allows vehicle 1200 to be in the neutral gear position. Furthermore, rear transfer case 616' allows front drive shaft 610 to rotate during forward and reverse operation of vehicle 1200, such that the rotational speed of rear drive shaft 612 is approximately the same as the rotational speed of front drive shaft 610. As such, the rotational speed of rear drive shaft 612 generally matches that of front drive shaft 610 in order to easily engage vehicle 1200 in a four-wheel drive mode. It may be appreciated, however, that when vehicle 1200 is in neutral, front drive shaft 610 may not rotate.

Figure 34:
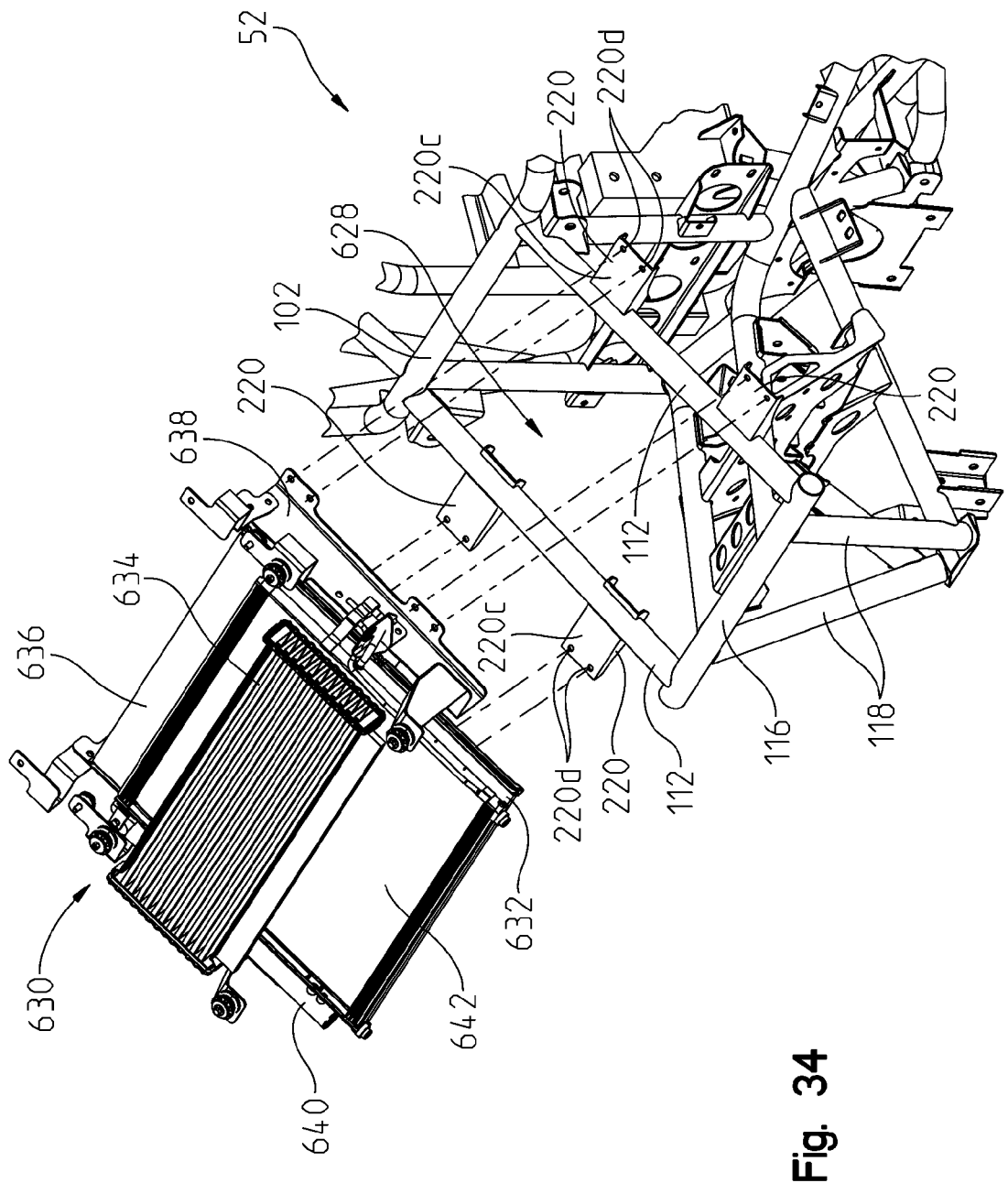

Frame 20 also supports a cooling assembly 630 to control the temperature of engine 604. Cooling assembly 630 also may control the temperature of other components of vehicle 2. As shown in FIGS. 29 and 34, cooling assembly 630 includes a first heat exchanger, illustratively a radiator 632, a second heat exchanger, illustratively an intercooler 634 for the turbocharger, an air conditioning condenser 642 of the HVAC system, a cooling assembly frame 636 having side panels 638 and 640, and at least one fan (not shown). In one embodiment, cooling assembly 630 includes two fans in a side-by-side arrangement, i.e., both fans are adjacent the rear surface of radiator 632. Illustrative air conditioning condenser 642 is intermediate turbocharger intercooler 634 and radiator 632, and more particularly, is positioned rearward of turbocharger intercooler 634 and forward of radiator 632.

Cooling assembly frame 636 supports radiator 632, turbocharger intercooler 634, air conditioning condenser 642, and the fans on front section 52 of frame 20. In particular, as shown in FIG. 34, side panels 638, 640 of frame 636 couple with top face 220c of brackets 220. Conventional fasteners (not shown) extend through apertures in side panels 638, 640 and apertures 220d of bracket 220 in order to support cooling assembly 630 on frame 20. Frame 636 may be configured as a shroud generally surrounding radiator 632.

Referring to FIG. 29, cooling assembly 630 is coupled to the top surface of frame tubes 112. In particular, an uppermost portion of frame 636 is a vertical distance D from the ground and is positioned above engine 604. Illustratively, distance D may be approximately 45-55 inches from the ground, and more particularly, may be approximately 51.5 inches from the ground. Despite being positioned above front section 52 of frame 20, cooling assembly 630 is positioned below a line of sight S of the operator and passenger and, therefore, does not cause the hood of vehicle body 22 to interfere with line of sight S.

Also, because cooling assembly 630 is coupled to the top of frame tubes 112, cooling assembly 630 is angled relative to longitudinal axis L. As such, the approach angle of the air flowing into cooling assembly 630 may be approximately 35 degrees. Cooling assembly 630 is positioned to receive sufficient air flow to control the temperature of engine 604. Alternatively, cooling assembly 630 also may be angled such that the approach angle of the air is less than approximately 35 degrees, or may be between approximately 35 degrees and 90 degrees. Other embodiments of cooling assembly 630 may include ducting or a baffle assembly to further control the approach angle and the air flow through turbocharger intercooler 634, air conditioning condenser 634, and radiator 632.

As is apparent from FIG. 29, cooling assembly 630 is positioned forward of, and generally above, front suspension 370. As such, cooling assembly 630 does not interfere with the suspension travel, and in particular the displacement of shock absorber 376. Additionally, cooling assembly is positioned generally forward of steering assembly 650 and extends above envelope 628. Cooling lines and tubes (not shown) may extend into envelope 628 at front section 52.

Air flowing into cooling assembly 630 and across radiator 632 is exhausted from cooling assembly 630 by the fans. The air from cooling assembly 630 may be directed towards the wheel well area in order to exit vehicle 2.

Figure 34B:
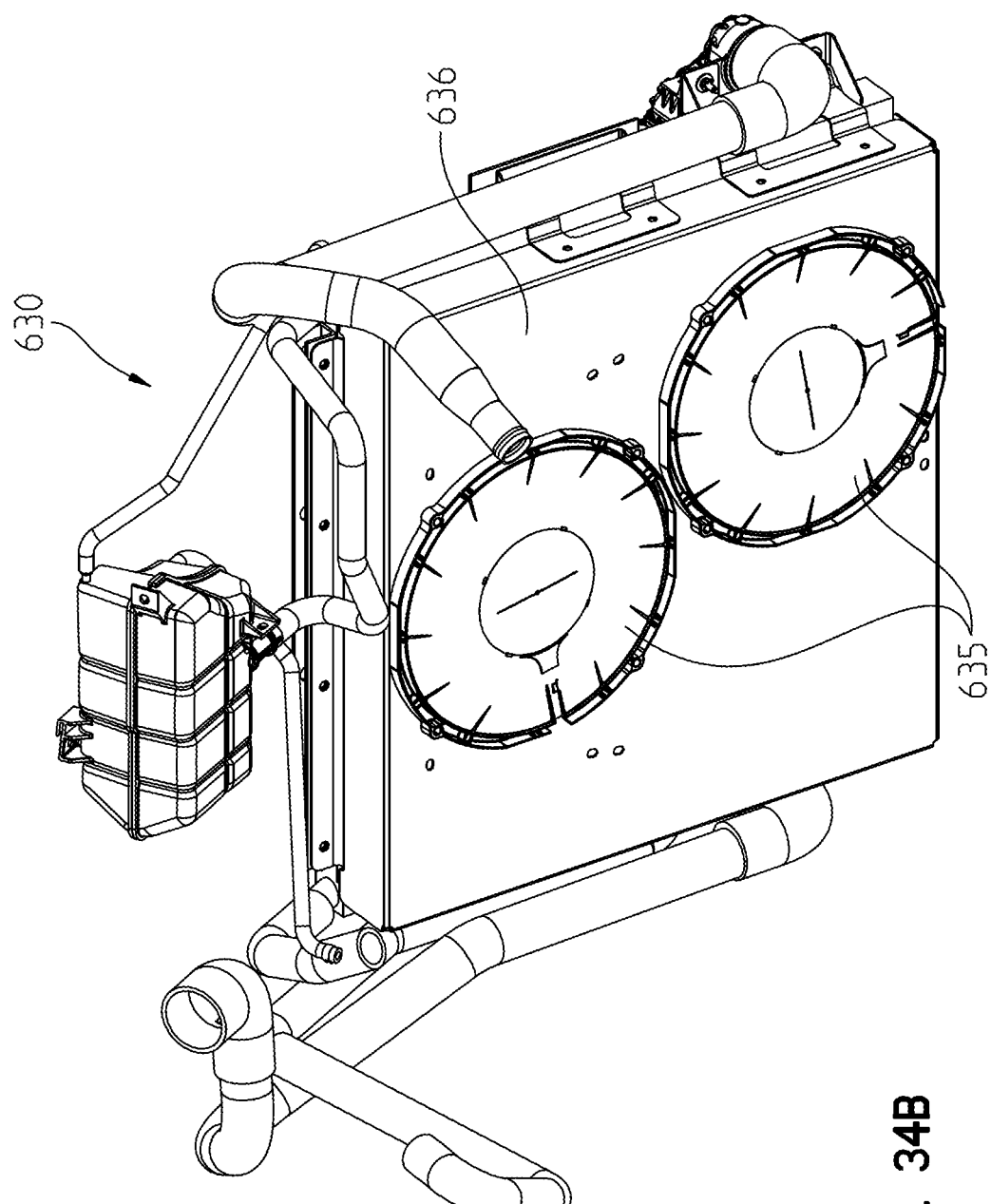

In one embodiment, as shown in FIG. 34A, cooling assembly 630 includes radiator 632, intercooler 634, and a transmission cooler 633. Illustratively, transmission cooler 633 is positioned above intercooler 634. Additionally, both intercooler 634 and transmission cooler 633 are positioned forward of radiator 632. Intercooler 634 and transmission cooler 633 may be supported by cooling assembly frame or shroud 636. As shown in FIG. 34B, cooling assembly frame 636 may also support at least one fan 635. Illustratively, cooling assembly frame 636 supports two fans 635 rearward of radiator 632. As such, fans 635 are integrally supported on cooling assembly 630. In one embodiment, fans are brushless fans with a high CFM capability.

Figure 35:
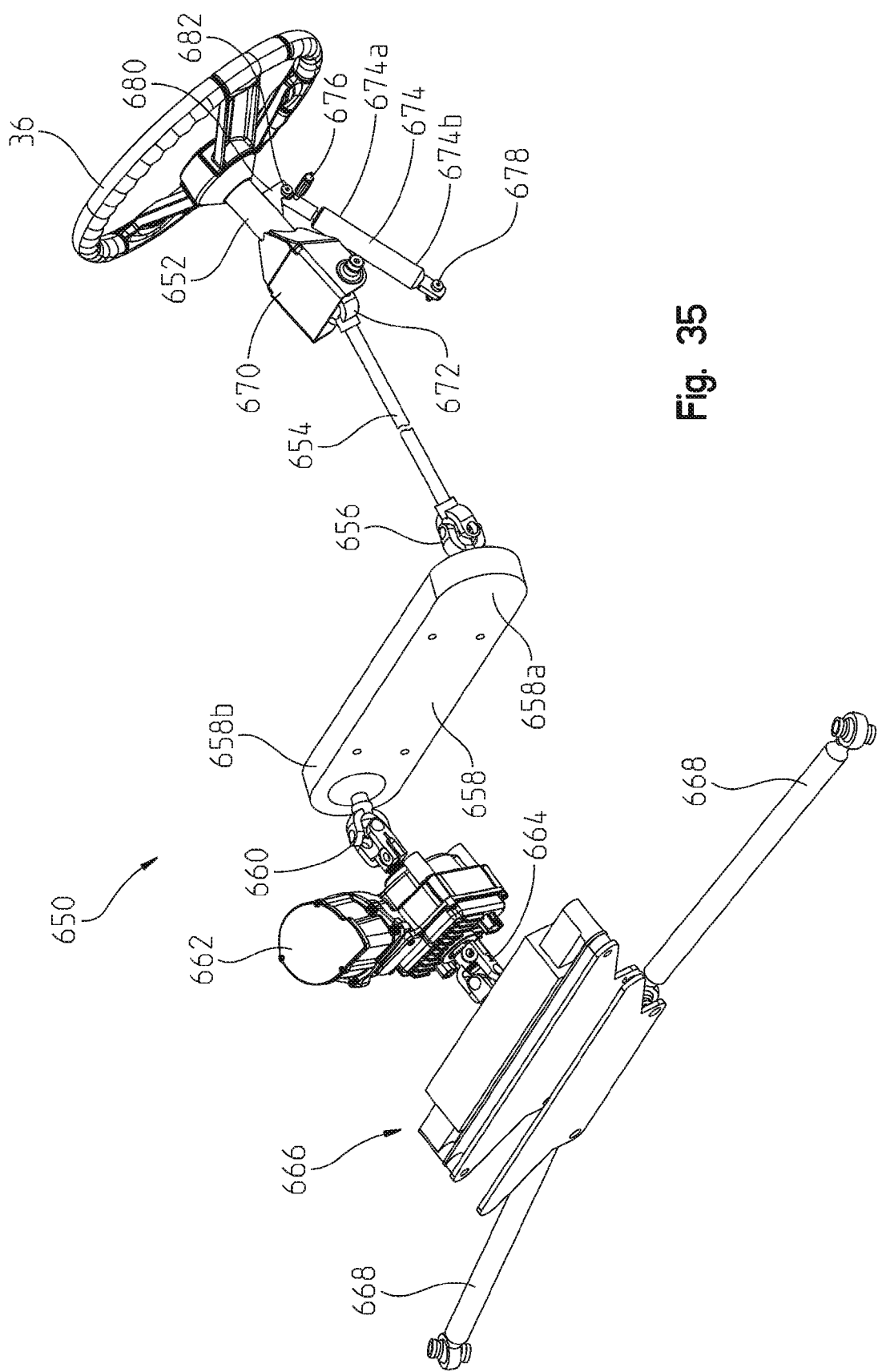

Referring now to FIGS. 35-38, steering assembly 650 extends between front section 52 and midsection 54 of frame 20. At least a portion of steering assembly 650 is positioned below cooling assembly 630, and at least a portion of steering assembly 650 is rearward of cooling assembly 630. Steering assembly 650 includes an operator control, illustratively a steering wheel 36, a steering column 652, a steering shaft 654, a steering transfer case 658 having an outer end 658a and an inner end 658b, a power assist unit, illustratively an electric power steering unit 662, a gearbox assembly 666, tie rods 668, and knuckles 290. Referring to FIG. 35, steering wheel 36 is operably coupled to steering column 652. Steering column 652 is rotatably coupled to steering shaft 654 via a joint 672, illustratively a U-joint. A torque sensor may be positioned within a housing 670 near a joint 672. Steering shaft 654 is coupled to steering transfer case 658 via a joint 656, illustratively a U-joint, in order to transfer the output of steering shaft 654 to power steering unit 662. Power steering unit 662 is operably coupled to transfer case 658 via a joint 660, and is operably coupled to gearbox assembly 666 via a joint 664. Joints 660 and 664 are illustratively U-joints. Gearbox assembly 666 is positioned forward of power steering unit 662 and is operably coupled to tie rods 668 in order to move front wheels 6.

Figure 37:
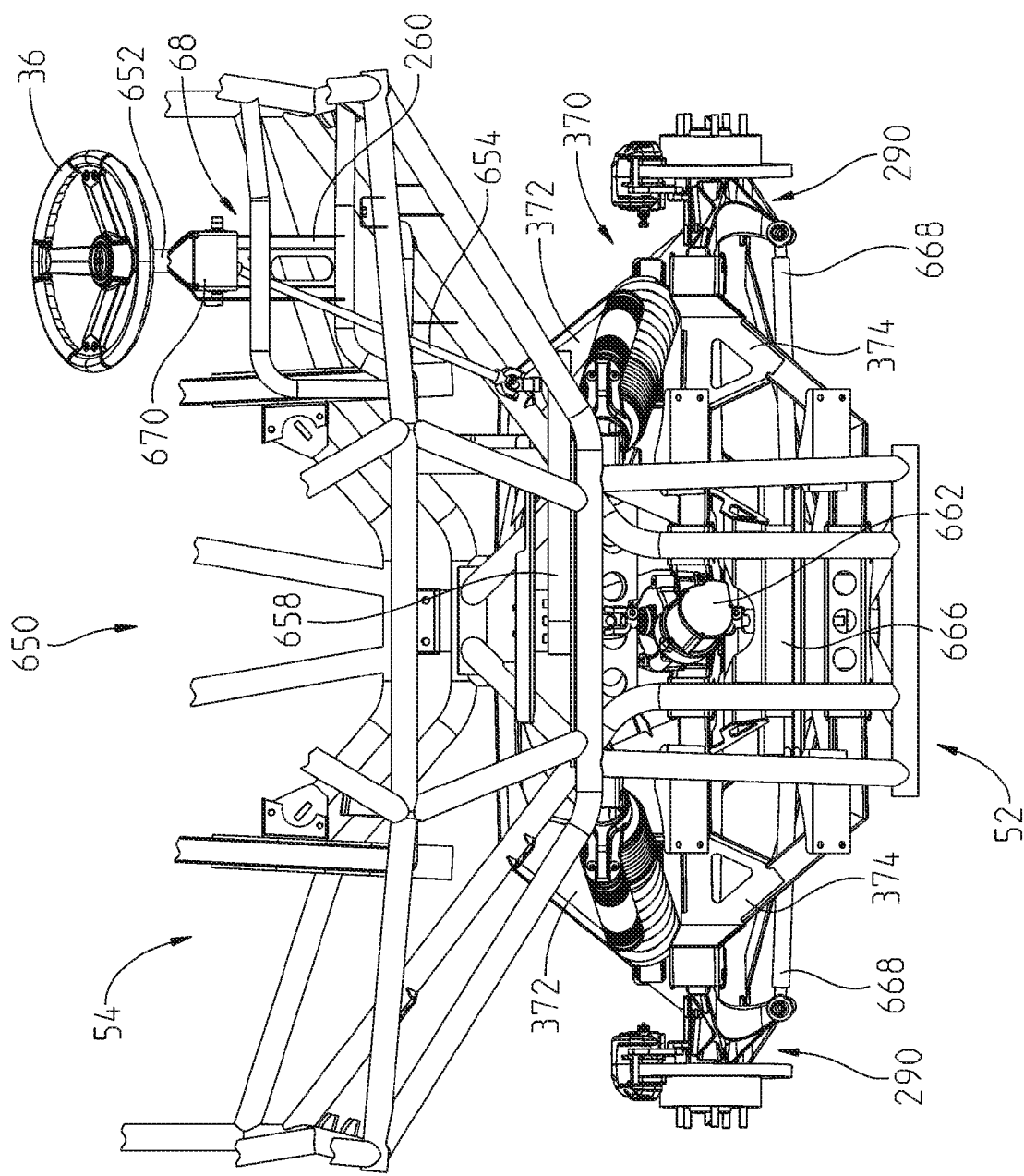
Figure 38:
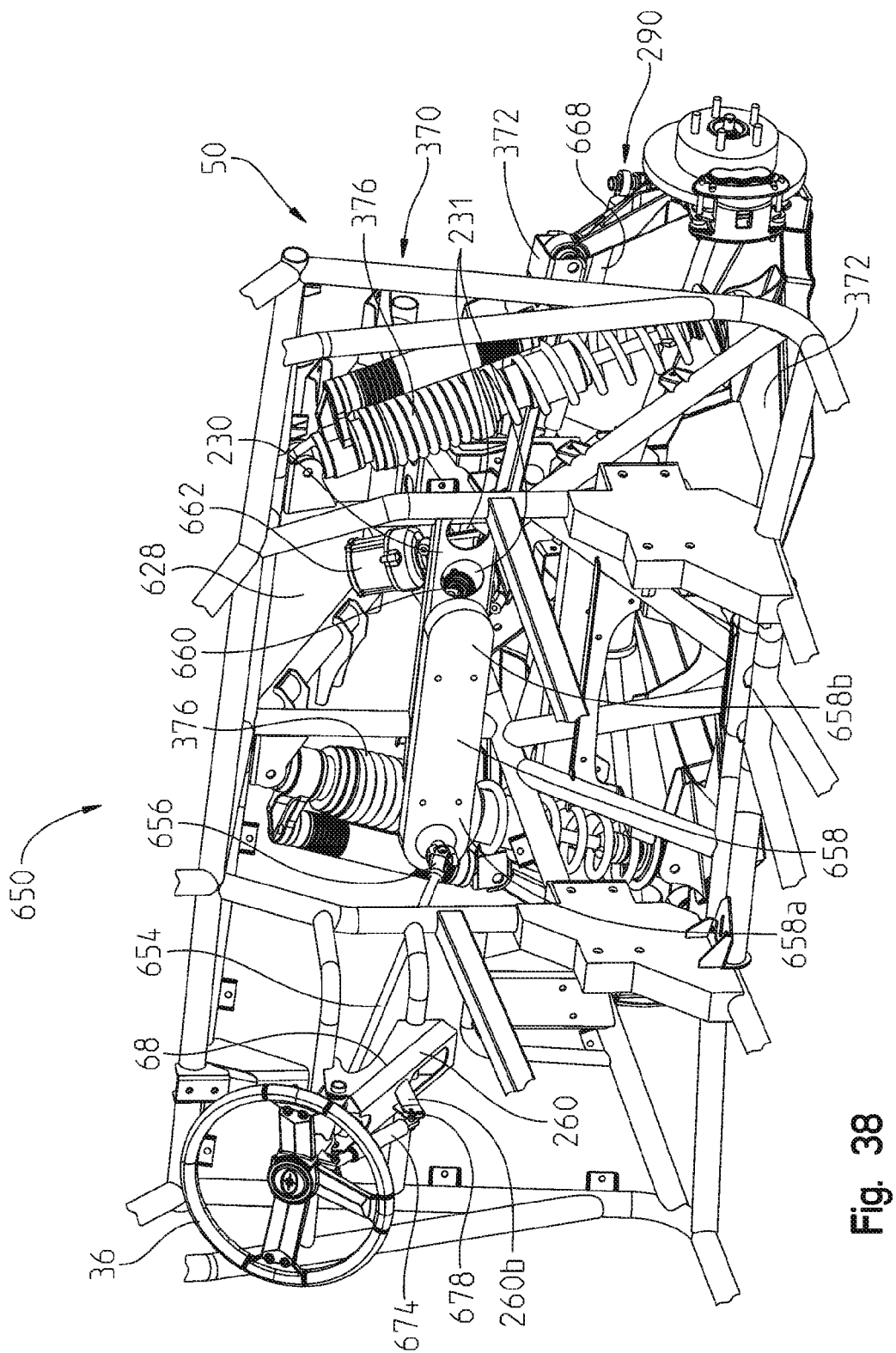
FIG. 38A is a rear perspective view of the cooling assembly of FIG. 34A and an alternative embodiment of the steering assembly of FIG. 35.
FIG. 38B is a top view of the alternative embodiment steering assembly of FIG. 38A.

Steering assembly 650 is supported by both front section 52 and midsection 54 of frame 20. Referring to FIGS. 37 and 38, steering column 652 extends along channel 260. Steering shaft 654 is angled inwardly and downwardly from steering column 652 toward steering transfer case 658. Steering shaft 654 and transfer case 658 are positioned rearward of front suspension 370 and are elevated relative to lower and upper control arms 372, 374 of front suspension.

As shown best in FIG. 38, steering transfer case 658 is coupled to bracket 230 of steering mount 64 at front section 52 of frame 20. Both bracket 230 and steering transfer case 658 may be positioned rearward of shock absorbers 376 of front suspension 370 (see FIG. 29). Joint 660 extends through one of apertures 231 on bracket 230 in order to couple with power steering unit 662, which is centrally positioned on front section 52. Inner end 658b of transfer case 658 is coupled to power steering unit 662 at approximately the vehicle centerline. However, outer end 658a extends laterally outward from the vehicle centerline because steering wheel 36, steering column 652, and steering shaft 654 are off-center from the vehicle centerline, i.e., laterally spaced apart from the centerline. As such, transfer case 658 operably couples steering shaft 654 to power steering unit 662 by routing the output of steering shaft 654 inwardly toward longitudinal axis L in order to align with the input of power steering unit 662. In particular, steering transfer case 658 may be a chaincase, a combination of gears, or any other type of device to transmit the output from steering shaft 654 to power steering unit 662.

As shown in FIGS. 29 and 36-38, power steering unit 662 is positioned within envelope 628 defined by front section 52 and front suspension 370. A lower portion of power steering unit 662 is generally positioned between upper control arms 374 of front suspension 370. An upper portion of power steering unit 662 extends upwardly such that the upper portion of power steering unit 662 is elevated relative to lower and upper control arms 372, 374. Additionally, as shown in FIG. 29, power steering unit 662 may be positioned forward of shock absorbers 376. While power steering unit 662 is illustratively shown as an electric power steering unit but also may be a hydraulic power steering unit or other device that assists steering assembly 650.

Gearbox assembly 666 is positioned within envelope 628 and is forward of power steering unit 662 and shock absorbers 376. In particular, gearbox assembly 666 is generally positioned between upper control arms 374, thereby leaving an open area between lower control arms 372 and below gearbox assembly 666 for front final drive 606. Gearbox assembly 666 also is positioned along the vehicle centerline such that the output of power steering unit 662 is directly aligned with the input of gearbox assembly 666. Gearbox assembly 666 may be a rack and pinion assembly or may be other assemblies for controlling the movement of tie rods 668 and front wheels 6.

Figure 36:
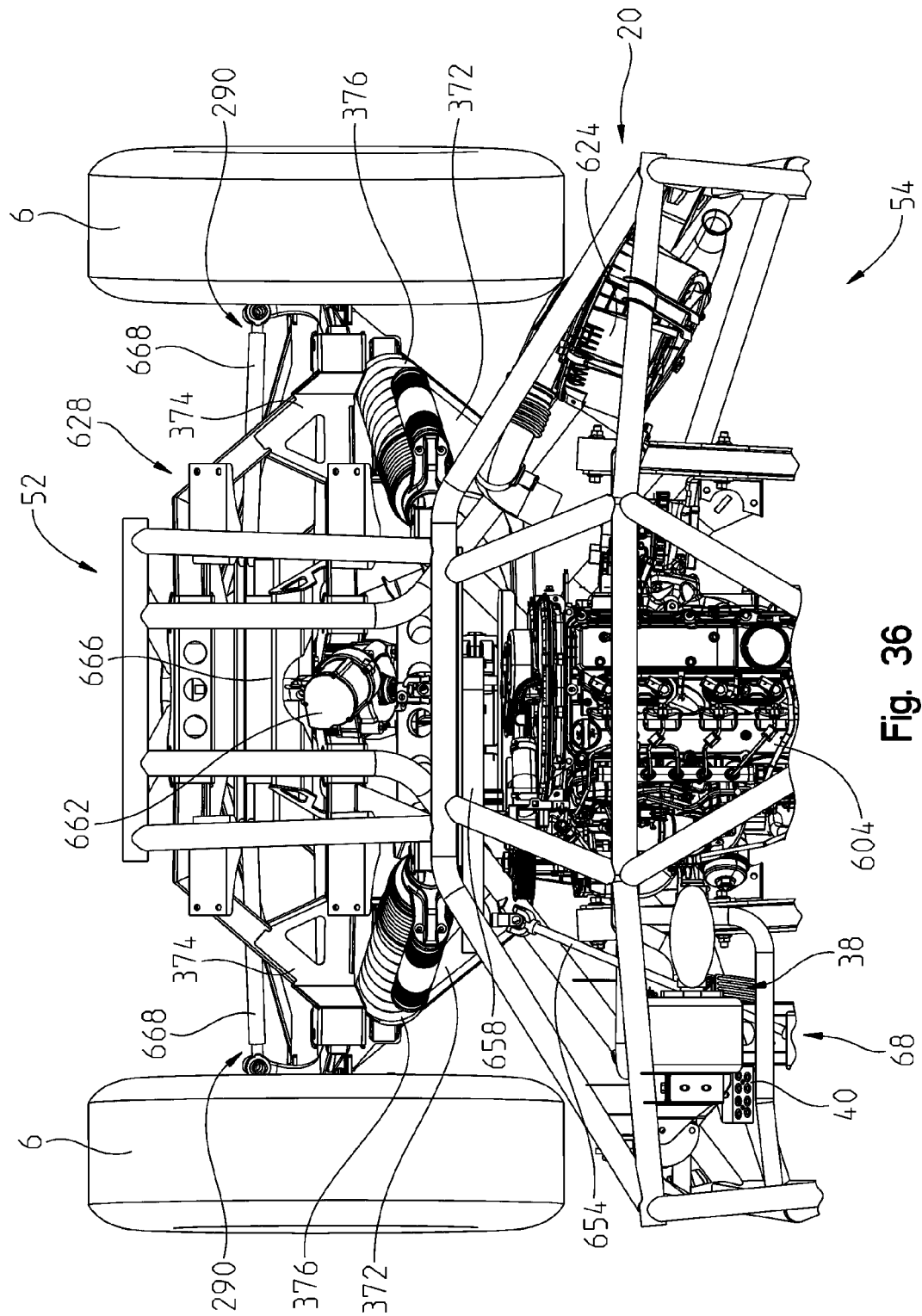

Tie rods 668 extend between gearbox assembly 666 and knuckles 290 at hubs 380 in order to control the movement of front wheels 6. Because tie rods 668 are positioned near the centerline of vehicle 2, the length of tie rods 668 may be increased to approximately 21 inches. As shown in FIGS. 36-38, tie rods 668 are positioned between lower and upper control arms 372, 374 of front suspension 370.

As shown in FIGS. 35 and 38, a tilt adjuster 674 is coupled to steering wheel 36 in order to adjust the position of steering wheel 36. Tilt adjuster 674 includes an inner rod 674a that telescopes within an outer portion 674b. An operator may activate a lever 676 to move inner rod 674a relative to outer portion 674b. Tilt adjuster 674 is coupled to steering wheel 36 via a bracket 680 attached to steering column 652. Fasteners, such as bolts 682, secure inner rod 674a of tilt adjuster 674 to bracket 680. Additionally, fasteners, such as bolts 678, couple outer portion 674b of tilt adjuster 674 to mounting leg 260b of controls mount 68.

The position of steering assembly 650 may increase suspension travel of front suspension 370. For example, by bringing the output from steering shaft 654 to the centerline of vehicle 2, i.e., aligning the output with longitudinal axis L, steering transfer case 658 may increase suspension travel. Additionally, by positioning at least gearbox assembly 666, power steering unit 662, and a portion of transfer case 658 along the centerline of the vehicle, the travel of front suspension 370 may be increased. Also, the length of tie rods 668 may be increased which may contribute increased suspension travel.

Steering assembly 650 also cooperates with front suspension 370 in order to minimize the turning radius of vehicle 2 by maximizing the steering angle. Lower control arms 372 and/or upper control arms 374 of front suspension 370 may include a "stop" to prevent front wheels 6 from overturning in a particular direction and damaging front wheels 6, front suspension 370, and/or steering assembly 650. The "stops" are positioned to prevent wheels 6 from contacting other components of vehicle 2 when steering assembly 650 is at full lock and front suspension 370 is at full jounce or rebound.

An alternative embodiment of steering assembly 650 may be a "drive-by-wire" arrangement, which may eliminate steering components such as steering column 652 and steering shaft 654 from steering assembly 650. Drive-by-wire steering assemblies operate through an electronic control system, thereby eliminating at least a portion of the mechanical components and connections between steering wheel 36 and front wheels 6. Additionally, drive-by-wire steering embodiments may allow vehicle 2 to be operated and controlled remotely. An exemplary drive-by-wire arrangement is electronic throttle control.

Figure 38A:
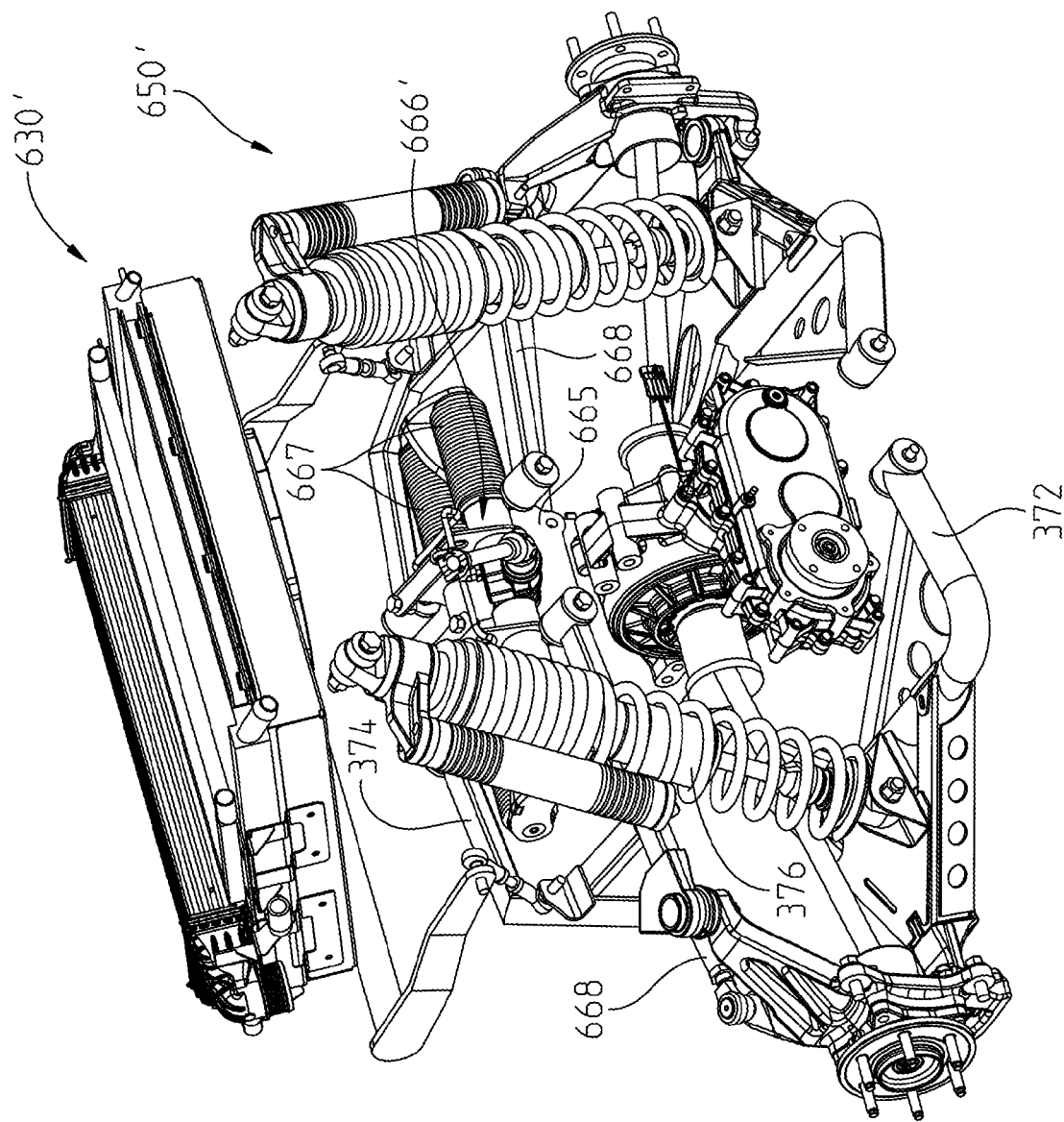

A further alternative embodiment of steering assembly 650 is shown in FIGS. 38A and 38B as steering assembly 650'. Steering assembly 650' includes a hydraulically-assisted steering rack assembly 666'. Steering rack assembly 666' is operably coupled to steering shaft 654 (FIG. 35) and operably coupled to tie rods 668 in order to steer front wheels 6. As shown in FIG. 38B, steering rack assembly 666' includes a hydraulic-assist cylinder 667a, a steering rack member 667b, and hydraulic fluid lines 669. Illustratively, steering rack member 667b is rearward of hydraulic-assist cylinder 667a. Steering rack assembly 666' is positioned between upper control arms 374 and is vertically intermediate cooling assembly 630' and front final drive 606. Hydraulic-assist cylinder 667a and steering rack member 667b are illustratively supported on a bracket 665. In operation, hydraulic pressure is supplied by a pump, which may be driven by engine 604 (FIG. 29), to fluid lines 669 in order to assist steering rack member 667b with turning front wheels 6. By replacing steering rack 666 and other components of steering assembly 650 with hydraulically-assisted steering rack assembly 666', vehicle 1200 may have a smaller turning radius. Additionally, hydraulically-assisted steering rack assembly 666' may produce less wear on steering rack member 667b. Furthermore, the cooperation between electric power steering unit 662 and hydraulically-assisted steering rack assembly 666' provides the steering geometry necessary for long steering and suspension travel and the packaging necessary to create space for front final drive 606.

Figure 2:
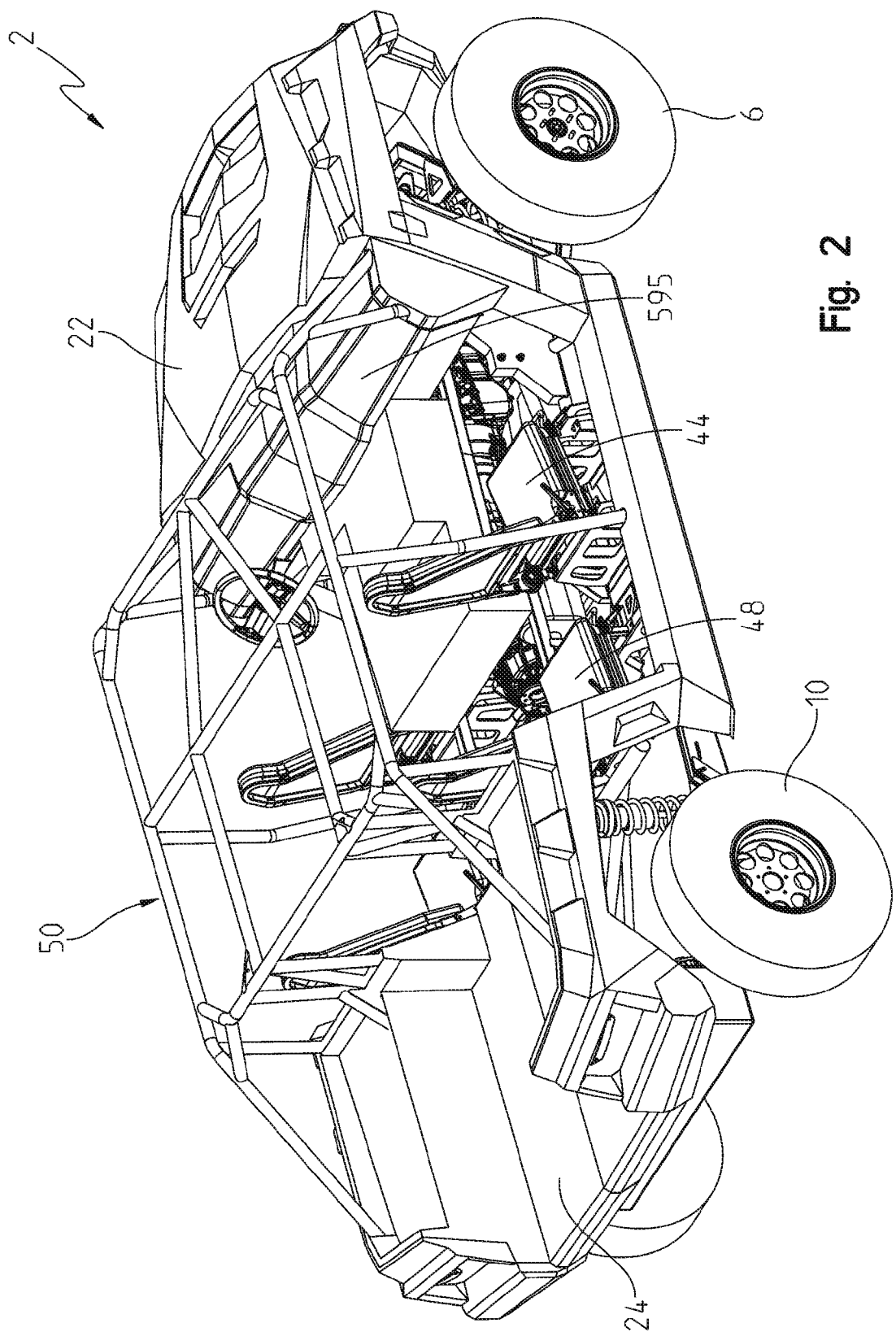
Figure 39:
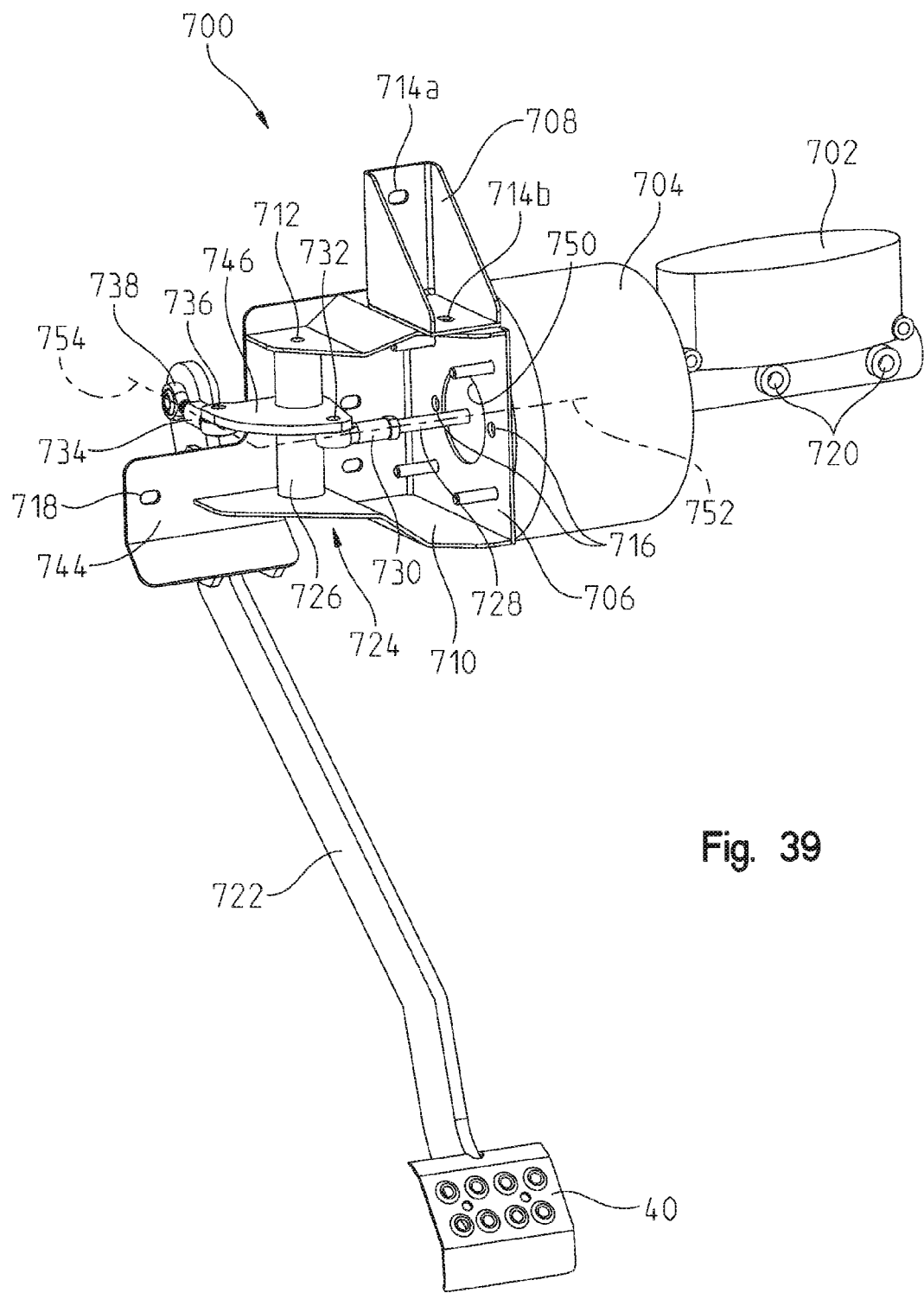
FIG. 39 is a rear perspective view of a brake assembly.
Figure 40:
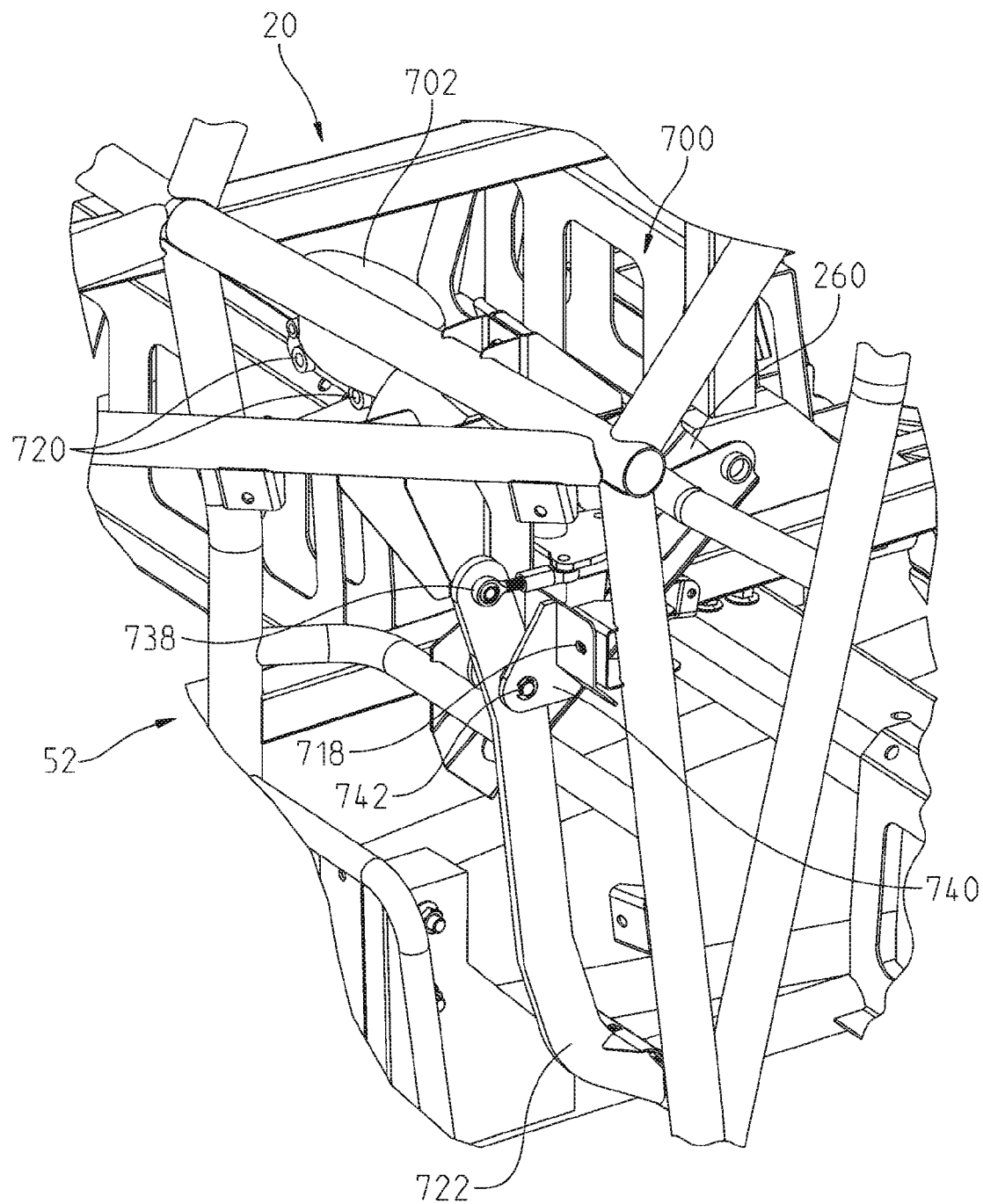
FIG. 40 is a front perspective view of the brake assembly of FIG. 39.
Figure 41:
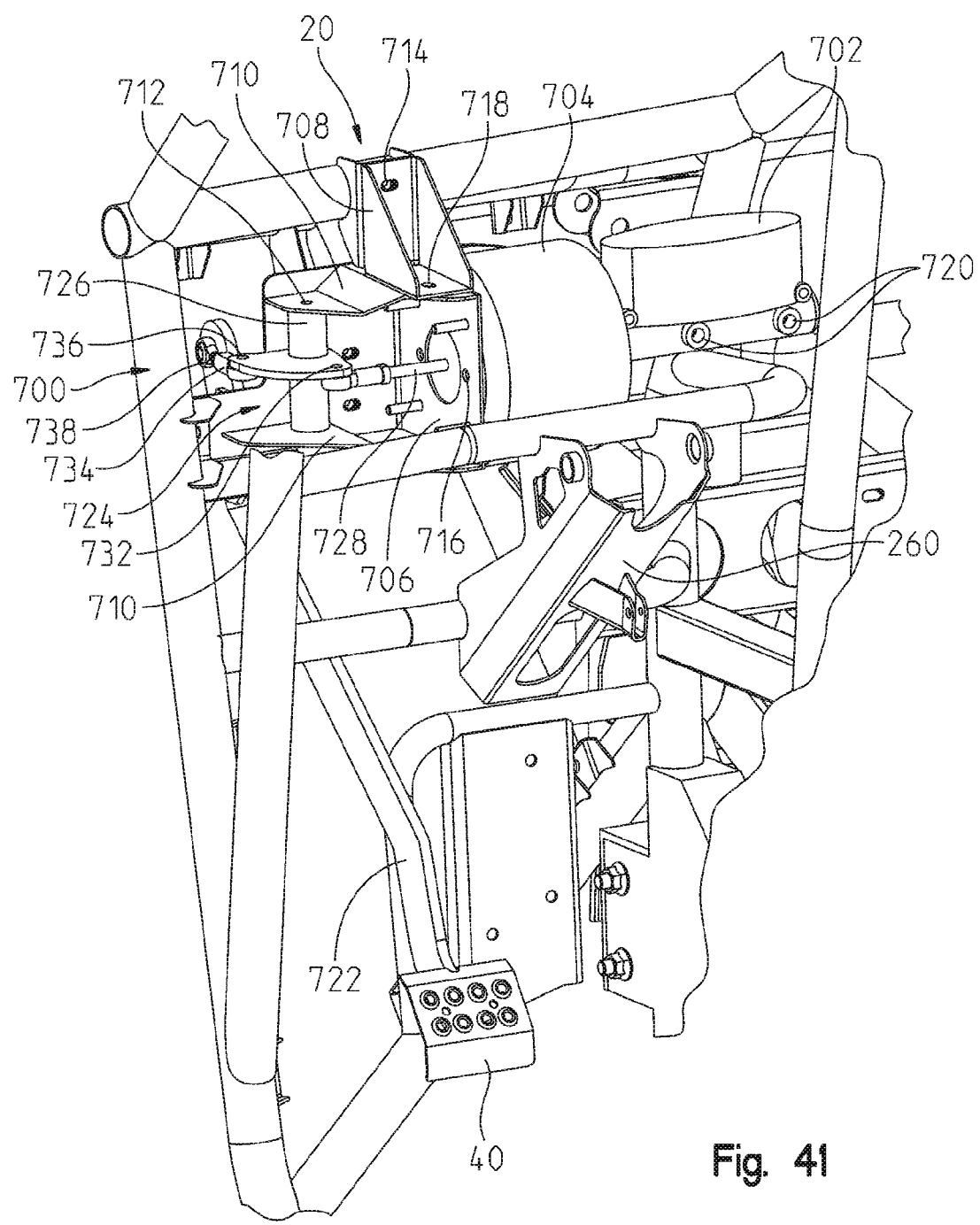
FIG. 41 is a rear perspective view of the brake assembly of FIG. 39 coupled to the front end of the frame.

Referring to FIGS. 39-41, brake assembly 700 is disclosed. Brake assembly 700 includes a master cylinder 702, a brake booster 704, a linkage assembly 724, a lever arm 722, and brake pedal 40. Brake assembly 700 is positioned above channel 260 for steering assembly 650 and is coupled to frame 20, as shown in FIG. 41. Additionally, brake assembly 700 is housed within a dashboard 595 of operator area 30 (FIGS. 1-3). A portion of brake assembly 700, such as lever arm 722 and pedal 40, extend below dashboard 595 and into operator cab 30 to provide access thereto for the operator. By housing brake assembly 700 within and under dashboard 595, front section 52 of frame 20 has additional space for other components of vehicle 2, such as front wheels 6, front suspension 370, and steering assembly 650.

As is apparent from FIGS. 39-41, master cylinder 702 extends laterally from brake booster 704. In particular, master cylinder 702 extends inwardly toward the centerline of vehicle 2. As such, master cylinder 702 does not extend in a forward direction from brake booster 704, but rather, is turned 90 degrees in order to extend laterally. Illustratively, master cylinder 702 is generally perpendicular to the centerline of vehicle 2. By positioning master cylinder 702 to the side of brake booster 704, rather than forward of booster 704, front section 52 of frame 20 has additional space for supporting additional components of vehicle 2. Master cylinder 702 is coupled to ports 720 with hoses (not shown) to allow fluid, for example hydraulic fluid, to flow to and from master cylinder 702 during operation of brake assembly 700.

Brake booster 704 is positioned intermediate master cylinder 702 and linkage assembly 724 and is operably coupled to both master cylinder 702 and linkage assembly 724. As shown in FIG. 39, brake booster is coupled to bracket 706 with conventional fasteners (not shown) that extend through apertures 716. Brake booster 704 includes an input shaft 728, which extends through an opening 750 of bracket 706, and is operably coupled to linkage assembly 724. A braking force is transmitted from the operator to brake booster 704 via linkage assembly 724 and input shaft 728. To facilitate deceleration and stopping of vehicle 2, brake booster 704 receives an input braking force from input shaft 728 and increases the braking force transmitted from master cylinder 702 to the brake calipers at wheels 6, 10.

Bracket 706 is coupled to frame 20 via extensions 708, 710, 744. As shown in FIGS. 39-41, extension 708 includes an aperture 714a, which receives a conventional fastener, for example a bolt, for coupling bracket 706 to frame 20. Similarly, extension 710 may include an aperture (not shown) for a conventional fastener in order to further secure bracket 706 to frame 20. Extension 744 includes an aperture 718 which secures bracket 706 to frame 20. Extensions 708, 710, 744 may be separate from bracket 706 and coupled thereto with fasteners, which are received through apertures, for example an aperture 714b on extension 708. Alternatively, extensions 708, 710, 744 may be integrally formed with bracket 706.

Bracket 706 also houses linkage assembly 724, which includes a first link 730, a second link 734, a pivot plate 746, and a support member 726. Support member 726 may be coupled to extensions 708, 710 with conventional fasteners (not shown). For example, as shown in FIG. 39, a conventional fastener may be received through aperture 712 on extension 708 in order to couple bracket 706 to support member 726.

Pivot plate 746 is pivotably coupled to support member 726. Pivot plate 746 also includes an aperture 732 for coupling with first link 730, and an aperture 736 for coupling with second link 734. In particular, first link 730 is positioned below pivot plate 746 and is coupled to input shaft 728 of brake booster 704. Additionally, second link 734 is positioned below pivot plate 746 and is coupled to lever arm 722 through fastener 738. As such, pivot plate 746 moves relative to support member 726 in response to pivotal motion from first link 730 and second link 734. As is detailed further herein and shown best in FIG. 39, first link 730 moves along a line 752 in a generally lateral motion and second link 734 moves along a line 754 in a generally fore and aft motion. Therefore, pivot plate 746 facilitates motion in at least two perpendicular directions.

Second link 734 is coupled to lever arm 722 through fastener 738. Lever arm 722 extends below bracket 706 and under dashboard 595 (FIGS. 1-3) and is coupled to brake pedal 40. Lever arm 722 has as curved or bent shape which allows lever arm 722 to extend below bracket 706 and dashboard 595.

In operation, when the operator depresses pedal 40, movement in lever arm 722 is transmitted to second link 734. Second link moves along line 754, which causes pivot plate 746 to rotate relative to support member 726. The rotational movement of pivot plate 746 causes first link 730 to move along line 752, which is generally perpendicular to line 754. The movement of first link 730 moves input shaft 728 relative to brake booster 704. Input shaft 728 engages brake booster 704 in order increase the braking force from master cylinder 702. Through ports 720, master cylinder 702 transmits a braking force to the brake calipers to slow the rolling movement of front wheels 6 and rear wheels 10.

Similar to steering assembly 650, an alternative embodiment of brake assembly 700 also may be operated electronically by wires, thereby eliminating various mechanical components and connections. A brake-by-wire arrangement also may allow vehicle 2 to be operated and controlled remotely.

Referring to FIGS. 42-74, an illustrative alternative embodiment of vehicle 2 is shown as vehicle 1200. Vehicle 1200 includes features similar to those of vehicle 2 of FIGS. 1-41, with like reference numerals indicating like elements having like functionality and structure, except as described below. Vehicle 1200 is illustratively shown as a utility vehicle and includes ground-engaging members 4, illustratively front wheels 6 and rear wheels 10. It should be understood that vehicle 1200 could include any of the components described and depicted in U.S. Pat. No. 7,795,602; U.S. Pat. No. 8,029,021; U.S. Pat. No. 7,717,495; and U.S. Pat. No. 8,205,910, the complete disclosures of which are expressly incorporated by reference herein.

In one embodiment, one or more of wheels 6, 10 may be replaced with tracks, such as the Prospector II Tracks available from Polaris Industries, Inc. located at 2100 Highway 55 in Medina, Minn. 55340. As shown, wheels 6, 10 include pneumatic tires mounted on standard steel rims. Illustrative wheels 6, 10 may be configured to include 35-inch pneumatic tires. Alternatively, tires could be non-pneumatic tires, as shown in U.S. Pat. No. 8,176,957 and U.S. Pat. No. 8,104,524; and/or in U.S. Provisional Patent Application Ser. No. 61/611,300, the complete disclosures of which are expressly incorporated by reference herein.

Figure 42:
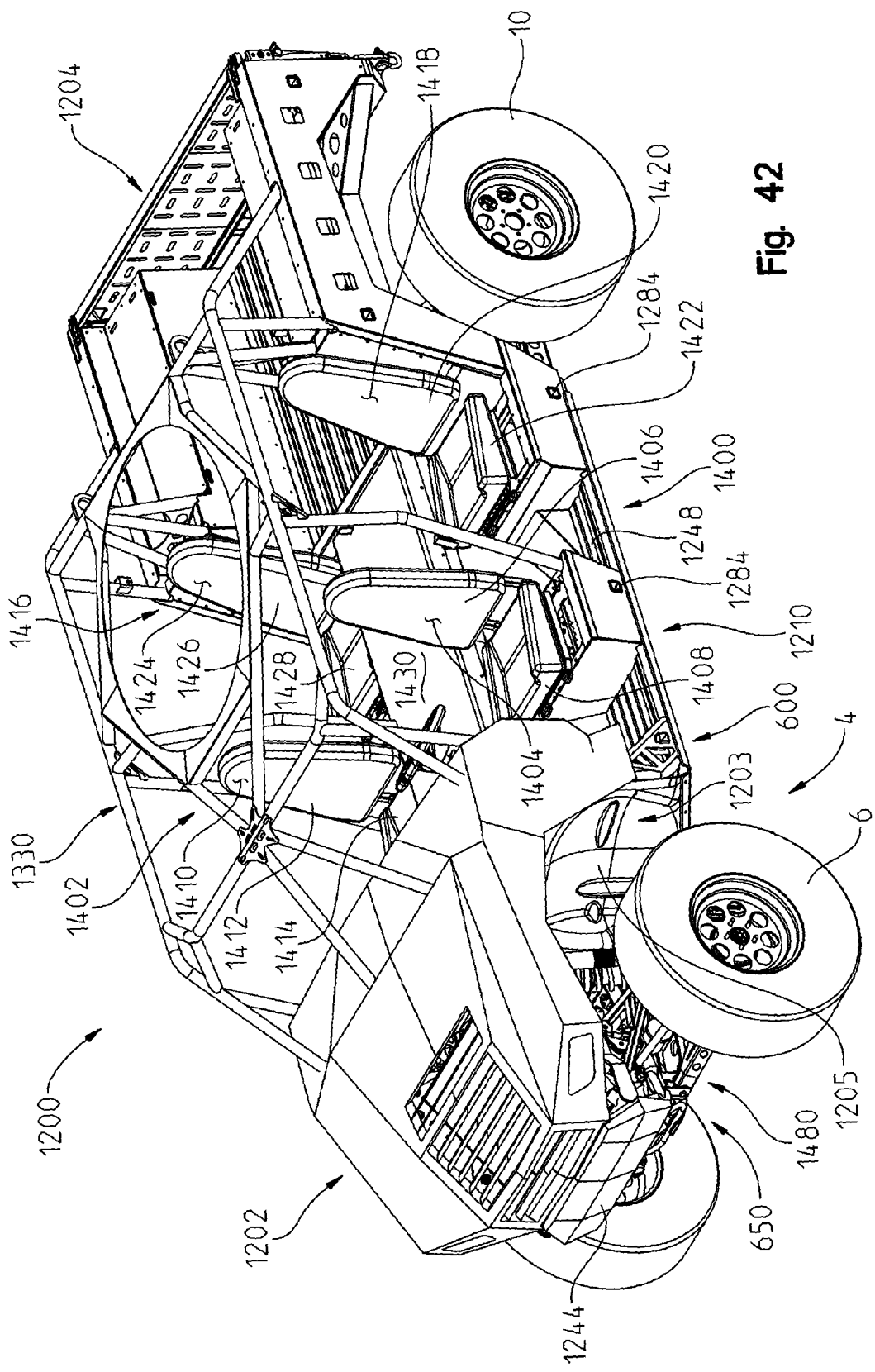
FIG. 42 is a left front perspective view of an alternative embodiment of the vehicle of FIGS. 1-41.

Vehicle 1200 includes a frame assembly 1210 (FIG. 50) supported by ground-engaging members 4. Frame assembly 1210 supports a plurality of vehicle body panels 1202 and a rear cargo area 1204. In one embodiment, body panels 1202 may be coupled with reinforced panels, for example armor, in order to further strengthen and protect vehicle 1200. For example, front wheel wells 1203 may be configured to support armor plates 1205, as shown in FIG. 42.

Vehicle 1200 defines an operator area 1400 which includes a front seating portion 1402 and a rear seating portion 1416. Front seating portion 1402 includes an operator seat 1404, having a seat back 1406 and a seat bottom 1408, and a front passenger seat 1410, having a seat back 1412 and a seat bottom 1414. Similarly, rear seating portion 1416 includes at least a first rear passenger seat 1418, having a seat back 1420 and a seat bottom 1422, and a second rear passenger seat 1424, having a seat back 1426 and a seat bottom 1428. Operator area 1400 may be configured to support additional passengers.

Figure 59:
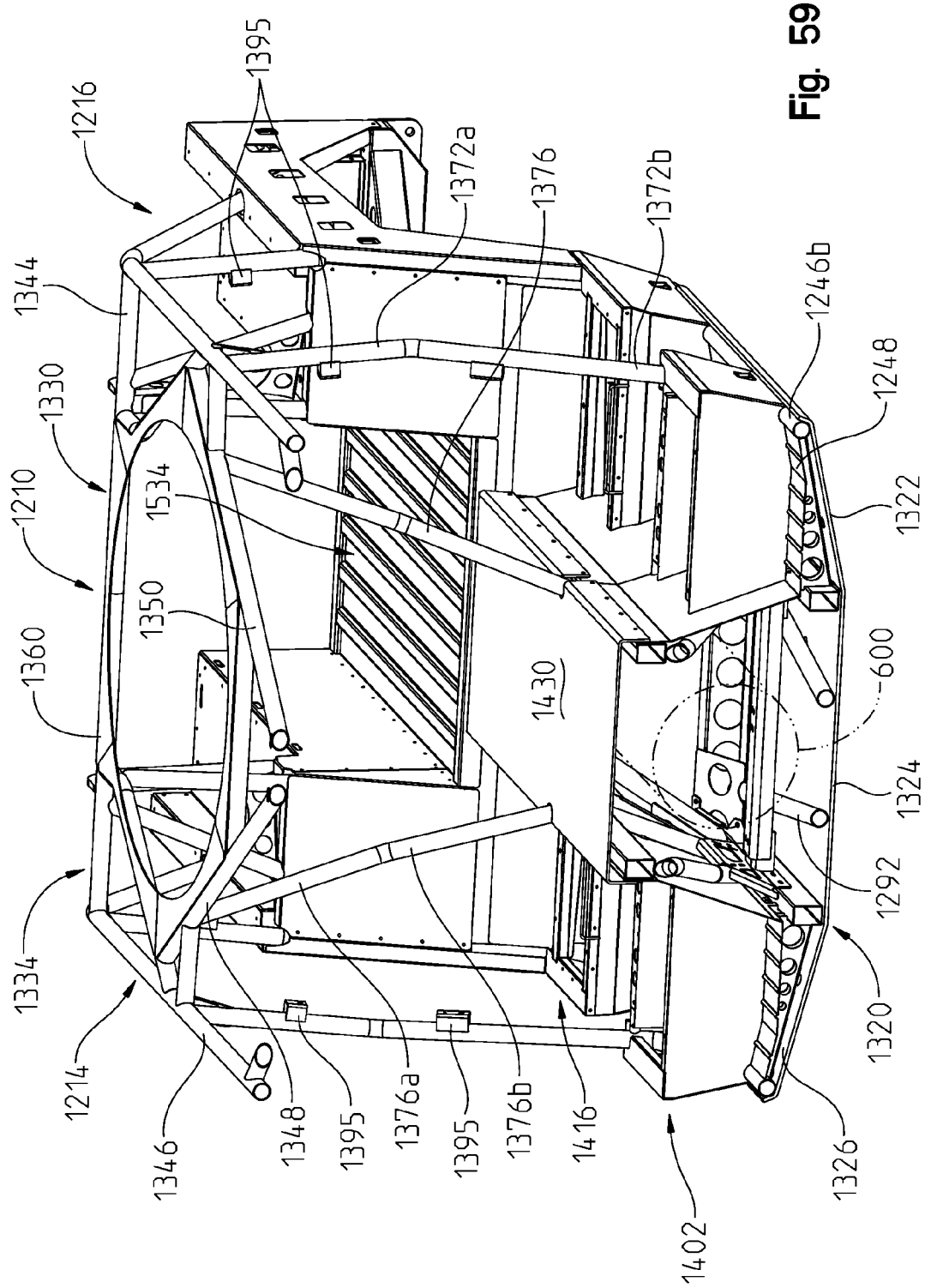
FIG. 59 is a cross-sectional view of the frame assembly and roll cage assembly of FIG. 50, showing a tunnel member generally surrounding a portion of the drivetrain assembly of FIG. 30.

Seats 1404, 1410, 1418, 1424 may be comprised of a mesh or other similar material in order to prevent moisture from remaining within seats 1404, 1410, 1418, 1424 if seats 1404, 1410, 1418, 1424 get wet. Additionally, the seat material may keep seats 1404, 1410, 1418, 1424 cooler in hot weather. Seats 1404, 1410, 1418, 1424 also may include seat belt assemblies (not shown), which may be mounted to brackets 1395 of a roll cage assembly 1330, as shown in FIG. 59.

Roll cage assembly 1330 is coupled to frame assembly 1210 and generally surrounds operator area 1400. Operator area 1400 further includes a plurality of operator controls 1434 by which an operator may control the movement and systems of vehicle 1200. For example, operator controls 1434 are operably coupled to drivetrain assembly 600. Operator controls 1434 and/or drivetrain assembly 600 may be operably coupled to additional systems and components of vehicle 1200, such as a front suspension assembly 1480, a rear suspension assembly 1500, and steering assembly 650 (FIGS. 35-38).

With reference now to FIGS. 50-56, frame assembly 1210 will be described in greater detail. Frame assembly 1210 includes a front frame portion 1212, an intermediate frame portion 1214, and a rear frame portion 1216. In addition to structurally supporting, rigidifying, and defining vehicle 1200, each of front frame portion 1212, intermediate frame portion 1214, and rear frame portion 1216 is configured to support accessories and various components of vehicle 1200.

As shown in FIGS. 50-55, front frame portion 1212 is defined by a plurality of frame members, which may be comprised of any structurally supportive material, for example polymeric materials, metallic materials, such as steel, aluminum, and/or any other material configured to support vehicle 1200 and its various components and systems positioned at front frame portion 1212. For example, front frame portion 1212 may be at least partially comprised of a high-strength steel material, such as chromoly. Additionally, the frame members defining front frame portion 1212 may be coupled together with fasteners, such as welds, rivets, bolts, adhesive, or any other type of fastener.

Front frame portion 1212 includes upper front members 1220 and a cross member 1222 extending therebetween. Illustratively, upper front members 1220 and/or cross member 1222 may be comprised of a high-strength steel material (e.g., chromoly). Upper front members 1220 also are coupled to lower front members 1224. Lower front members 1224 are coupled to a mounting plate 1225, which supports a portion of drivetrain assembly 600, a portion of steering assembly 650, and/or a portion of front suspension assembly 1480 (FIG. 42). Mounting plate 1225 extends rearwardly to couple with a removable portion 1218 of frame assembly 1210. Removable portion 1218 provides lower access to frame assembly 1210 for assembling, disassembling, and servicing drivetrain assembly 600, as detailed further below.

Positioned above removable portion 1218 and mounting plate 1225 are front upper longitudinal frame members 1226. Front upper longitudinal frame members 1226 are coupled to cross member 1222 and extend rearwardly to couple with intermediate frame portion 1214. More particularly, front upper longitudinal frame members 1226 have parallel arms 1226a coupled to cross member 1222 and rear ends 1226b coupled to intermediate frame portion 1214. Front upper longitudinal frame members 1226 bend outwardly between parallel arms 1226a and rear ends 1226b such that the distance between rear ends 1226b is greater than the distance between parallel arms 1226a. Upstanding members 1234 may be used to couple front upper longitudinal frame members 1226 to upper front members 1220.

A pair of front lower longitudinal frame members 1238 are supported below front upper longitudinal frame members 1226. The forward ends of front lower longitudinal frame members 1238 are coupled to lower front members 1224 and the rearward ends of front lower longitudinal frame members 1238 are coupled to rear ends 1226b of front upper longitudinal frame members 1226.

Figure 50:
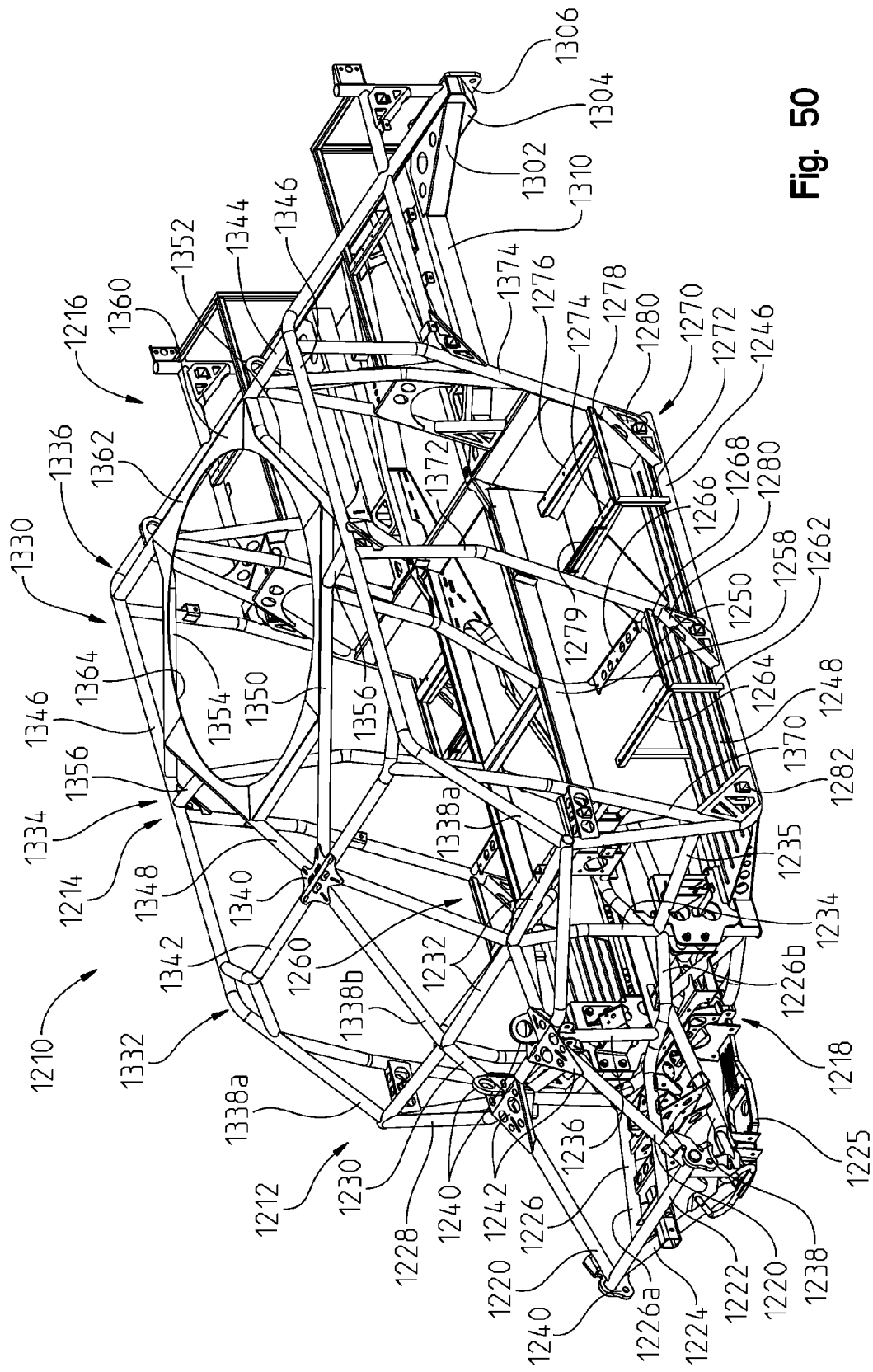
FIG. 50 is a left front perspective view of a frame assembly and a roll cage assembly of the vehicle of FIG. 42.

Front frame portion 1212 further includes frame members 1228 and frame members 1230. As shown in FIG. 50, frame members 1228 and 1230 are generally coupled to upper front members 1220 and extend rearwardly to couple with intermediate frame portion 1214. Upstanding members 1234 may be used to couple rear ends 1226b of front upper longitudinal frame members 1226 to frame members 1230. Additionally, front frame portion 1212 includes cross members 1235, which are coupled to upstanding members 1234 and front upper longitudinal frame members 1226. Cross members 1235 also are coupled to intermediate frame portion 1214, as detailed further herein.

Front frame portion 1212 further includes at least one accessory mount 1240. Illustratively, front frame portion 1212 includes at least four accessory mounts 1240, which are coupled to upper front members 1220. Additionally, some accessory mounts 1240 may also be coupled to frame members 1228 and/or lower front members 1224. Additionally, accessory mounts 1240 may be integrally formed with brackets 1242 on upper front members 1220. In this way, accessory mounts 1240 may be integrally coupled to and/or formed with front frame portion 1212, such that accessory mounts 1240 increase the strength, rigidity, and stability of front frame portion 1212.

Illustratively, accessory mounts 1240 are tie-downs configured to support vehicle 1200 during an air lift, an air drop, when secured during transportation, for example on an air craft carrier, or in other similar situations. Additionally, accessory mounts 1240 may be configured for other applications, such as supporting cargo, vehicle systems, and/or vehicle components. For example, accessory mounts 1240 at front frame portion 1212 may be configured to support a front bumper 1244 (FIG. 42) such that the mounting for front bumper 1244 is integrally coupled to front frame portion 1212. In this way, the integration of accessory mounts 1240 with front frame portion 1212 allows loads and forces applied to vehicle 1200 to be transmitted directly to frame assembly 1210 through accessory mounts 1240. As shown in FIG. 42, body panels 1202 may cover at least a portion of accessory mounts 1240, however, accessory mounts 1240 are accessible through body panels 1202 without the need to remove body panels 1202 from vehicle 1200.

Referring to FIGS. 50-54, intermediate frame portion 1214 is positioned rearward of front frame portion 1212 and is coupled thereto with frame members 1228, front upper longitudinal frame members 1226, upstanding members 1234, cross members 1235, and removable portion 1218. More particularly, at least one cross member 1232 of intermediate frame portion 1214 is coupled to frame members 1228, 1230 and upstanding members 1234 of front frame portion 1212. Cross members 1232 of intermediate frame portion 1214 also are coupled to roll cage assembly 1330, as detailed herein.

Cross members 1232 also are coupled to longitudinal frame members 1246 of intermediate frame portion 1214. As shown in FIGS. 50-54, longitudinal frame members 1246 include an upstanding portion 1246a coupled to cross members 1232 and a longitudinally-extending portion 1246b. Longitudinally-extending portion 1246b of longitudinal frame members 1246 generally defines an outer lower boundary of frame assembly 1210 and are positioned laterally outward of floor boards 1248. Illustratively, vehicle 1200 may include one floor board 1248 on each side of vehicle 1200. Alternatively, floor boards 1248 may be divided into multiple portions and coupled to frame assembly 1210 with conventional fasteners, such as welds, rivets, bolts, and/or adhesive.

Figure 51:
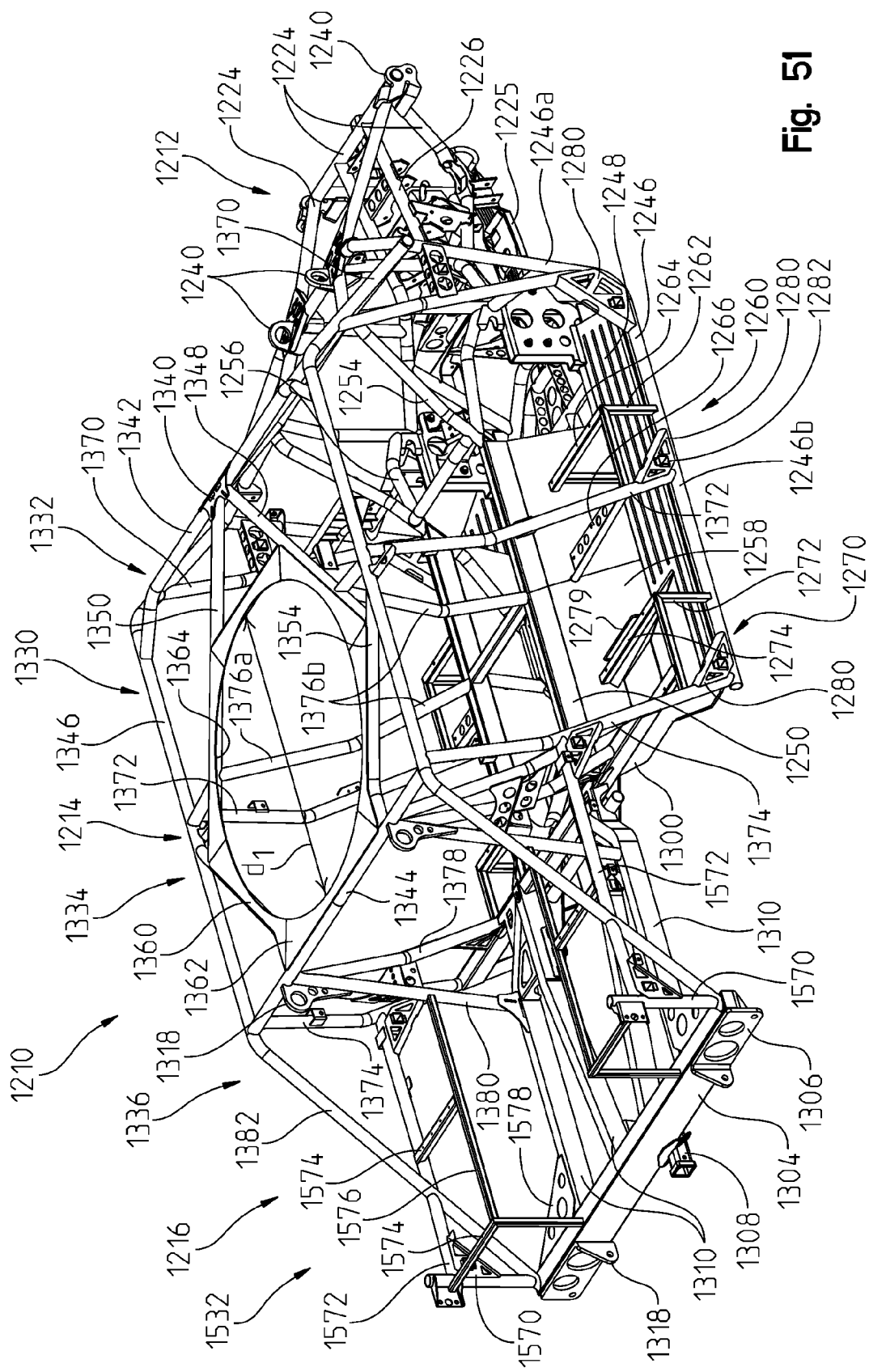
FIG. 51 is a right rear perspective view of the frame assembly and roll cage assembly of FIG. 50.
Figure 52:
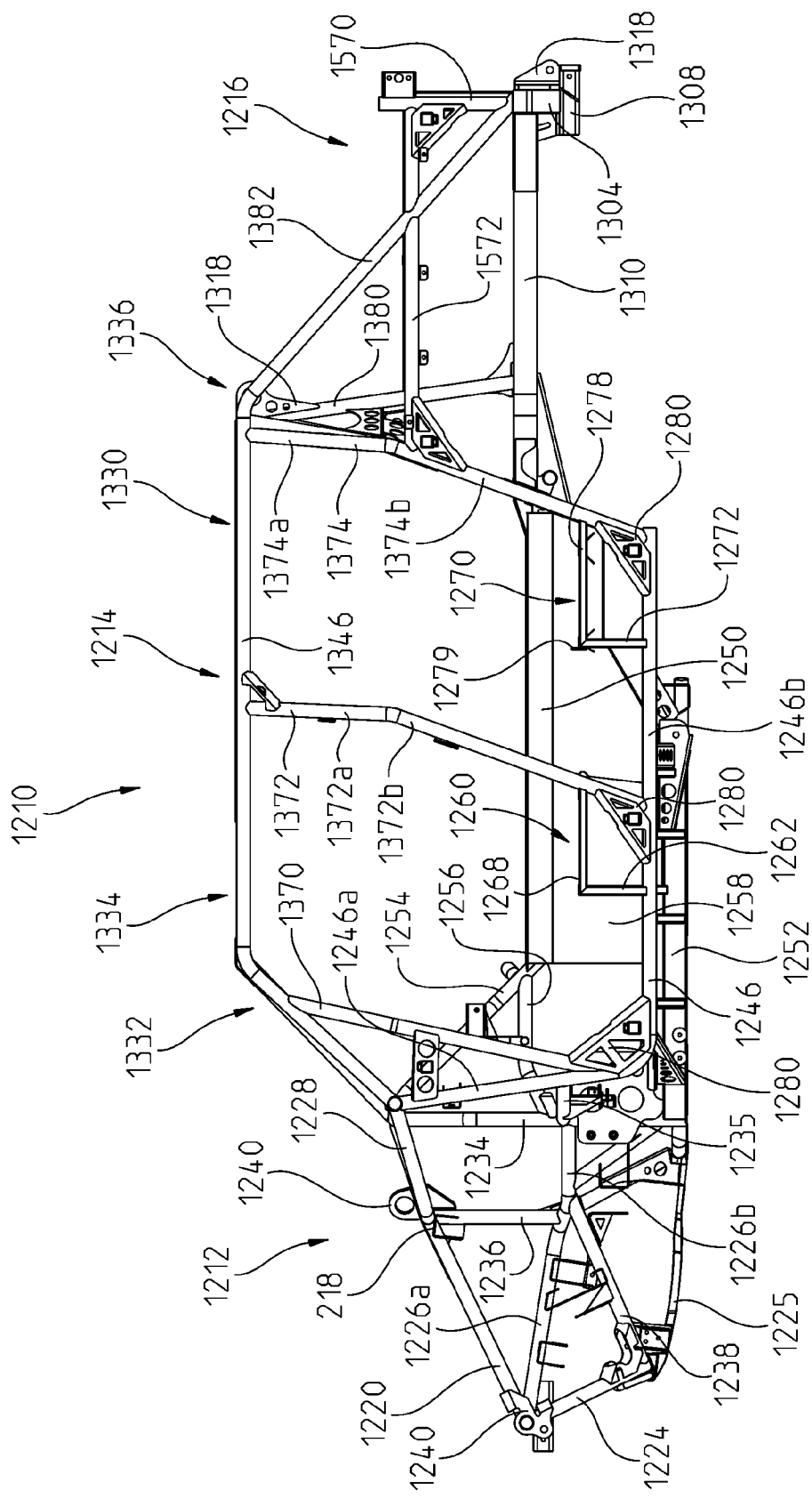
FIG. 52 is a left side view of the frame assembly and roll cage assembly of FIG. 50.

As shown in FIGS. 51 and 52, intermediate frame portion 1214 also includes a controls mount 1254, which extends into operator area 1400. Controls mount 1254 is angled downwardly and rearwardly from cross members 1232. Controls mount 1254 also is coupled to upstanding member 1234 through frame members 1256 of intermediate frame portion 1214. Controls mount 1254 supports various instruments, gauges, and components of operator controls 1434, and also supports a dash board assembly 1432 and other body panels 1202 within operator area 1400.

Figure 46:
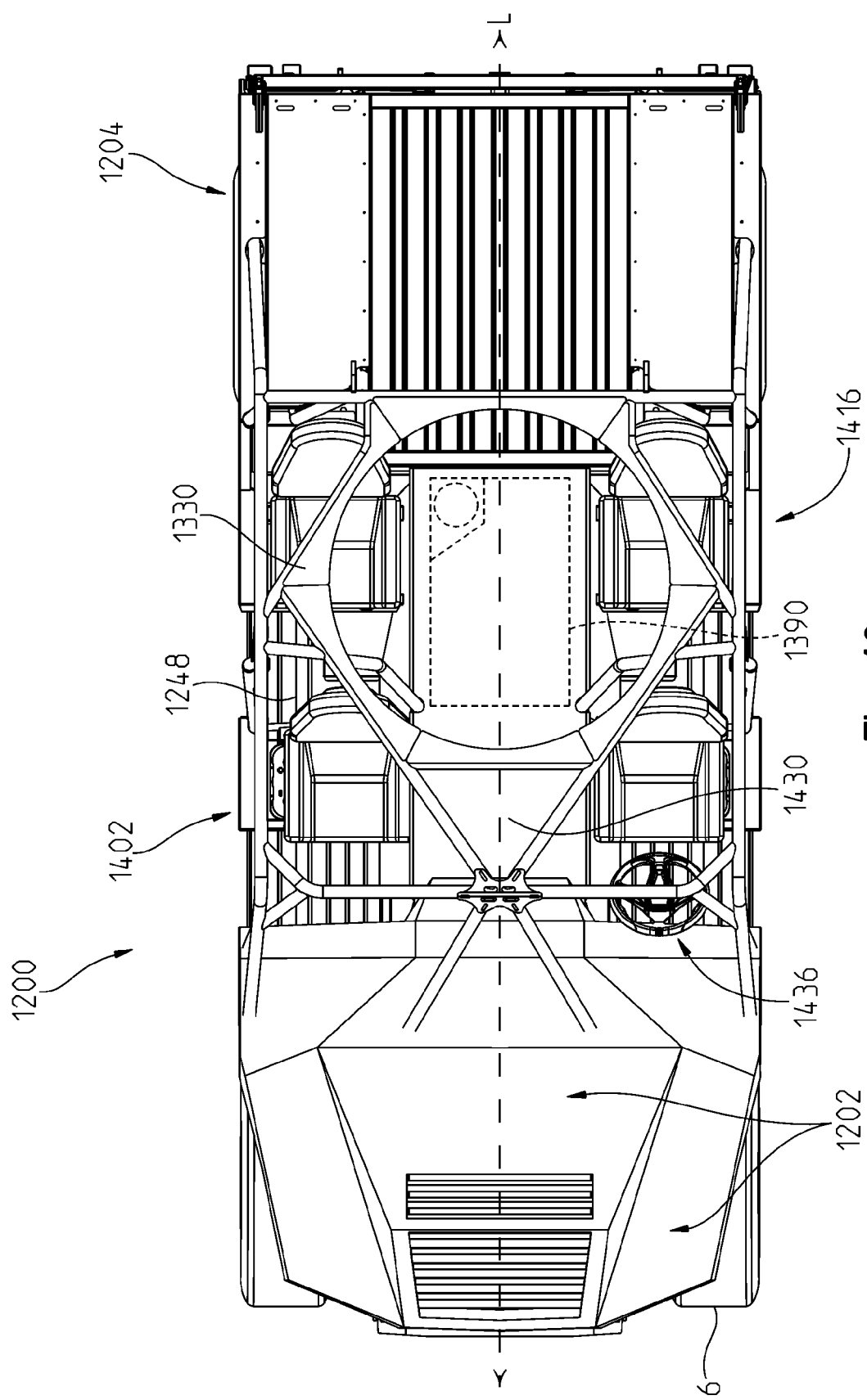
FIG. 46 is a top view of the alternative embodiment vehicle of FIG. 42.
Figure 53:
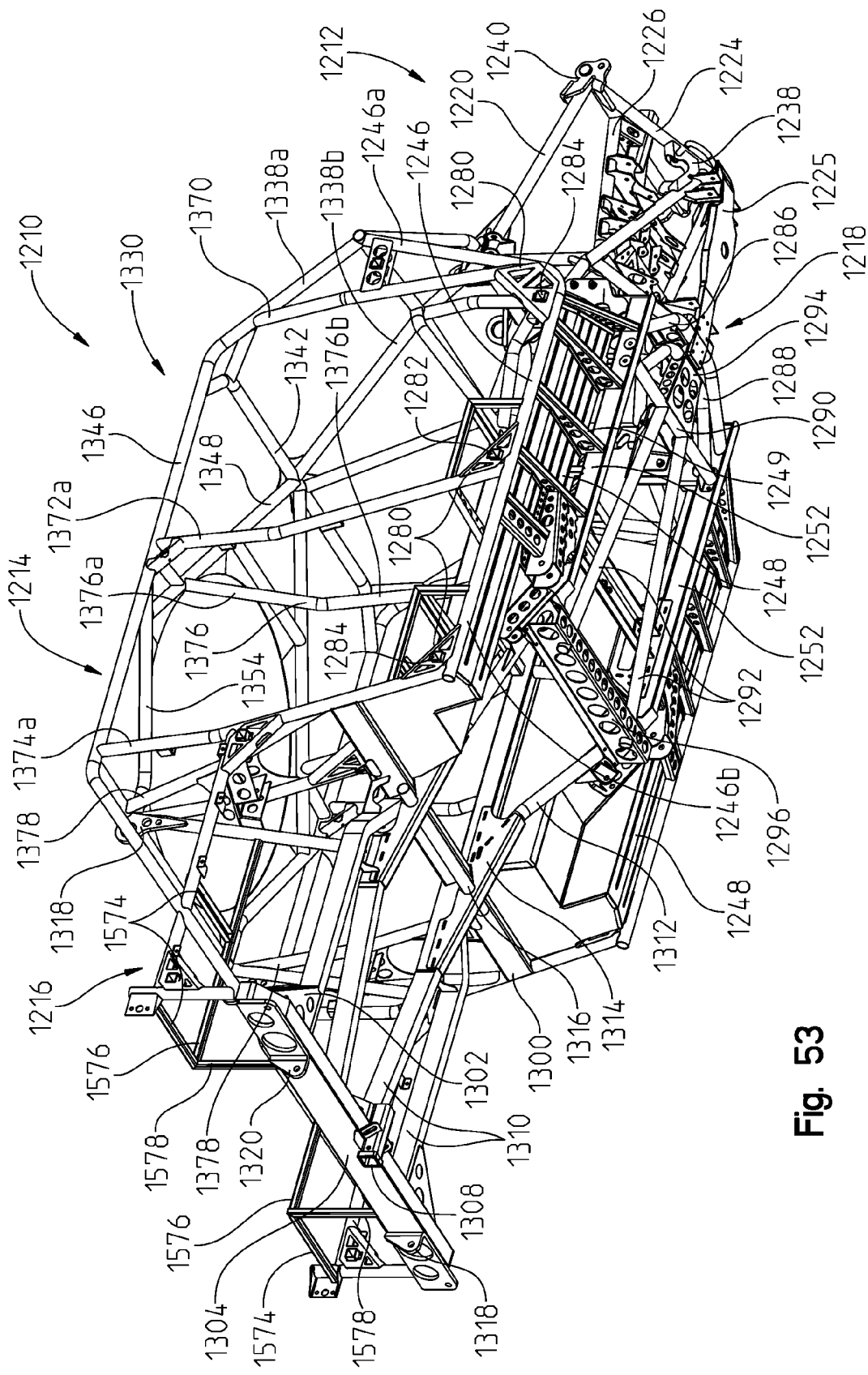
FIG. 53 is a further right rear perspective view of the frame assembly and roll cage assembly of FIG. 50.
Figure 54:
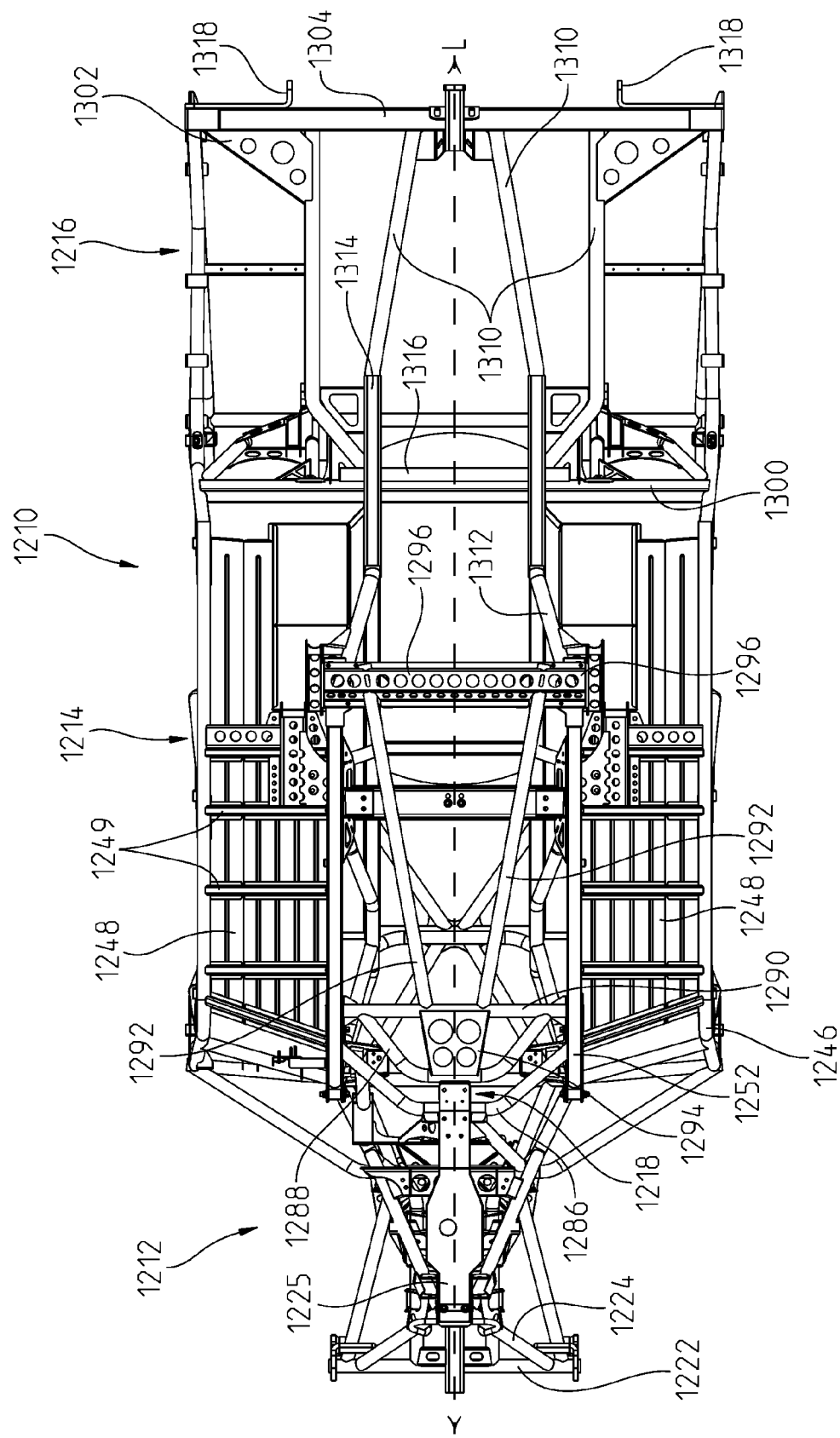
FIG. 54 is a bottom view of the frame assembly of FIG. 50.
Figure 55:
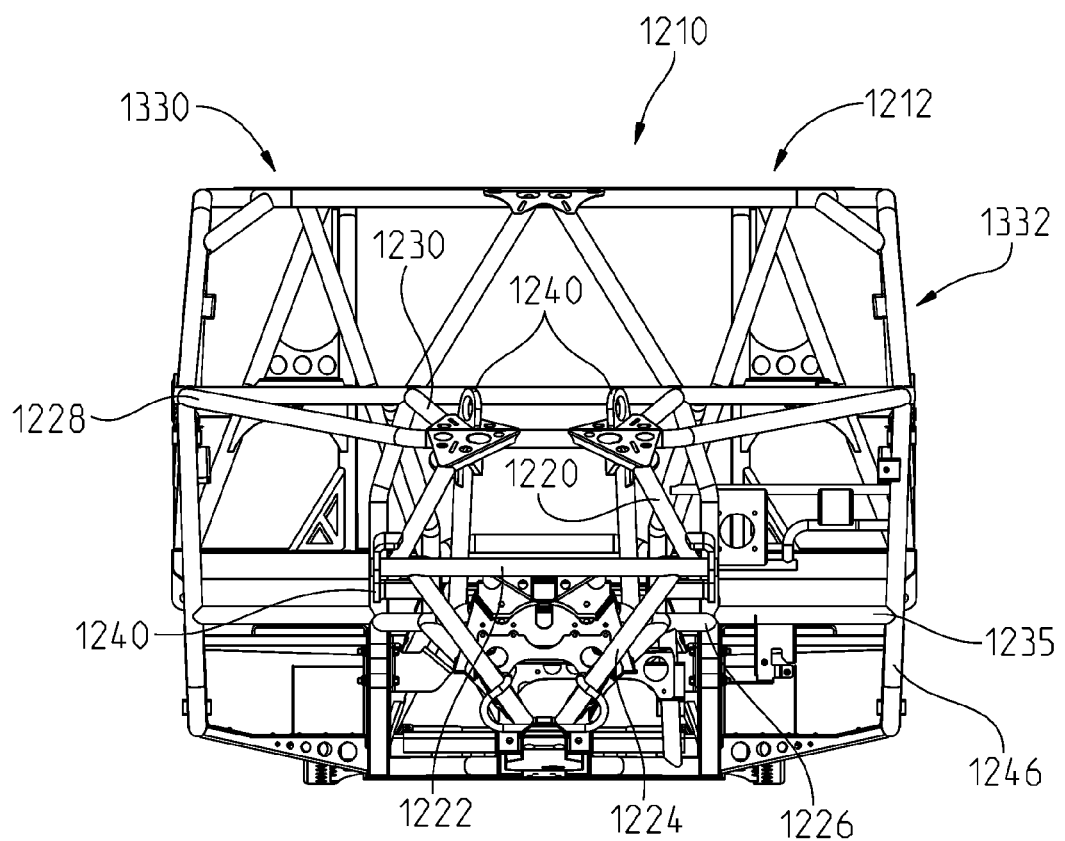
FIG. 55 is a front view of the frame assembly and roll cage assembly of FIG. 50.
Figure 56:
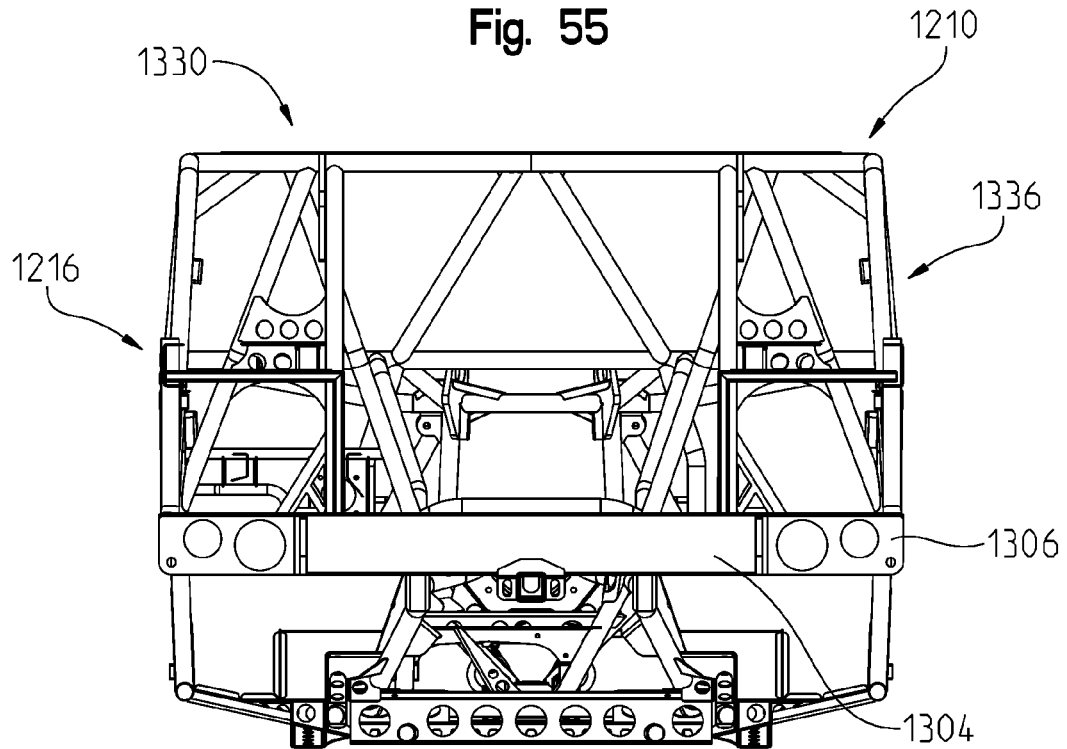
FIG. 56 is a rear view of the frame assembly and roll cage assembly of FIG. 50.
Figure 57:
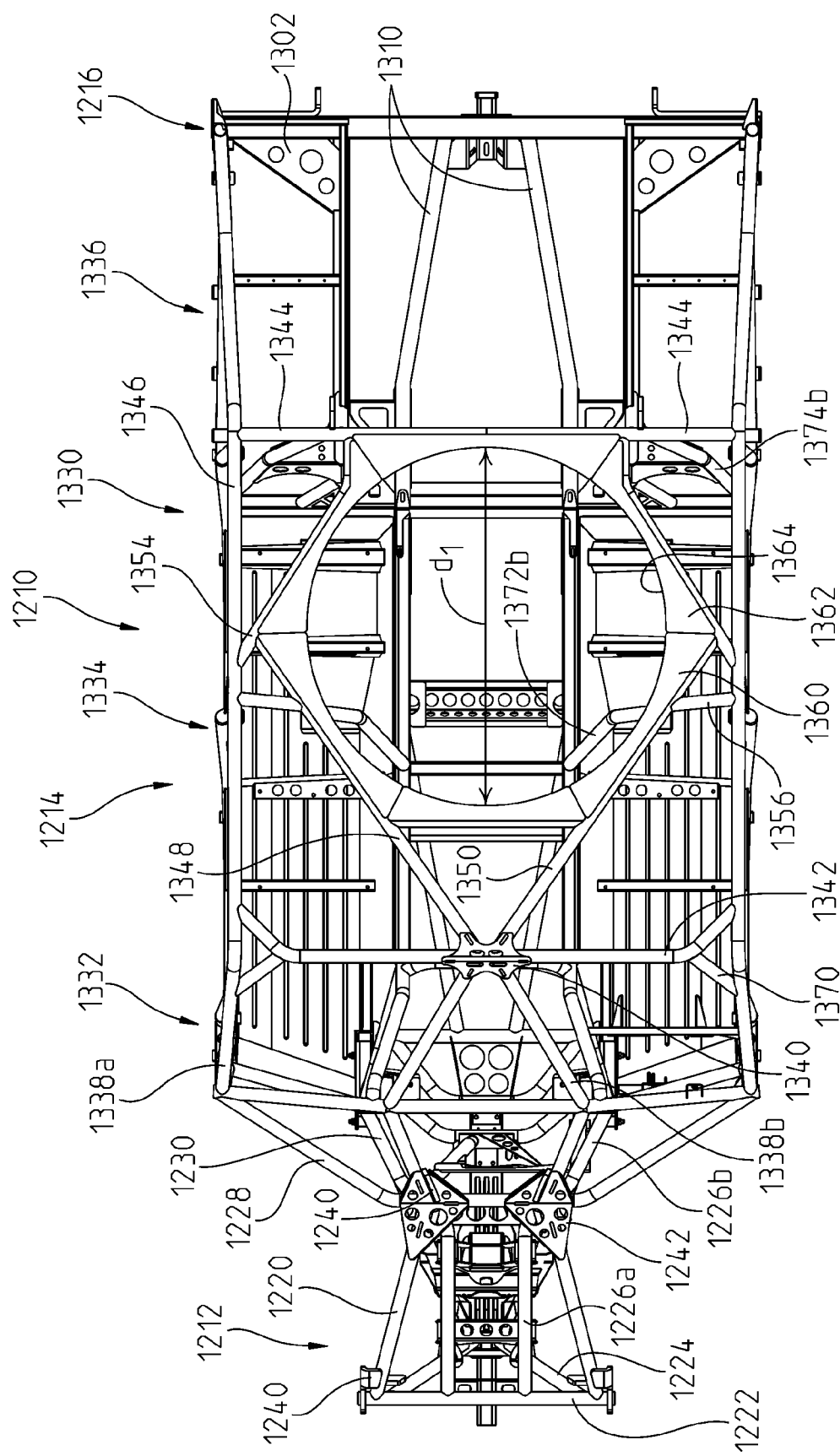
FIG. 57 is a top view of the roll cage assembly of FIG. 50.

Intermediate frame portion 1214 also includes a plurality of frame rails, illustratively upper frame rails 1250 and lower frame rails 1252 (FIGS. 52-54). Upper frame rails 1250 are positioned generally above lower frame rails 1252, and both upper and lower frame rails 1250, 1252 are generally parallel to a longitudinal axis L of vehicle 1200 (FIG. 46). More particularly, as shown best in FIG. 59, lower frame rails 1252 are positioned below and laterally outward from upper frame rails 1250. A rear end of controls mount 1254 is coupled to upper frame rails 1250.

Lower frame rails 1252 are coupled to removable portion 1218 of frame assembly 1210, as detailed further herein. Lower frame rails 1252 also are coupled to floor boards 1248 with a plurality of braces 1249 (FIGS. 53 and 54). Braces 1249 extend between longitudinally-extending portion 1246b of longitudinal frame members 1246 and lower frame rails 1252 and are coupled thereto with conventional fasteners, such as welds, rivets, bolts, and/or adhesive. Braces 1249 are generally perpendicular to longitudinal axis L.

Upper and lower frame rails 1250, 1252 define a tunnel area for housing and supporting at least a portion of drivetrain assembly 600. The lateral offset of lower frame rails 1252 relative to upper frame rails 1250 is designed to accommodate the minimum width of drivetrain assembly 600. Walls 1258 may be coupled to upper and lower frame rails 1250, 1252 and extend therebetween in order to shield operator area 1400 from drivetrain assembly 600. More particularly, upper frame rails 1250 define an inner boundary of front and rear seating sections 1402, 1416 and, therefore, walls 1258 shield the operator and passengers within operator area 1400 from the heat, noise, vibration, and movement of drivetrain assembly 600. Walls 1258 may be configured as single components or may be configured as multiple portions coupled together. Walls 1258 may be tapered, as shown best in FIG. 59, due to the lateral offset of lower frame rails 1252 relative to upper frame rails 1250. As such, the front and rear seating sections 1402, 1416 may have increased space for the operator and passengers due to the narrowing or tapered configuration of walls 1258 near upper frame rails 1250.

As shown in FIGS. 50-53, intermediate frame portion 1214 further includes front seat frames 1260 and rear seat frames 1270. Front seat frames 1260 are positioned within front seating section 1402 and include upstanding members 1262, a front brace 1264, a rear brace 1266, and a cross member 1268. Upstanding members 1262 are coupled to longitudinally-extending portion 1246b of longitudinal frame members 1246 and/or floor boards 1248. Front and rear braces 1264, 1266 may be coupled to walls 1258 and cross member 1268. Additionally, cross member 1268 may be coupled to roll cage assembly 1330, as detailed further herein. Front seat frames 1260 support operator seat 1404 and front passenger seat 1410 in a side-by-side configuration. Front seat frames 1260 are configured to couple with seat bottom 1408 of operator seat 1404 and seat bottom 1414 of front passenger seat 1410. At least front passenger seat may be removably coupled to front seat frames 1260.

Similarly, rear seat frames 1270 are positioned within rear seating section 1416 and include upstanding members 1272, a front brace 1274, a rear brace 1276, and a cross member 1278. Upstanding members 1272 are coupled to longitudinally-extending portion 1246b of longitudinal frame members 1246 and/or floor boards 1248. Front and rear braces 1274, 1276 may be coupled to walls 1258 and cross member 1278. Additionally, cross members 1278 may be coupled to roll cage assembly 1330, as detailed further herein. Rear seat frames 1270 support at least first and second rear passenger seats 1418, 1424 in a side-by-side configuration. Front brace 1274 may support a seat latch member 1279 for removably coupling first and second rear passenger seats 1418, 1424 to rear seat frames 1270. More particularly, seat bottoms 1422, 1428 of first and second rear passenger seats 1418, 1424 may be removably coupled to seat latch members 1279 for removing first and second rear passenger seats 1418, 1424 from vehicle 1200. As such, first and second rear passenger seats 1418, 1424 may be removed from vehicle 1200 to provide space for additional cargo, as detailed herein.

As shown in FIGS. 42-45 and 50-53, intermediate frame portion 1214 also includes a plurality of brackets, illustratively accessory brackets 1280. As shown best in FIG. 52, each side of vehicle 1200 includes three accessory brackets 1280. Accessory brackets 1280 are coupled to longitudinal frame members 1246 and roll cage assembly 1330. Accessory brackets 1280 are configured to couple with various accessories positioned laterally outward of vehicle 1200. More particularly, accessory brackets 1280 may include a tube portion 1282 extending from accessory brackets 1280 that includes an opening 1284. Accessories, such as an auxiliary standing platform, a litter carrier, an auxiliary cargo platform, and/or a gun or ammunition support member, may be coupled to vehicle 1200 when a portion of such accessories is received within opening 1284 of tube portion 1282. For example, tube portion 1282 may be configured similar to a receiver hitch of a trailer in order to receive a rod, tube, or other similar shaft member of the accessory. Alternatively, accessory brackets 1280 may be configured to couple with the accessories in other ways, for example, through clamps, bolts, latches, cables, wires, ropes, or other similar coupling mechanisms. As such, retrofitted or add-on accessories may be supported by vehicle 1200 and positioned laterally outward from operator area 1400, frame assembly 1210, and roll cage assembly 1330.

Intermediate frame portion 1214 further includes a brace member 1296, which couples removable portion 1218 of frame assembly 1210 to intermediate frame portion 1214. Brace member 1296 is coupled to lower frame rails 1252 and rear frame portion 1216, as detailed further herein. Brace member 1296 is generally positioned below rear seating section 1416 of vehicle 1200.

Removable portion 1218 of frame assembly 1210 is coupled to front and intermediate frame portions 1212, 1214, as shown best in FIGS. 53 and 54. Removable portion 1218 includes a front cross member 1286, a middle cross member 1288, a rear cross member 1290, a movable member 1294, and diagonal members 1292. More particularly, front cross member 1286 is coupled to mounting plate 1225 and lower frame rails 1252. Middle cross member 1288 is spaced apart from front cross member 1286 and is coupled to movable member 1294 and lower frame rails 1252. Additionally, rear cross member 1290 is coupled to movable member 1294 and lower frame rails 1252. Diagonal members 1292 are coupled to rear cross member 1290 and are coupled to brace member 1296. Diagonal members 1292 are angled relative to rear cross member 1290 and longitudinal axis L (FIG. 54).

Movable member 1294 is operably coupled to mounting plate 1225 and is configured to move, pivot, or rotate relative to mounting plate 1225. Alternatively, movable member 1294 may be removably coupled to mounting plate 1225 such that removable portion 1218 may be removed from frame assembly 1210. As such, movable member 1294 allows removable portion 1218 to move away from frame assembly 1210, thereby making the tunnel area accessible for assembling, disassembling, accessing, and servicing drivetrain assembly 600 and/or portions of frame assembly 1210.

Figure 43:
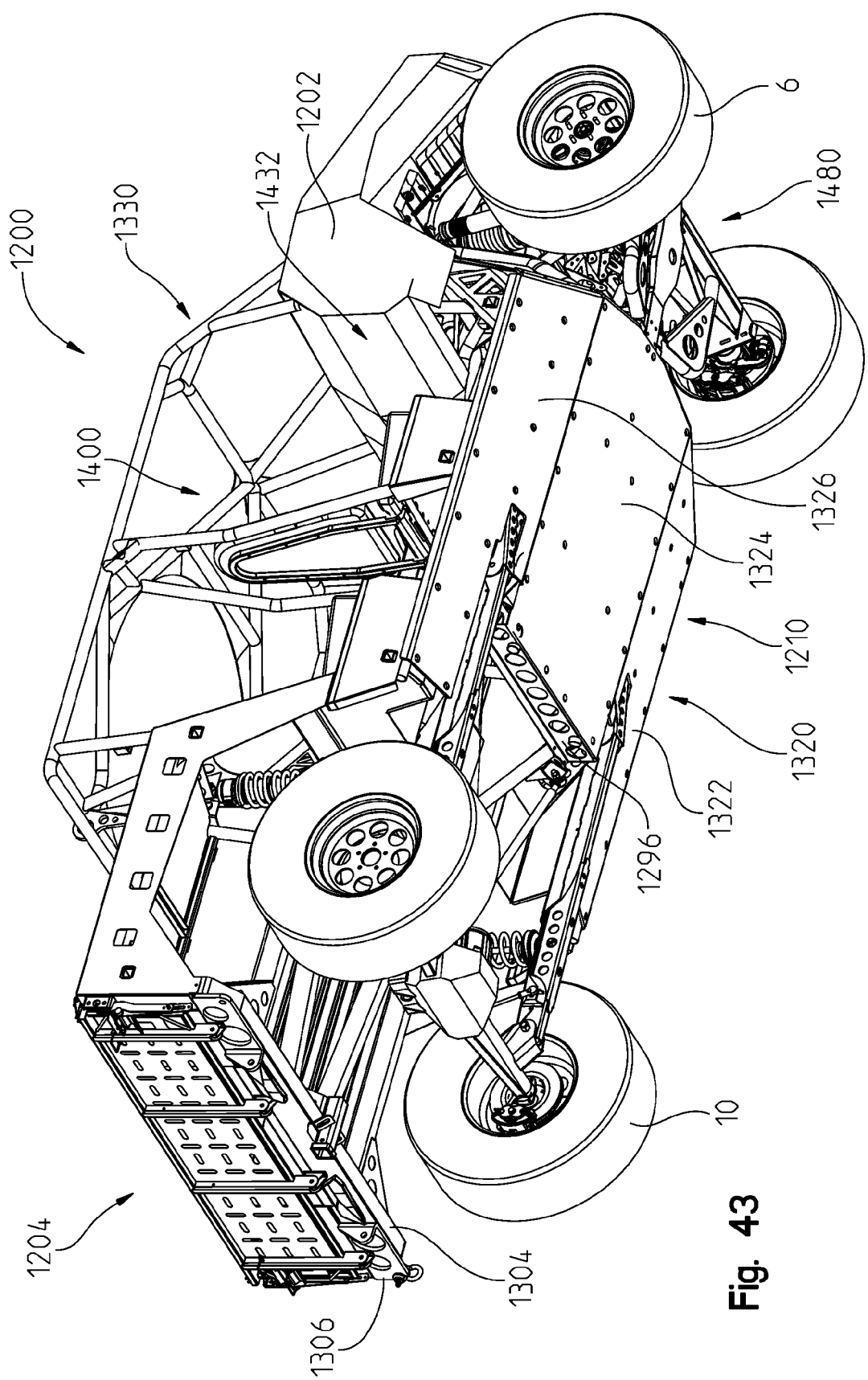
FIG. 43 is a right rear perspective view of the alternative embodiment vehicle of FIG. 42.
Figure 44:
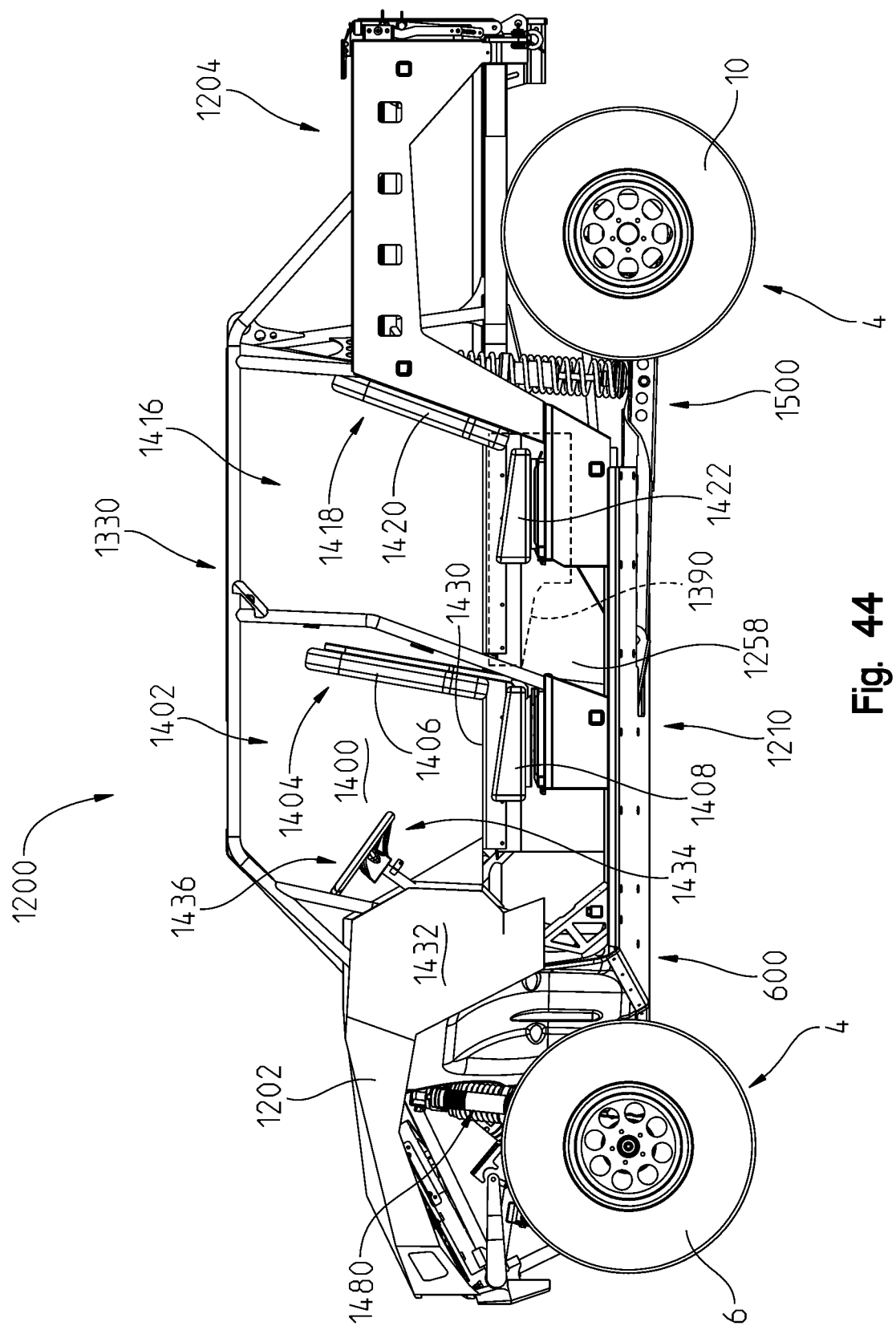
FIG. 44 is a left side view of the alternative embodiment vehicle of FIG. 42.
Figure 45:
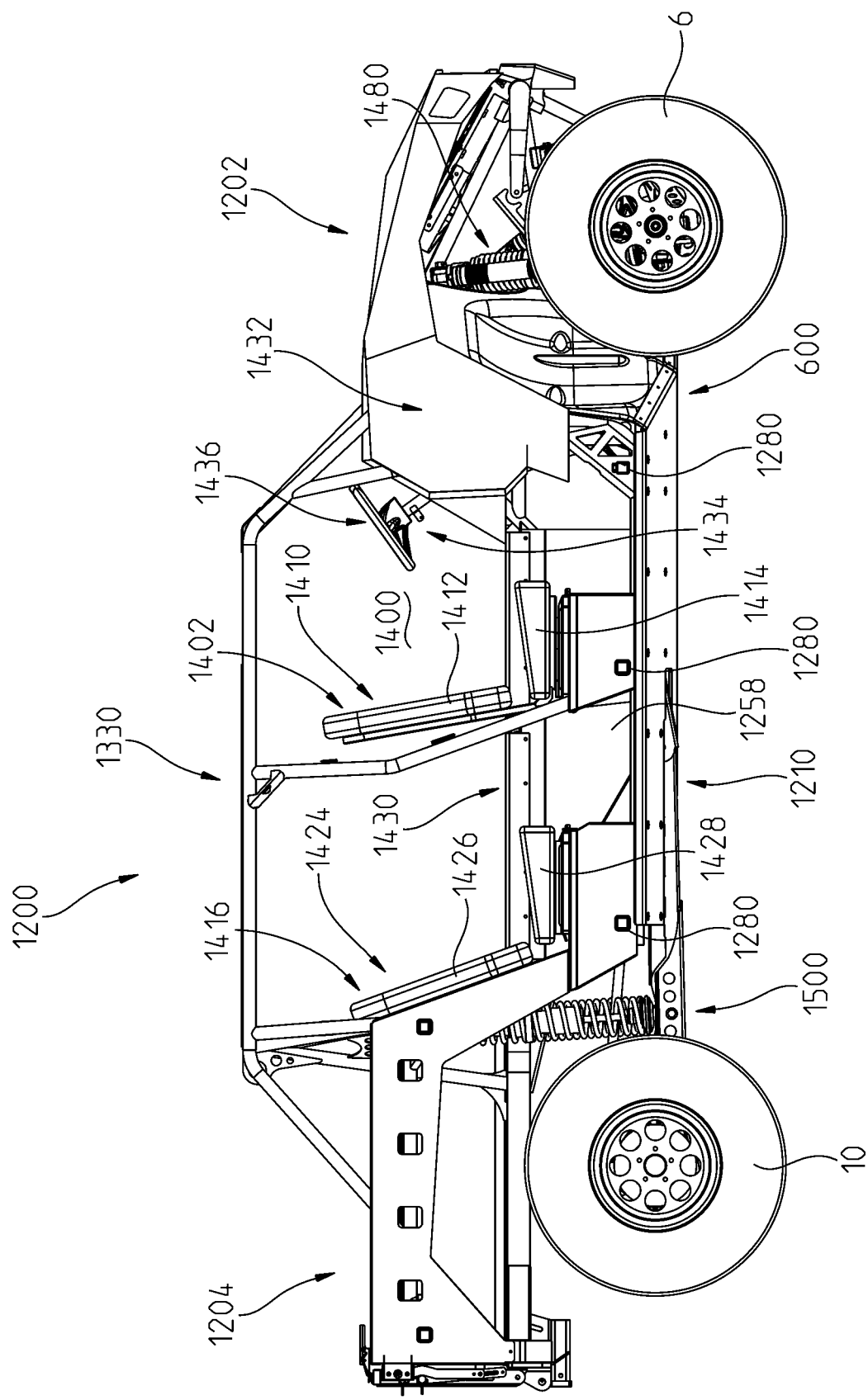
FIG. 45 is a right side view of the alternative embodiment vehicle of FIG. 42.
Figure 47:
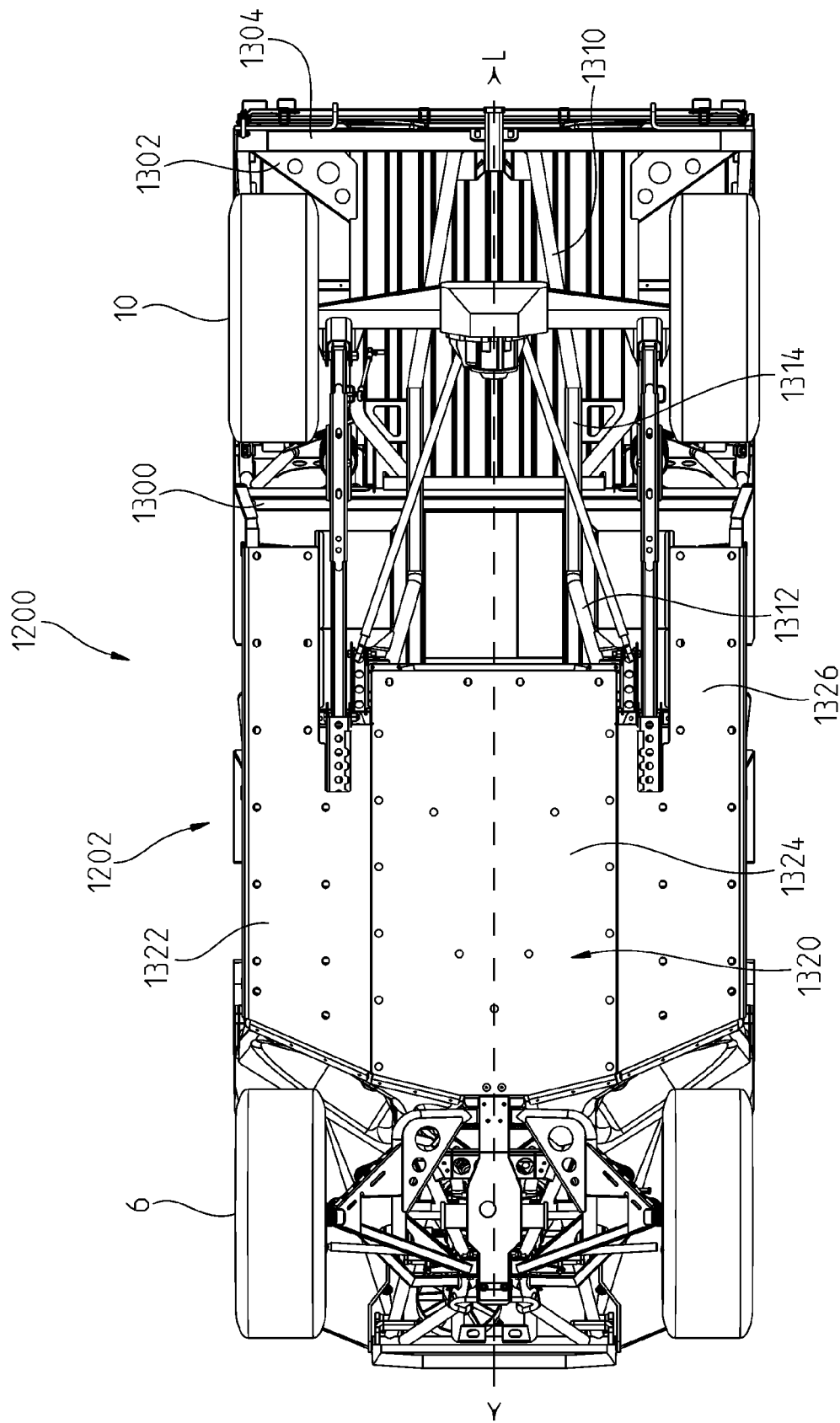
FIG. 47 is a bottom view of the alternative embodiment vehicle of FIG. 42.
Figure 49:
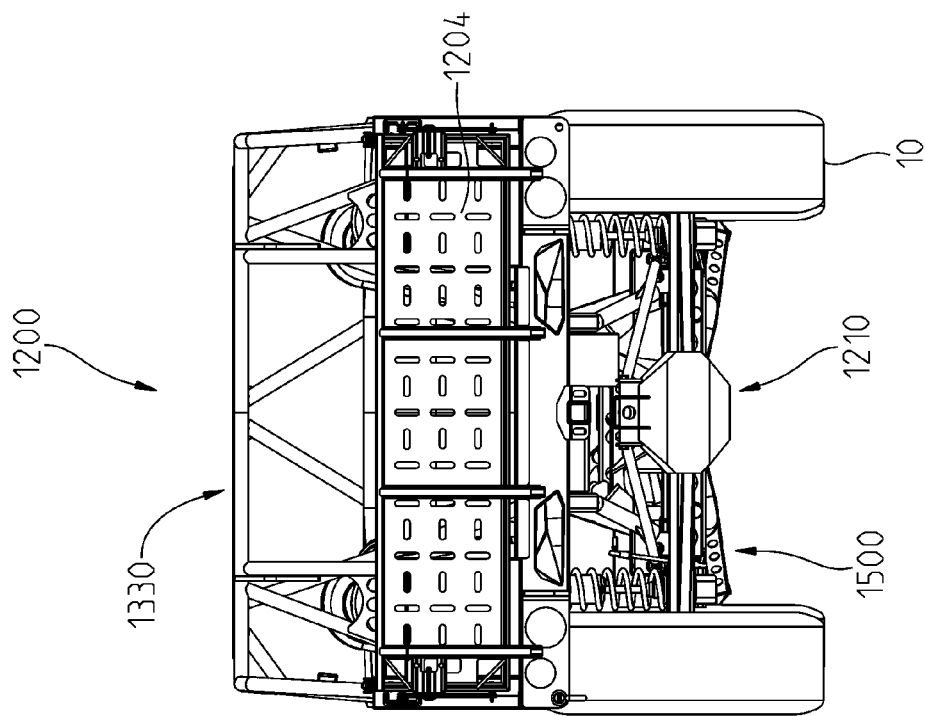
FIG. 49 is a rear view of the alternative embodiment vehicle of FIG. 42.
Figure 48:
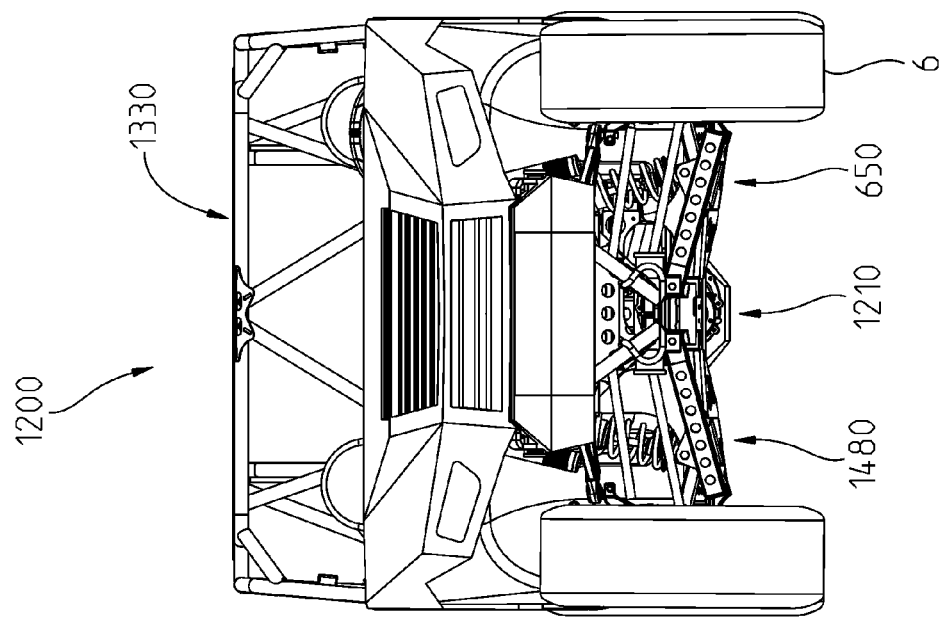
FIG. 48 is a front view of the alternative embodiment vehicle of FIG. 42.

Intermediate frame portion 1214 also includes a skid plate assembly 1320, as shown best in FIGS. 43 and 47. Skid plate assembly 1320 may be comprised of reinforced materials. For example, skid plate assembly 1320 may be configured as armor for vehicle 1200 or may be configured to support armor for vehicle 1200. Skid plate assembly 1320 illustratively includes a left-side portion 1322, a center portion 1324, and a right-side portion 1326. Portions 1322, 1324, 1326 may be integrally coupled together or coupled together with conventional fasteners, such as welds, rivets, bolts, and/or adhesive. Center portion 1324 generally surrounds removable portion 1218 of frame assembly 1210 and, as shown in FIG. 59, extends in a generally horizontal direction along intermediate frame portion 1214. Conversely, left-side and right-side portions 1322, 1326 are beveled or angled relative to center portion 1324. The angle of left-side and right-side portions 1322, 1326 may be configured for off-camber driving and may increase the ground clearance of vehicle 1200.

As shown in FIGS. 50-56, rear frame portion 1216 is generally positioned rearward of intermediate frame portion 1214 and supports rear cargo area 1204. Rear frame portion 1216 includes a cross brace 1300, brackets 1302, a tailgate support member 1304, rear plates 1306, an accessory mount, illustratively a trailer hitch 1308, a plurality of rear longitudinal support members 1310, frame members 1312, braces 1314, and a cross bar 1316. As shown best in FIG. 53, cross brace 1300 is coupled to roll cage assembly 1330 and is positioned rearward of operator area 1400. Cross brace 1300 generally spans the width of roll cage assembly 1330 and is coupled to rear longitudinal support members 1310.

Rear longitudinal support members 1310 extend rearwardly from cross brace 1300 and are configured to support a cargo surface or platform, as detailed further herein. A forward end of rear longitudinal support members 1310 is coupled to cross brace 1300 and a rearward end of rear longitudinal support members 1310 is coupled to tailgate support member 1304.

Tailgate support member 1304 generally defines the rearward boundary of frame assembly 1210 and is coupled to rear longitudinal support members 1310 with brackets 1302. Tailgate support member 1304 may integrally formed with, or is otherwise coupled to, rear plates 1306 which may support rear lights, such as tail lights, turn signals, reverse lights, and auxiliary lights, on rear frame portion 1216. Rear plates 1306 also include integral accessory mounts 1318. Illustratively, rear frame portion 1216 includes at least two accessory mounts 1318 integrally coupled to and/or formed with rear frame portion 1216. Additionally, accessory mounts 1318 may integrally coupled with roll cage assembly 1330, as detailed further herein. As such, there may be at least four accessory mounts 1318 integrally coupled to vehicle 1200, which may increase the strength, rigidity, and stability of rear frame portion 1216 and roll cage assembly 1330.

Illustratively, accessory mounts 1318 are tie-downs configured to support vehicle 1200 during an air lift, an air drop, when secured during transportation, for example on an air craft carrier, or in other similar situations. Additionally, accessory mounts 1318 may be configured for other applications, such as supporting cargo, vehicle systems, and/or vehicle components. In this way, the integration of accessory mounts 1318 with rear frame portion 1216 allows loads and forces applied to vehicle 1200 to be transmitted directly to frame assembly 1210 through accessory mounts 1318.

Additionally, tailgate support member 1304 may further include integrated couplings for supporting a rear bumper on vehicle 1200. Because the rear bumper is supported by couplings that are integrally formed with rear frame portion 1216, loads and forces applied to the rear bumper may be directly transmitted to frame assembly 1210, thereby increasing the structural integrity of vehicle 1200.

Referring to FIGS. 50-59, roll cage assembly 1330 is shown. Roll cage assembly 1330 includes a front portion 1332, an intermediate portion 1334, and a rear portion 1336. Portions 1332, 1334, and 1336 of roll cage assembly 1330 may be integrally coupled together or may be coupled together with conventional fasteners, such as welds, rivets, bolts, and/or adhesive. Roll cage assembly 1330 may be comprised of a structural material, such as a metallic or polymeric material, for example steel.

Front portion 1332 of roll cage assembly 1330 includes a plurality of frame members 1338 coupled to cross members 1232 of intermediate frame portion 1214. Illustratively, vehicle 1200 includes four frame members 1338 extending upwardly and rearwardly from cross members 1232. More particularly, frame members 1338 include outer frame members 1338a and inner frame members 1338b extending from cross members 1232. Inner frame members 1338b are couple to intermediate portion 1334 of roll cage assembly 1330 through a mounting plate 1340, however, outer frame members 1338a are spaced apart from mounting plate 1340. Inner frame members 1338b are angled inwardly to couple with mounting plate 1340.

Intermediate portion 1334 of roll cage assembly 1330 is generally positioned rearward of front portion 1332. Intermediate portion 1334 includes a front cross member 1342, a rear cross member 1344, and longitudinally-extending members 1346 extending therebetween. Longitudinally-extending members 1346 of roll cage assembly 1330 define an outer boundary of roll cage assembly 1330. Illustratively, rear cross member 1344 is coupled to longitudinally-extending members 1346. Similarly, front cross member 1342 also is coupled to longitudinally-extending members 1346 and is further coupled to mounting plate 1340. In one embodiment, front cross member 1342 is a single member extending between longitudinally-extending members 1346. Alternatively, front cross member 1342 may be comprised of at least two separate members coupled together. For example, the various members of front cross member 1342 may be coupled together at mounting plate 1340.

Additionally, intermediate portion 1334 may include a sub-frame assembly defined by front diagonal members 1348, 1350 and rear diagonal members 1352, 1354. Front diagonal members 1348, 1350 are coupled to mounting plate 1340 and extend rearwardly away from each other to couple with rear diagonal members 1354, 1352, respectively. Additionally, the rear end of each front diagonal member 1348, 1350 may be coupled to longitudinally-extending members 1346 via brace members 1356. It may be appreciated that mounting plate 1340 couples together six frame members of roll cage assembly 1330, illustratively inner members 1338b of front portion 1332, at least one front cross member 1342 of intermediate portion 1334, and front diagonal members 1348, 1350 of intermediate portion 1334.

Rear diagonal members 1352, 1354 of intermediate portion 1334 are coupled to longitudinally-extending members 1346 and rear cross member 1344. Rear diagonal members 1352, 1354 extend rearwardly from front diagonal members 1348, 1350 and are angled inwardly towards each other.

The configuration of the sub-frame assembly of intermediate portion 1334 supports a turret mount 1360. Turret mount 1360 is coupled to diagonal members 1348, 1350, 1352, 1354, as well as rear cross member 1344. More particularly, as shown in FIGS. 50-52 and 58, turret mount 1360 may be coupled to the inner surfaces of diagonal members 1348, 1350, 1352, 1354, and rear cross member 1344. As such, turret mount 1360 may be generally flush with the upper surfaces of diagonal members 1348, 1350, 1352, 1354, and rear cross member 1344, such that turret mount 1360 does not extend above diagonal members 1348, 1350, 1352, 1354, or rear cross member 1344. Alternatively, the height of turret mount 1360 may be adjustable such that turret mount 1360 may be coupled to, or spaced apart from, diagonal members 1348, 1350, 1352, 1354, and rear cross member 1344.

Turret mount 1360 includes a plate portion 1362 and an opening 1364. Opening 1364 may have an inner diameter $d_1$ of approximately 40-50 inches. More particularly, inner diameter $d_1$ may be approximately 47-48 inches and, illustratively, inner diameter $d_1$ is approximately 47.7 inches.

Figure 58:
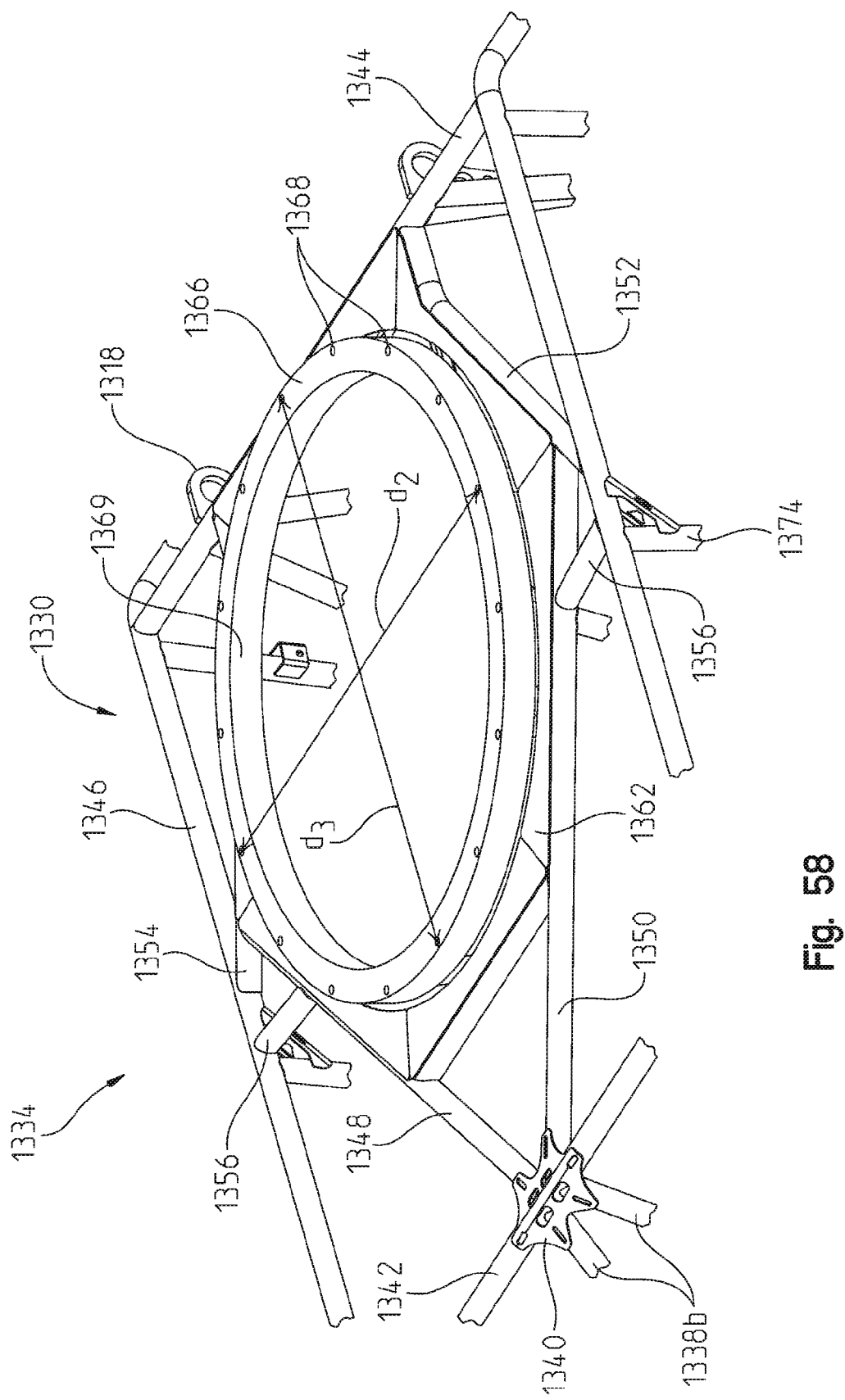
FIG. 58 is a left front perspective view of a portion of the roll cage assembly of FIG. 57.

Referring to FIG. 58, turret mount 1360 is configured to accommodate a gun ring or turret 1366. Gun turret 1366 is configured to couple with turret mount 1360, illustratively on top of plate portion 1362 and/or within opening 1364. Alternatively, the height of gun turret 1366 may be adjustable such that gun turret 1366 may be spaced apart from turret mount 1360. Gun turret 1366 includes a plurality of apertures 1368 for mounting a gun or other weapon thereon. Gun turret 1366 may be configured to move or rotate about opening 1364 in order to adjust the position of any gun or other weapon supported by gun turret 1366 relative to plate portion 1362. Alternatively, a gun or weapon may be rotatably or otherwise movably coupled to gun turret 1366 such that the gun or weapon may move relative to a fixed position of gun turret 1366.

Gun turret 1366 includes an opening 1369, which may have an adjustable diameter $d_2$. For example, diameter $d_2$ may be approximately 35-45 inches and, more particularly, may be approximately 41.9 inches. As such, the size of opening 1369 may be adjusted to accommodate various types and sizes of guns or other weapons. An outer diameter $d_3$ of gun turret 1366 also may be adjustable in order to accommodate various types and sizes of weapons for specific applications. For example, outer diameter $d_3$ may be approximately 40-50 inches and, more particularly, may be approximately 46.7 inches. Additionally, both turret mount 1360 and gun turret 1366 may be removably coupled to each other and/or to roll cage assembly 1330, thereby allowing different turret mounts 1360 and/or gun turrets 1366 to be used with vehicle 1200.

Referring again to FIGS. 50-53, intermediate portion 1334 of roll cage assembly 1330 also includes a front upstanding pillar member 1370, an intermediate upstanding pillar member 1372, and a rear upstanding pillar member 1374. As shown in FIGS. 51 and 52, front upstanding pillar member 1370 is generally linear and is angled rearwarly from longitudinal frame member 1246. Illustratively, front upstanding pillar member 1370 is coupled to longitudinal frame member 1246 and outer frame member 1338a. Front upstanding pillar member 1370 also may be coupled to accessory bracket 1280. The rearward angle of front upstanding pillar member 1370 positions front upstanding pillar member 1370 within operator area 1400 but does not cause any interference with front seating section 1402. As such, the operator and front passenger are able to freely move into and out of vehicle 1200 and within operator area 1400.

Intermediate portion 1334 of roll cage assembly 1330 also includes intermediate upstanding pillar member 1372. Intermediate upstanding pillar member 1372 is positioned rearward of front upstanding pillar member 1370 and front seating section 1402, and is coupled to front seat frame 1260, accessory bracket 1280, longitudinal frame member 1246, and longitudinally-extending members 1346. Illustratively, intermediate upstanding pillar member 1372 includes an upper portion 1372a and a lower portion 1372b. Lower portion 1372b is coupled to accessory bracket 1280, longitudinal frame member 1246, and front seat frame 1260, and is angled rearwardly relative thereto. Upper portion 1372a is coupled to lower portion 1372b and extends generally vertically therefrom in order to couple with longitudinally-extending members 1346 of roll cage assembly 1330. By angling lower portion 1372b rearwardly, the operator and front passenger are afforded additional space for ingress and egress. Additionally, the rearward angle of intermediate upstanding pillar member 1372 may provide the operator and front passenger with additional space for movement while seated in front seating section 1402.

As shown in FIGS. 51 and 53, an inner upstanding pillar member 1376 is positioned generally adjacent intermediate upstanding pillar member 1372. As with intermediate upstanding pillar member 1372, inner upstanding pillar member 1376 is positioned rearward of front seating section 1402. Inner upstanding pillar members 1376 are coupled to front diagonal members 1348, 1350 and/or brace members 1356. Inner upstanding pillar members 1376 also are coupled to upper frame rails 1250. Inner upstanding pillar members 1376 have the same general profile as intermediate upstanding pillar members 1372, in that inner upstanding pillar members 1376 include an upper portion 1376a and a lower portion 1376b. Lower portion 1376b is coupled to upper frame rails 1250 and extends rearwardly and upwardly therefrom. Upper portion 1376a is coupled to front diagonal members 1348, 1350 and lower portion 1376b, and extends generally vertically upward from lower portion 1376b. Upper portion 1376a may be positioned laterally outward from lower portion 1376b such that inner upstanding pillar member 1376 is angled inwardly toward upper frame rails 1250 and does not extend directly downward. As such, inner upstanding pillar member 1376 may be angled inwardly, as well as angled rearwardly. The angled configuration of inner upstanding pillar members 1376 allows the operator and front passenger additional space for movement within operator area 1400 and during ingress and egress. Inner upstanding pillar members 1376 also may increase the structural support and stability of the center portion of vehicle 1200.

Intermediate portion 1334 of roll cage assembly 1330 also includes rear upstanding pillar member 1374, which is positioned rearward of intermediate upstanding pillar member 1372 and rear seating section 1416. Rear upstanding pillar member 1374 is coupled to longitudinal frame member 1246, accessory bracket 1280, rear seat frame 1270, and longitudinally-extending member 1346. Illustratively, rear upstanding pillar member 1374 includes an upper portion 1374a and a lower portion 1374b. Lower portion 1374b is coupled to accessory bracket 1280, longitudinal frame member 1246, and rear seat frame 1270, and is angled rearwardly relative thereto. Upper portion 1374a is coupled to lower portion 1374b and extends generally vertically upwards therefrom in order to couple with longitudinally-extending members 1346 of roll cage assembly 1330. By angling lower portion 1374b rearwardly, the rear passengers are afforded more space for ingress and egress. Additionally, the rearward angle of rear upstanding pillar member 1374 may provide the rear passengers with additional space for movement while seated in rear seating section 1416.

Referring to FIGS. 51 and 53, intermediate portion 1334 of roll cage assembly 1330 may also include rear inner pillar members 1378 positioned generally adjacent to rear upstanding pillar members 1374. Illustratively, intermediate portion 1334 may include four rear inner pillar members 1378. Rear inner pillar members 1378 may be coupled to rear cross member 1344 and cross brace 1300 of rear frame portion 1216. Rear inner pillar members 1378 may have a rearwardly-angled profile similar to that of rear upstanding pillar members 1374 and also are positioned rearward of rear seating section 1416.

As shown in FIGS. 51-53, rear portion 1336 of roll cage assembly 1330 includes upstanding members 1380 and diagonal members 1382. Upstanding members 1380 are coupled to rear longitudinal support members 1310 of rear frame portion 1216 and extend upwardly therefrom. Additionally, upstanding members 1380 are angled forwardly relative to rear longitudinal support members 1310 in order to couple with rear cross member 1344 of roll cage assembly 1330. As shown in FIG. 51, upstanding members 1380 may include accessory mounts 1318. Accessory mounts 1318 may be integrally formed with, or otherwise coupled to, upstanding members 1380 such that any load or force applied to accessory mounts 1318 may be directly transmitted to roll cage assembly 1330, thereby increasing the structural integrity of vehicle 1200. Illustratively, accessory mounts 1318 are tie-downs configured to support vehicle 1200 during an air lift, an air drop, during transportation (e.g., on an aircraft carrier), and also may be configured to support additional cargo for vehicle 1200.

Diagonal members 1382 of rear portion 1336 of roll cage assembly 1330 are coupled to rear cross member 1344 and/or longitudinally-extending members 1346 and are angled rearwardly and downwardly therefrom in order to couple with tailgate support member 1304. Diagonal members 1382 also may be coupled to a cargo bed frame assembly 1532, as detailed further herein.

Referring to FIGS. 42-49 and 59, operator area 1400 includes a plurality of body panels, such as a tunnel member 1430 and a dash board assembly 1432 for covering and protecting the systems and other components of vehicle 1200. In particular, tunnel member 1430 is coupled to upper frame rails 1250 with conventional fasteners, such as bolts, welds, rivets, and/or adhesive. Tunnel member 1430 may increase the strength, rigidity, and structural integrity of frame assembly 1210. Tunnel member 1430 extends rearwardly from dash board assembly 1432 and generally along longitudinal axis L of vehicle 1200. As shown in FIG. 46, tunnel member 1430 is positioned between operator seat 1404 and front passenger seat 1410 and also between first and second rear passenger seats 1418, 1424. In this way, tunnel member 1430 creates a flat or planar platform between seats 1404, 1414, 1418, 1424. Tunnel member 1430 extends rearwardly to couple with cargo bed frame assembly 1532 and is positioned at approximately the same height as a portion of a cargo bed platform 1534, as detailed further herein.

Illustratively, as shown in FIG. 59, tunnel member 1430 cooperates with walls 1258 to define the tunnel area for housing various assemblies, systems, and components of vehicle 1200, such as drivetrain assembly 600. Walls 1258 may be angled outwardly relative to tunnel member 1430 such that the upper portion of the tunnel area has a tapered configuration. In other words, the width at the bottom of the tunnel area (i.e., the width between lower frame rails 1252) is greater than the width at the top of the tunnel area (i.e., the width between upper frame rails 1250). As such, the profile of the tunnel area may be trapezoidal in cross-section. Tunnel member 1430 defines a passenger and cargo platform, as detailed further herein. The width of tunnel member 1430 and, therefore, the width between upper frame rails 1250 is sized to accommodate a passenger and/or cargo. As shown in FIG. 59, tunnel member 1430 generally encloses at least a portion of drivetrain assembly 600.

Also, as shown in FIG. 46, a fuel tank 1390 is generally enclosed by tunnel member 1430. By being positioned below tunnel member 1430, fuel tank 1390 is generally positioned along longitudinal axis L of vehicle 1200. More particularly, fuel tank 1390 is positioned between first and second rear passenger seats 1418, 1424. In this way, fuel tank 1390 is centrally positioned within vehicle 1200 and, therefore, is assists in evenly distributing weight on vehicle 1200. Also, the central position of fuel tank 1390 protects fuel tank 1390 from objects that may contact vehicle 1200, for example off-road debris. Additionally, by supporting fuel tank 1390 below tunnel member 1430, the position of fuel tank 1390 is low within vehicle 1200, which may decrease the overall center of gravity of vehicle 1200. It may also be appreciated that fuel tank 1390 is substantially spaced apart from any gun fire or weapon fire occurring at gun turret 1366. In one embodiment, the capacity of fuel tank 1390 is approximately 18 gallons.

Figure 46A:
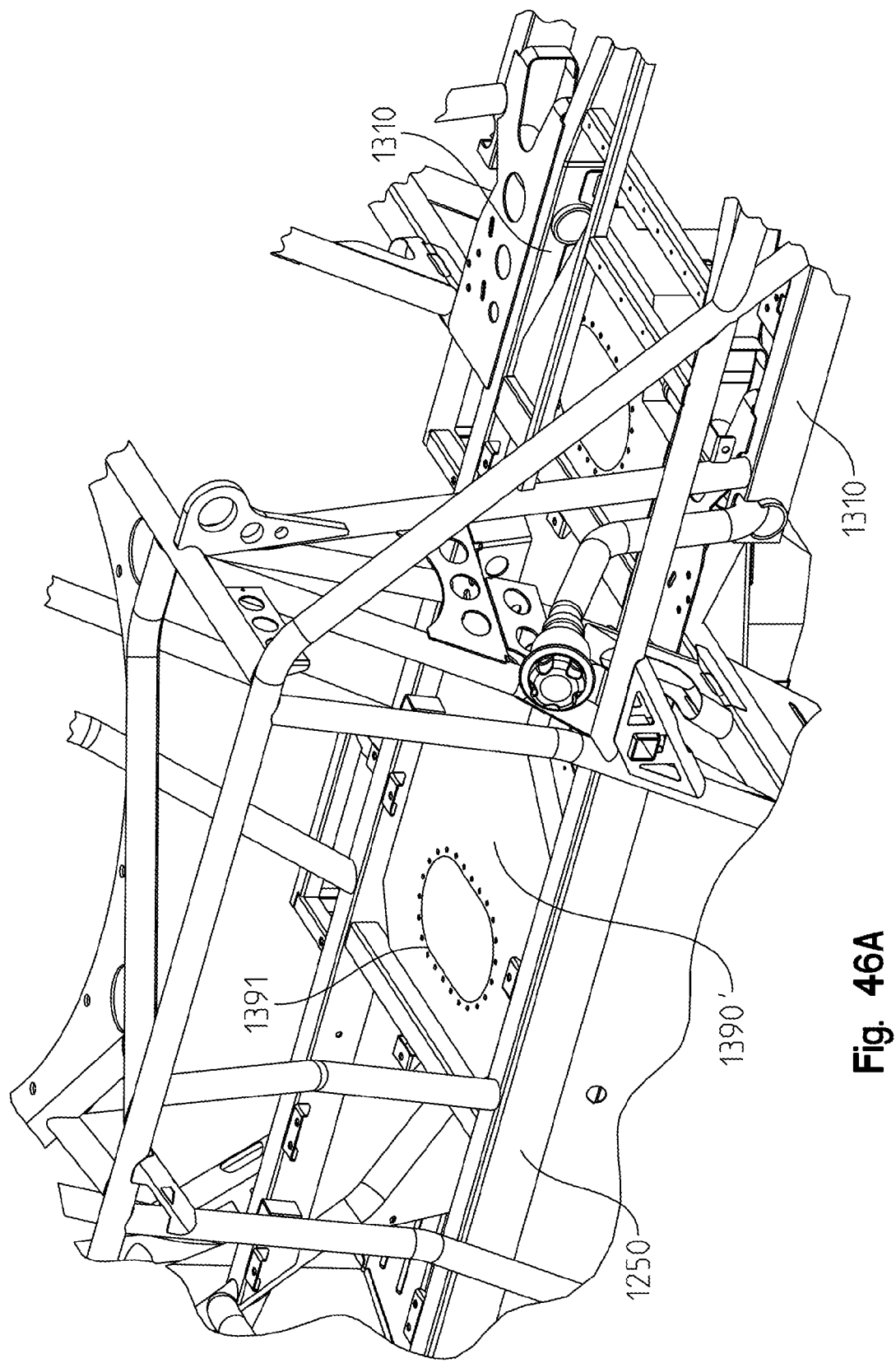
FIG. 46A is a rear perspective view of an alternative embodiment fuel tank assembly.
Figure 46B:
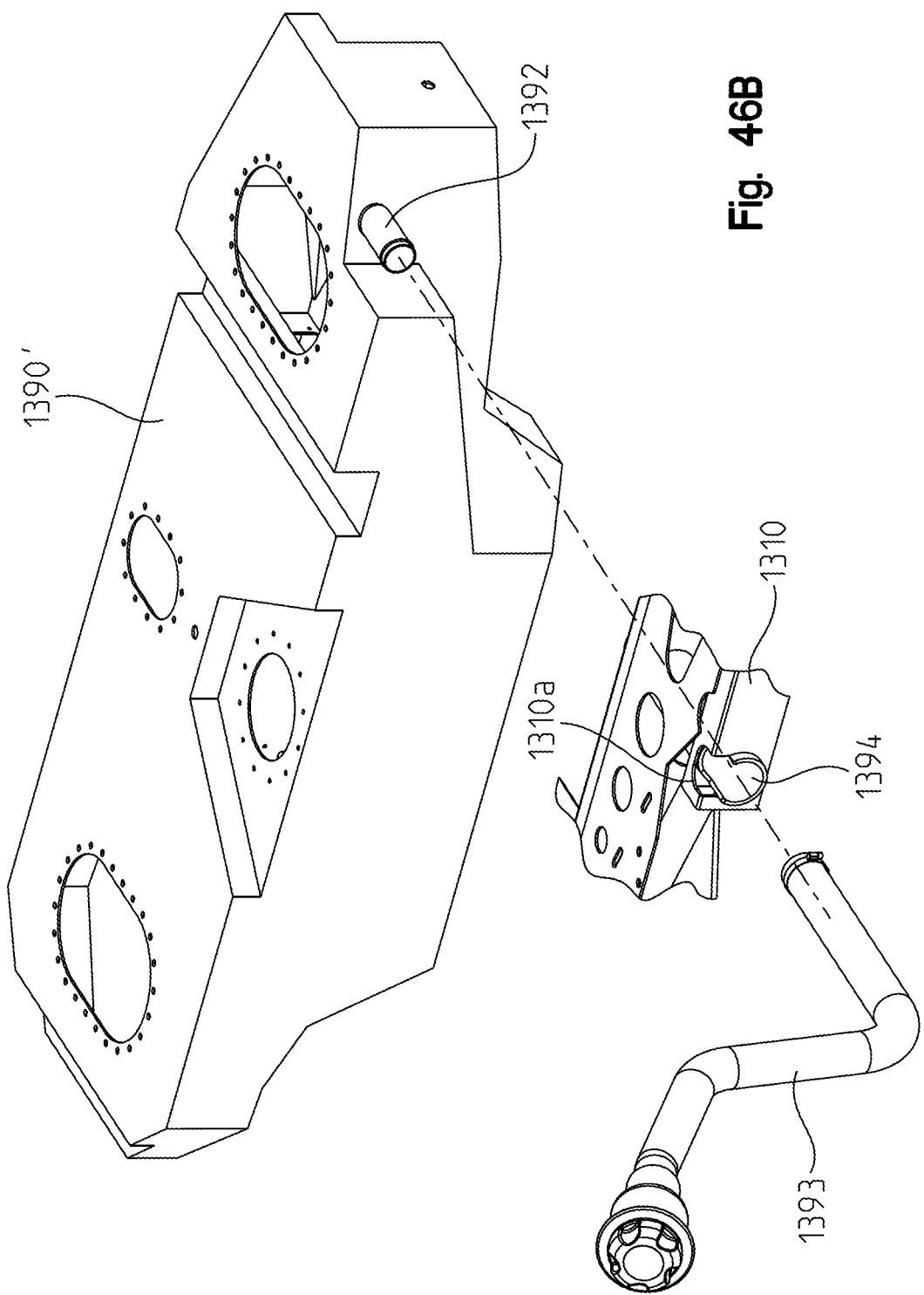
FIG. 46B is an exploded view of the alternative embodiment fuel tank assembly of FIG. 46A.

Referring to FIGS. 46A and 46B, an alternative embodiment fuel tank 1390' is shown. Fuel tank 1390' is positioned under tunnel member 1430 (FIG. 59) and between upper frame rails 1250. Additionally, a portion of fuel tank 1390' extends rearwardly and is supported between rear longitudinal support members 1310. As such, fuel tank 1390' is centrally positioned on vehicle 1200, which both assists in evenly distributing weight on vehicle 1200 and also protects the fuel from any impacts to the side of vehicle 1200. Additionally, frame assembly 1210 is configured to both accommodate fuel tank 1390' and maintain its load-carrying capacity. In other words, frame assembly 1210 is configured to transfer loads to the central portion thereof despite the placement of fuel tank 1390'.

As shown in FIG. 46B, fuel tank 1390' has a generally elongated configuration such that the longitudinal length or dimension of fuel tank 1390' is greater than the vertical depth of fuel tank 1390'. Fuel tank 1390' includes a plurality of apertures 1391, an inlet tube 1392, and a fill tube 1393. Fill tube 1393 is connected to inlet tube 1392 through an intermediate tube 1394, which is supported on one of the rear longitudinal support members 1310. More particularly, intermediate tube 1394 is supported within a notched portion 1310a of rear longitudinal support member 1310. By including notched portion 1310a on rear longitudinal support member 1310, fill tube 1393 is able to easily connect with intermediate tube 1394 and also extend laterally outward in order to be accessible from the side of vehicle 1200.

Figure 73:
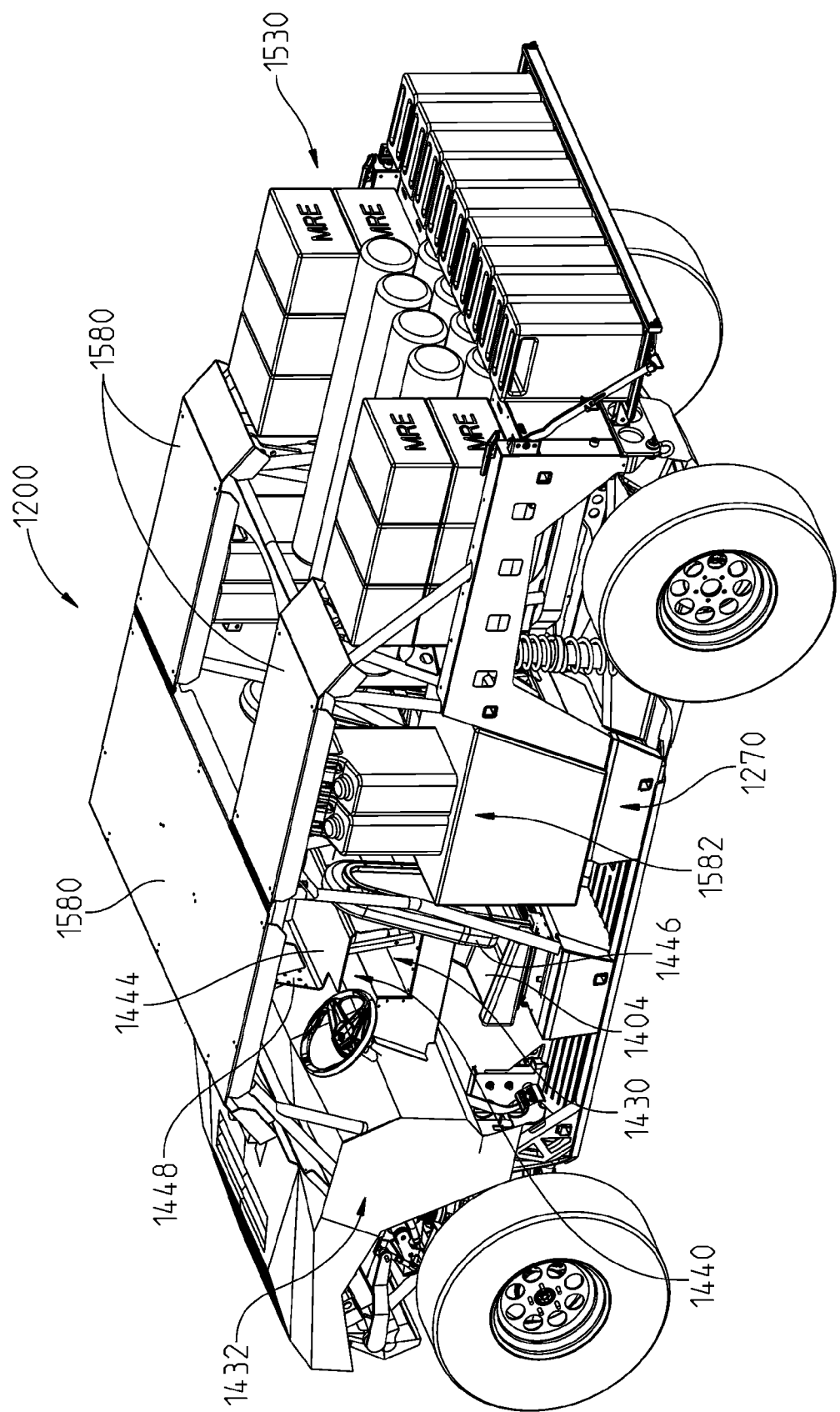
FIG. 73 is left rear perspective view of an alternative embodiment of the vehicle of FIG. 42, showing the vehicle configured to support additional cargo.
Figure 74:
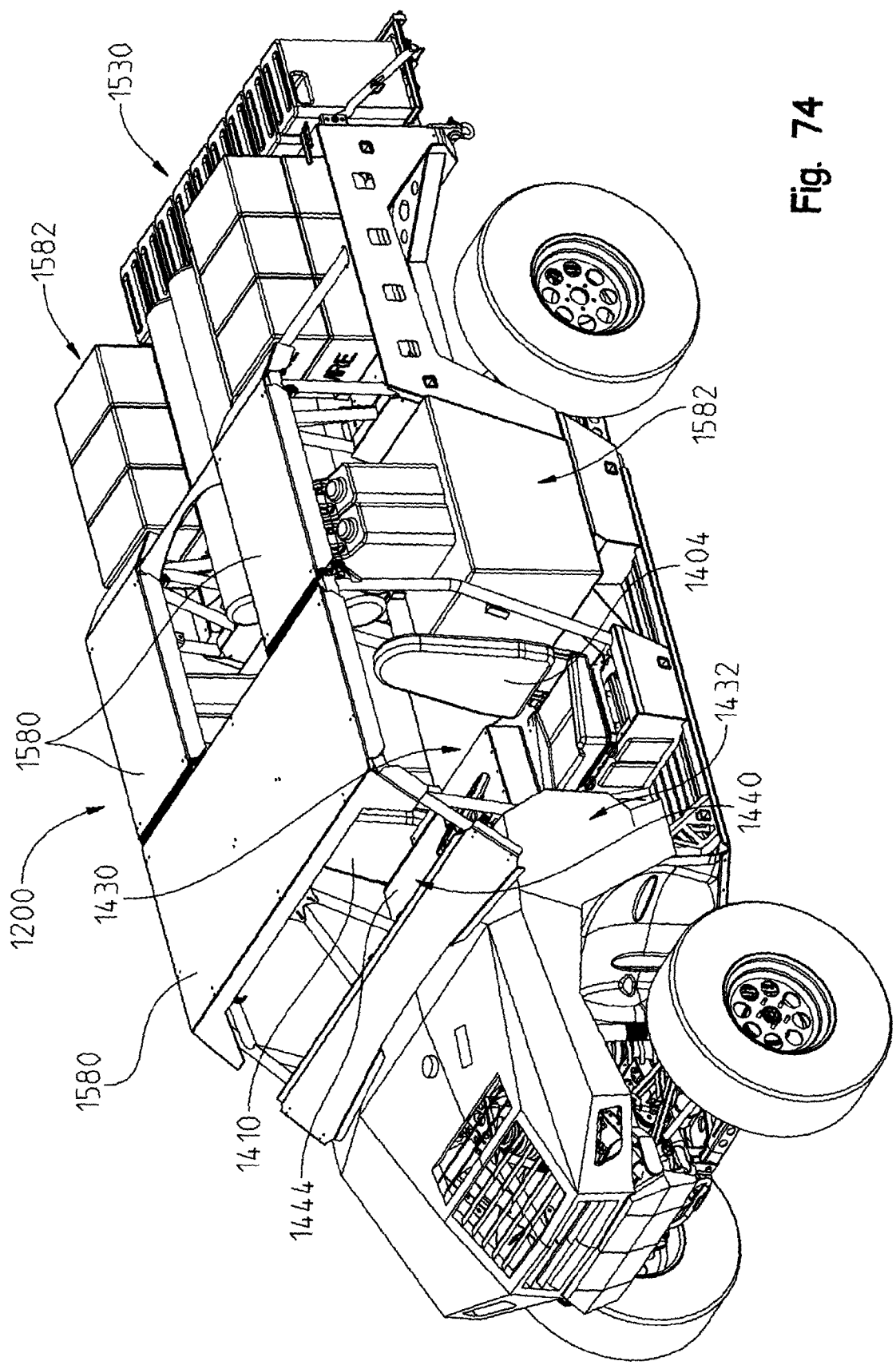
FIG. 74 is a left front perspective view of the alternative embodiment vehicle of FIG. 73.

As shown in FIGS. 42-49, dash board assembly 1432 also encloses various components, systems, and assemblies of vehicle 1200. For example, dash board assembly 1432 encloses a portion of operator controls 1434. Operator controls 1434 include at least a plurality of instruments, gauges, a steering assembly 1436, a brake assembly 1438, and other components operably coupled to an electrical system 1440 of vehicle 1200. Dash board assembly 1432 may enclose at least one electrical panel, such as a breaker panel in order to minimize the number of fuses and/or other electrical connections within dash board assembly 1432 and/or centralize the fuses and other electrical connections within dash board assembly 1432. Additionally, electrical system 1440 may include a plurality of outlets or plug-in adapters that are configured to charge accessories within vehicle 1200, for example cell phones, computers, navigation systems, and radar systems. In one embodiment, electrical system 1440 includes five plug-in adapters for charging accessories. In a further embodiment, for example as shown in FIGS. 73 and 74, a tray 1444 for a computer or other electronic or communications device is included on vehicle 1200. Tray 1444 includes a plurality of legs 1446 coupled to tunnel member 1430 and at least one bracket 1448 coupled to dash board assembly 1432.

Figure 60:
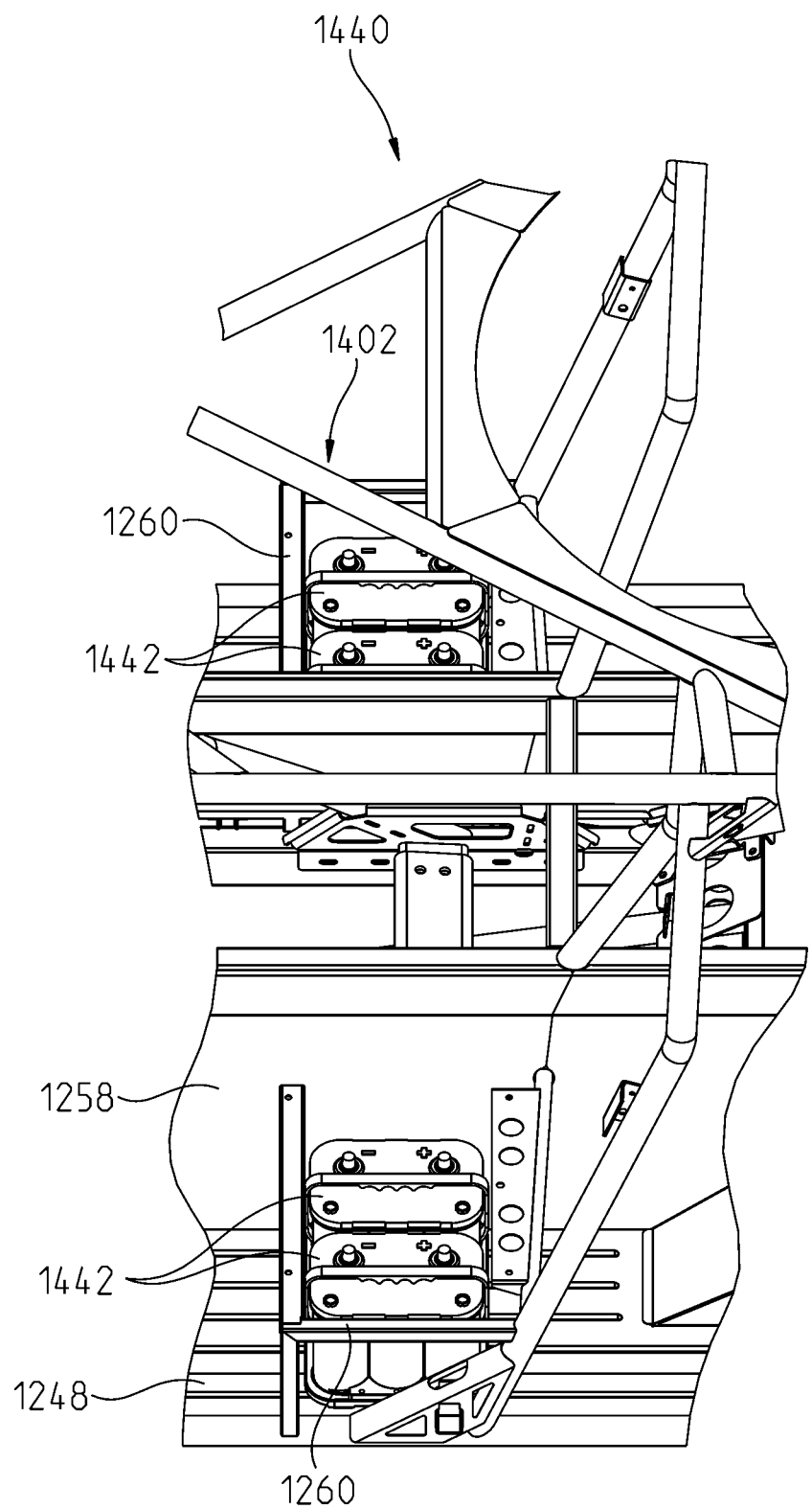
FIG. 60 is a top perspective view of a seating section and a plurality of batteries of the vehicle of FIG. 42.

As shown in FIG. 60, electrical system 1440 includes a plurality of batteries 1442 supported by frame assembly 1210 and positioned below at least one of seats 1404, 1410, 1418, 1424. Illustratively, batteries 1442 are supported on floor boards 1248 and within front seat frames 1260. In one embodiment, at least two batteries 1442 are supported below operator seat 1404 and at least two batteries 1442 are supported below front passenger seat 1410. Additional batteries may be supported below first and second rear passenger seats 1418, 1424. Alternatively, cargo or storage bins or containers may be positioned below any of seats 1404, 1410, 1418, 1424 to increase the storage capacity of vehicle 1200.

Figure 60B:
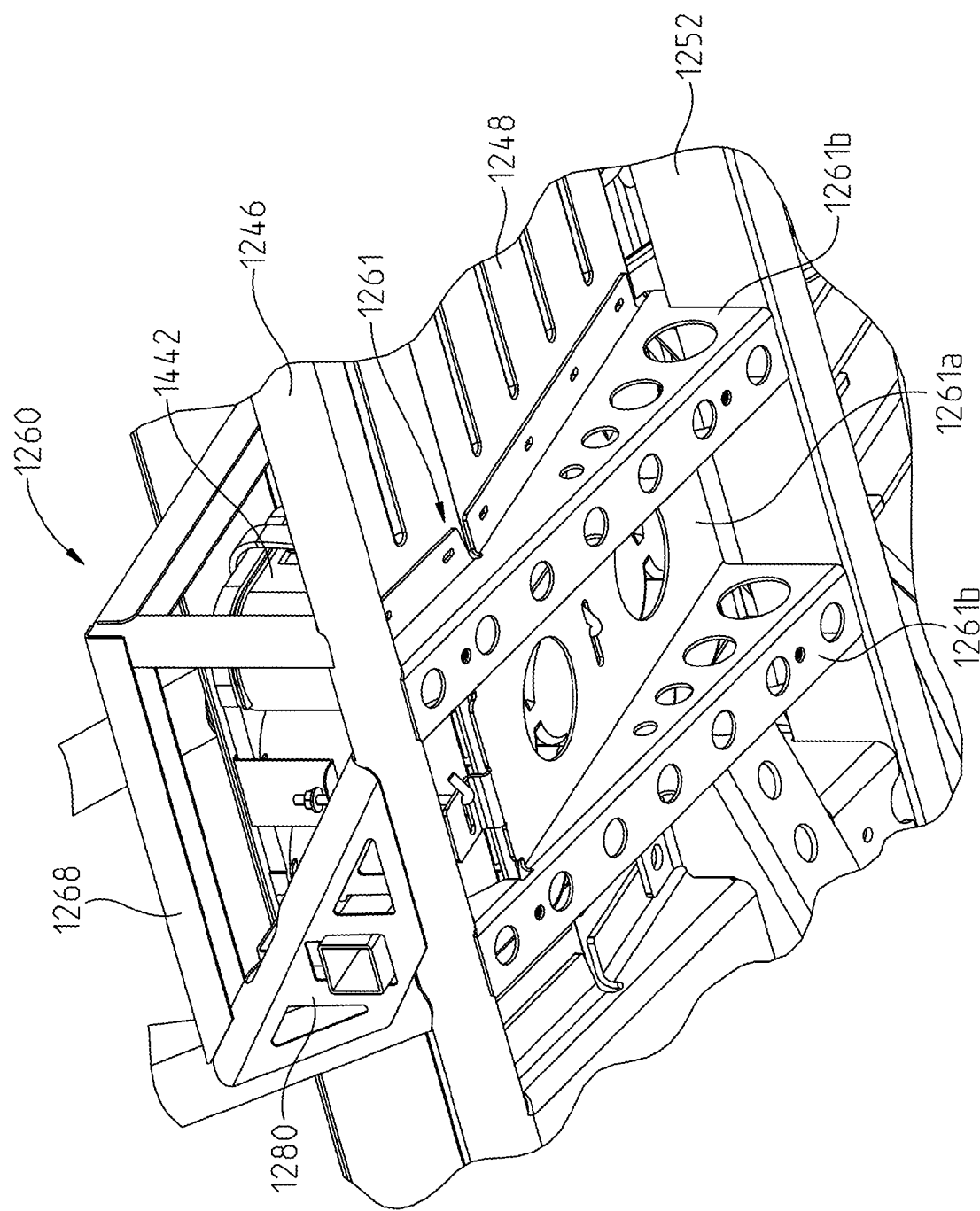
FIG. 60B is a bottom perspective view of the support member of FIG. 60A.

Alternatively, as shown in FIGS. 60A and 60B, a support member 1261 is positioned below front seat frames 1260. Illustratively, support member 1261 is configured to support at least one battery 1442. In one embodiment, support member 1261 is a stamped member. The configuration and position of support member 1261 supports batteries 1442 below front seat frame 1260. As such, the low position of batteries 1442 on vehicle 1200 may lower the center of gravity of vehicle 1200.

Support member 1261 includes a plate member 1261a and braces 1261b. Plate member 1261a is integrally formed with braces 1261b. As shown in FIG. 60B, plate member 1261a is coupled to floorboards 1248 with conventional fasteners, for example, welds, rivets, and/or bolts. More particularly, plate member 1261a is positioned below floorboards 1248 such that the top surface of plate member 1261a is coupled to the bottom surface of floorboards 1248. The outer ends of braces 1261b are coupled to longitudinal frame members 1246 and the inner ends of braces 1261b are coupled to lower frame rails 1252 with conventional couplers, for example welds, rivets, bolts, and/or adhesive.

Electrical system 1440 also may be coupled to dual alternators, each of which is configured with a capacity of approximately 12 volts or 24 volts. Additionally, electrical system 1440 may have a capacity of approximately 120 amps at idle. In one embodiment, electrical system 1440 outputs approximately 200 amps at idle.

Figure 61:
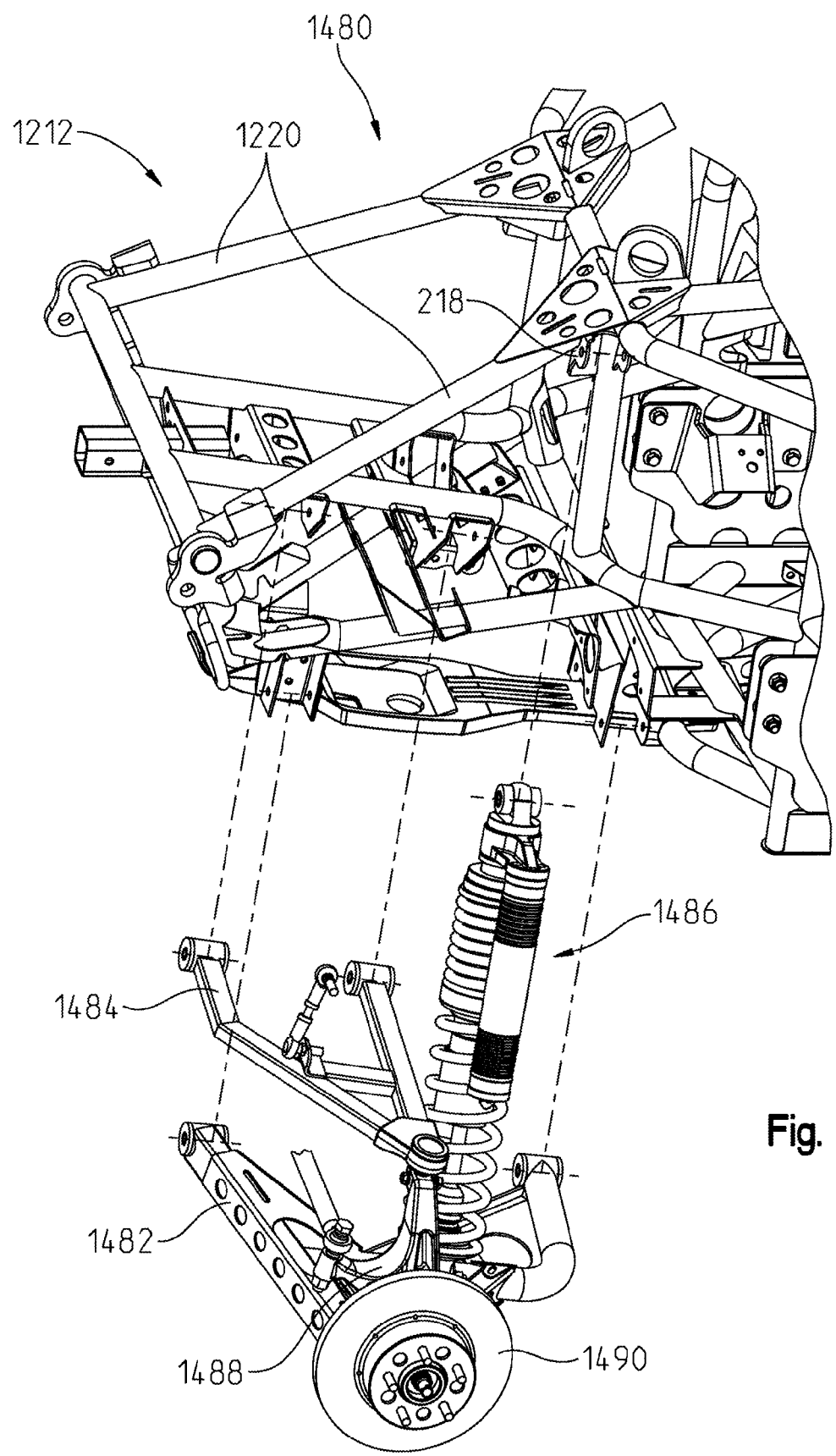
FIG. 61 is an exploded side view of a front suspension assembly of the vehicle of FIG. 42.
Figure 62:
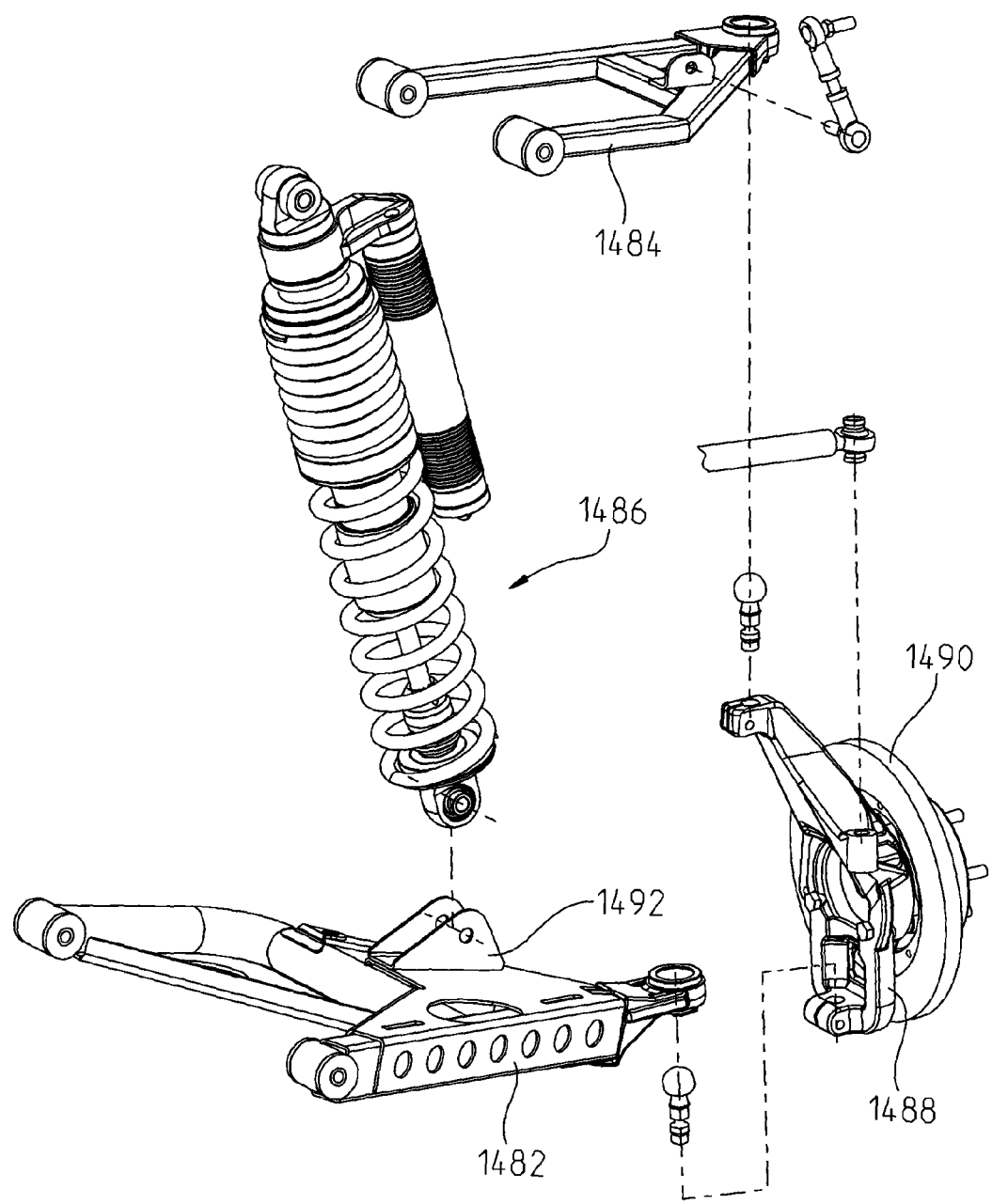
FIG. 62 is a further exploded view of the front suspension assembly of FIG. 61.

Referring now to FIGS. 61 and 62, front suspension assembly 1480 is shown. Front suspension assembly 1480 is similar to front suspension assembly 370 of FIGS. 24 and 25. Front suspension assembly 1480 includes a lower control arm 1482, an upper control arm 1484, and a shock absorber 1486. In one embodiment, shock absorber 1486 is a 3-inch internal bypass shock available from Fox Shox. Upper and lower control arms 1484, 1482 are coupled to a wheel spindle 1488, which is coupled to a wheel hub 1490. Upper control arm 1484 is substantially narrower than lower control arm 1482. The narrowed width of upper control arm 1484 allows shock absorber 1486 to be pivotably coupled to lower control arm 1482 rather than upper control arm 1484.

More particularly, shock absorber 1486 is pivotably coupled to a bracket 1492 on lower control arm 1482. Also, shock mount brackets 218 (FIG. 52) are positioned high on frame assembly 1210, which allows shock absorber 1486 to be substantially longer than shock absorbers on prior vehicles. Shock absorber 1486 may have an increased shock stroke length. For example, shock absorber 1486 may have a travel length of approximately 18 inches. In one embodiment, the travel length of shock absorber 1486 may be approximately 19.3 inches. The travel of shock absorber 1486 may be adjusted to increase the steering angle.

Figure 62A:
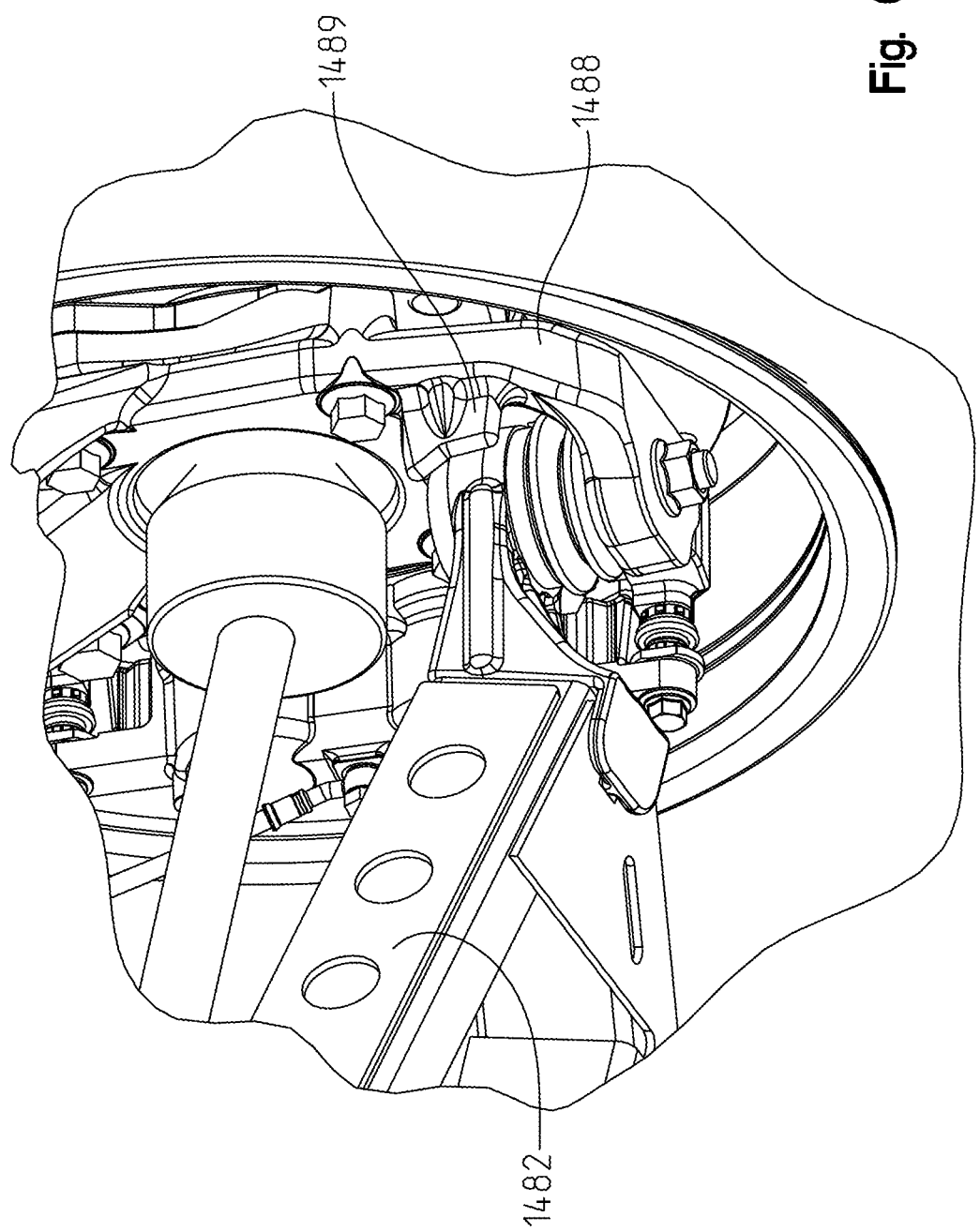
FIG. 62A is a perspective view of a portion of the front suspension assembly of FIG. 62, including a stop member.
Figure 63:
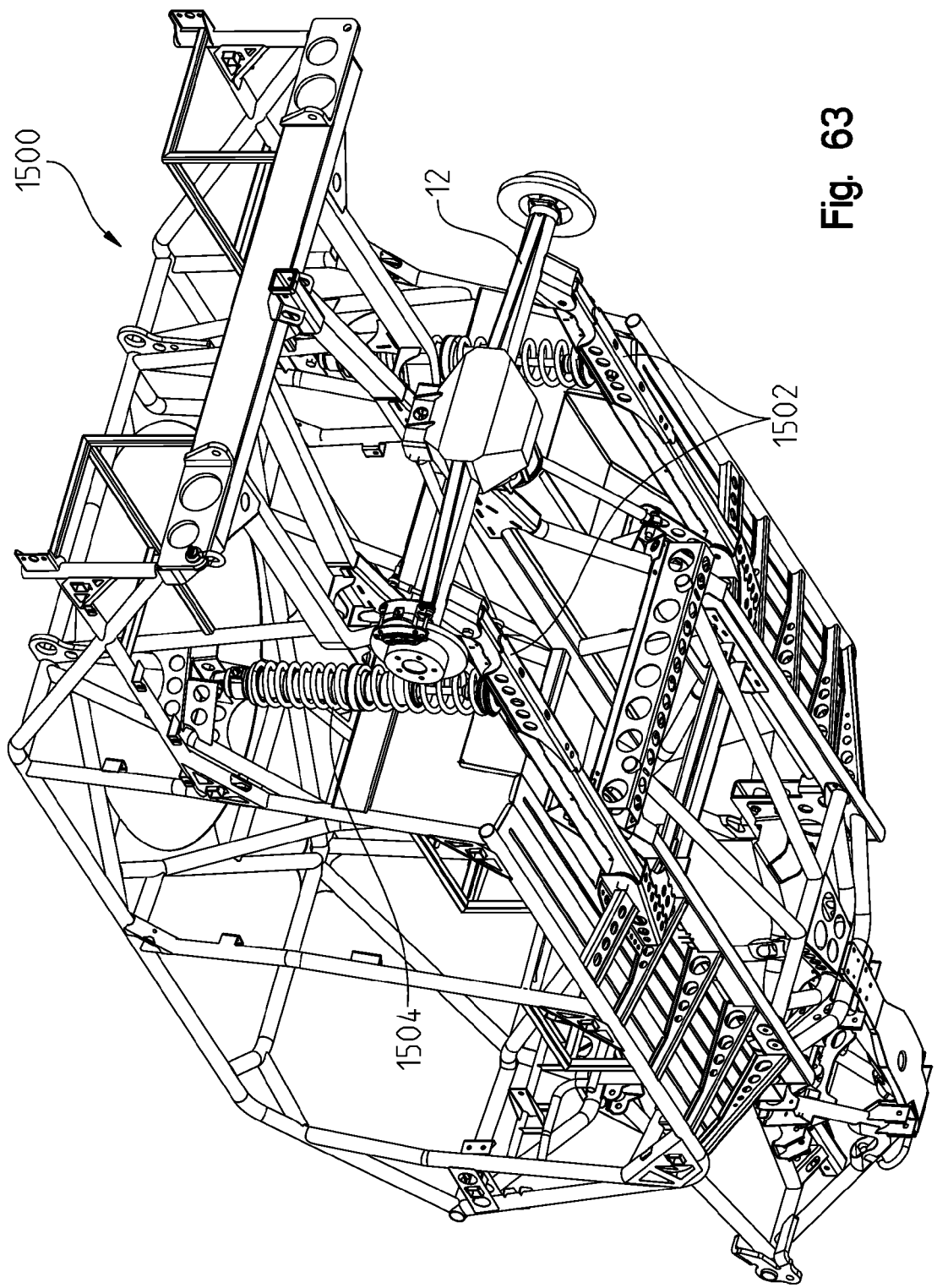
FIG. 63 is a rear bottom perspective view of a rear suspension assembly of the vehicle of FIG. 42.
Figure 64:
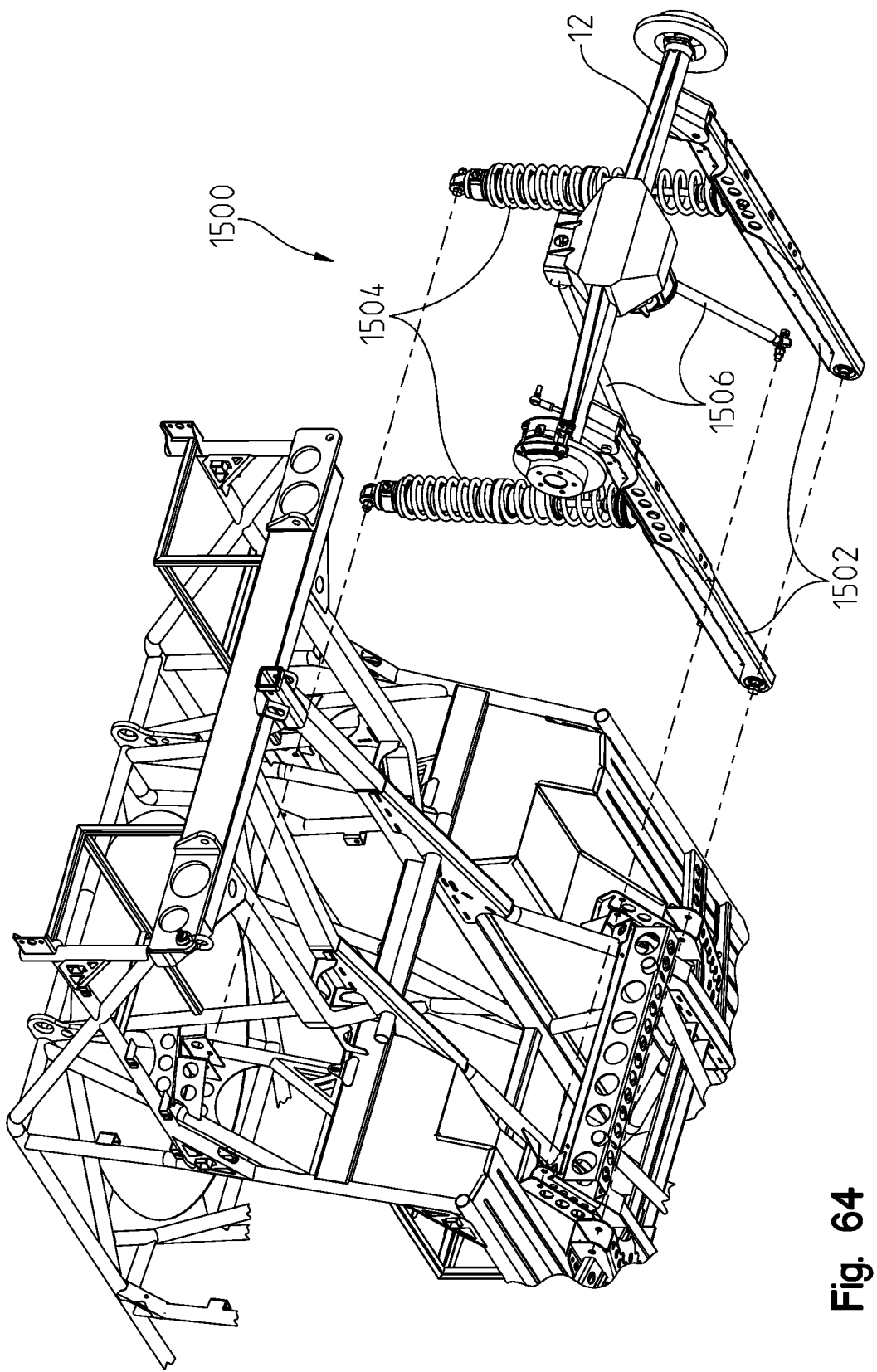
FIG. 64 is an exploded view of the rear suspension assembly of FIG. 63.
Figure 65:
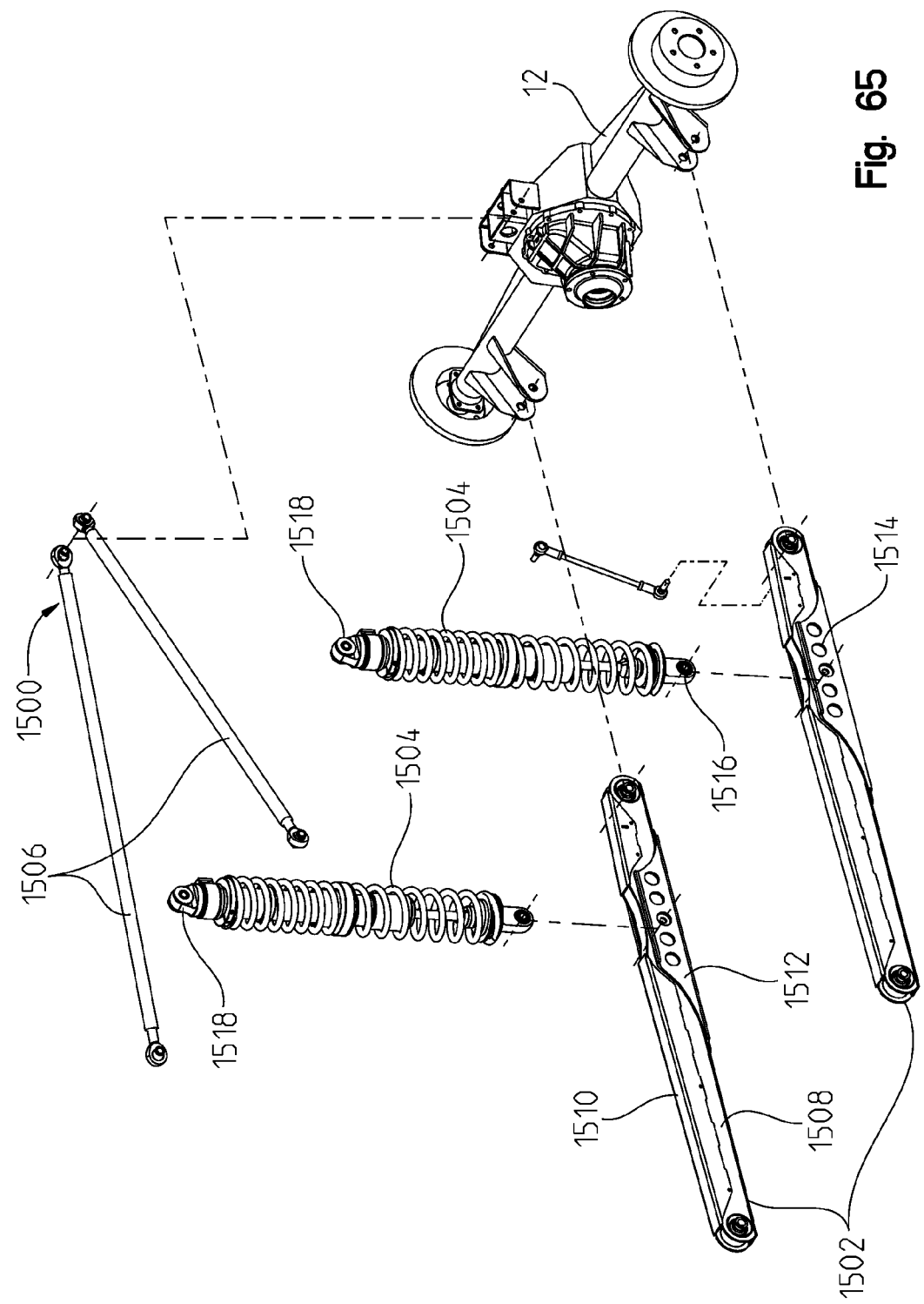
FIG. 65 is a further exploded view of the rear suspension assembly of FIG. 64.

In one embodiment, shown in FIG. 62A, wheel spindle or knuckle 1488 includes a stop member 1489. Stop member 1489 assists in controlling clearances between components of front suspension assembly 1480 during suspension and steering travel. Additionally, stop member 1489 protects the body of vehicle 1200, steering rack assemblies 666 and 666', upper control arm 1484, the CV joints, tie rods 668, and other components of front wheels 6 and front suspension assembly 1480 when vehicle 1200 is at full turn.

With reference now to FIGS. 63-66, rear suspension assembly 1500 includes trailing arms 1502, shock absorbers 1504, and rear alignment arms 1506 coupled to rear axle 12. In one embodiment, shock absorbers 1504 are from Fox Shox. Rear suspension assembly 1500 is generally similar to rear suspension assembly 460 of FIGS. 26-28B. Trailing arms 1502 include elongate arm portions 1508, plate portions 1510, and bracket portions 1512. Elongate arm portions 1508, plate portions 1510, and bracket portions 1512 are coupled together in a clam-shell configuration with conventional fasteners, for example welds, adhesive, bolts, and/or rivets. This clam-shell configuration of trailing arms 1502 is designed to uniformly transfer loads throughout trailing arms 1502.

Figure 66:
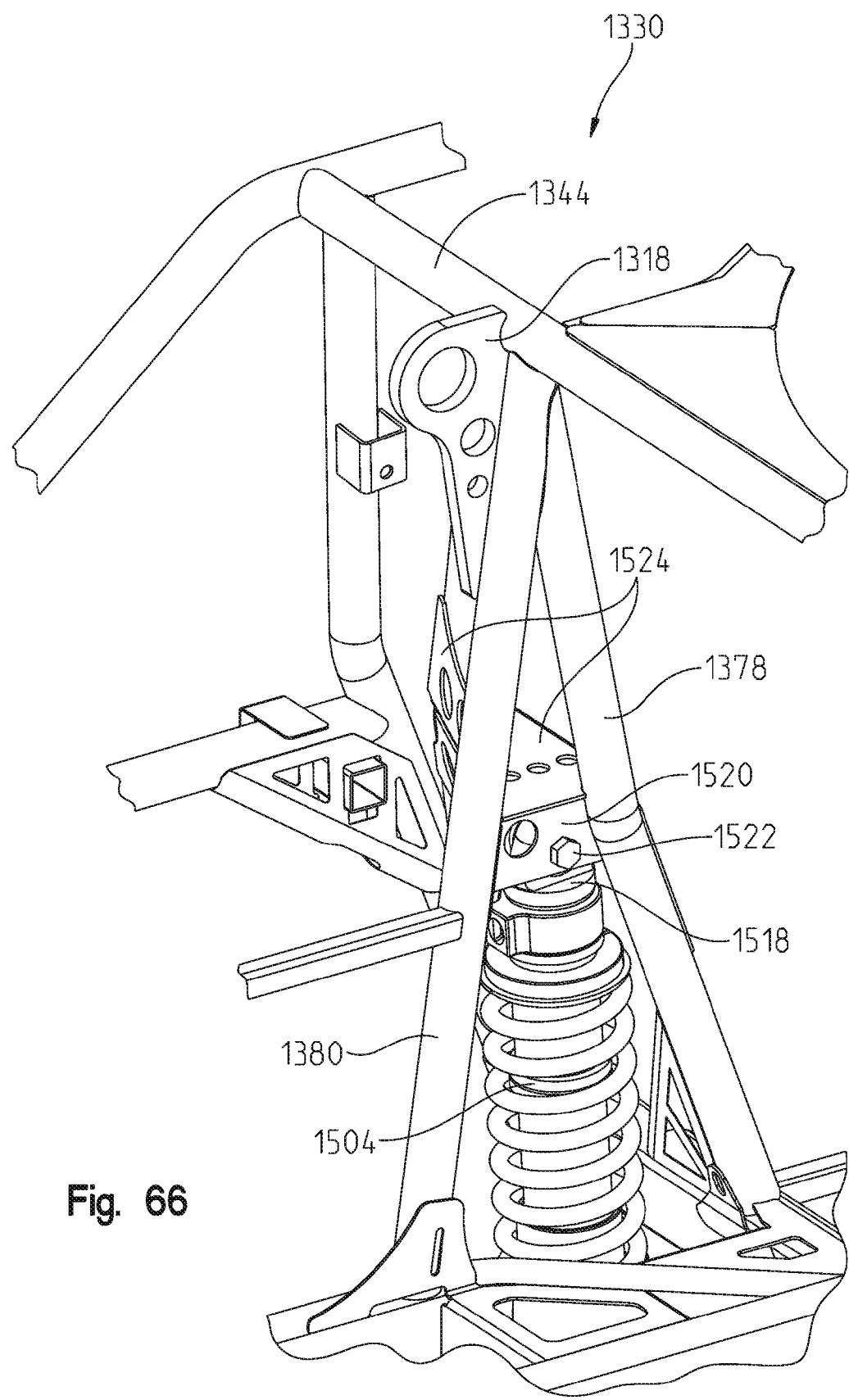
FIG. 66 is a left front perspective view of a portion of the rear suspension assembly and frame assembly of FIG. 64.

Shock absorbers 1504 include lower mounts 1516 and upper mounts 1518. Lower mounts 1516 are coupled to trailing arms 1502 with a conventional fasteners that is received within aperture 1514 of trailing arms 1502 and lower mounts 1516. Upper mounts 1518 of shock absorbers 1504 are configured to couple with roll cage assembly 1330. More particularly, as shown in FIG. 66, upper mounts 1518 are coupled to brackets 1520 with a fastener 1522, illustratively a bolt. Brackets 1520 are coupled to rear pillar members 1378 and upstanding members 1380 through conventional methods, for example with welds, adhesive, bolts, and/or rivets. As shown best in FIG. 69, brackets 1520 are positioned laterally outwardly or outboard of tunnel member 1430. Rear cargo bed assembly 1530 is packaged around brackets 1520 and upper mounts 1518 for shock absorbers 1504 in order configure brackets 1520 and upper mounts 1518 outboard of tunnel member 1430.

Additionally, because both brackets 1520 for shock absorbers 1504 and accessory mounts 1318, which may be tie downs for vehicle 1200, are coupled to upstanding members 1380, loads from shock absorbers 1504 and accessory mounts 1318 may be transmitted directly to roll cage assembly 1330, rather than one or more body panels 1202 of vehicle 1200.

At least one support plate 1524 may be coupled to roll cage assembly 1330, illustratively rear inner pillar members 1378 and/or upstanding members 1380, in order to further strengthen the coupling between shock absorber 1504 and roll cage assembly 1330. In one embodiment, shown in FIG. 69, rear suspension assembly 1500 may include one, two, or three support plates 1524 around upper mount 1518 of shock absorbers 1504.

Figure 67:
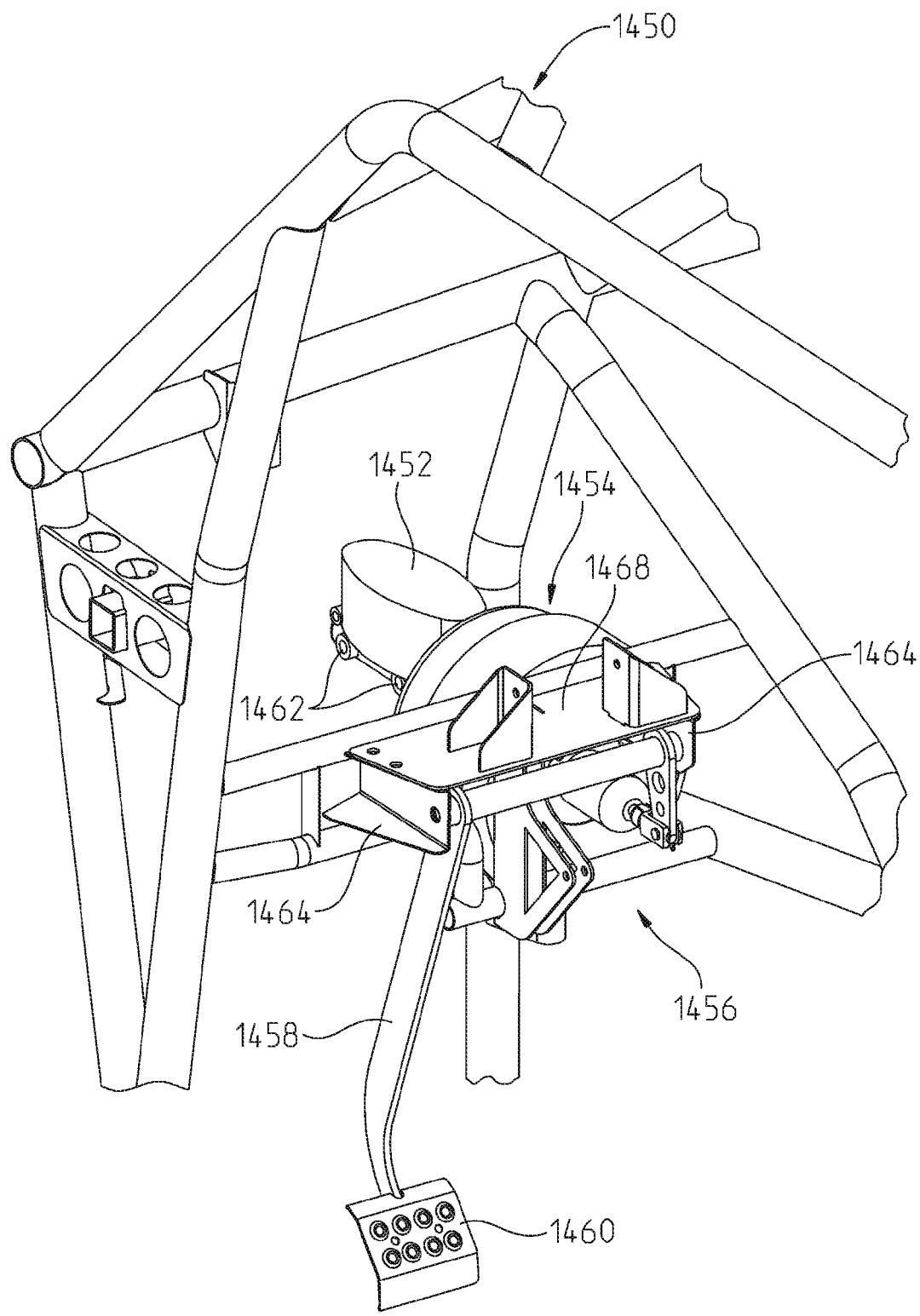
FIG. 67 is a left rear perspective view of a brake assembly of the vehicle of FIG. 62.
Figure 68:
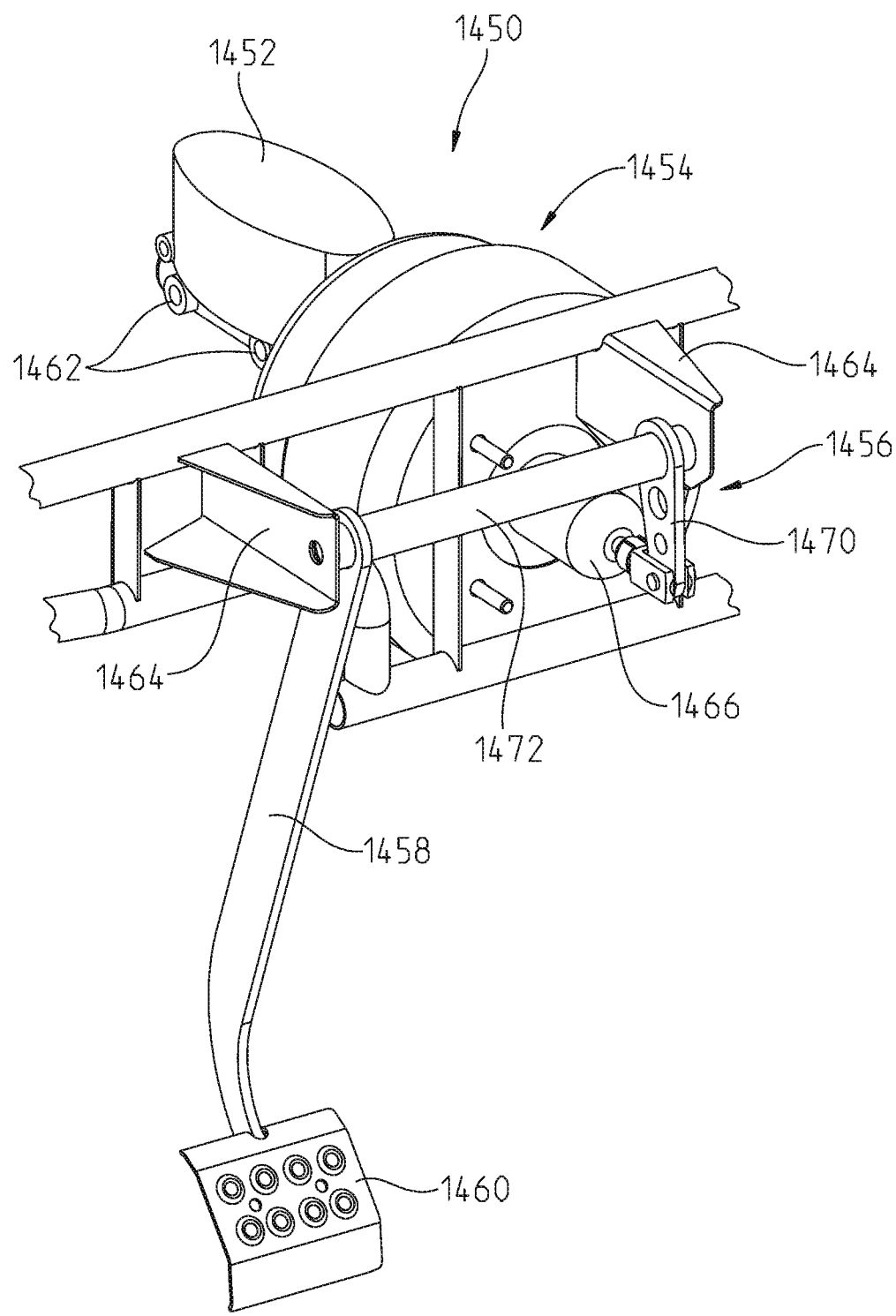
FIG. 68 is a further left rear perspective view of the brake assembly of FIG. 62.
Figure 69:
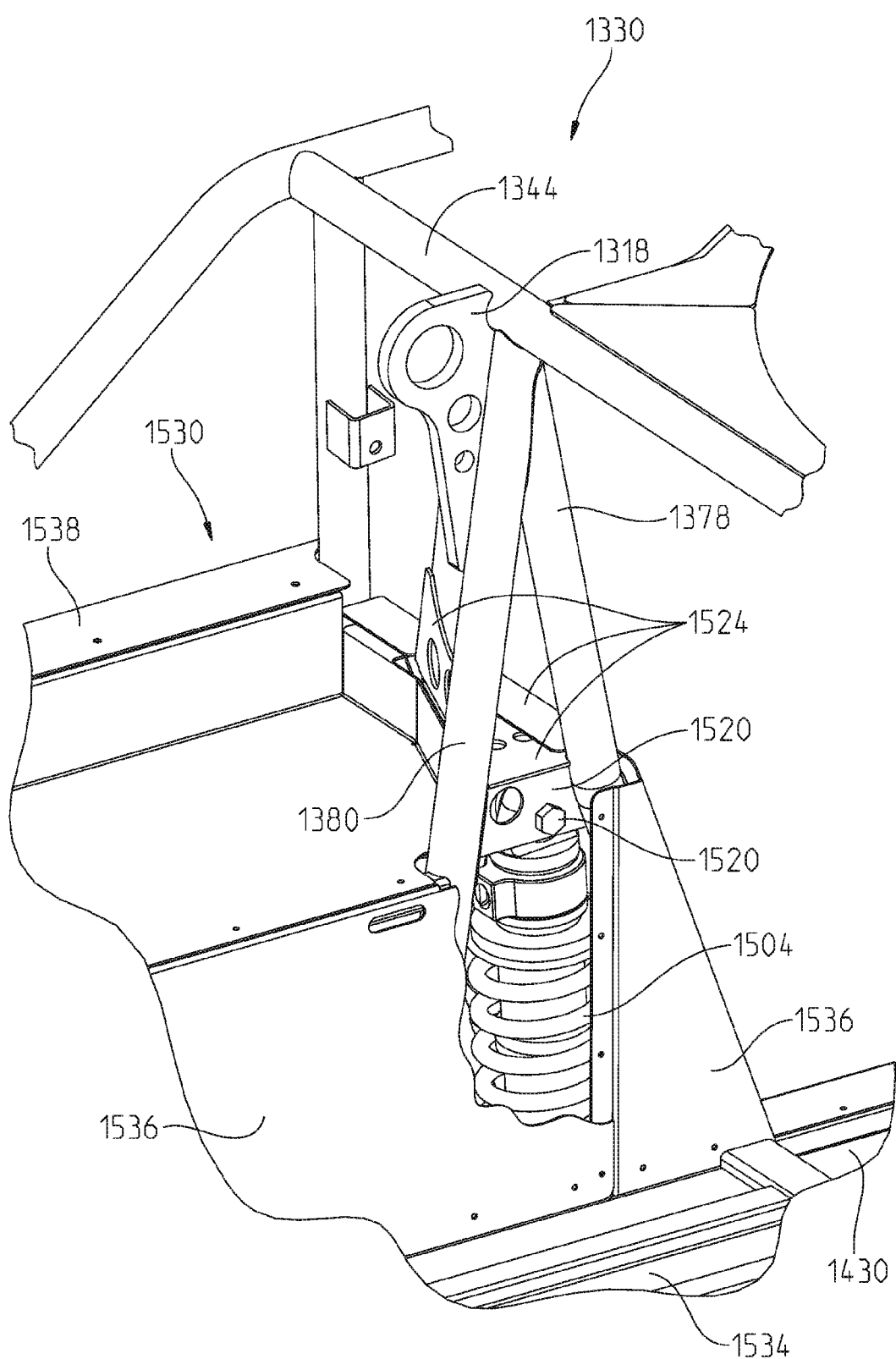
FIG. 69 is a partial cut-away view of a portion of the rear suspension assembly of FIG. 68 and a portion of a cargo bed assembly of the vehicle of FIG. 42.

Referring to FIGS. 67 and 68, a brake assembly 1450 is disclosed. Brake assembly 1450 includes a master cylinder 1452, a brake booster 1454, a linkage assembly 1456, a lever arm 1458, and a brake pedal 1460. Brake assembly 1450 is housed within dash board assembly 1432 and a portion of brake assembly 1450, such as lever arm 1458 and brake pedal 1460, extend below dash board assembly 1432 and into operator area 1400 to provide access thereto for the operator. By housing brake assembly 1450 within and under dash board assembly 1432, front frame portion 1212 of frame assembly 1210 has additional space for other components of vehicle 1200, such as front wheels 6, front suspension assembly 1480, and steering assembly 1436.

As is apparent from FIGS. 67 and 68, master cylinder 1452 extends forward from brake booster 1454. Illustratively, master cylinder 1452 is generally parallel to longitudinal axis L of vehicle 1200. Master cylinder 1452 is coupled to ports 1462 with hoses (not shown) to allow fluid, for example hydraulic fluid, to flow to and from master cylinder 1452 during operation of brake assembly 1450.

Brake booster 1454 is positioned intermediate master cylinder 1452 and linkage assembly 1456 and is operably coupled to both master cylinder 1452 and linkage assembly 1456. As shown in FIG. 68, brake booster 1454 is coupled to a bracket 1464 with conventional fasteners (not shown). Brake booster 1454 includes an input shaft 1466, which is operably coupled to linkage assembly 1456. A braking force is transmitted from the operator to brake booster 1454 via linkage assembly 1456 and input shaft 1466. To facilitate deceleration and stopping of vehicle 1200, brake booster 1454 receives an input braking force from input shaft 1466 and increases the braking force transmitted from master cylinder 1452 to the brake calipers at wheels 6, 10.

As shown in FIG. 67, bracket 1464 is coupled to frame assembly 1210 and a plate member 1468. Plate member 1468 and/or bracket 1464 also may support at least a portion of steering assembly 1436, for example the steering wheel. Bracket 1464 also is coupled to linkage assembly 1456, which includes a first link 1470 and a second link 1472. First link 1470 is pivotably coupled to input shaft 1466 and second link 1472. Second link is pivotably coupled to lever arm 1458. As such, in operation, when the operator depresses pedal 1460, movement in lever arm 1458 is transmitted to second link 1472. Second link 1472 then rotates, pivots, or otherwise moves, thereby causing movement in first link 1470. The movement of first link 1470 is transmitted to input shaft 1466 and, therefore, to brake booster 1454. Input shaft 1466 engages brake booster 1454 in order increase the braking force from master cylinder 1452. Through ports 1462, master cylinder 1452 transmits a braking force to the brake calipers to slow the rolling movement of front wheels 6 and rear wheels 10.

In one embodiment of brake assembly 1450, the brakes at front wheels 6 may include a hydraulic lock or line lock. For example, the line lock may be configured to extend into operator area 1400. For example, the line lock may be positioned within or below tunnel 1430. In a further embodiment, the rear brakes at rear wheels 10 are a drum style. Additionally, brake assembly 1450 may be configured with a four-wheel parking brake.

Referring now to FIGS. 69-72, rear cargo bed assembly 1530 is shown and includes cargo bed frame assembly 1532, a cargo bed surface or platform 1534, inner walls 1536, outer walls 1538, a tailgate member 1540, and a latch assembly 1550. The width of rear cargo bed assembly 1530, including cargo bed frame assembly 1532 and cargo bed platform 1534, may be approximately 1850-1950 mm, and illustratively is approximately 1880 mm. Cargo bed frame assembly 1532 is shown in FIGS. 51-53 and includes outer upstanding members 1570, outer longitudinal members 1572, braces 1574, inner longitudinal members 1576, and inner upstanding members 1578. Outer longitudinal members 1572 are coupled to outer upstanding members 1570, braces 1574, diagonal members 1382, and rear upstanding pillar members 1374. Outer and inner upstanding members 1570 and 1578 are coupled to tailgate support member 1304 and braces 1574. Additionally, inner upstanding members 1578 are coupled to inner longitudinal members 1576. Inner longitudinal members 1576 also are coupled to upstanding members 1380.

Cargo bed frame assembly 1532 defines spaces for cargo and other components of vehicle 1200. For example, outer upstanding members 1570, outer longitudinal members 1572, braces 1574, inner longitudinal members 1576, and inner upstanding members 1578 define two raised spaces of rear cargo bed assembly 1530. Inner and outer walls 1536, 1538 are coupled to outer upstanding members 1570, outer longitudinal members 1572, braces 1574, inner longitudinal members 1576, and inner upstanding members 1578 to define storage containers on rear cargo bed assembly 1530. Cargo bed platform 1534 is positioned between these two storage containers.

Outer walls 1538 of rear cargo bed assembly 1530 may include apertures 1539 which expose a portion of cargo bed frame assembly 1532. Illustratively, apertures 1539 expose outer longitudinal members 1572. As such, apertures 1539 and outer longitudinal members 1572 cooperate to define a tie-down for accessories, cargo, or transportation means for vehicle 1200. In this way, any force applied to vehicle 1200 by the accessory, cargo, or transportation means may be directly transmitted to cargo bed frame assembly 1532 and roll cage assembly 1330.

Figure 70:
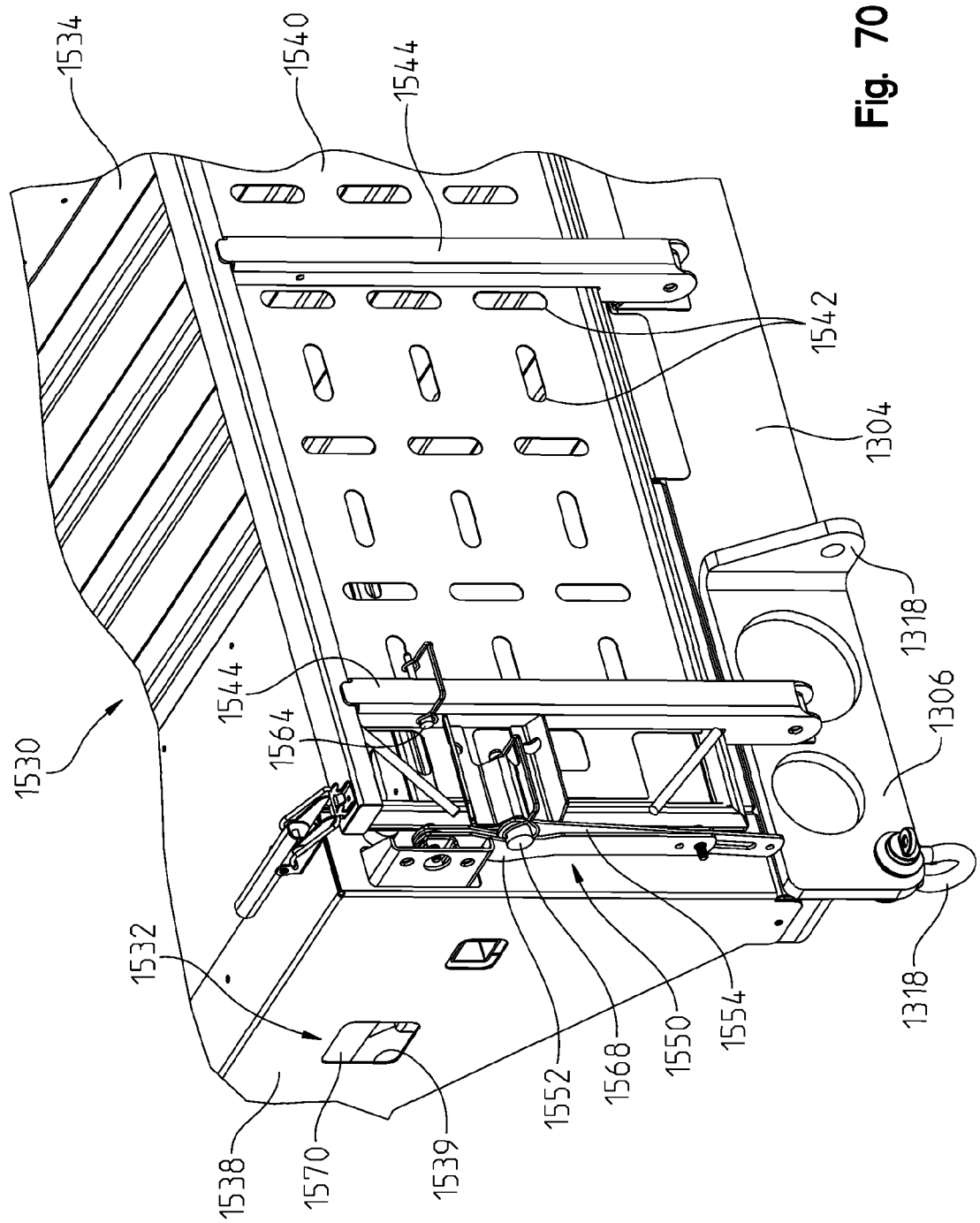
FIG. 70 is a left rear perspective view of a tailgate member of the cargo bed assembly of FIG. 69 in a closed position.
Figure 71:
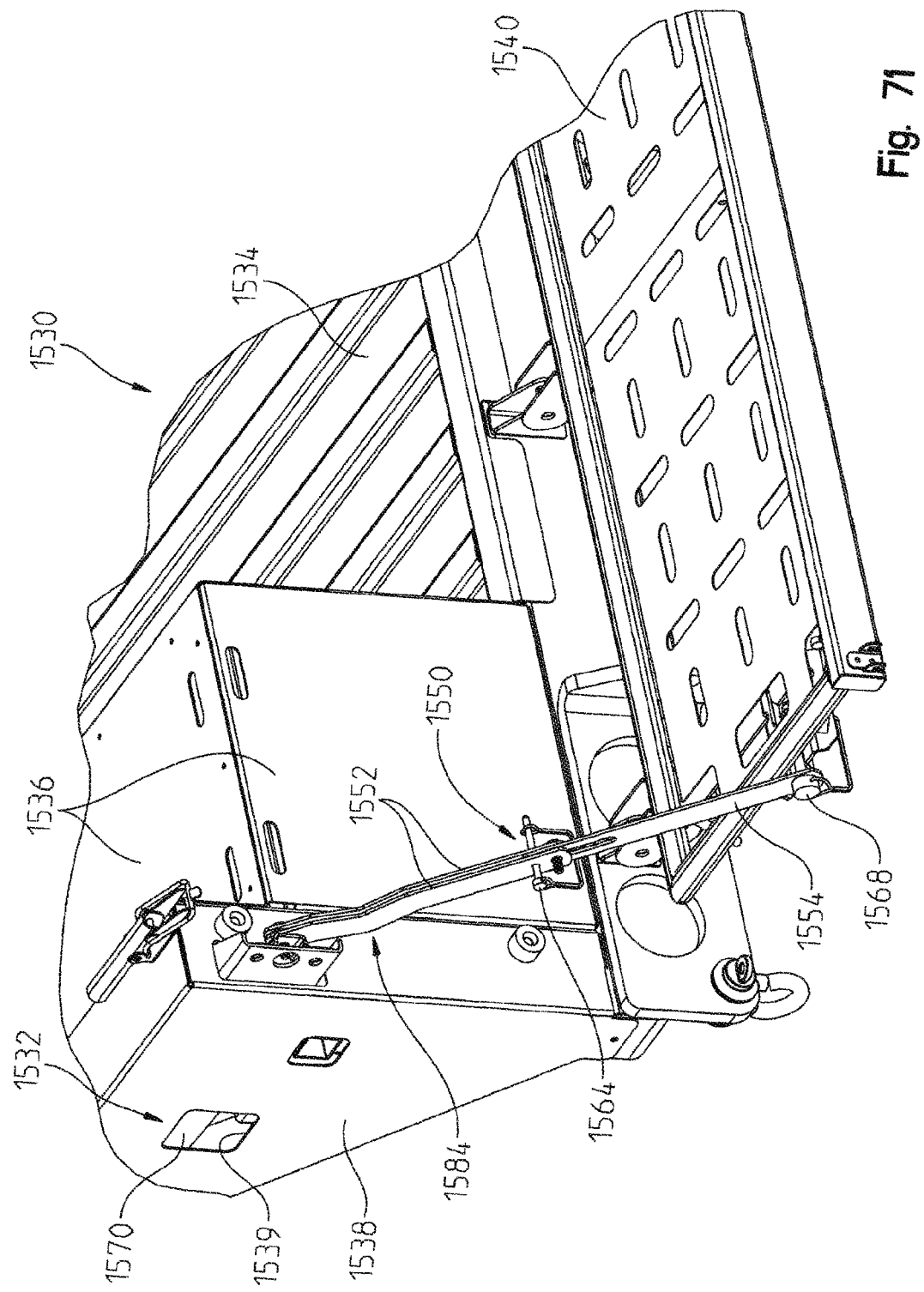
FIG. 71 is a left rear perspective view of the tailgate member of FIG. 70 in an open position.

As shown in FIGS. 70 and 71, tailgate member 1540 includes a plurality of openings 1542 which also may be used as tie-downs for vehicle 1200. Tailgate member 1540 also includes braces 1544 which are coupled to tailgate support member 1304. Latch assembly 1550 also is coupled to one of braces 1544. When latched, latch assembly 1550 closes tailgate member 1540 against cargo bed frame assembly 1532. However, when unlatched, latch assembly 1550 allows tailgate member 1540 to open and extend rearwardly from rear cargo bed assembly 1530.

Figure 72:
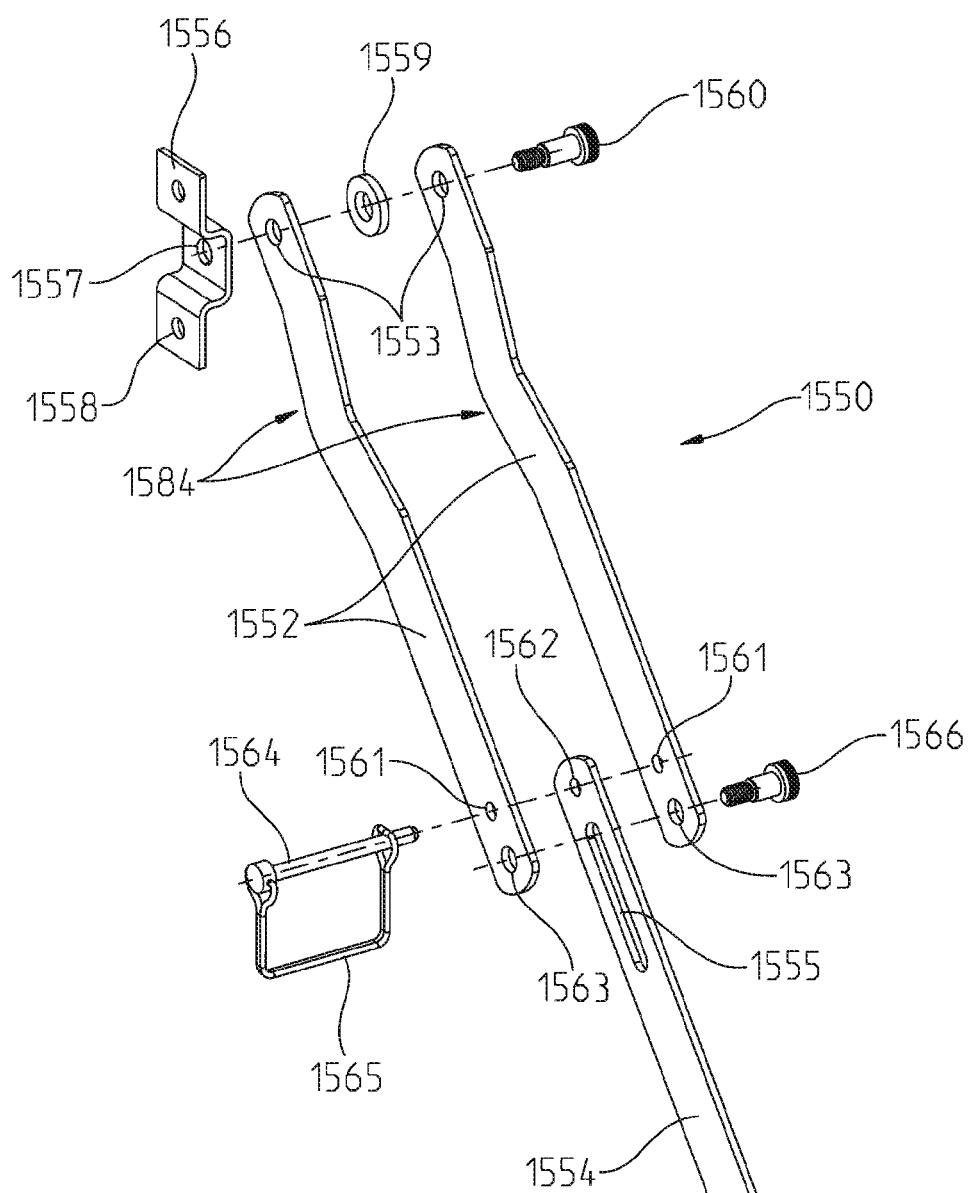
FIG. 72 is an exploded view of a latch assembly of the tailgate member of FIG. 71.

Referring to FIG. 72, latch assembly 1550 includes two upper arms 1552 and one lower arm 1554. Upper arms 1552 are generally parallel to each other and are positioned outwardly from lower arm 1554. The configuration of two upper arms 1552 may prevent bending when tailgate member 1540 and latch assembly 1550 receive a load. Upper arms 1552 include upper apertures 1553, which allow a fastener 1560 to be received therethrough in order to couple upper arms 1552 to spacer 1559, bracket 1556, and rear cargo bed assembly 1530. More particularly, fastener 1560 is received through spacer 1559, upper apertures 1553, and an aperture 1557 of bracket 1556. Other fasteners are received through apertures 1558 of bracket 1556 in order to couple bracket 1556 to rear cargo bed assembly 1530.

Upper arms 1552 are coupled to lower arm 1554 with a fastener 1566. More particularly, fastener 1566 is received through lower apertures 1563 of upper arms 1552 and a slot 1555 of lower arm 1554. Upper arms 1552 also include apertures 1561 for receiving a first pin 1564. First pin 1564 also is received through an upper aperture 1562 of lower arm 1554. A first handle 1565 is received around first pin 1564.

Lower arm 1554 also includes a lower aperture 1567 which receives a second pin 1568 for coupling latch assembly 1550 to tailgate member 1540, as shown in FIG. 70. A second handle 1569 is received around second pin 1568.

As shown in FIGS. 71 and 72, upper arms 1552 include a bend 1584, which allows latch assembly 1550 to be closed without interference. More particularly, as latch assembly 1550 is closed (shown in FIG. 71), lower arm 1554 moves toward upper arms 1552 and slides between upper arms 1552. Bend 1584 in upper arms 1552 prevents upper arms 1552 from interfering with the movement of lower arm 1554 when tailgate member 1540 and latch assembly 1550 are moved to the closed position.

As shown best in FIG. 59, cargo bed platform 1534 defines a surface that extends between tailgate member 1540 and tunnel member 1430. The width of cargo bed platform 1534 may be approximately 900-950 mm and, illustratively, is approximately 920 mm. The longitudinal length of cargo bed platform 1534 may be approximately 1300-1400 mm and, illustratively is approximately 1360 mm. Cargo bed platform 1534 may be coupled to tunnel member 1430 and coupled to rear longitudinal support members 1310. By coupling cargo bed platform 1534 to tunnel member 1430, the structural integrity of vehicle 1200 may increase. Cargo bed platform 1534 may be approximately 38 inches from the ground and, similarly, tunnel member 1430 may be approximately 38 inches from the ground. As such, tunnel member 1430 forms an extension of cargo bed platform 1534. In this way, large or long cargo may be carried on vehicle 1200 by extending the cargo along cargo bed platform 1534 and tunnel member 1430. Additionally, cargo bed platform 1534 and tunnel member 1430 may be configured to receive a litter or other carrier for a passenger. Alternatively, because cargo bed platform 1534 and tunnel member 1430 are at the same height with respect to the ground and define a generally continuous planar surface, a passenger of vehicle 1200 may stand, walk, or otherwise move between operator area 1400 and rear cargo bed assembly 1530 by moving along tunnel member 1430 and cargo bed platform 1534.

Alternatively, as shown in FIGS. 72A-72D, an alternative embodiment of rear cargo bed assembly 1530 is shown as rear cargo bed assembly 1530'. Rear cargo bed assembly 1530' includes cargo bed platform 1534 and walls 1536. A plurality of cargo attachments or tie downs 1546 are included on cargo bed platform 1534. Tie downs 1546 are illustratively U-shaped and include an attachment portion 1546a extending above cargo bed platform 1534 and legs 1546b extending below cargo bed platform 1534. More particularly, legs 1546b extend through openings in a bracket 1549. Legs 1546b include springs 1547, which extend between bracket 1549 and conventional fasteners 1548, such that tie downs 1546 are spring loaded. As such, tie downs 1546 are biased in a downward position against the top surface of cargo bed platform 1534. However, a user may pull up on attachment portion 1546a in order to couple cargo or accessories to tie downs 1546. In this way, cargo bed platform 1534 supports and maintains the position of cargo and/or accessories on rear cargo bed assembly 1530'.

Figure 72C:
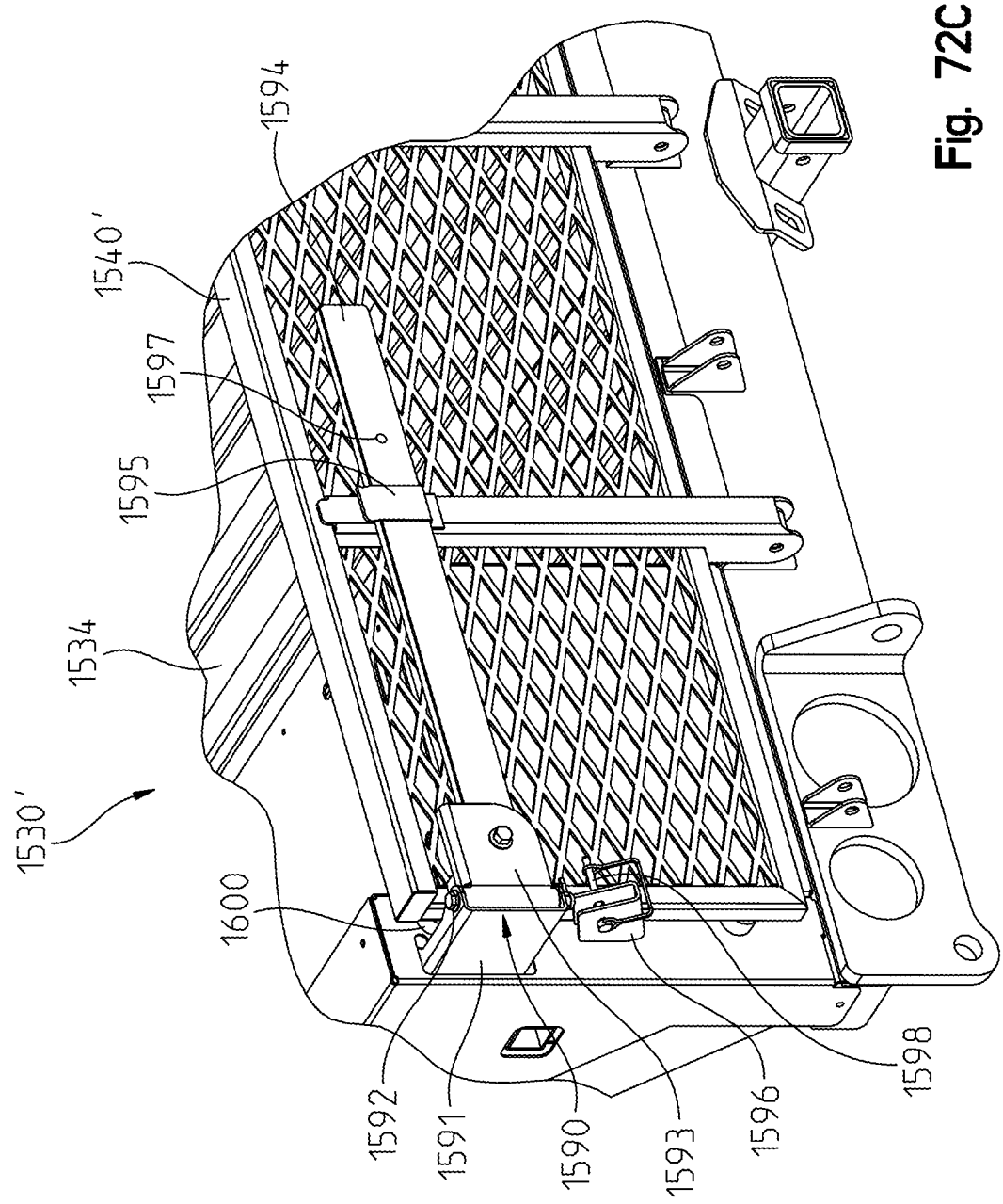
FIG. 72C is a left rear perspective view of a tailgate member of the alternative embodiment cargo bed assembly of FIG. 72A in a closed position.
Figure 72D:
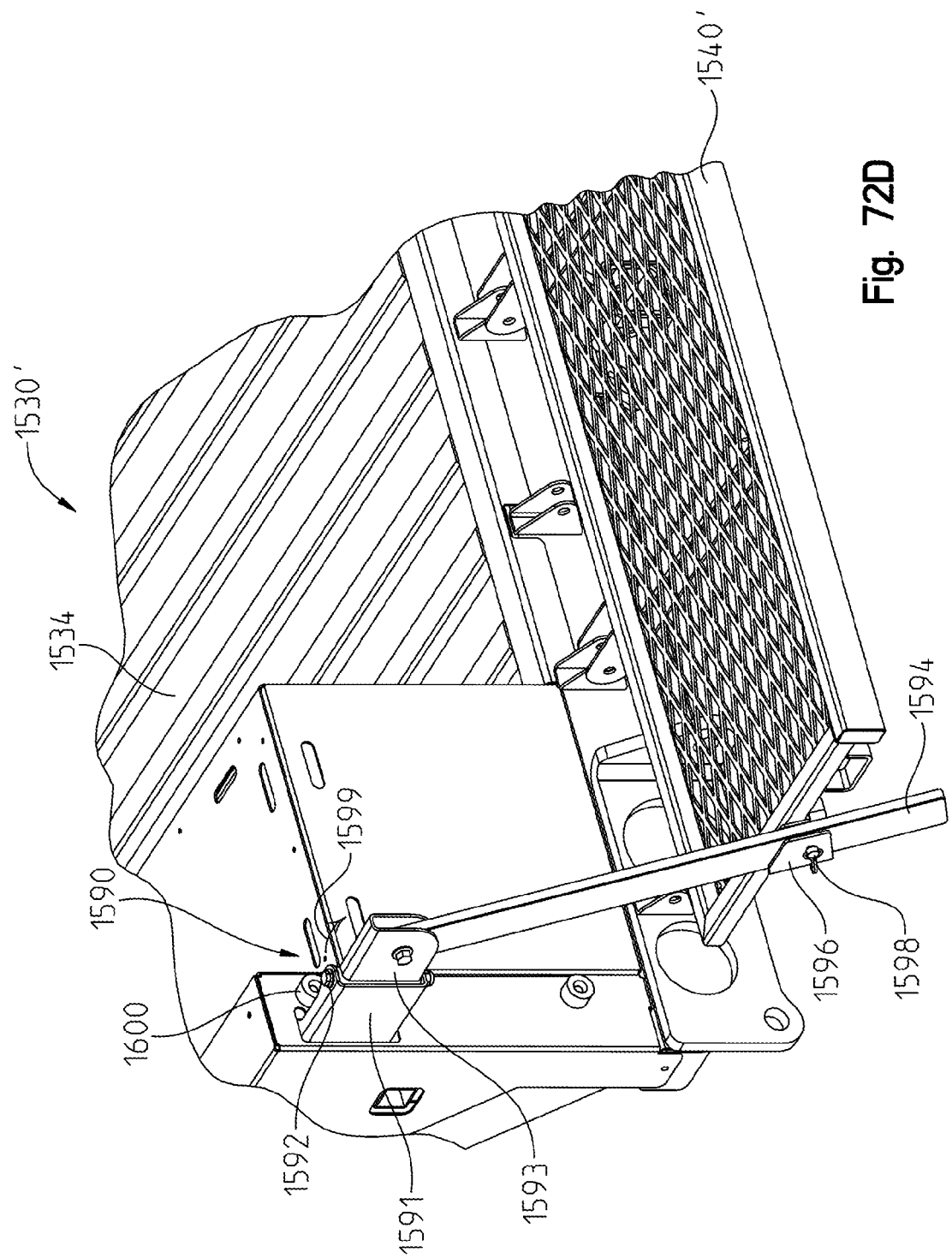
FIG. 72D is a left rear perspective view of the tailgate member of FIG. 72C in an open position.

Additionally, as shown in FIGS. 72C and 72D, rear cargo bed assembly 1530' includes an alternative embodiment tailgate member 1540'. Tailgate member 1540' is configured to pivot between a closed position (FIG. 72C) and an open position (FIG. 72D). Tailgate member 1540' is supported in the closed and open positions by a support member 1594, as detailed herein. Tailgate member 1540' includes a pivot assembly 1590 comprised of a fixed bracket 1592, a pivot bracket 1593, and a fastener, illustratively a bolt 1592. Pivot bracket 1593 is configured to pivot between a closed position (FIG. 72C) corresponding to the closed position of tailgate member 1540' and an open position (FIG. 72D) corresponding to the open position of tailgate member 1540'. More particularly, pivot bracket 1593 is configured to pivot in the direction of arrow 1599 (FIG. 72D) when pivoting between the closed position and the open position.

When in the closed position, shown in FIG. 72C, tailgate member 1540' is in a generally upright or vertical position and contacts isolators 1600 to prevent tailgate member 1540' from vibrating against walls 1536 during operation of vehicle 1200. In the closed position, support member 1594 also is closed such that pivot bracket 1593 is in the closed position and is generally perpendicular to fixed bracket 1591. As such, support member 1594 extends across an upper portion of tailgate member 1540' and engages with a tab 1595. In this way, support member 1594 maintains tailgate member 1540' in the closed position.

However, when in the open position, shown in FIG. 72D, tailgate member 1540' is in a generally horizontal position and is parallel with cargo bed platform 1534. In the open position, pivot bracket 1593 pivots in the direction of arrow 1599 and is generally co-planar with fixed bracket 1591. As such, support member 1594 extends rearwardly from pivot bracket 1593 and fixed bracket 1591. Support member 1594 also is configured to pivot in a downward direction from pivot bracket 1593, such that support member 1594 is angled relative to pivot bracket 1593. Support member 1594 is configured to engage with a bracket 1596 on the side of tailgate member 1540' in order to prevent tailgate member 1540' from bouncing, rattling, or otherwise moving when in the open position. More particularly, a pin 1598 extends through an aperture 1597 in support member 1594 in order to couple support member 1594 with tailgate member 1540' and bracket 1596. Support member 1594 may have more than one aperture 1597 in order to support tailgate member 1540' at multiple positions when in the open position. In this way, support member 1594 is configured to move in two different directions in order to stabilize tailgate member 1540' when in the open position. Furthermore, it may be appreciated that a user may move tailgate member 1540' between the closed and open positions without the use of tools such that operation of tailgate member 1540' is toolless.

Referring to FIGS. 73 and 74, vehicle 1200 may be configured to store and carry additional cargo 1582 in operator area 1400. As shown, both rear cargo bed assembly 1530 and 1530' are configured to carry cargo, such as fuel, ammunition, MREs, and other supplies. In one embodiment, vehicle 1200 is configured to support a load of approximately 3,250 lbs. More particularly, illustrative rear cargo bed assemblies 1530, 1530' may be configured to carry an additional 100 gallons of fuel, as well as other supplies. In one embodiment, tailgate member 1540 and tailgate support member 1304 may be configured to support a load of approximately 500 lbs. In one embodiment, rear longitudinal support members 1310 and cargo bed platform 1534 may be configured to support a load of approximately 2,000 lbs. Additional cargo 1582 may be supported within operator area 1400, for example on rear seat frames 1270 and tunnel member 1430. In the embodiment shown in FIGS. 73 and 74, first and second rear passenger seats 1418, 1424 have been removed from vehicle 1200 in order to carry additional cargo 1582 on vehicle 1200. With first and second rear passenger seats 1418, 1424 removed, additional cargo 1582, for example dual 60-gallon fuel tanks, may be supported by rear seat frames 1270 in rear seating section 1416.

As shown in FIGS. 73 and 74, an alternative embodiment of vehicle 1200 may include roof panels 1580, which are configured to couple with roll cage assembly 1330.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a plurality of ground-engaging members;
a drivetrain assembly operably coupled to the ground-engaging members;
a frame assembly supported by the ground-engaging members and extending along a longitudinal axis of the vehicle, the frame assembly including at least one central frame member;
a seating section defining an operator area and supported by the frame assembly, the seating section including at least a first seat and a second seat in a side-by-side configuration, the first and second seat being laterally outward of the at least one central frame member of the frame assembly; and
a roll cage assembly coupled to the frame assembly and generally surrounding the seating section, the roll cage assembly including a plurality of roll cage members, and at least one of the roll cage members includes an upper end and a lower end, and the lower end is angled downwardly and laterally inwardly toward the longitudinal axis relative to the upper end to couple with the at least one central frame member of the frame assembly, the at least one roll cage member being configured to increase space in the operator area.

2. The utility vehicle of claim 1, further comprising a tunnel member coupled to the at least one central frame member and the at least one roll cage member.

3. The utility vehicle of claim 2, wherein the first seat defines an operator seat and the second seat defines a front passenger seat, and the at least one roll cage member includes a first roll cage member positioned rearward of the operator seat and a second roll cage member positioned rearward of the front passenger seat.

4. The utility vehicle of claim 3, wherein the tunnel member is configured to support at least one of a passenger and cargo between the first and second roll cage members.

5. The utility vehicle of claim 3, wherein each of the first and second roll cage members includes a lower end coupled to the tunnel member and an upper end coupled to an upper portion of the roll cage assembly, a first width is defined between lower ends of the first and second roll cage members and a second width is defined between the upper ends of the roll cage assembly, the first width is less than a second width.

6. The utility vehicle of claim 1, wherein the at least one central frame member includes a first upper frame member, a second upper frame member, a first lower frame member, and a second lower frame member, the first and second lower frame members are positioned laterally outward of the first and second upper frame members.

7. The utility vehicle of claim 6, wherein the tunnel member is coupled to the first and second upper frame members, and the tunnel member, the first and second lower frame members, and the first and second upper frame members define a trapezoid in cross-section.

8. The utility vehicle of claim 2, wherein the at least one roll cage member extends through a portion of the tunnel member to couple with the at least one central frame member.

9. The utility vehicle of claim 2, further comprising a cargo portion supported by the frame and positioned generally rearward of the tunnel member, wherein the tunnel member is positioned at a first height from a ground surface and the cargo portion is positioned at a second height from the ground surface, and the first height is approximately equal to the second height.

10. The utility vehicle of claim 1, wherein the seating section includes a forward seating section including the first and second seats and a rearward seating section positioned longitudinally rearward of the forward seating section, and the at least one roll cage member is longitudinally intermediate the forward and rearward seating sections.

11. The utility vehicle of claim 1, wherein the at least one roll cage member has an upper portion angled rearwardly relative to a lower portion.

12. A utility vehicle, comprising:
a plurality of ground-engaging members;
a drivetrain assembly operably coupled to the ground-engaging members;
a frame assembly supported by the ground-engaging members and including at least one central frame member;
a seating section defining an operator area and supported by the frame assembly, the seating section including at least a first seat and a second seat in a side-by-side configuration, the first and second seat being laterally outward of the at least one central frame member of the frame assembly; and
a roll cage assembly coupled to the frame assembly and generally surrounding the seating section, the roll cage assembly including a first roll cage member positioned rearward of the first seat and a second roll cage member positioned rearward of the second seat, and the first and second roll cage members each extend downwardly and inwardly to couple with the at least one central frame member of the frame assembly to increase space in the operator area, and each of the first and second roll cage members includes a lower end coupled to the at least one central frame member and an upper end coupled to an upper portion of the roll cage assembly, a first width is defined between the lower ends of the first and second roll cage members and a second width is defined between the upper ends of the first and second roll cage members, and the first width is less than a second width.

13. The utility vehicle of claim 12, further comprising a tunnel member coupled to the at least one central frame member and the first and second roll cage members.

14. The utility vehicle of claim 13, wherein the tunnel member is configured to support at least one of a passenger and cargo between the first and second roll cage members.

15. A utility vehicle, comprising:
a plurality of ground-engaging members;
a drivetrain assembly operably coupled to the ground-engaging members;
a frame assembly supported by the ground-engaging members and including at least one central frame member, and the at least one central frame member including a first upper frame member, a second upper frame member, a first lower frame member, and a second lower frame member, the first and second lower frame members are positioned laterally outward of the first and second upper frame members;
a seating section defining an operator area and supported by the frame assembly, the seating section including at least a first seat and a second seat in a side-by-side configuration, the first and second seat being laterally outward of the at least one central frame member of the frame assembly;
a roll cage assembly coupled to the frame assembly and generally surrounding the seating section, the roll cage assembly including a plurality of roll cage members, and at least one of the roll cage members extends downwardly and inwardly to couple with the at least one central frame member of the frame assembly, the at least one roll cage member being configured to increase space in the operator area; and
a tunnel member coupled to the at least one central frame member and the at least one roll cage member, the tunnel member being coupled to the first and second upper frame members, and the tunnel member, the first and second lower frame members, and the first and second upper frame members defining a trapezoid in cross-section.

* * * * *